United States Patent [19]

Lawrence et al.

[11] Patent Number: 5,086,513
[45] Date of Patent: Feb. 4, 1992

[54] DIGITAL RADIO TRANSCEIVER PROGRAMMER WITH ADVANCED USER INTERFACE

[75] Inventors: Douglas P. Lawrence; Jeffrey S. Childress, both of Lynchburg, Va.

[73] Assignee: General Electric Company, Lynchburg, Va.

[21] Appl. No.: 337,202

[22] Filed: Apr. 12, 1989

[51] Int. Cl.$^5$ .............................................. H04B 1/38
[52] U.S. Cl. ................... 455/186; 455/184; 455/185; 455/154; 455/160; 455/76; 455/77
[58] Field of Search ............... 455/186, 185, 184, 154, 455/160, 87, 76, 73, 77

[56] References Cited

U.S. PATENT DOCUMENTS

| | | | |
|---|---|---|---|
| 4,247,951 | 1/1981 | Hattori et al. | 455/183 |
| 4,254,504 | 3/1981 | Lewis et al. | 455/76 |
| 4,378,551 | 3/1983 | Drapac | 455/26 |
| 4,392,135 | 7/1983 | Ohyagi | 340/825.44 |
| 4,510,623 | 4/1985 | Bonneau et al. | 455/181 |
| 4,525,865 | 6/1985 | Mears | 455/186 |
| 4,618,997 | 1/1986 | Imazeki et al. | 455/76 |
| 4,688,261 | 8/1987 | Killoway et al. | 455/76 |
| 4,771,399 | 9/1988 | Snowden et al. | 455/186 |
| 4,792,986 | 12/1988 | Garner et al. | 455/186 |
| 4,843,588 | 6/1989 | Flynn | 364/900 |
| 4,860,380 | 8/1989 | Mengel | 455/186 |

OTHER PUBLICATIONS

Programming Manual for M-PD 16$^{Plus}$ Personal Radio (General Electric Co.).
GE Mobile Communications PC Programming MCS Programming Guide, Model TQ3317, vol. 10 (General Electric Company, Apr. 1988).
"SABER" Series Handie-talkie Portable Radios Field Programmer User's Guide, No. 68P81044C65-0 (Motorola Corp. 1987).
SMARTNET Standalone Field Programmer Model T5124A Programming Information Guide, Manual No. 68P81117E11 (Motorola Corp. 1985).
GE Mobile Radio: "Maintenance Manual Universal Radio Programmer," Copyright 12-1983.
GE Mobile Radio: "Phoenix-S, Phoenix-SX: Programming Instructions Using TQ2310 Programmer," Copyright 12-1983.
GE Mobile Radio, "Software Specification Universal Radio Programmer for GEMARC VE," dated Jan. 15, 1985 (redacted version).

Primary Examiner—Donnie L. Crosland
Attorney, Agent, or Firm—Nixon & Vanderhye

[57] ABSTRACT

A digital radio communications transceiver programming apparatus and method are used to load personality defining information in a non-volatile EEPROM memory within a portable or mobile digital radio transceiver. A user interface defines display formats organized in a hierarchial tree structure with more general tasks nearer the "root" of the structure and more specific tasks existing at the "leaf" portions of the structure. The tasks are organized in a hierarchial fashion to simplify operation. Pop-up display formats filling only a portion of the display are used to display help text and for specific user selection tasks. Help text is provided on a field level and on a display format level. Error and range checking are also provided on a field-by-field basis. A changing prompt is displayed on a field-by-field basis to guide the user in filling in input fields, and different operative function key assignments are made on a display format basis.

23 Claims, 45 Drawing Sheets

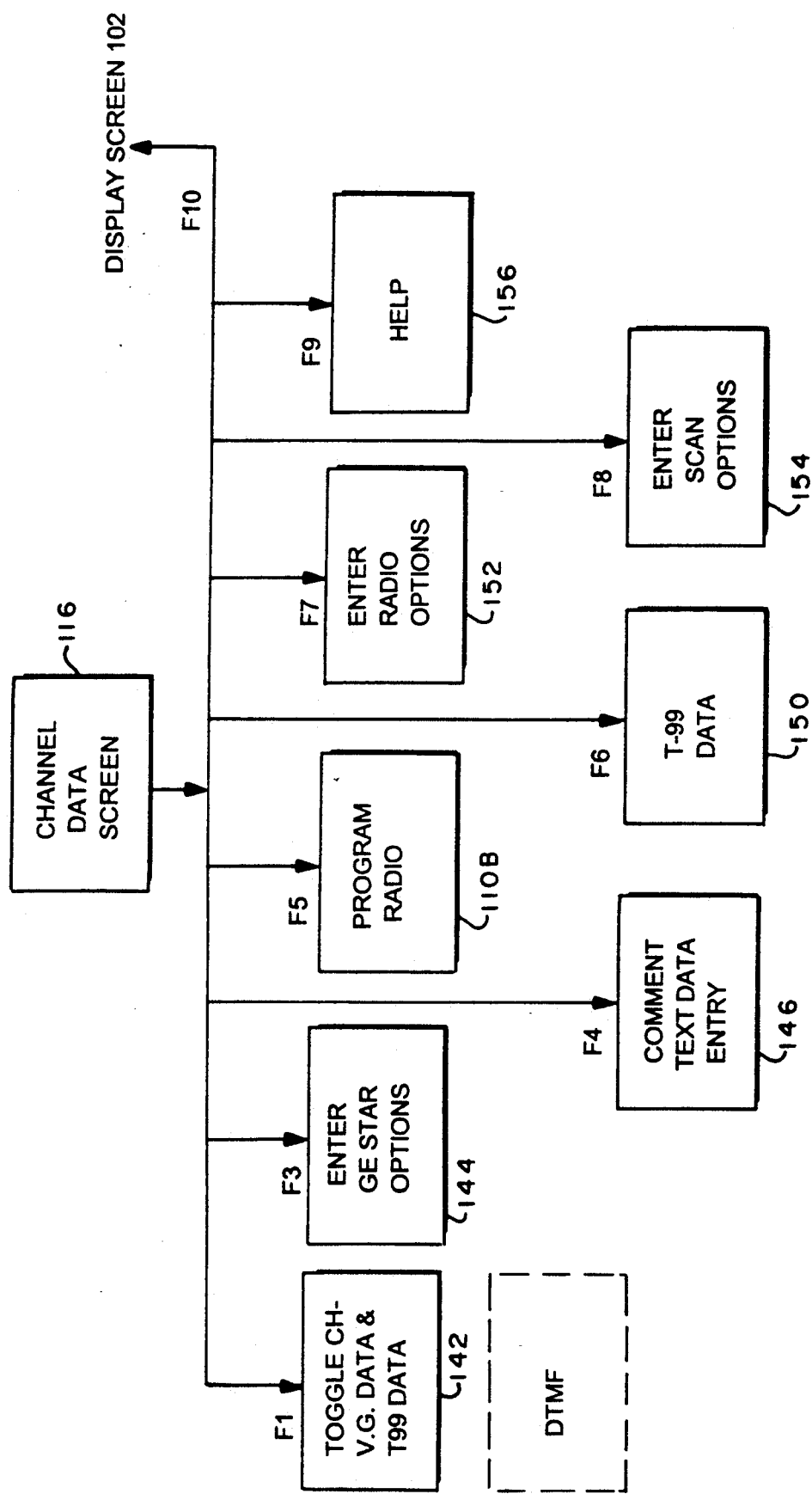

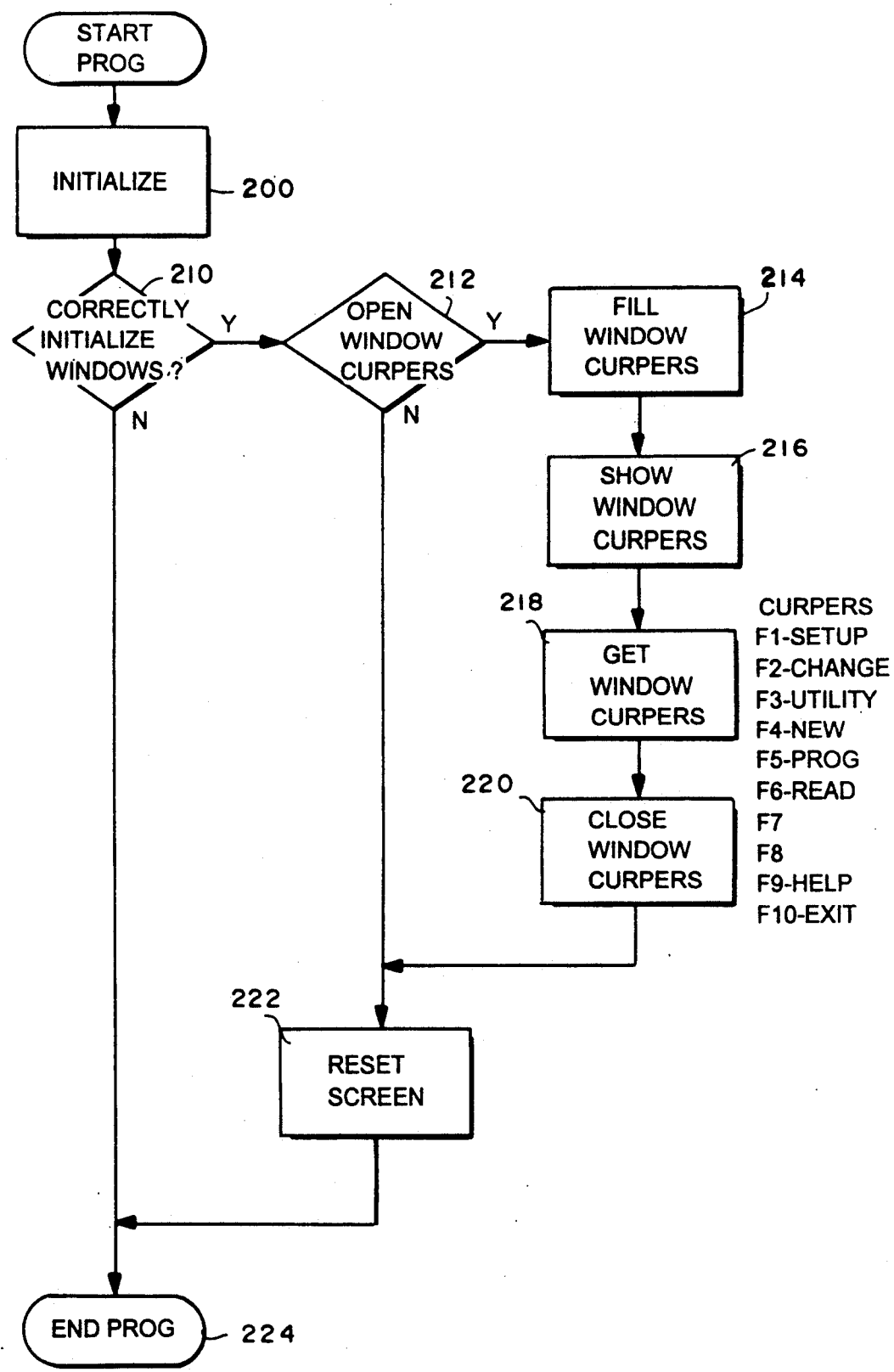
FIG. 4  MAIN ROUTINE

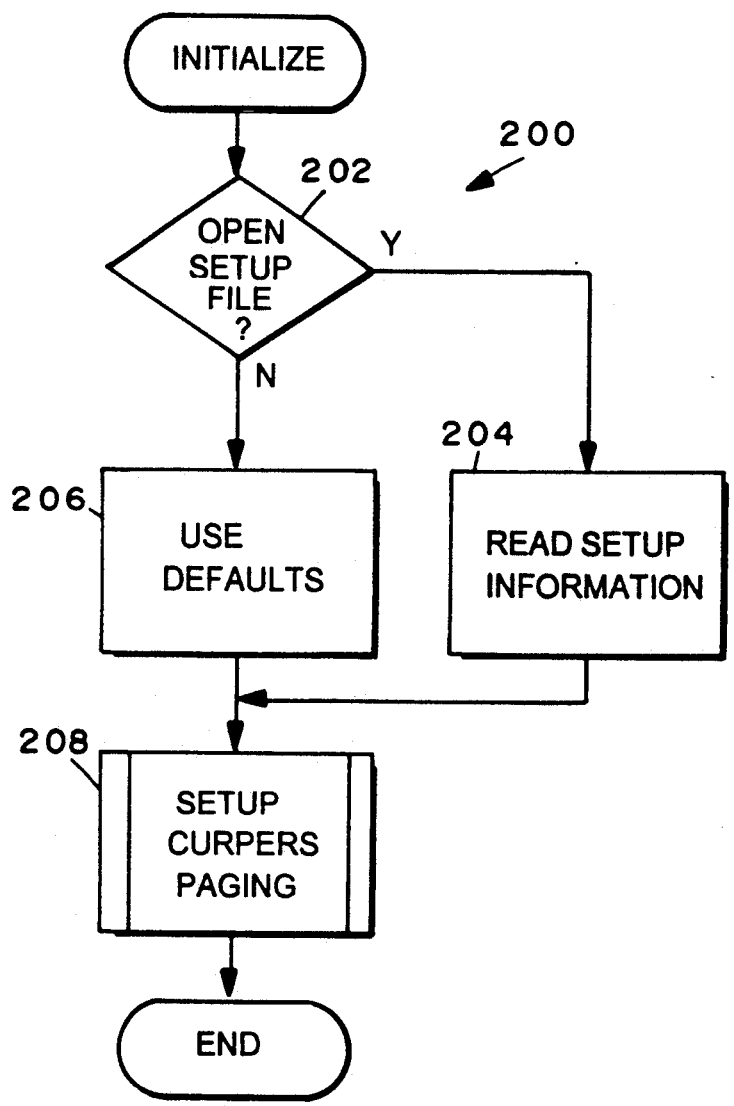
FIG. 5 INITIALIZE ROUTINE

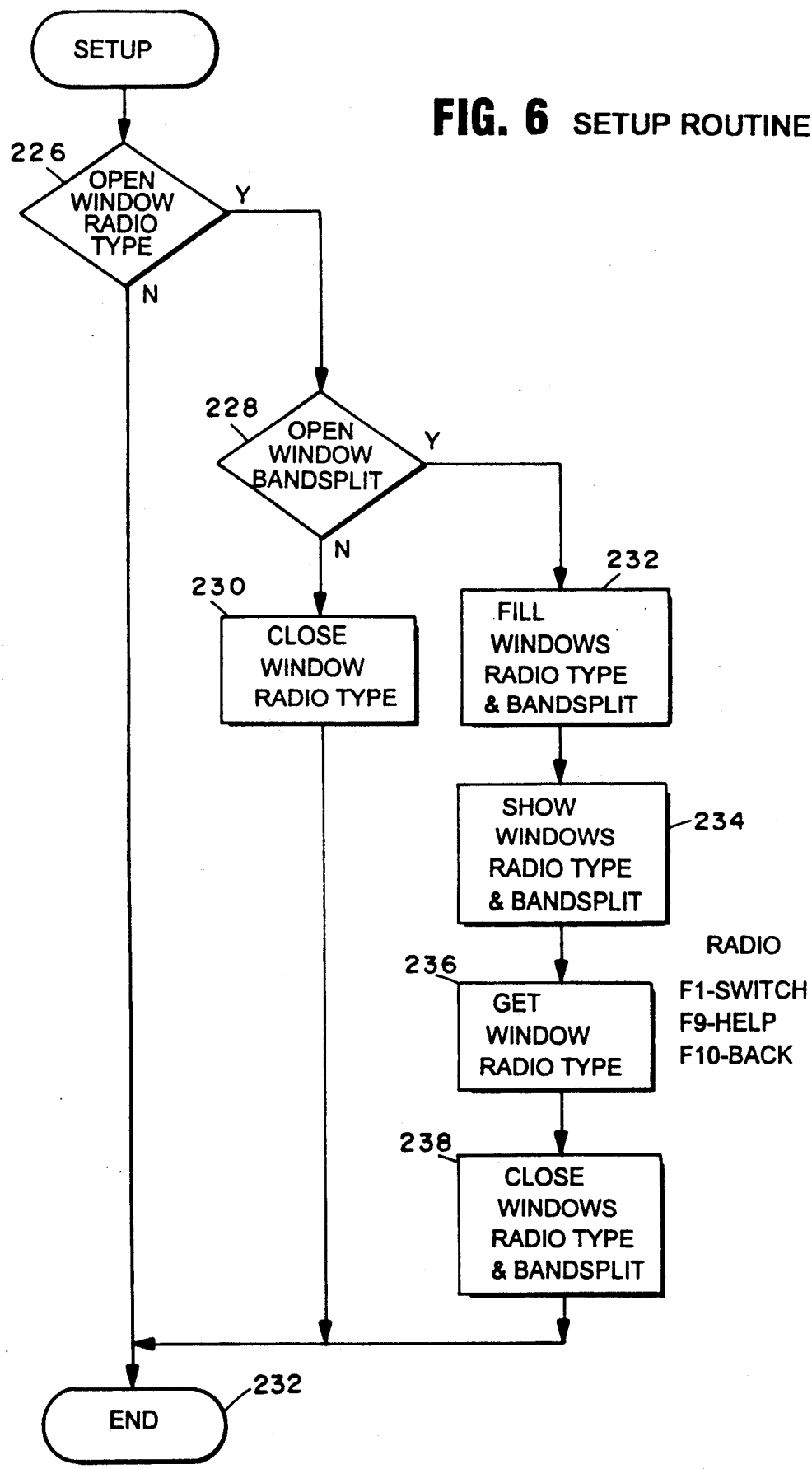
FIG. 6 SETUP ROUTINE

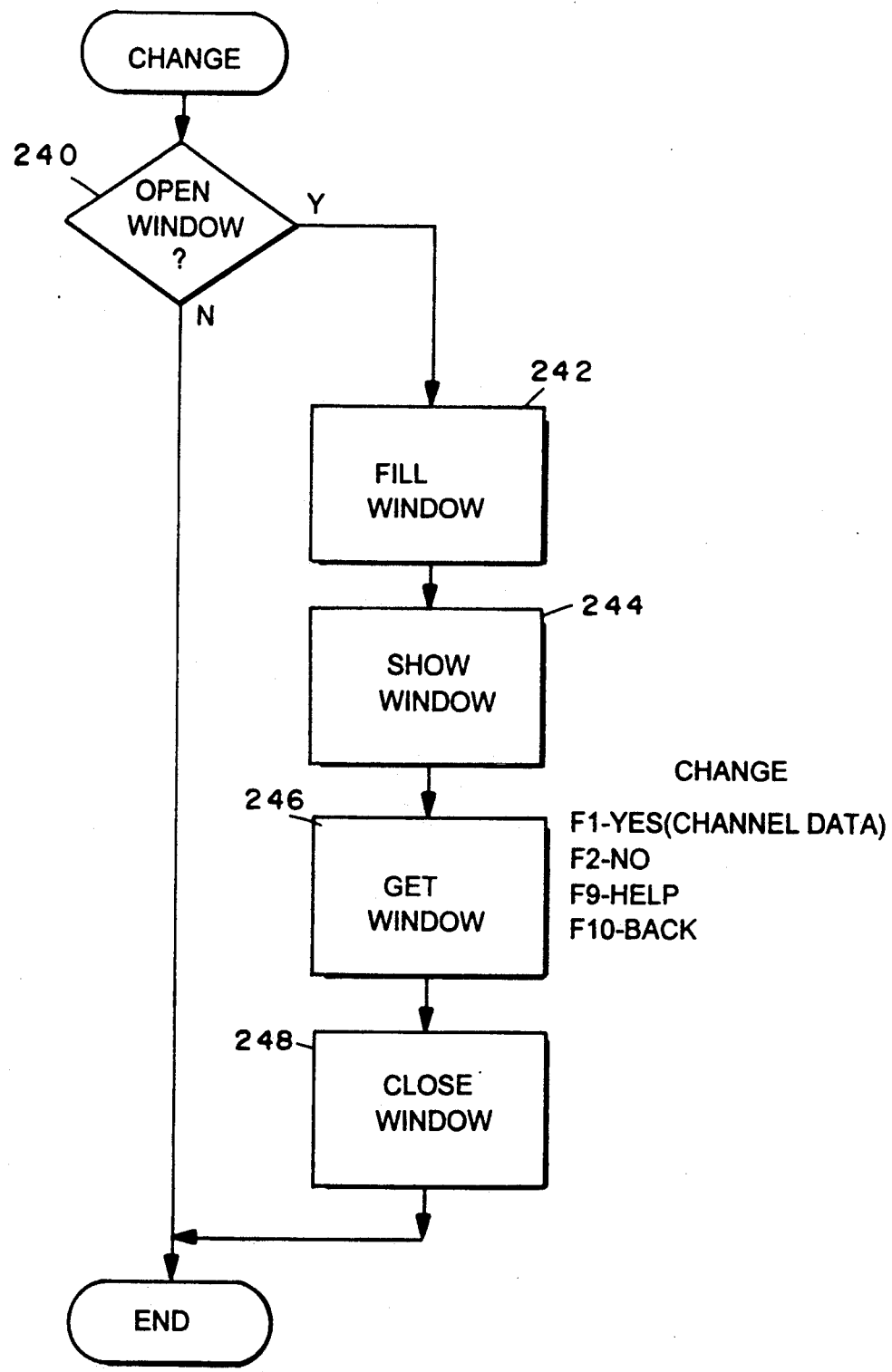
FIG. 7 CHANGE PERSONALITY ROUTINE

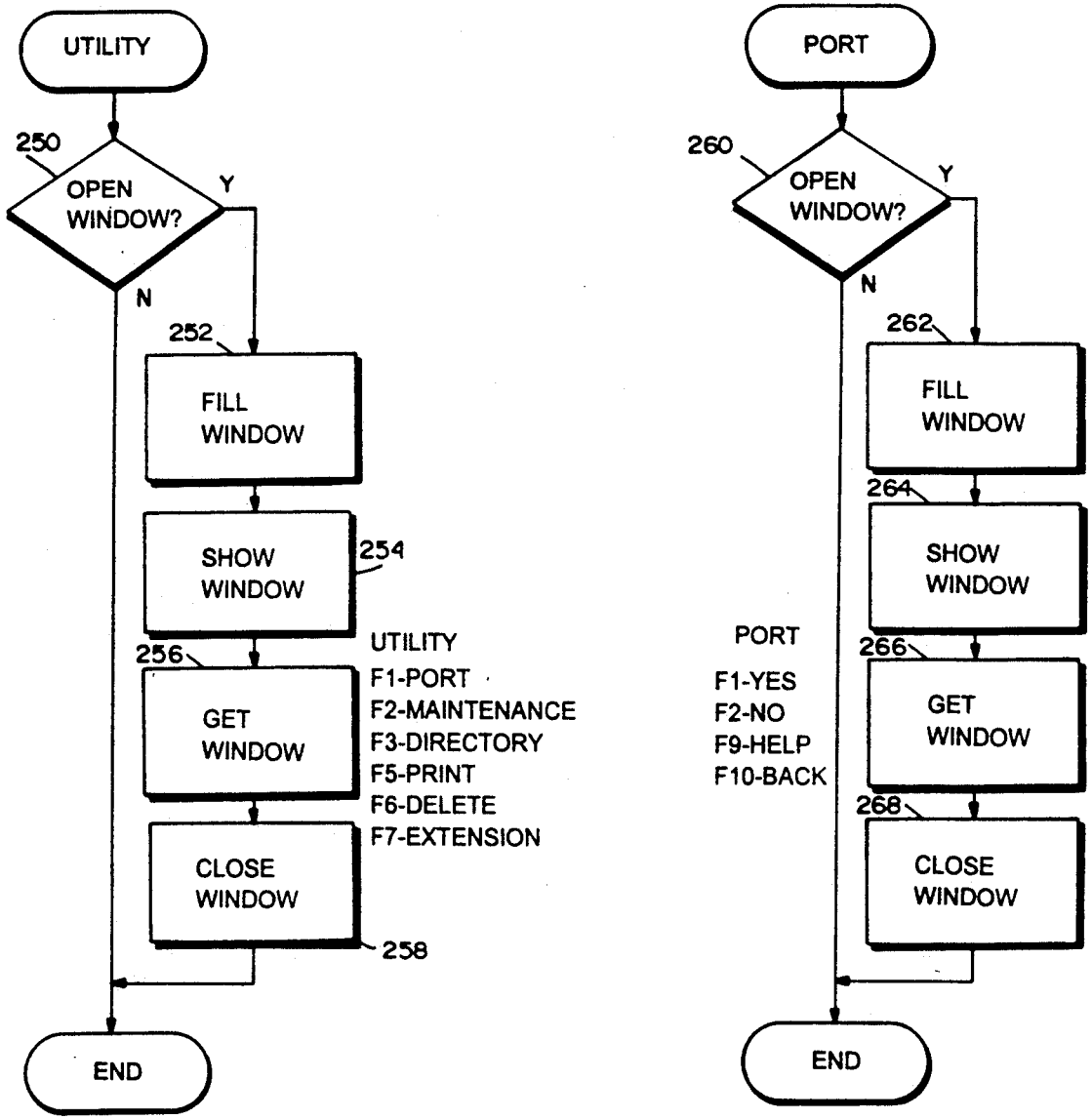
FIG. 8 UTILITY ROUTINE
FIG. 9 CHANGE/VERIFY PORT ROUTINE

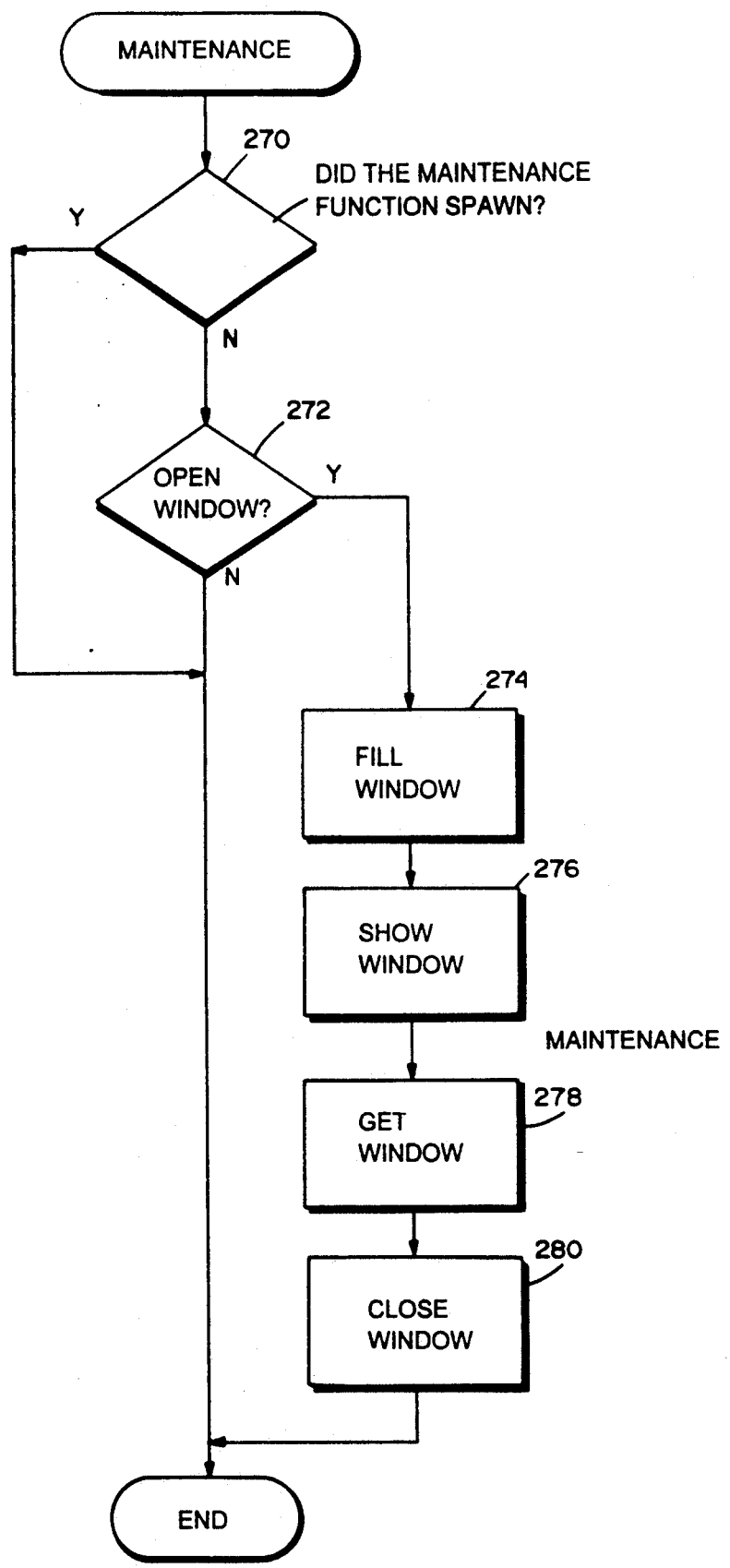
FIG. 10  MAINTENANCE FUNCTION ROUTINE

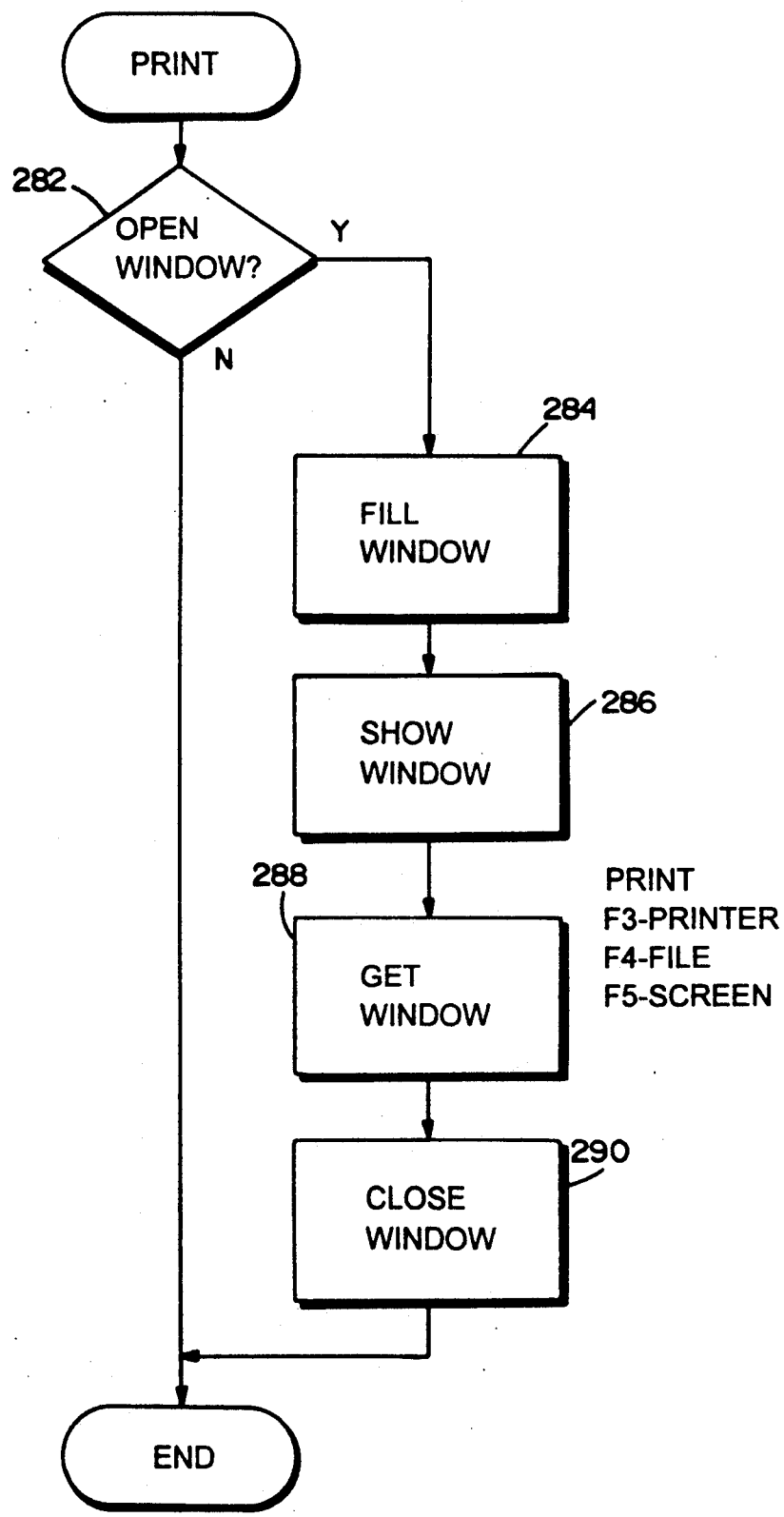
FIG. 11 PRINT PERSONALITY ROUTINE

DISPLAY PERSONALITY
TEXT ROUTINE

GET CHANNEL
DATA ROUTINE

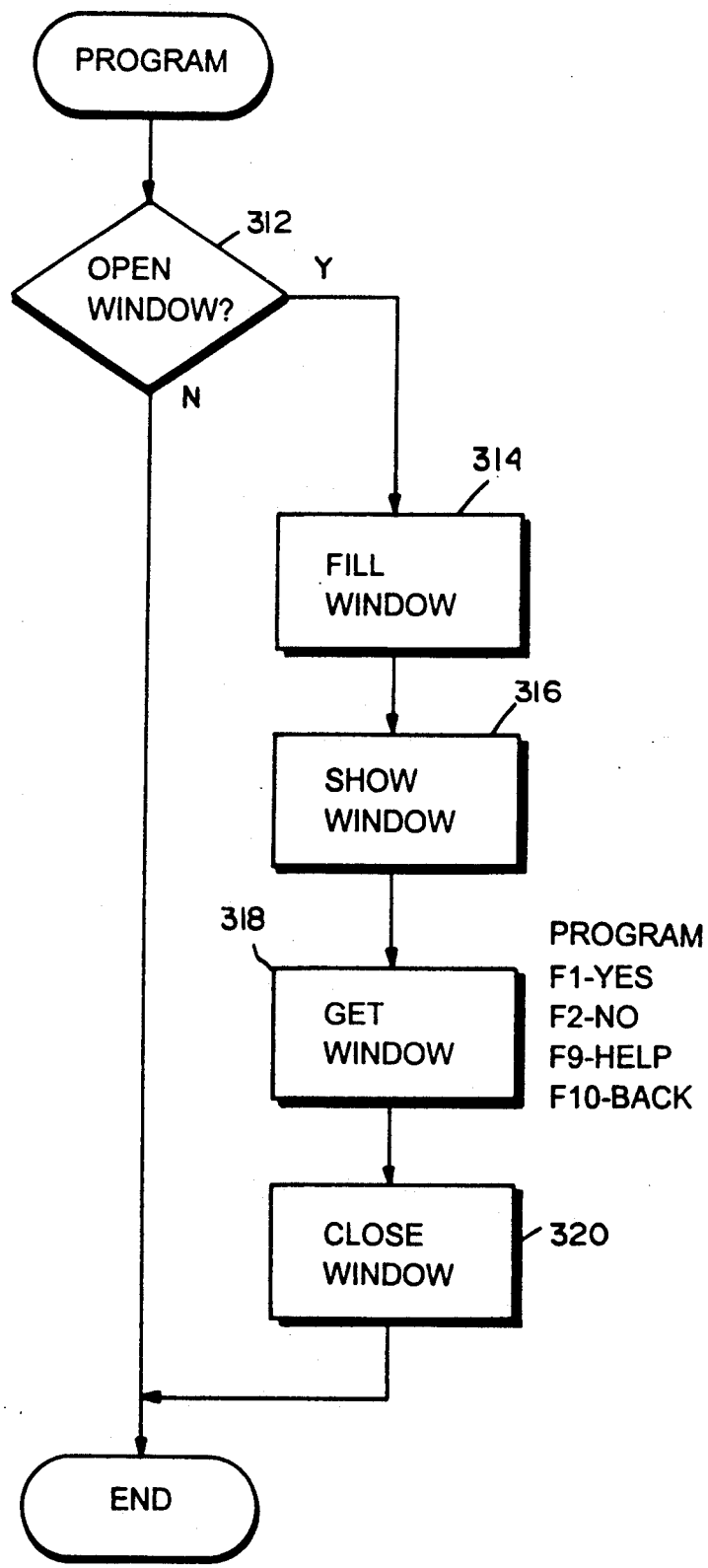
FIG. 14  PROGRAM RADIO ROUTINE

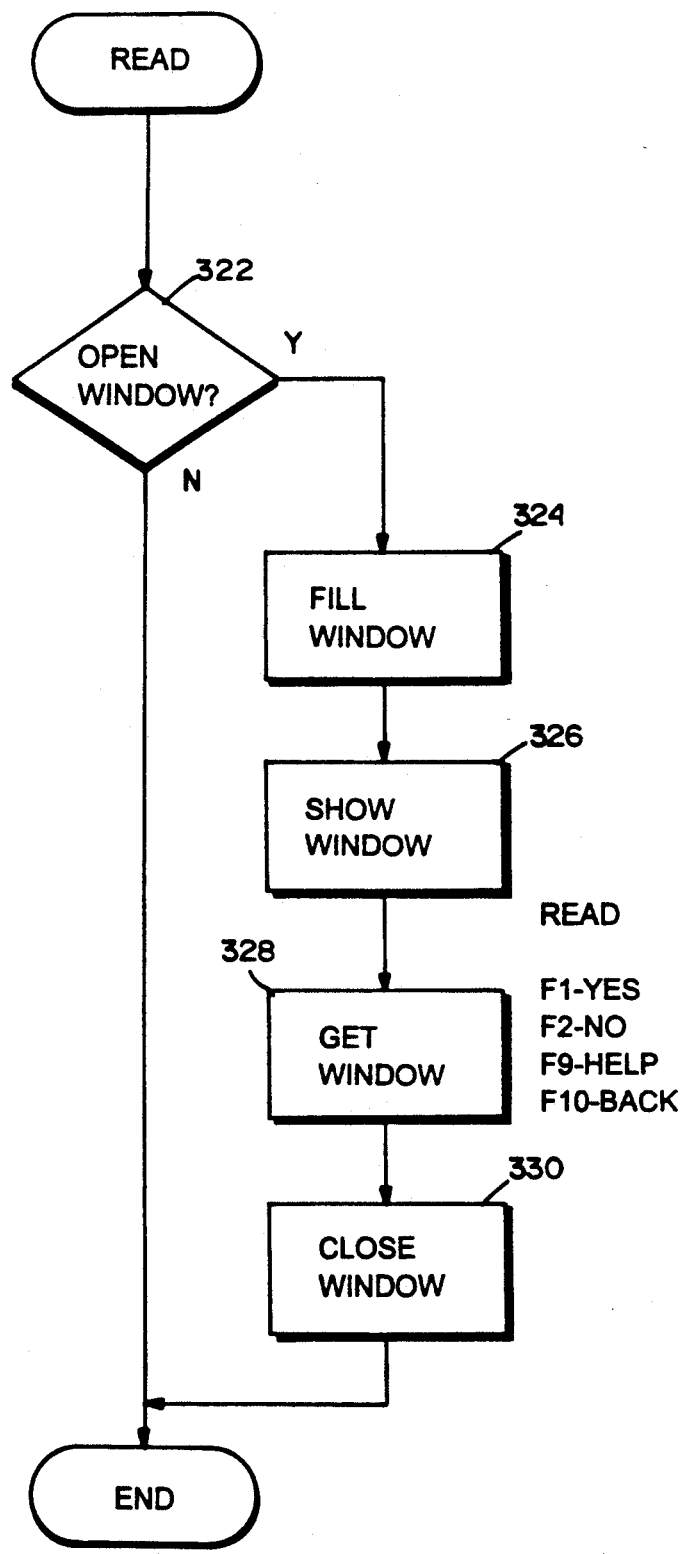
FIG. 15 READ PERSONALITY DATA ROUTINE

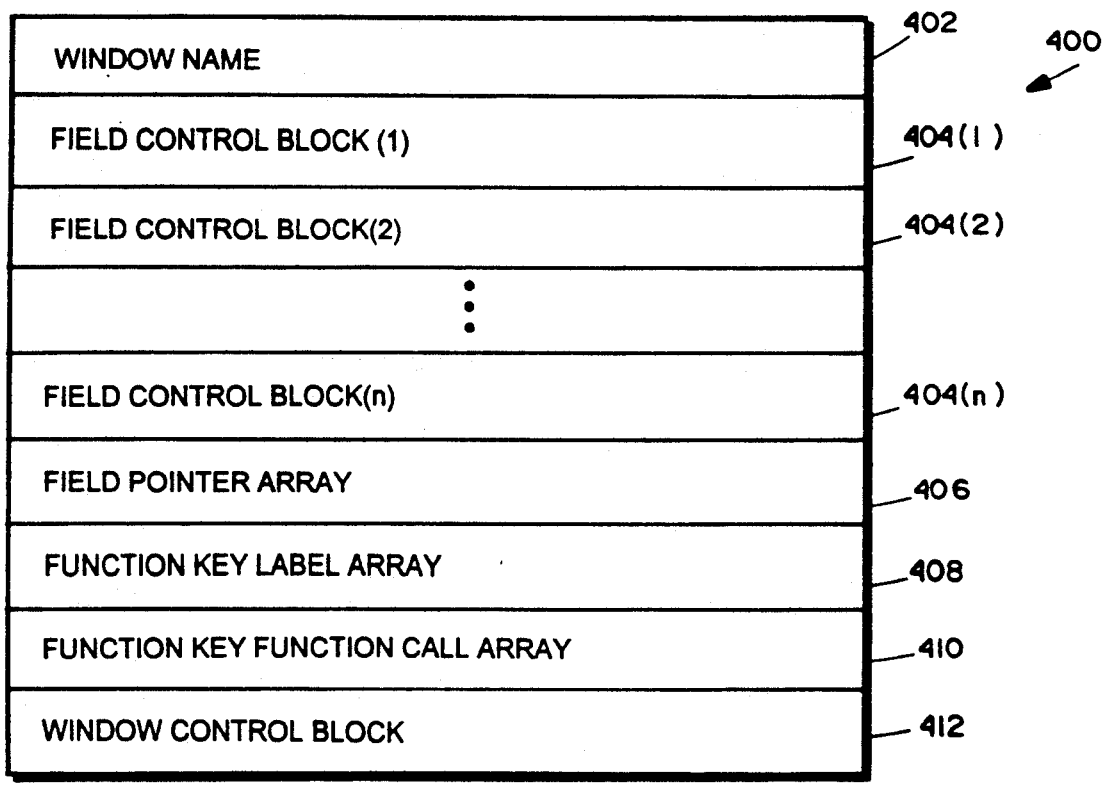
FIG. 16 WINDOW DEFINITION

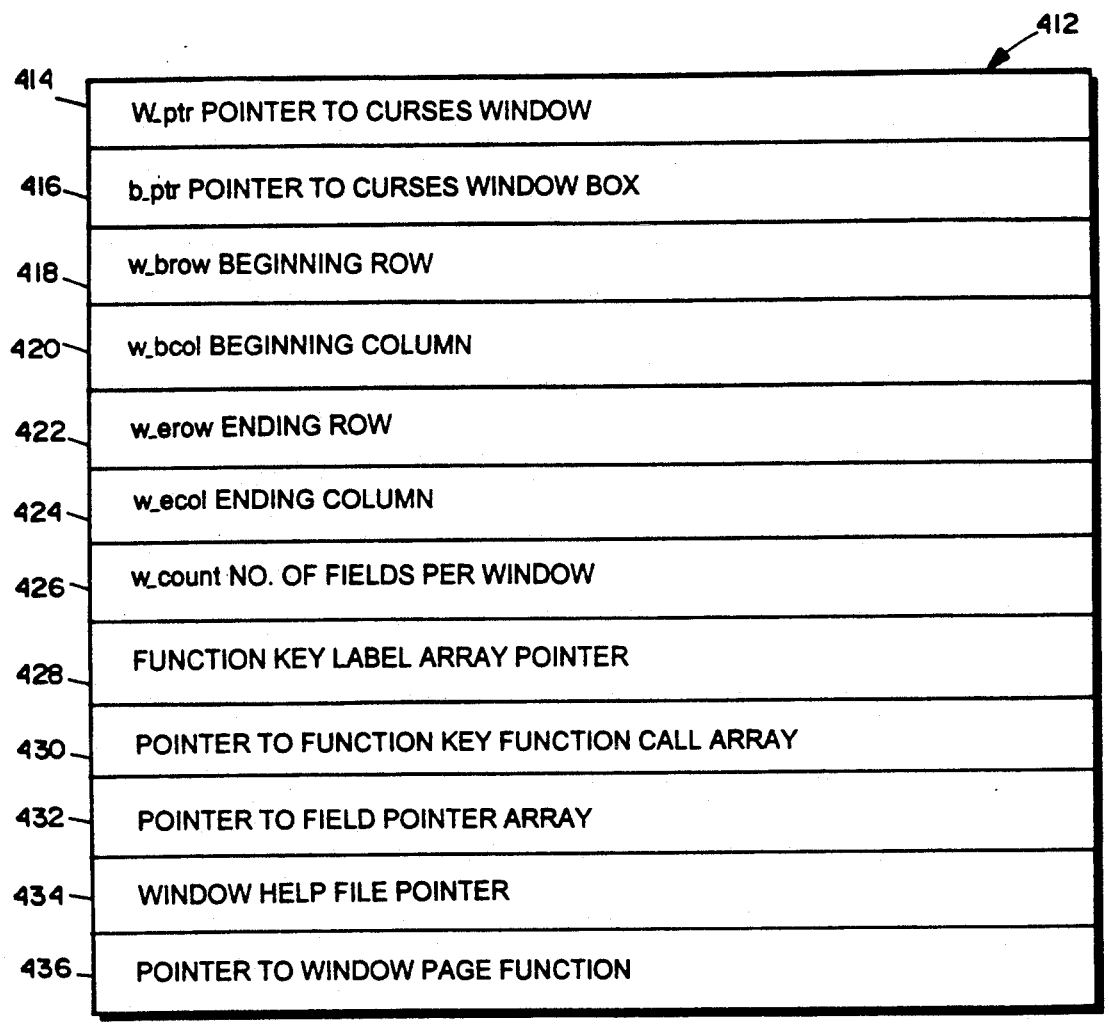
FIG. 17 WINDOW CONTROL BLOCK

| # | Field |
|---|---|
| 438 | F_IGNORE (IGNORE FIELD) |
| 440 | F_SUPER (SUPERVISORY MODE) |
| 442 | F_DISPLAY (DISPLAY ONLY) |
| 444 | F_Auto (AUTO ADVANCE WHEN FILLED) |
| 446 | F_Toggle (TOGGLE FIELD) |
| 448 | F_toupper (UPPERCASE CHARACTERS) |
| 450 | F_check (FUNCTION EDIT CHECK) |
| 452 | F_trimr (TRIM TRAILING SPACES) |
| 454 | F_row (ROW LOCATION) |
| 456 | F_col (COLUMN LOCATION) |
| 458 | F_min (MINIMUM CHARACTERS ACCEPTED) |
| 460 | F_max (MAXIMUM CHARACTERS ACCEPTED) |
| 462 | F_trig (#CHARACTERS BEFORE TRIGGERING) |
| 464 | F_type (FIELD TYPE) |
| 466 | F_color (CHARACTER COLOR) |
| 468 | F_ATTR (FIELD ATTRIBUTE) |
| 470 | *f_data (POINTER TO DATA) |
| 472 | *f_help (POINTER TO FIELD HELP TEXT) |
| 474 | *f_prompt (POINTER TO PROMPT LINE) |
| 476 | *f_buffer (POINTER TO CHARACTER DATA) |
| 478 | (*f_edit) (POINTER TO EDIT FUNCTION) |

404

FIG. 18 FIELD CONTROL BLOCK

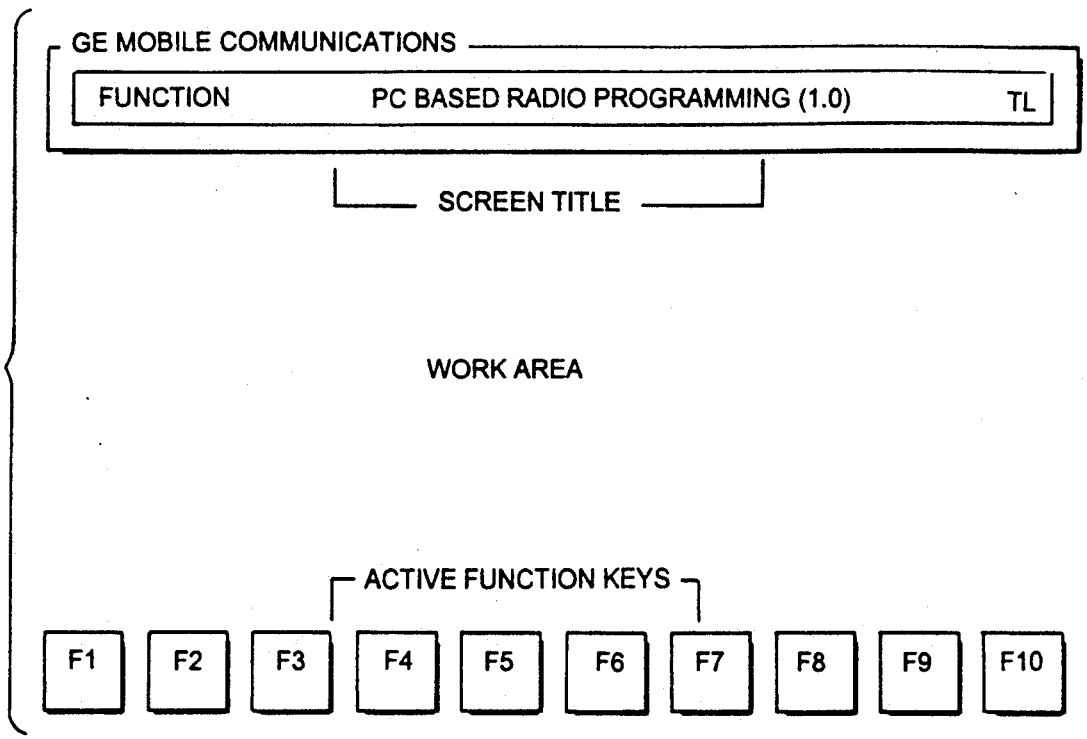
FIG. 32 SCREEN DEFINITION
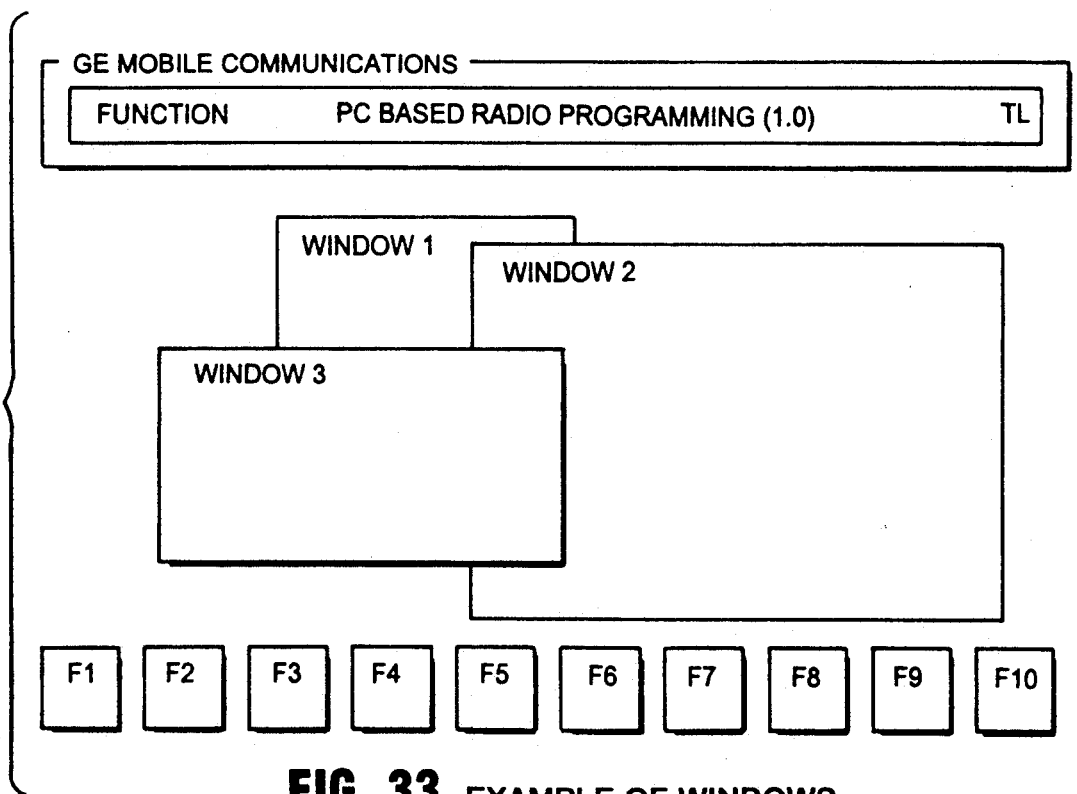
FIG. 33 EXAMPLE OF WINDOWS

FIG. 34 WINDOW

FIG. 35 SAMPLE WINDOW

| FUNCTION KEY DEFINITIONS | | | | |
|---|---|---|---|---|
| F1 | SETUP | PORT | SWITCH | YES |
| F2 | CHANGE | MAINT | INSERT | NO |
| F3 | UTILITY | DIR | REMOVE | |
| F4 | NEW | | | |
| F5 | PROGRAM | DELETE | | |
| F6 | READ | PRINT | | |
| F7 | | EXT | | |
| F8 | MORE | | | |
| F9 | HELP | | | |
| F10 | EXIT | BACK | | |

FIG. 36 FUNCTION KEYS DEFINITIONS

```
┌─GE MOBILE COMMUNICATIONS─────────────────────────────────┐
│ ┌──────────────────────────────────────────────────────┐ │
│ │ DIRECTORY     S-825 CONTROL HEAD PROGRAMMING    LO-A │ │
│ └──────────────────────────────────────────────────────┘ │
└──────────────────────────────────────────────────────────┘

┌──────────────────────────────────────────────────────────┐
│           CURRENT PERSONALITIES - 825                    │
│           C:\CITY                                        │
│                                                          │
│   MAYOR   JUDGE   COUNCIL   PUBLIC   FIRE_CHF  POLICE  COMM_OFF │
│   WATER   SEWER                                          │
│                                                          │
│                                                          │
│                                                          │
│ USE THE CURSOR KEYS TO SELECT PERSONALITY.               │
└──────────────────────────────────────────────────────────┘
```

| F1 | F2 | F3 | F4 | F5 | F6 | F7 | F8 | F9 | F10 |
|----|----|----|----|----|----|----|----|----|----|
| SETUP | CHANG | UTILT | NEW | PROGM | READ |  |  | HELP | EXIT |

FIG. 37 CURRENT PERSONALITY SCREEN

```
┌─GE MOBILE COMMUNICATIONS─────────────────────────────────┐
│ ┌──────────────────────────────────────────────────────┐ │
│ │ SETUP         S-825 CONTROL HEAD PROGRAMMING    L1-A │ │
│ └──────────────────────────────────────────────────────┘ │
└──────────────────────────────────────────────────────────┘
```

| DELUXE KEYPAD DEFINITION | FREQUENCY RANGES RANGR |
|---|---|
| PWR        XXX XXX XXX | LB    29 - 42    35 - 50 |
| FNC        XXX XXX XXX | HB    136 - 153    150 - 174 |
| XXX XXX XXX XXX XXX XXX XXX XXX | UHF  403 - 423    410 - 430 |
| VOL CHN XXX |         420 - 440    440 - 460 |
| |         450 - 470    470 - 488 |
| XXX XXX XXX XXX XXX XXX XXX XXX |         482 - 500    494 - 512 |
| PRESS TAB TO TOGGLE, F9 FOR HELP | 800  806 - 821    851 - 866 |

| F1 | F2 | F3 | F4 | F5 | F6 | F7 | F8 | F9 | F10 |
|----|----|----|----|----|----|----|----|----|----|
| SWTCH | KEYPD | RANGE |  |  |  |  |  | HELP | BACK |

FIG. 38 DELUXE KEYPAD DEFINITION

```
┌─ GE MOBILE COMMUNICATIONS ────────────────────────────────┐
│  ┌────────────────────────────────────────────────────┐   │
│  │ SETUP        S-825 CONTROL HEAD PROGRAMMING   L1-A │   │
│  └────────────────────────────────────────────────────┘   │
└───────────────────────────────────────────────────────────┘
```

| DELUXE KEYPAD DEFINITION | FREQUENCY RANGES RANGR |
|---|---|
| PWR           XXX XXX XXX | LB    29 - 42        35 - 50 |
| FNC           XXX XXX XXX | HB   136 - 153      150 - 174 |
| XXX XXX XXX XXX XXX XXX XXX XXX | UHF  403 - 423      410 - 430 |
| VOL CHN  XXX | 420 - 440      440 - 460 |
|  | 450 - 470      470 - 488 |
| XXX XXX XXX XXX XXX XXX XXX XXX | 482 - 500      494 - 512 |
| PRESS TAB TO TOGGLE, F9 FOR HELP | 800  806 - 821      851 - 866 |

| F1 | F2 | F3 | F4 | F5 | F6 | F7 | F8 | F9 | F10 |
| SWTCH | KEYPD | RANGE |  |  |  |  |  | HELP | BACK |

FIG. 39 FREQUENCY RANGE WINDOW

```
┌─ GE MOBILE COMMUNICATIONS ────────────────────────────────┐
│  ┌────────────────────────────────────────────────────┐   │
│  │ SETUP        S-825 CONTROL HEAD PROGRAMMING   L1-A │   │
│  └────────────────────────────────────────────────────┘   │
└───────────────────────────────────────────────────────────┘
```

| BASIC KEYPAD DEFINITION | FREQUENCY RANGES NB DELTA |
|---|---|
| PWR           XXX   XXX | LB  - 29.7 - 36 |
| FNC           SCN | 36 - 42 |
|  | 42 - 50 |
| XXX XXX   XXX XXX | HB  - 136 -153 |
| VOL  CHN | 150.8-174 |
| XXX XXX XXX XXX XXX  XXX | UHF - 403 -423 |
|  | 450 -470 |
|  | 470 -494 |
| PRESS TAB TO TOGGLE, F9 FOR HELP | 494 -512 |

| F1 | F2 | F3 | F4 | F5 | F6 | F7 | F8 | F9 | F10 |
| SWTCH | KEYPD | RANGE |  |  |  |  |  | HELP | BACK |

FIG. 40 FREQUENCY RANGE WINDOW

GE MOBILE COMMUNICATIONS

| SETUP | S-825 CONTROL HEAD PROGRAMMING | L1-A |

```
BASIC KEYPAD DEFINITION          FREQUENCY RANGES
                                     WB DELTA
  PWR          XXX  XXX
                                 HB  -    136 - 153
  FNC          SCN                        150 - 174

XXX XXX XXX XXX         UHF -    403 - 423
                                          410 - 430
           VOL  CHN                       420 - 440
XXX XXX XXX XXX  XXX  XXX                 440 - 460
                                          450 - 470
PRESS TAB TO TOGGLE, F9 FOR HELP
```

| F1 SWTCH | F2 KEYPD | F3 RANGE | F4 | F5 | F6 | F7 | F8 | F9 HELP | F10 BACK |

FIG. 41 BASIC KEYPAD DEFINITION WINDOW

GE MOBILE COMMUNICATIONS

| CHANGE RADIO | S-825 CONTROL HEAD PROGRAMMING | L1-B |

```
            CURRENT PERSONALITIES - 825
                    C:/CITY
MAYOR  JUDGE   COUNCIL   PUBLIC   FIRE_CHF   POLICE   COMM_OFF
WATER  SEWER
                  CHANGE/EDIT A FILE

FILE TO BE EDITED:  XXXXXXXX

ARE YOU SURE:  YES - PRESS F1
                              NO  - PRESS F2
```

| F1 YES | F2 NO | F3 | F4 | F5 | F6 | F7 | F8 | F9 HELP | F10 BACK |

FIG. 42 CHANGE/EDIT FILE WINDOW

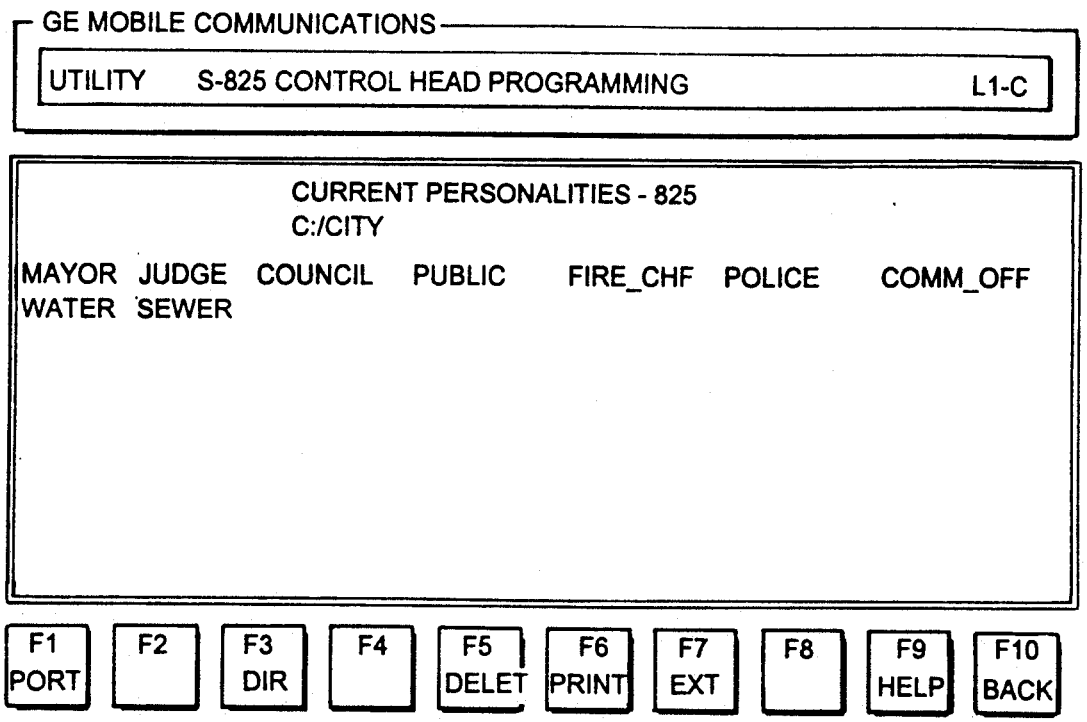
FIG. 43 UTILITY SCREEN
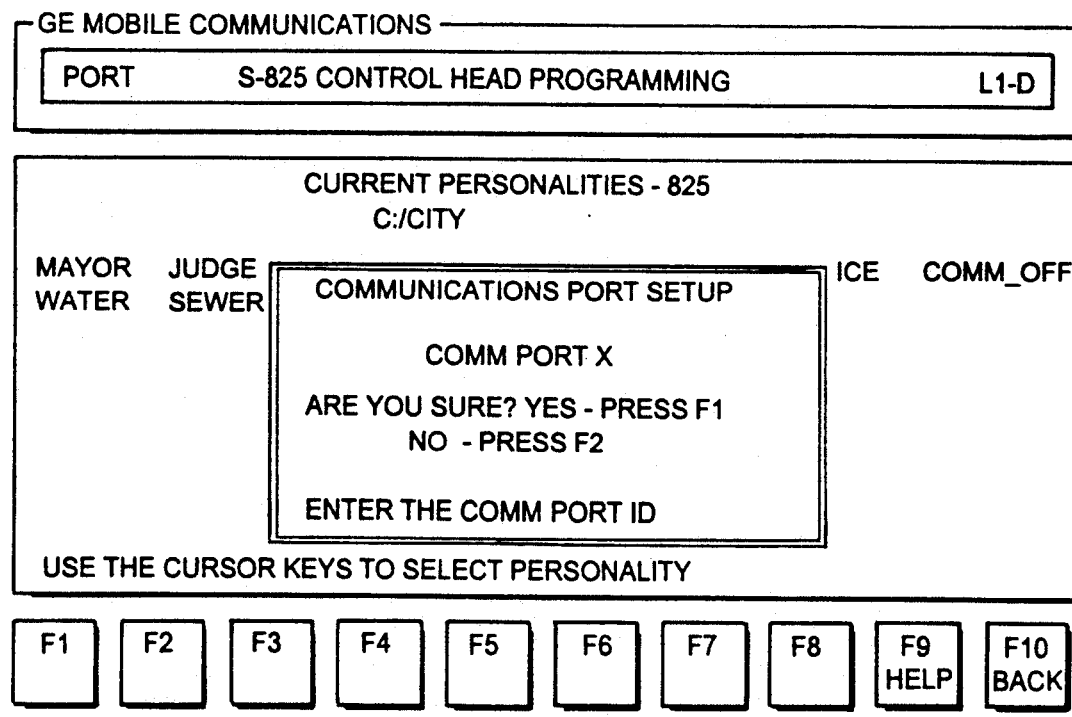
FIG. 44 COMMUNICATIONS PORT SETUP WINDOW

FIG. 45
CHANGE DIRECTORY WINDOW

```
┌─ GE MOBILE COMMUNICATIONS ──────────────────────────────────┐
│  ┌────────────────────────────────────────────────────────┐ │
│  │ CHANGE DIR      S-825 CONTROL HEAD PROGRAMMING    L1-E │ │
│  └────────────────────────────────────────────────────────┘ │
└─────────────────────────────────────────────────────────────┘
```

```
┌─────────────────────────────────────────────────────────────┐
│                 CURRENT PERSONALITIES - 825                 │
│                 C:\CITY                                     │
│                                                             │
│   MAYOR    JUDGE   ┌─────────────────────────┐ ICE  COMM_OFF│
│   WATER    SEWER   │     CHANGE DIRECTORY    │              │
│                    │                         │              │
│                    │ XXXXXXXXXXXXXXXXXXXXXXX │              │
│                    │                         │              │
│                    │ ARE YOU SURE? YES - PRESS F1           │
│                    │               NO - PRESS F2            │
│                    │                         │              │
│                    │ ENTER DESIRED DIRECTORY │              │
│                    └─────────────────────────┘              │
│                                                             │
│   USE THE CURSOR KEYS TO SELECT PERSONALITY.                │
└─────────────────────────────────────────────────────────────┘
```

| F1 | F2 | F3 | F4 | F5 | F6 | F7 | F8 | F9 HELP | F10 BACK |

FIG. 46
DELETE PERSONALITY WINDOW

```
┌─ GE MOBILE COMMUNICATIONS ──────────────────────────────────┐
│  ┌────────────────────────────────────────────────────────┐ │
│  │ DELETE          S-825 CONTROL HEAD PROGRAMMING    L1-F │ │
│  └────────────────────────────────────────────────────────┘ │
└─────────────────────────────────────────────────────────────┘
```

```
┌─────────────────────────────────────────────────────────────┐
│                 CURRENT PERSONALITIES - 825                 │
│                 C:\CITY                                     │
│                                                             │
│   MAYOR    JUDGE    COUNCIL   PUBLIC   FIRE_CHF  POLICE  COMM_OFF │
│   WATER    SEWER   ┌──────────────────────────┐             │
│                    │     DELETE PERSONALITY   │             │
│                    │                          │             │
│                    │  DELETE THE FILE  XXXXXXX│             │
│                    │                          │             │
│                    │  ARE YOU SURE? YES - PRESS F1          │
│                    │                NO - PRESS F2           │
│                    └──────────────────────────┘             │
│                                                             │
└─────────────────────────────────────────────────────────────┘
```

| F1 | F2 | F3 | F4 | F5 | F6 | F7 | F8 | F9 HELP | F10 BACK |

FIG. 47
PRINT WINDOW

```
┌─GE MOBILE COMMUNICATIONS─────────────────────────────────────┐
│ ┌──────────────────────────────────────────────────────────┐ │
│ │ PRINT          S-825 CONTROL HEAD PROGRAMMING       L2-F │ │
│ └──────────────────────────────────────────────────────────┘ │
└──────────────────────────────────────────────────────────────┘
```

|  |  | PRINT PERSONALITY |  |  |
|---|---|---|---|---|
| MAYOR | JUDG | PERSONALITY: XXXXXXX<br>OUTPUT TO: SCREEN | OLICE | COMM_OFF |
| WATER | SEWE |  |  |  |
|  |  | ARE YOU SURE?  YES - PRESS F1<br>NO - PRESS F2 |  |  |
| USE THE CURSOR K | | PRESS TAB TO TOGGLE, F9 FOR HELP | | |

| F1 YES | F2 NO | F3 | F4 | F5 | F6 | F7 | F8 | F9 HELP | F10 BACK |

FIG. 48
PRINT PERSONALITY WINDOW

```
┌─GE MOBILE COMMUNICATIONS─────────────────────────────────────┐
│ ┌──────────────────────────────────────────────────────────┐ │
│ │ PRINT          S-825 CONTROL HEAD PROGRAMMING       L2-F │ │
│ └──────────────────────────────────────────────────────────┘ │
└──────────────────────────────────────────────────────────────┘
```

|  |  | PRINT PERSONALITY |  |  |
|---|---|---|---|---|
| MAYOR | JUDG | PERSONALITY: XXXXXXX<br>OUTPUT TO: FILE | OLICE | COMM_OFF |
| WATER | SEWE | XXXXXXXXXXXXXXXXXXXXXXXXXXXXXXX |  |  |
|  |  | ARE YOU SURE?  YES - PRESS F1<br>NO - PRESS F2 |  |  |
| USE THE CURSOR K | | PRESS TAB TO TOGGLE, F9 FOR HELP | | |

| F1 YES | F2 NO | F3 | F4 | F5 | F6 | F7 | F8 | F9 HELP | F10 BACK |

FIG. 49
CHANGE EXTENSION WINDOW

```
┌─GE MOBILE COMMUNICATIONS──────────────────────────────────────────┐
│ ┌───────────────────────────────────────────────────────────────┐ │
│ │ EXTENSION         S-825 CONTROL HEAD PROGRAMMING         L1-H │ │
│ └───────────────────────────────────────────────────────────────┘ │
└───────────────────────────────────────────────────────────────────┘

┌───────────────────────────────────────────────────────────────────┐
│                      CURRENT PERSONALITIES - 825                  │
│                              C:\CITY                              │
│                                                                   │
│    MAYOR    JUDGE    COUNCIL    PUBLIC    FIRE_CHF    POLICE    COMM_OFF
│    WATER    SEWER                                                 │
│               ┌───────────────────────────────────┐               │
│               │         CHANGE EXTENSION          │               │
│               │                                   │               │
│               │  ENTER FILE NAME EXTENSION - 825  │               │
│               │                                   │               │
│               │  ARE YOU SURE?   YES - PRESS F1   │               │
│               │                  NO  - PRESS F2   │               │
│               └───────────────────────────────────┘               │
└───────────────────────────────────────────────────────────────────┘
```

| F1 YES | F2 NO | F3 | F4 | F5 | F6 | F7 | F8 | F9 HELP | F10 BACK |

FIG. 50
CONTROL HEAD PERSONALITY SCREEN

```
┌─GE MOBILE COMMUNICATIONS──────────────────────────────────────────┐
│ ┌───────────────────────────────────────────────────────────────┐ │
│ │ NEW               S-825 CONTROL HEAD PROGRAMMING         L1-B │ │
│ └───────────────────────────────────────────────────────────────┘ │
└───────────────────────────────────────────────────────────────────┘

┌───────────────────────────────────────────────────────────────────┐
│                      CONTROL HEAD PERSONALITY                     │
│                           VHF  136 - 160                          │
│  MODE   NAME      FREQ SET   SIGNAL   P1-PROG   P1   P2-PROG   P2   W/CG
│   1    XXXXXXX    XXXXXXX    XXXXX    XXXXX     XX   XXXXX     XX   XXX
│   2                                                               │
│   3                                                               │
│   4                                                               │
│   5                                                               │
│   6                                                               │
│   7                                                               │
│   8                                                               │
│                                                  BYTES FREE: XXXX │
└───────────────────────────────────────────────────────────────────┘
```

| F1 DETAI | F2 INSRT | F3 REMVE | F4 SIGNL | F5 PROGR | F6 | F7 OPTON | F8 MORE | F9 HELP | F10 BACK |

FIG. 51
FREQUENCY SET DEFINITION

GE MOBILE COMMUNICATIONS

| FREQUENCY | S-825 CONTROL HEAD PROGRAMMING | L1-B |

FREQUENCY SET DEFINITION

| CHN | NAME | TX FREQ | RX FREQ | TX CG | RX CG | STE | CCT | SCN | CGO | T90/T99 TONE1 | TONE2 |
|---|---|---|---|---|---|---|---|---|---|---|---|
| 1 | XXXXXXX | XXXXXXX | XXXXXXXX | XXXX | XXXXX | XXX | XXX | XXX | XXX | XXXXX | XXXXX |
| 2 | | | | | | | | | | | |
| 3 | | | | | | | | | | | |
| 4 | | | | | | | | | | | |
| 5 | | | | | | | | | | | |
| 6 | | | | | | | | | | | |
| 7 | | | | | | | | | | | |
| 8 | | | | | | | | | | | |

| F1 | F2 INSER | F3 REMVE | F4 | F5 STORE | F6 | F7 | F8 | F9 HELP | F10 BACK |

FIG. 52
CONTROL HEAD PERSONALITY

GE MOBILE COMMUNICATIONS

| NEW | S-825 CONTROL HEAD PROGRAMMING | L1-B |

CONTROL HEAD PERSONALITY
VHF 136 - 160

| MODE | NAME | FREQ SET | SIGNAL | HOME | INITIATE | PTTOPT | EMERG | GESTAR |
|---|---|---|---|---|---|---|---|---|
| 1 | XXXXXXX | XXXXXXX | XXXXX | XX | XXXX | XXX | XX | XXX |
| 2 | | | | | | | | |
| 3 | | | | | | | | |
| 4 | | | | | | | | |
| 5 | | | | | | | | |
| 6 | | | | | | | | |
| 7 | | | | | | | | |
| 8 | | | | | | | | |

BYTES FREE: XXXX

| F1 DETAI | F2 INSRT | F3 REMVE | F4 SCAN | F5 PROGR | F6 | F7 OPTON | F8 MORE | F9 HELP | F10 BACK |

FIG. 53
PROGRAM RADIO WINDOW

GE MOBILE COMMUNICATIONS

| NEW | S-825 CONTROL HEAD PROGRAMMING | L1-B |

CONTROL HEAD PERSONALITY
VHF 136 - 160

MODE NAME FRE W/CG
1 XXXXXXX XXX XXX
2
3
4
5
6
7
8

PROGRAM RADIO

ARE YOU SURE?  YES - PRESS F1
NO - PRESS F2

PLEASE BE SURE THE RADIO IS CONNECTED
TO XXX AND THAT THE RADIO IS TURNED
ON BEFORE PRESSING F1 (YES).

BYTES FREE: XXXX

| F1 YES | F2 NO | F3 | F4 | F5 | F6 | F7 | F8 | F9 HELP | F10 BACK |

FIG. 54
CONTROL HEAD OPTIONS WINDOW

GE MOBILE COMMUNICATIONS

| NEW | S-825 CONTROL HEAD PROGRAMMING | L1-B |

CONTROL HEAD OPTIONS

UNIT TYPE: XXXXX     KEYPAD SEL: XXX     ALERT TONE: XXXX
OFF HOOK: XXXXX      B-LITE DIS: XXX     B-LITE SAV: XXX
RX CG DEC: XXXXX     MIN VOLUME: XXX     DS TIMEOUT: X
DELETE KY: XXXXX     WRAP RAMPS: XXX     DS TEST MD: XXX
PWR DELAY: XXXXX     SCAN HANG: XXX      CCT: X

| F1 SIREN | F2 CG | F3 FNC | F4 SIGNL | F5 RADIO | F6 KEY | F7 | F8 | F9 HELP | F10 BACK |

FIG. 55
SIREN / LIGHTS WINDOW

GE MOBILE COMMUNICATIONS

| NEW | S-825 CONTROL HEAD PROGRAMMING | L1-B |

SIREN / LIGHTS

MODE N  UNIT

| FUNCT | SRN | 1 | 2 | 3 | 4 | 5 | 6 | 7 | 8 | 9 | CAN | MOM |
|---|---|---|---|---|---|---|---|---|---|---|---|---|
| WAIL | X | X | X | X | X | X | X | X | X | X | XXX | XXX |
| YELP | | | | | | | | | | | | |
| S/L 1 | | | | | | | | | | | | |
| S/L 2 | | | | | | | | | | | | |
| S/L 3 | | | | | | | | | | | | |
| S/L 4 | | | | | | | | | | | | |
| S/L 5 | | | | | | | | | | | | |
| S/L 6 | | | | | | | | | | | | |
| S/L 7 | | | | | | | | | | | | |
| S/L 8 | | | | | | | | | | | | |

MODE: 1 X, 2, 3, 4, 5, 6, 7, 8
UNIT / OFF H / RX CG / DELET

XXXX / XXX / X / XXX

CG X / XXXX

F1 | F2 | F3 | F4 | F5 | F6 | F7 | F8 | F9 HELP | F10 BACK

---

FIG. 57
FNC BUTTON WINDOW

GE MOBILE COMMUNICATIONS

| NEW | S-825 CONTROL HEAD PROGRAMMING | L1-B |

FNC BUTTON

PRIMARY:    XXXXXXXX
SECONDARY:  XXXXXXXX
TERTIARY:   XXXXXXXX

MODE: 1 X, 2, 3, 4, 5, 6, 7, 8
UNIT TYP / OFF HOO / RX CG DE / DELETE K

NE: XXXX
AV: XXX
UT: X
MD: XXX

CG X / XXXX

F1 | F2 | F3 | F4 | F5 | F6 | F7 | F8 | F9 HELP | F10 BACK

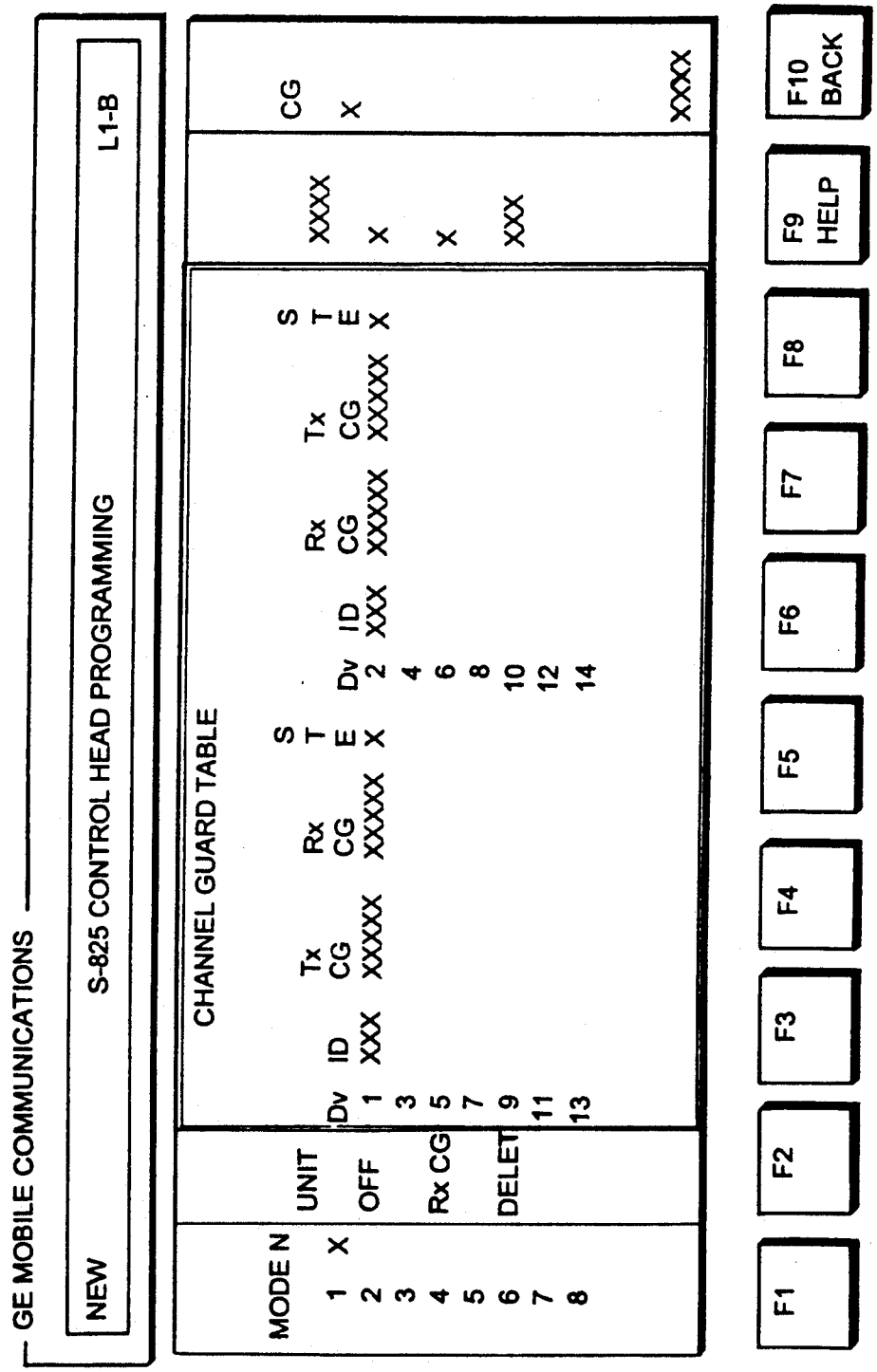
FIG. 56 CHANNEL GUARD TABLE WINDOW

FIG. 58
EMERGENCY SIGNALLING WINDOW

GE MOBILE COMMUNICATIONS

| NEW | S-825 CONTROL HEAD PROGRAMMING | L1-B |

```
                         EMERGENCY SIGNALLING

MODE    N                 REVERT TO HOME:  XXX                      CG
        UNIT TYP    T90 / T99                          NE:  XXXX
1  X                      EMERG TONE 1:    XXXXX Hz                 X
2       OFF HOO               LENGTH:      XXXXX Msecs AV:  XXX
3                         EMERG TONE 2:    XXXXX Hz
4       RX CG DE              LENGTH:      XXXXX Msecs UT:  X
5                         TONE DELAY:      XXXXX Secs
6       DELETE K      GE STAR                          MD:  XXX
7                         REPEAT COUNT:    XXX
8                         DELAY TIME:      XX    Secs
                          ATTACK DELAY:    XXXXX Msecs
                                                                 XXXX
```

| F1 | F2 | F3 | F4 | F5 | F6 | F7 | F8 | F9 HELP | F10 BACK |

FIG. 59
RADIO OPTIONS WINDOW

GE MOBILE COMMUNICATIONS

| NEW | S-825 CONTROL HEAD PROGRAMMING | L1-B |

```
                            RADIO OPTIONS

MODE    N                                                          CG
        UNIT TYP      RADIO DOWNLOAD:  XXX          NE:  XXXX
1  X                                                               X
2       OFF HOO       MAX CHN / MODE:  XX           AV:  XXX
3
4       RX CG DE      VRS BEEP INTERVAL:  XX        UT:  X
5
6       DELETE K      VRS FORCED SCAN:  XXX         MD:  XXX
7
8                     DUAL CONTROL:  XXX
                                                                 XXXX
```

| F1 | F2 | F3 | F4 | F5 | F6 | F7 | F8 | F9 HELP | F10 BACK |

FIG. 60
DELUXE KEYPAD DEFINITION WINDOW

GE MOBILE COMMUNICATIONS

| NEW | S-825 CONTROL HEAD PROGRAMMING | L1-B |

DELUXE KEYPAD DEFINITION

MODE N          UNIT TYP       PWR           XXX XXX XXX       NE: XXXX    CG
1      X                       FNC           XXX XXX XXX                    X
2               OFF HOO                                         AV: XXX
3                              XXX XXX XXX XXX XXX XXX XXX XXX
4               RX CG DE                                        UT: X
5                              VOL CHN XXX
6               DELETE K                                        MD: XXX
7
8               XXX XXX XXX XXX XXX XXX XXX XXX

PRESS TAB TO TOGGLE, F9 FOR HELP                                            XXXX

| F1 | F2 | F3 | F4 | F5 | F6 | F7 | F8 | F9 HELP | F10 BACK |

FIG. 61
BASIC KEYPAD DEFINITION WINDOW

GE MOBILE COMMUNICATIONS

| NEW | S-825 CONTROL HEAD PROGRAMMING | L1-B |

BASIC KEYPAD DEFINITION

MODE N          UNIT TYP       PWR           XXX       XXX     NE: XXXX    CG
1      X                       FNC           XXX                            X
2               OFF HOO                                         AV: XXX
3                              XXX XXX     XXX     XXX
4               RX CG DE                                        UT: X
5                              VOL CHN
6               DELETE K                                        MD: XXX
7
8               XXX XXX XXX XXX    XXX  XXX

PRESS TAB TO TOGGLE, F9 FOR HELP                                            XXXX

| F1 | F2 | F3 | F4 | F5 | F6 | F7 | F8 | F9 HELP | F10 BACK |

FIG. 62
'MORE' KEY ACTION

GE MOBILE COMMUNICATIONS

| NEW | S-825 CONTROL HEAD PROGRAMMING | L1-B |

CONTROL HEAD PERSONALITY
VHF 136 - 160

| MODE | NAME | FREQ SET | SIGNAL | P1-PROG | P1 | P2-PROG | P2 | W/CG |
|---|---|---|---|---|---|---|---|---|
| 1 | XXXXXXX | XXXXXXX | XXXXX | XXXXX | XX | XXXXX | XX | XXX |
| 2 | | | | | | | | |
| 3 | | | | | | | | |
| 4 | | | | | | | | |
| 5 | | | | | | | | |
| 6 | | | | | | | | |
| 7 | | | | | | | | |
| 8 | | | | | | | | |

BYTES FREE: XXXX

| F1 | F2 FREQ | F3 | F4 TEXT | F5 | F6 | F7 | F8 MORE | F9 HELP | F10 BACK |

FIG. 63
CURRENTLY DEFINED FREQUENCY SETS

GE MOBILE COMMUNICATIONS

| FREQUENCY | S-825 CONTROL HEAD PROGRAMMING | L1-B |

CURRENTLY DEFINED FREQUENCY SETS
C:\CITY

| MVR | CAMDLERS | MOUNTAIN | SITE01 | SITE02 | SITE03 | SITE04 |
| SITE05 | SITE06 | | | | | |

| F1 | F2 CHANG | F3 | F4 NEW | F5 DELET | F6 | F7 | F8 | F9 HELP | F10 BACK |

```
┌─ GE MOBILE COMMUNICATIONS ─────────────────────────────┐
│  ┌──────────────────────────────────────────────────┐  │
│  │ NEW      S-825 CONTROL HEAD PROGRAMMING    L1-B  │  │
│  └──────────────────────────────────────────────────┘  │
└────────────────────────────────────────────────────────┘
                      TEXT WINDOW
              SOFTWARE VERSION:  XX
MODE NAME   FR   LAST PROGRAMMED: XX/XX/XX      NON-PRI W/CG
1   XXXXXXXX XX  XXXXXXXXXXXXXXXXXXXXXXXXXXXX   XXXXX   XXX
2                XXXXXXXXXXXXXXXXXXXXXXXXXXXX
3                XXXXXXXXXXXXXXXXXXXXXXXXXXXX
4                XXXXXXXXXXXXXXXXXXXXXXXXXXXX
5                XXXXXXXXXXXXXXXXXXXXXXXXXXXX
6                XXXXXXXXXXXXXXXXXXXXXXXXXXXX
7                XXXXXXXXXXXXXXXXXXXXXXXXXXXX
8                XXXXXXXXXXXXXXXXXXXXXXXXXXXX   BYTES FREE: XXXX

[F1] [F2] [F3] [F4] [F5] [F6] [F7] [F8] [F9 HELP] [F10 BACK]
```

FIG. 64 TEXT WINDOW

```
┌─ GE MOBILE COMMUNICATIONS ─────────────────────────────┐
│  ┌──────────────────────────────────────────────────┐  │
│  │ NEW      S-825 CONTROL HEAD PROGRAMMING    L1-B  │  │
│  └──────────────────────────────────────────────────┘  │
└────────────────────────────────────────────────────────┘
                  CONTROL HEAD PERSONALITY
                       VHF  136-160
MODE NAME    FR      SAVE PERSONALITY           NON-PRI W/CG
1   XXXXXXXX XX   SOURCE:                       XXXXX   XXX
2                 XXXXXXXXXXXXXXXXXXXXXXXXXXXXX
3                 DESTINATION:
4                 XXXXXXXXXXXXXXXXXXXXXXXXXXXXX
5
6                 EXIT WITH SAVE:    PRESS F1
7                 EXIT WITHOUT SAVE: PRESS F2
8                        NO EXIT:    PRESS F10
                  ENTER THE FILE NAME.           BYTES FREE: XXXX

[F1 YES] [F2 NO] [F3] [F4] [F5] [F6] [F7] [F8] [F9 HELP] [F10 BACK]
```

FIG. 65 SAVE PERSONALITY WINDOW

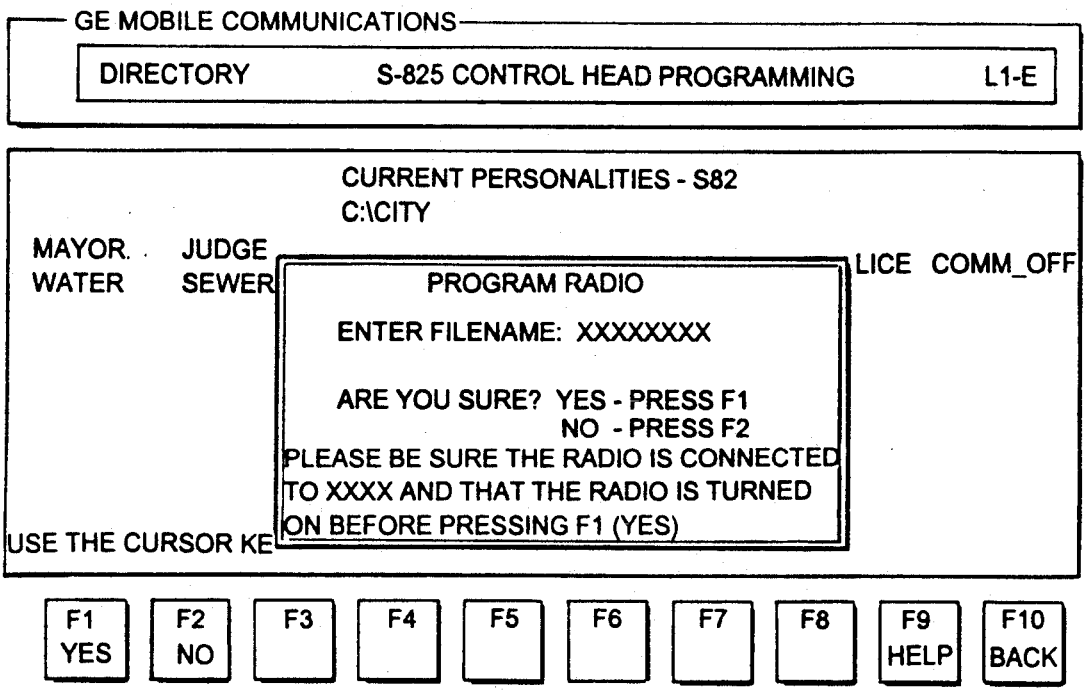
FIG. 66  PROGRAM RADIO WINDOW
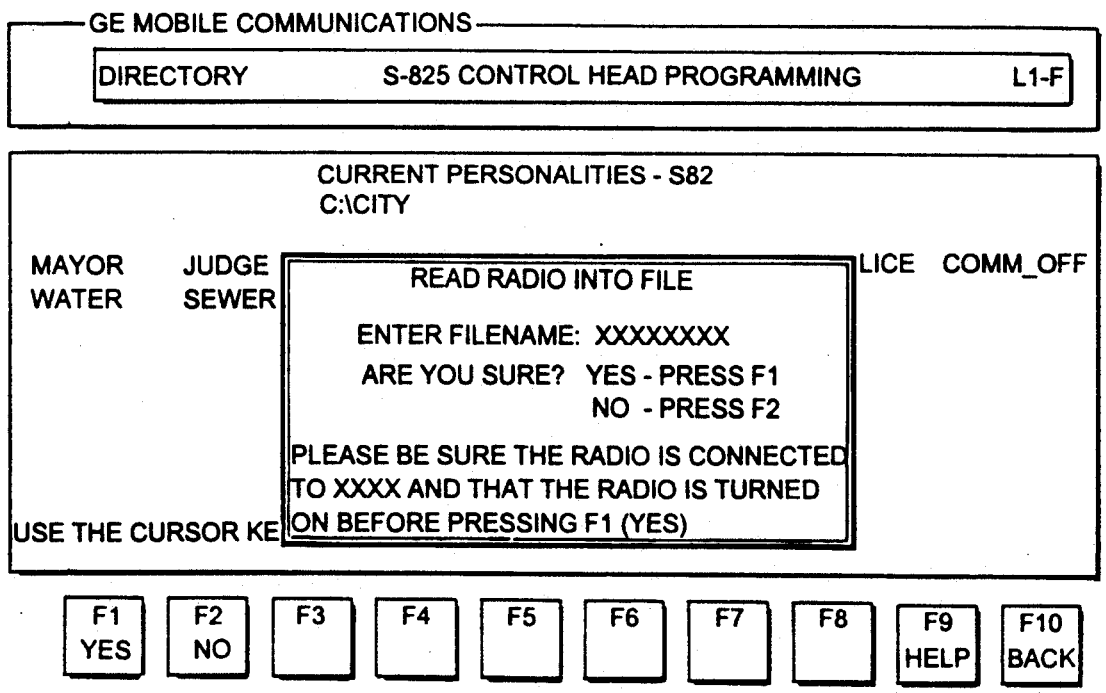
FIG. 67  READ RADIO TO FILE

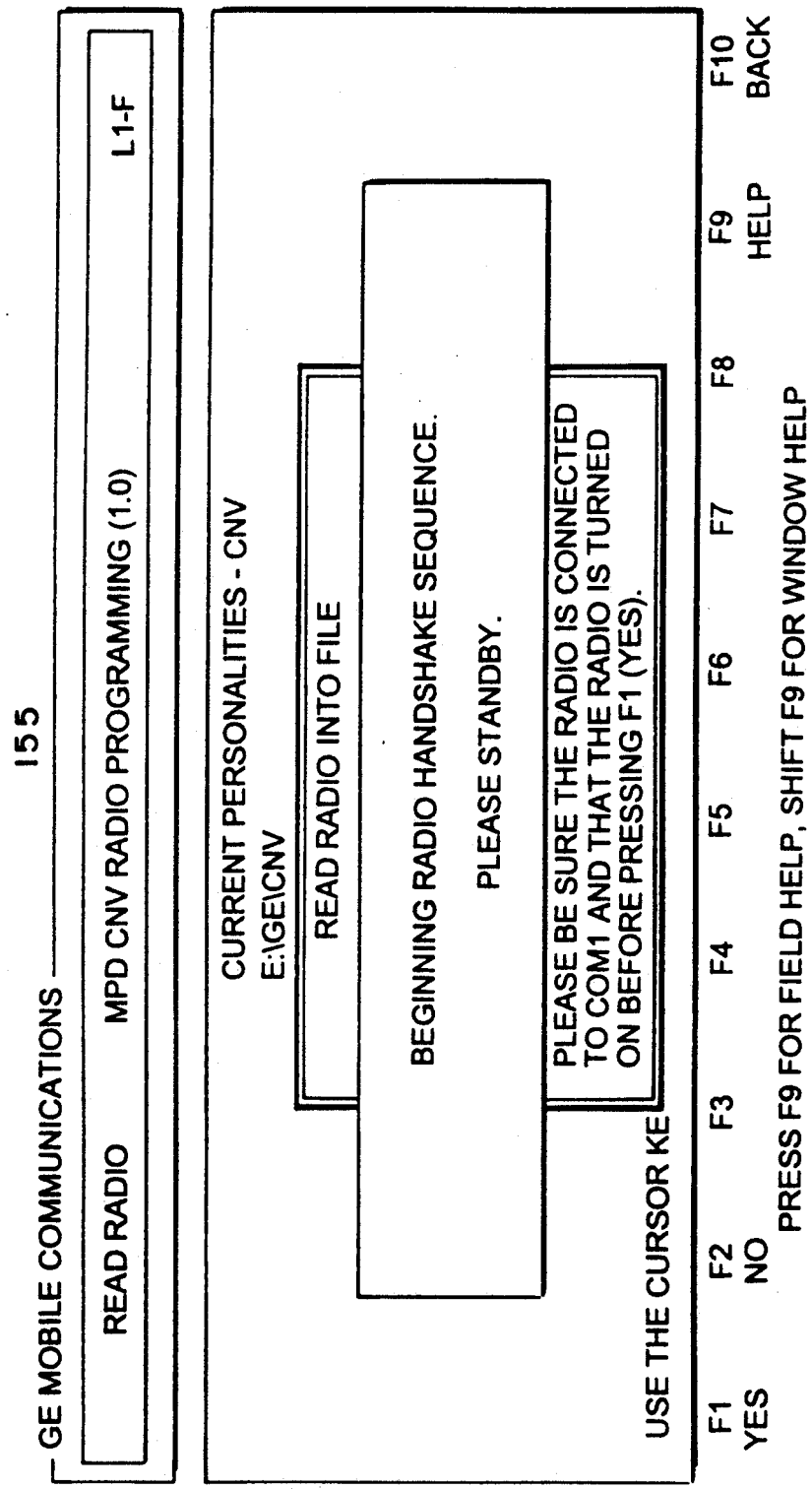
FIG. 68 CONFIRMATION SCREEN

DIGITAL RADIO TRANSCEIVER PROGRAMMER WITH ADVANCED USER INTERFACE

FIELD OF THE INVENTION

This invention relates to digital radio frequency (RF) transceivers, and more particularly to programmer devices for programming the "personality" of a digital RF portable or mobile RF transceiver. Still more particularly, the present invention relates to a computer user interface for customizing the "personality PROM" (programmable read only memory) programming of a digitally controlled RF trasceiver.

BACKGROUND AND SUMMARY OF THE INVENTION

The subject application is tangentially related to following commonly assigned copending applications: Ser. No. 085,490 of Dissoway et al. entitled "Mobile Radio Interface" (Attorney Docket No. 46-80; Client Reference No. 45-MR-549(filed Aug. 14, 1987.

Long ago, virtually all of the features, options and operating characteristics of mobile and portable radio transceivers were determined by hard-wired components. Even operating frequencies were typically controlled by plug-in quartz crystals (in part because that was at one time the only practical way to provide the frequency stability required).

While older radio transceivers required additional or modified circuitry or components to perform certain functions (e.g., channel scanning, tone activated squelch, DTMF dialing, and the like), modern digital microprocessor-controlled transceivers are capable of performing such functions under software control with little or no additional circuitry. In fact, in many cases the only customizing required to adapt a radio transceiver to the specific requirements of a particular radio user is to load "personality" defining digital data into an electrically programmable non-volatile memory internal to the radio transceiver.

Digital microprocessor controlled radio communications devices are generally known, of course. The following (by no means exhaustive) listing of prior issued patents may be generally relevant to the state of the art of so-called "digital radios":

U.S. Pat. No. 4,378,551—Drapac
U.S. Pat. No. 4,392,135—Ohyagi
U.S. Pat. No. 4,525,865—Mears
U.S. Pat. No. 4,247,951—Hattori et al.
U.S. Pat. No. 4,254,504—Lewis et al.
U.S. Pat. No. 4,510,623—Bonneau et al.
U.S. Pat. No. 4,688,261—Killoway et al.
U.S. Pat. No. 4,618,997—Imazeki et al.

Such reference teach controlling transceiver functions and other transceiver operating parameters (e.g., operating frequencies) in response to digital signals stored in a "personality PROM" memory device internal to the radio. For example, specific frequency data can be stored in a memory device to specify corresponding transceiver operating channels. Tone decoding, DTMF encoding, scanning and other parameters can similarly be stored in the same memory device and these parameters can, in conjunction with control algorithms performed by the microprocessor under program control software, provide advance squelch control functions, tone signalling functions, and other advanced functions.

In the past, digital mobile and portable transceivers were preprogrammed at time of memory device (PROM) preprogrammed with the specific set of RF frequencies and other "personality" information. Thus, replacement of the integrated circuit PROM was at one time required to change the operating characteristics of the transceiver. However, to provide increased flexibility and permit transceivers to be reprogrammed more easily in the field (e.g., as user or system requirements change or a particular transceiver is issued to a different user), most modern digital transceivers have been provided with a connector via which programming data produced by an external source (e.g., a dedicated programmer device (an be applied to the transceiver. Programming may be accomplished by connecting a cable between the transceiver and the dedicated programming device and loading frequency allocation tables (and other information) from the programmer into the internal non-volatile "personality PROM" memory device within the transceiver. The transceiver microprocessor (or other component associated with the internal personality PROM) automatically loads the programming data appearing on the connector into appropriate locations in the personality PROM. This newly loaded information is used by the transceiver microprocessor in conjunction with stored program control instructions to control the transceiver. See, for example, commonly assigned U.S. Pat. No. 4,525,865 to Mears (1985) and commonly assigned application Ser. No. 06/910,353 of Flynn et al. filed Sept. 22, 1986 which issued as U.S. Pat. No. 4,843,588 on June 27, 1989 as two examples of methods for programming radio transceiver personality PROMs.

In the past, dedicated special purpose hardware programming devices were typically required to generate programming information and load the programming information into the radios. With the proliferation of personal computers (an in particular, the IBM PC and compatibles), however, some leading manufacturers of mobile and portable digital radios have provided software and associated interface kits which permit a user to program his radio via the ubiquitous RS-232C serial output port of a personal computer. Thus, users for whom the purchase of a specialized dedicated programming system was not cost effective in the past may now program their radios using the same personal computer they use for accounting and word processing functions.

General Electric Company for example provides a conventional Serial Programming Interface Module Model TQ-3310 which connects to the RS-232C serial output port of a personal computer via a serial output cable and connects to a radio transceiver programming connector via a Mobile Programming Cable (e.g., model no. TQ-3314). Using these components, data stored in the transceiver personality PROM can be read into a personal computer disk file and displayed on the personal computer display; and data stored in a personal compputer disk file can be downloaded into the transceiver personality PROM. Motorola, Inc. of Schaumburg, Ill., for example, sells a "level shifter" interface unit and associated cables which permits a personal computer to program Motorola digital radio transceivers. See, for example, the following publications relating to programming digital radios using a personal computer:

*Programming Manual for M-PD 16$^{Plus}$ Personal Radio* (General Electric Col);

GE Mobile Communications PC Programming MCS Programming Guide, Model TQ3317 V.10 (General Electric Company, April 1988);

"SABER Series Handle—talkie Portable Radios Field Programmer User's Guide, No. 68P81044C65-0 (Motorola Corp. 1987); and SMARTNET Standalone Field Programmer Model T5124A Programming Information Guide, Manual No. 68P81117E11 (Motorola Corp. 1985).

While the actual process of downloading a file from a personal computer or other computing device into the personality PROM of a digital radio transceiver is relatively easy and straightforward, a much more challenging problem is to provide a user interface which is sufficiently flexible to allow the user to easily specify the information to be downloaded and to easily perform other tasks related to the programming process. Not all persons involved in programming or reprogramming radio transceivers are skilled computer programmers. Many such people may be radio hardware specialists with little or no computer background, and others may not have much technical skill in any area. Besides, a programmer user interface which is so complex and unwieldy that it cannot be operated by anyone other than a skilled computer programmer would be extremely difficult and inefficient to use.

It would be highly desirable to provide a menu driven digital radio transceiver programmer user interface which is highly "user friendly" and easy to use; provides sufficient flexibility to allow the user to perform radio programming tasks as well as other tasks related to radio programming; and actually assists the user in performing radio programming and other tasks related to radio programming; and actually assists the user in performing radio programming tasks while helping to prevent errors. Such an advanced radio programmer user interface would allow radios to be programmed even by those who are not technically skilled, and would help to make the task of programming radios far more efficient and less time consuming.

The present invention provides method and apparatus for programming digital radio transceivers which defines an advance user interface with the following non-limiting advantageous features (and additional features as well):

A non-intimidating set of display formats that are easily understood by the user;

A user environment that frees the user from ever having to read a manual;

An interface that is comfortable for both the novice and the experienced computer user;

Easy maneuverability between display formats and easy access to task selections;

An interface which places the user in control and reassures the user that he is in fact in control;

Uniformity in operative key function assignments so that the same keys are used to perform similar tasks throughout the interface;

Informative and aesthetically balanced screen formats including a title section, a data/text section, and a navigational key assignment legend section;

Use of partial screen "pop-up" display formats overlying already displayed full screen display formats to display messages and additional selections related to a displayed full screen display format;

Screen and field type help text provided throughout the interface whenever the user depresses a certain key;

Individual Help text files stored in ASCII format for each help text call;

A hierarchial arrangement of display formats wherein each format includes a tree level indicator to help the user easily determine "where he is" in the hierarchy;

Helpful user text prompts which change as different tasks become available to assist the user in making task selections;

For radio bandsplit and other function selections that provide user selection from a limited predefined set of valid values, display of a list of different options so the user merely selects from the displayed options (rather than requiring the user to key in his selection);

Display of error messages in pop-up window overlay format at the same location on the display throughout the interface while preserving the information "beneath" the error message window; and A main display format providing a listing of all "personality" files previously created and allowing the user to select one of the personalities for modification, downloading into a radio, or other tasks by depressing cursor or other navigational keys.

BRIEF DESCRIPTION OF THE DRAWINGS

These and other features and advantages of the present invention will be better and more completely understood by referring to the following detailed description in connection with the appended sheets of drawings, in which:

FIGS. 2 and 3 are schematic illustrations of the hierarchial menu structure provided by the FIG. 1 preferred embodiment;

FIGS. 4-15 are schematic high-level flowcharts of exemplary program control steps performed by the FIG. 1 embodiment;

FIGS. 16-18 are schematic diagrams of exemplary data structures used in the preferred embodiment to define display formats.

FIGS. 32 through 68 illustrate exemplary screen displays shown in the preferred embodiment.

DETAILED DESCRIPTION OF A PRESENTLY PREFERRED EXEMPLARY EMBODIMENT

Figure 1:
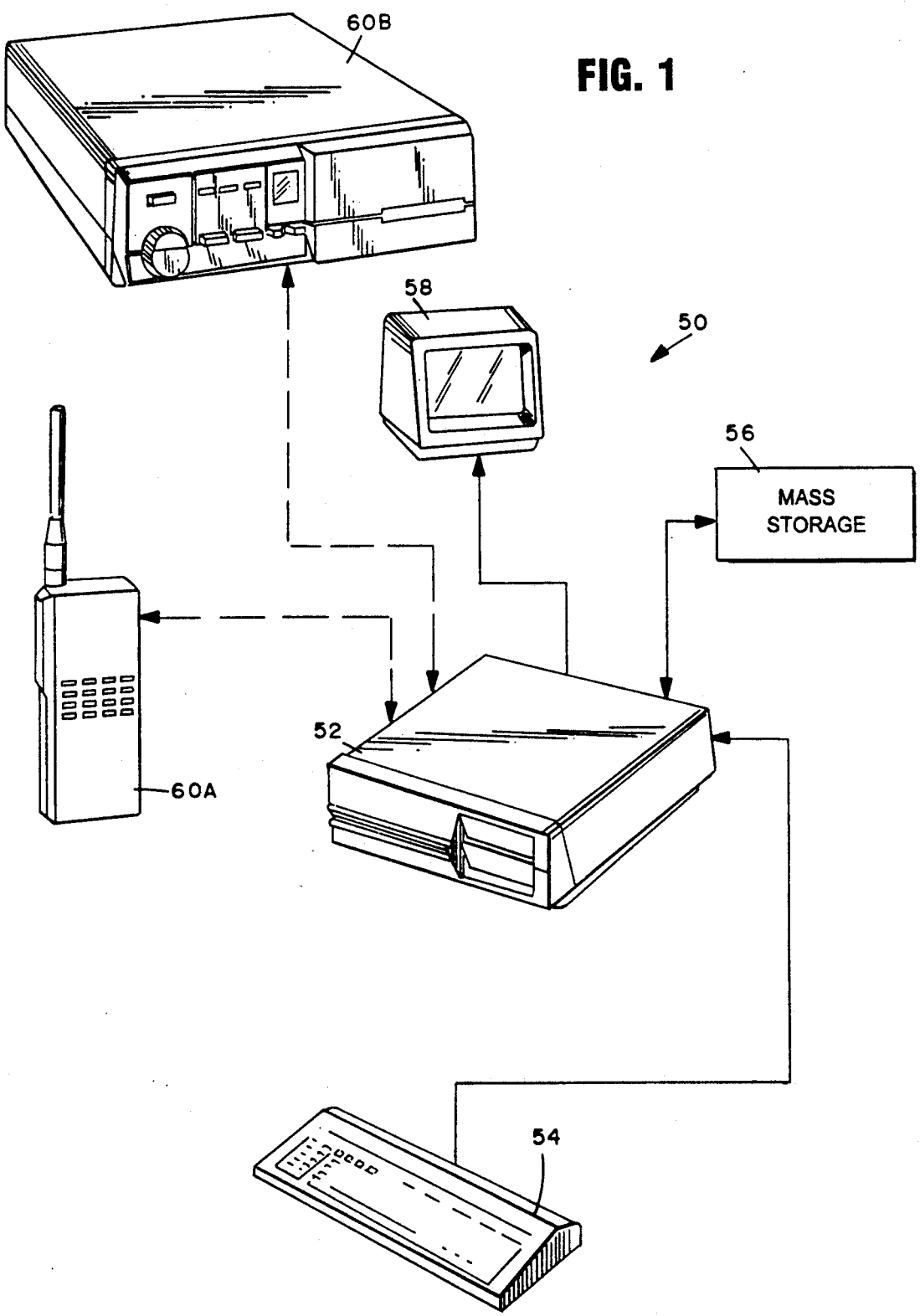
FIG. 1 is a schematic block diagram of the presently preferred exemplary embodiment of a digital radio transceiver programming system in accordance with the present invention.

FIG. 1 is a schematic illustration of a presently preferred exemplary embodiment of a radio transceiver programming system 50 in accordance with the present invention.

System 50 includes a personal computer 52 with associated keyboard 54 and mass storage device 56, a display 58, and a digital radio frequency communications device 60 (hereinafter "radio") to be programmed. In the preferred embodiment, radio 60 might comprise a conventional handheld portable radio 60A and/or a conventional handheld portable radio 60B (either of which may be temporarily connected to programming system 50). Personal computer 52 in the preferred embodiment comprises a conventional IBM personal computer or compatible, and display 58 in the preferred embodiment comprises a standard conventional CRT video display.

Figure 1A:
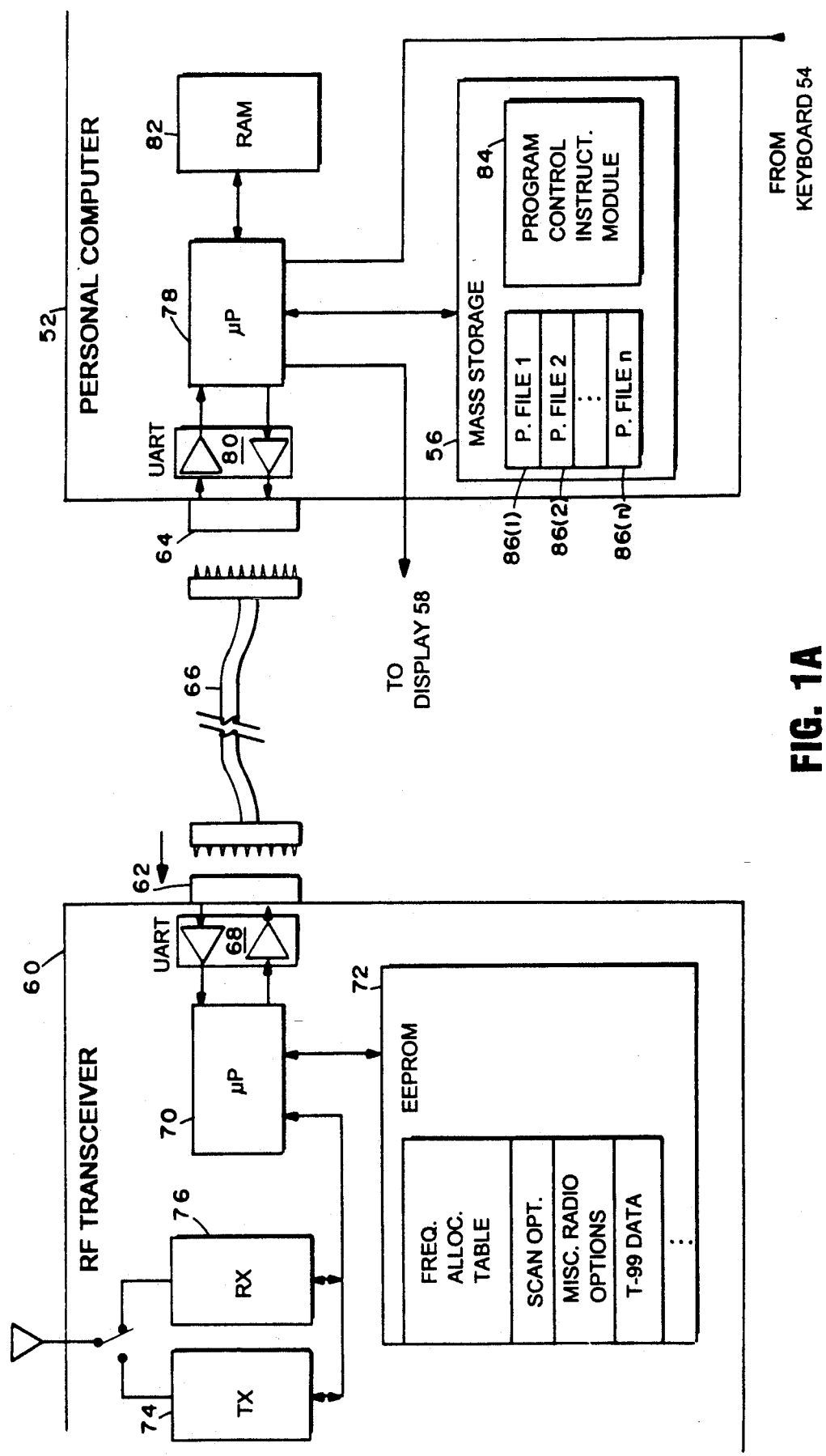
FIG. 1A is a simplified schematic diagram of some of the structures within the personal computer and the radio transceiver shown in FIG. 1 which are involved in transceiver programming.

FIG. 1A is a more detailed schematic diagram of portions of system 50. Conventional radio 60 includes a serial data connector 62 which is capable of being connected to the standard RS-232C personal computer serial port connector 64 via a cable 66 (a standard serial programming interface module such as GE part no. 19D438367G1 or the like may be connected between connectors 62, 64 as required to shift signal levels, convert between protocols, or the like). Conventional radio 60 may include a bidirectional data buffer/trasceiver 68 (e.g., a UART or the like) which communicates a serial data stream between the connector 62 and radio microprocessor 70. Microprocessor 70 in turn is connected to a non-volatile memory 72 (e.g., an EEPROM) storing "personality defining" information.

The personality information stored in EEPROM 72 controls the manner in which radio 60 operates in response to user inputs. For example, memory 72 in the preferred embodiment stores among many other conventional parameters a frequency/channel allocation table; radio scan options (e.g., whether scanning is enabled, hang time, and a parameter controlling whether the transceiver resumes scanning after transmitting on a priority channel); miscellaneous radio options (e.g., serial number, whether data is to be inverted before being transmitted, whether the operator can select power output levels from the keyboard, predetermined minimum power output, whether transmit mode is inhibited when transmit on a busy channel is attempted, etc.); T-99 data and/or digital voice guard mode data selection; and the like. Radio microprocessor 70 reads this personality defining information from EEPROM 72 and controls radio transmitter section 74 and radio receiver section 76 in a conventional manner in accordance with this personality defining information. For example, radio microprocessor 70 controls the synthesized RF operating frequencies for transmitter section 74 and receiver section 76 in accordance with stored frequency information (as indexed by operator inputted channel selections), controls transmitter output power in accordance with stored parameters, etc.—all in a conventional manner.

Personal computer 52 in the preferred embodiment also includes a microprocessor 78 communicating with serial output port 64 via a conventional UART 80 or the like. As is well known, personal computer microprocessor 78 is capable of transmitting serial data (using standard protocols) for loading into radio EEPROM 72 via UART 80, serial port 64, cable (and associated interface module) 66, connector 62, UART 68 and radio microprocessor 70; and is also capable of reading information stored in radio EEPROM 72 via the same path. While radio 60 in the preferred embodiment provides cooperative program control steps performed by radio microprocessor 70 to read from and write to radio EEPROM 72, in some applications it might be desirable to provide direct read/write access to the radio EEPROM via programming connector 62. Both such arrangements are known to those skilled in this art.

The conventional architecture for personal computer 52 shown in FIG. 1A is considerably simplified for clarity. Briefly, in the preferred embodiment personal computer microprocessor 78 executes program control instructions from RAM 82 (these instructions being initially stored in a program control instruction digital data module 84 on mass storage device 56 and loaded into the RAM as needed). Mass storage device 56 may also store one or more "personality files" 86 corresponding to preprogrammed parameters for particular radios. Briefly, such "personality files" 86 in the preferred embodiment contain both information for downloading into the EEPROM 72 of a radio 60 as well as additional information (e.g., comments) used by personal computer microprocessor 78 to facilitate processing and selection of radio personalities by a user (but not necessarily downloaded into a radio EEPROM).

These personality files 86 can be created "from scratch" using the program control module instructions 84, or can be obtained by uploading the contents of radio EEPROM 72. Thus, two basic modes of operation are possible in system 50: a radio 60 can be programmed or reprogrammed by creating a new personality file 86 on personal computer 52 and downloading the new file into the radio EEPROM 72; or the programming of an already programmed radio can be modified by uploading the radio EEPROM contents to the personal computer (e.g., to create a personality file on mass storage device 56), modifying the uploaded data, and downloading the modified data back into the radio EEPROM to replace the initial EEPROM data. As will be understood, it is also possible to program a new radio 60 to have behavior which is identical to that of an already programmed radio by simply uploading personality data from the already programmed radio and downloading the same data without change into the new radio.

The processes used in the preferred embodiment for uploading data from the radio 60 to the personal computer 52 and downloading data from the personal computer to the radio are conventional. However, the steps performed by the personal computer 52 to permit a user to easily create and/or modify a personality file and to perform other associated tasks are new. Briefly, system 50 presents the user of personal computer 52 with a flexible and advanced user interface (defined by a hierarchial tree structure of menus, windows and other display formats shown in FIGS. 2-3 and controlled by the exemplary program control steps shown in FIGS. 4-15). This user interface presents the user with opportunities to select tasks to be performed, these tasks resulting in the proper programming of radios 60.

In the preferred embodiment, system 50 minimizes user mistakes and guides the user in making task selections by displaying, on display 58, display formats which prompt the user for selections. The user interacts with system 50 in the preferred embodiment by depressing so-called "operational keys" on keyboard 54 as will be explained.

The following is a description of some of the general concepts ("design philosophy") used in accordance with the presently referred exemplary embodiment of the present invention for the format of the screen display formats and the assignment of user operable command and navigation keys.

Screen Definition

This interface divides the screen into three distinct sections: the title, the work area and the active function keys; refer to FIG. 32.

The screen title is used to present four items to the user: the program name, the software version number, the current function and the tree level indicator. The program name, located in the center of the title area, is used to provide the correlation between the PC programmer and the radio in which it programs. To the immediate right of the program name is the software version number. This version number is used to identify a particular release of the software i.e.: 1.0, 1.2 etc. The current function is displayed to the left of the program name. This is implemented to assist the user in maintaining a reference point while using the software. In addition, a tree level indicator is displayed to the right of the version number. This indicator provides an additional reference point as a cross-reference to a tree diagram in the user's documentation.

Located between the screen title and the function key labels is the work area of the screen. It is in this area that all windows are displayed and manipulated. No window will ever extend itself over the screen title or the function key labels.

Displayed in the lower portion of the screen are the function key labels. These labels indicate the current functionality of the function keys. There are active keys and inactive keys. Active keys are identified by labels and will carry out the displayed function whenever pressed. Inactive keys are identified by the lack of a label and will not affect the functionality of the program in any way. They are displayed along with the active keys to provide balance to the screen and maintain proportion between the labels.

Windows

A window is a section of the screen that has been dedicated to either the displaying or the entering of data. Windows are identified by an outline or box surrounding the window. As shown in FIG. 33, there are no limit to the number of windows that can be displayed on the screen at any one time, however, there can only be one active window. Active windows are identified by their highlighted outlines and gives the user a sense of position, on the screen and within the program. Often, windows will overlap one another with the active window always on top.

Similar to the screen, windows are divided into three distinct regions or parts: the title, the work area and the prompt line as shown in FIG. 34.

As shown in FIG. 34, the title is used to identify the window and give the user an idea of the action taking place or the information being displayed. If the window was a print window, then the title might read 'Print Personality'. If the window is used to display system information, 'System Information' would be displayed on the top line. Unlike the screen title, the window title occupies only the top line of the window and the length is determined by the width of the window.

The work area of the window is comprised of one or more fields. Fields are the primary tool with which the user and the program interact. Fields provide for the entering of data or the displaying of data. As such, there are two types of fields: display only fields and input fields. Display only fields are used to label the input fields or provide additional information. Input fields accept data from the user.

When a window is painted, all display only fields will appear in normal video. Default values (if any) for input fields will appear in a highlighted attribute. The cursor will be located in the top left input field being edited. The will appear in reverse video to readily identify the field being edited. The user can edit or modify the data as they please. Once completed, the user signifies completion by pressing one of the movement/acceptance keys (see Key Definitions). Before the cursor advances to the next field a validity check of the data is made. If the data is acceptable, advancement to the next field occurs. However, if the data is unacceptable, a message will appear indicating the problem and the cursor remains in the field until acceptable data is entered. Movement through the screen is from top to bottom, left to right. Advancement passed the last field of the window will cause a wrap around the top. Wrap to the bottom occurs on advancement through the top.

FIG. 35 contains two sample windows: sample A and sample B. Refer to sample A. When this window appears, the cursor will be located in the name input field and a 'prompt line' appears at the bottom of the screen. The prompt line is used to help explain either the type, format or range of data that is expected in the field. When advancing to the next field (see sample B), the prompt line changes to reflect the next field.

Function Keys

There are two types of function keys: active and inactive. Inactive function keys will not have a function label associated with the key. Pressing the key will have no affect what so ever on the operation of the screen. On the other hand, active keys are identified by a corresponding label and depressing an active key will cause a 'jump' to the function specified.

The definition of the function keys are determined by each window. One window may define the function keys in a manner substantially different than another. However, since only one window can be active at any time, only one set of function key definitions can be active at a time. In other words, the active window controls the function keys.

Although the function keys may take on different definitions i.e.: Using F3 for New and Add, similar definitions will always be defined using the same key. For example: two windows require a New Key. To maintain consistency, F3 will always be used to define the New key. We will never define F4 to be a new key or use any other function key other than F3. The following convention has been selected for the function keys.

FIG. 36 lists the currently defined key positions for some of the more commonly used functions. A brief explanation of each function follows:

Set up

When pressed, the set up window will be invoked. The set up window is used to maintain infrequently modified definitions. Included might be such items as radio type and band split setup and frequency sets or group sets definition. The specific windows under the guise of set up will depend on the radio if not the system. Therefore, 'infrequently modified' ought to be used as a guide in determining window placement under set up.

Change

Change is used to indicate that the desired operation is to change the personality, data or definition currently highlighted by reverse video. A typical example would be a window that lists the currently defined personalities. To change a personality, the user would use the cursor keys to highlight the personality to be changed and press the change key. This will cause activation of the change personality window. The currently selected personality will become the default and the user will be given the opportunity to enter a new name.

Utility

The utility key is used to activate the utility functions screen. Because of the limitation of ten function keys, another screen was created to handle the overflow of the functions. The utility window was implemented to satisfy this requirement. Currently, the utility window provides access to the following functions: Port, Maintenance, Directory, Delete, Print, and Extension.

New

The new function provides the user with the ability to create a new personality, frequency set or group set depending upon which screen their under when the key is pressed. This key may or may not bring up an intermediary window before providing access to the definition screen.

Program

This key is selected in order to download the selected personality into the radio. Once invoked, it will activate the program personality window and give the user the ability to override the selected personality.

Read

Similar to the program radio key, this key is selected in order to read the radio into a file. Once selected, the read radio window will appear to let the user specify the name of the file to receive the radio personality.

More

F8 has been set aside as the more key. The more key is used to switch the function keys to alternate sets of function keys. Specifically, the more key is used to handle the over flow of functions.

Help

Help is selected whenever the user has a question about what they are looking at or what they are expected to do. There are two levels of help: field help and window help (accessed by pressing shift F9.) The field level help, when selected, will pop up the normal help window centered in the screen. This help should try to answer at least these three questions: 1. What is the field for? 2. What values are acceptable? 3. What affect will this have on the radio? In the case of toggle fields, it should also indicate that the TAB key is used to toggle the field.

Similarly, the window level help should try to answer these questions: 1. What is this window for? 2. What am I expected to do? 3. Where should I go from here or what are my options.

A couple of thoughts:

1. One of the goal of PC programming is to be self explanatory.
2. Assume the user is unfamiliar with the radio and the terminology.
3. Use support material (documentation, worksheets, samples) whenever practical.

Exit

Exit is only found under the current personalities window and is used to return the user to DOS. Once selected, an exit confirmation prompt is displayed that will require the user to confirm the exit.

Port

The port key is found under the utility window. When pressed, it will activate the Communications port window. This window gives the user the ability to specify which communications port the radio interface box is attached to.

Maintenance

This key is selected when the user wishes to change some of the operational parameters of the radio such as power, modulation and squelch levels. Once selected, the maintenance window will appear giving the user the ability to perform the maintenance functions.

Directory

The DIRECTORY function is used to change the working directory from within the program. Once selected, the Change directory window will appear and the user can specify a new directory. This new directory will appear in the current personality window.

Delete

The delete key is selected in order to delete a personality, frequency or group set. Prior to activation, the user will use the cursor keys to position a video bar over a selected personality. This personality will become the default when the delete window appears.

Print

Print is selected when the user wants to produce a formatted output of the personality. This output can be directed to the line printer, the screen or to an ascii file.

Back

Back is used to return to the previous window. As you recall, it is possible to have multiple windows on a screen. When a new window is created (usually by selecting a function key) the current window becomes inactive and the new window becomes the active window. Returning to the old window is possible by selecting Back.

Switch

This key is used to switch between active windows. As mentioned earlier, each screen may contain more than one window. However, only one window can be active at any one time. Movement between the windows can be accomplished through the use of the switch key. When this key is pressed, the current window deactivates and the destination window activates. It should also be noted that this is active only under tightly controlled circumstances.

Insert

Typically, the insert key is used to insert an element into a list or group of elements. This can be a list of modes, channels, groups, etc. To insert, the user would position the cursor on the line, row or field in which the insert is to made and press the insert key. Once selected, all the elements from the cursor to the end of the list will be shifted down one position with the current field becoming closer.

Remove

Remove is selected to delete an element from a list and move everything else in the list up one position. To remove an element, the user would place the cursor in the element position to be removed and select this key.

Yes

There are a few windows that have been designated as confirmation windows. Typically, confirmation windows require a Yes/No entry before continuing. The Yes key is selected to confirm the desired operation.

No

The No key is found on confirmation windows to give the user the opportunity to cancel the desired operation.

Windows are controlled on a first-in, last-out basis. This means that the last window created will be the first to disappear when back is selected and the first window will be the last.

Help Windows

The help windows employed in this interface incorporate some very unique features. First of all, they reside on disk. What this means is that when the help key is pressed, the help window will read a help file from disk for display on the screen. This has a number of advantages. First of all, it reduces program size which has a direct impact on program loading. The smaller the program, the less time required to load it into memory and the less memory required to run in. Also, by maintaining the help files on disk, they can be changed or modified by any text editor. Thus if a help requires more information, we just edit the help file. No additional compilation is required.

Also, the help window provides full scrolling. This provides for reading helps that may contain more information that can appear on the screen at one time. If the file is larger than the window, the user uses the page up and page down keys to scroll through the text.

Key Definitions

This interface defines four general categories of keys: function keys, character keys, editing keys and movement/acceptance keys. Function keys have already been discussed so this discussion will limit itself to the remaining three categories.

Character Keys

Character keys are used to enter data into a field. When pressed, they will deposit a character in the field and advance the cursor to the next character position. The character keys will effectively disable when the field fills. Below are the character keys:

| Alphabetic: | (a-z) and (A-Z) |
|---|---|
| Numeric: | (0-9) |
| Special Characters: | (`~!@#$% &*()-_=+[]{} ;:'",.<>/? |

Editing Keys

Editing keys are used to manipulate the data within a field. The editing keys are:

Left Arrow
Moves the cursor one character to the left until the left most position of the field is reached. Once reached, an additional left arrow key will cause advancement to the previous field.

Right Arrow
Moves the cursor one character to the right until the right most character is reached. Once reached, an additional right arrow key will cause advancement to the next arrow.

Backspace
Deletes the character to the left of the cursor moving the cursor one space to the left.

Delete
Deletes the character under the cursor and shifts all characters on the right, left on space to fill in the gap.

Insert
Toggles insert mode on and off. Insert mode is identified by a block cursor. When in insert mode, characters may be placed anywhere within a string of characters without over writing characters. When a character key is pressed, all characters on the right are shifted one character to the right and the character is placed in the gap.

Cap Lock
Toggles Capital mode on and off. (General usage)

Control/left arrow
Moves the cursor to the left most character in the field.

Control/right arrow
Moves the cursor to the right most character in the field.

Control/Backspace
Deletes all characters in the field. Cursor will be located in the left most character position.

Movement/Acceptance Keys

Movement keys are used to provide movement or cursor positioning on the screen. However, they are also used to indicate an end of input in the current field. When a movement key is pressed, before any movement can occur, the current field is checked for acceptable data. If the data in the field is unacceptable, a message indicating the problem with the data is displayed in the prompt line and the user is required to modify the field.

Enter
Accept data in field and advance to the next field.

Up arrow
Accept data in field and move to previous field. In list windows, the Up arrow key causes the cursor to advance to the field immediately above. Causes the cursor to wrap if in top most field when executed.

Accept data in field and advance to next field. In list windows, causes the cursor to advance to the field below current field. If in bottom most field when executed, causes wrap to the top most field.

Home
Move to the first input field on the window.

End
Move to the last input field on the window.

Tab
Toggle the field between selections.

Special Usage Keys

The following keys are considered to have special usage. The reason for this is that depending on their implementation, the may or may not be a movement/acceptance key.

Page Up
Primary purpose is to page up through the screen data. This data might be channels, modes or various options. The secondary purpose is to scroll the help screen up. Help screen will page up until beginning of file is reached.

Page Down

The primary purpose of the page down key is to page down through the screen data or the help window. This key will be used in conjunction with the page up key.

Note: Some screens such as the Current Personality screen requires a redefinition of the cursor keys. On these screens, no editing of the fields are performed, just selection from a list of fields. In these cases, the cursor keys will provide logical movement within the list. Cursor up moves to the field above the current. Cursor down advances to the field below. Left and right arrow moves to the respective fields.

User Interface Specification

The user interface specification is the single most important contribution to the success of a PC Programmer. It not only gives the programmer specific direction but it also uncovers serious design flaws in the programmer logic and the radio personality.

By definition, the user interface specification has a two fold purpose. First, it is to guide the development of the PC programmer illustrating each screen and field, the acceptable values of each field, the layout of the windows and the help window text. It should attempt to alleviate any questions a programmer will ask in order to code the program. Secondly, it becomes the basis from which the user's manual can be written. The specification should:

1. Illustrate each window to be displayed in the program. Along with the window illustration, it should give a brief discussion on how the window functions, what fields are conditional on other fields, cursor progression and what the program is doing after data is entered in certain fields.

2. Discuss the window level help. More specifically, the specification should spell out exactly the information that the help window is to display to the user. The programmer should be able to transfer this information directory to the window help file.

3. Explain the operation of each field in the window. Specifically, this discussion should tell the programmer specifically what is to happen when information is entered. For example: When the name is entered, a search is made of the data base to locate the entry. If found, the information is pulled up and displayed on the screen and the cursor advances to the next field. If the entry is not found, a message will appear indicating that the field requires a valid entry before cursor progression.

3. Indicate what each field prompt should say.

4. Discuss each field level help. Similar to the window level help, the field help should spell out exactly what the user will see in the help window.

5. Indicate the default value for each field.

6. Explain the validity check for the field and how it should operate.

7. Indicate the storage for the field. The goal is here is to direct the programmer to where the information is being stored in the personality.

Although there is no set way in which to go about producing a user interface specification; here are a couple of suggestions.

1. Start with an existing specification and perform the necessary cuts and pastes to create a new specification.

2. Based upon the prom specification, itemize the information that the user is required to enter. Try to get an accurate idea of every question or input that needs to be asked in the program.

3. Group together related fields/items. For example, put together all information that's required for each channel and use this information to create a channel definition. The channel definition can then be used to determine which window the information is to be solicited.

4. Create the windows based on the groups of data. The attempt here is to create windows comprised of related fields. For example, options relating to scan should be in a scan window. Options relating to Type 99 should be in a separate Type 99 window, etc. This is going to require a lot of creativity to select the right size window, position the fields within the window, and coordinate window calling.

5. Before writing any text, discuss the screens with every one involved to get a feel for acceptance. No sense in writing a lot of text for a window that no one is going to accept.

6. Once the screens and the philosophy of the program has been accepted, start putting the text with the window. Be very verbose and explain how the window operates, how the fields operate, what the helps should say etc.

The S825 Control Head user interface specification provides a good example of what is required for a specification and should be used as an example.

Figure 2:
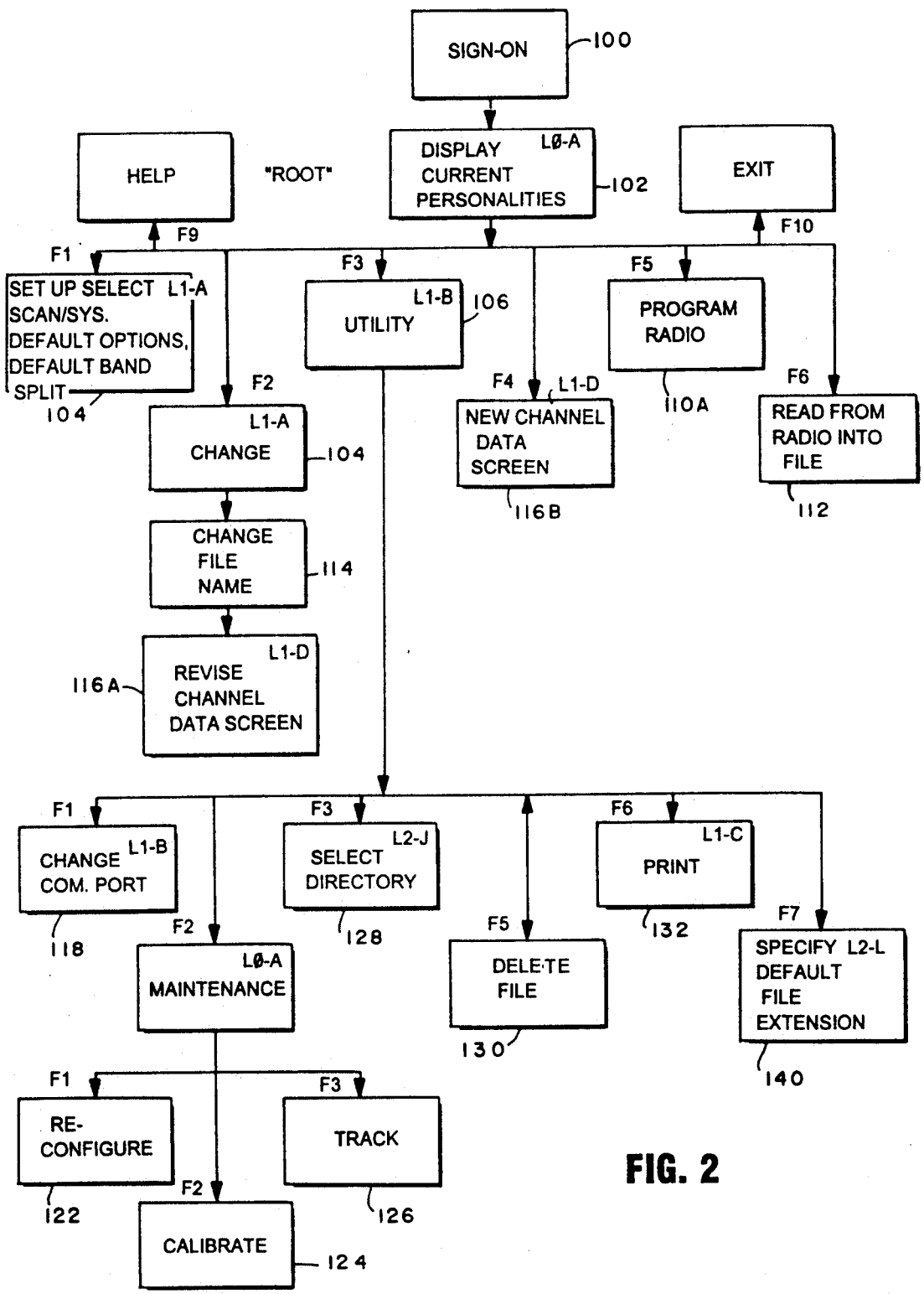

The hierarchial display format tree structure of the preferred embodiment is schematically shown in FIGS. 2-3. When the user first starts programming system 50, a signon display 100 appears and then display 58 displays a main ("root") screen 102 listing all of the personality files 86 (in the default directory and having the default file extension) stored on mass storage device 56. The user may choose a task to perform by depressing any one of a set of active "function keys" of keyboard 54 (in the preferred embodiment the standard PC function keys F1-F10 are assigned to function selection tasks). Depressing a function key causes a task to be performed, causes a further display format listing additional user selections to be displayed on display 58, or both.

As described above, in the preferred embodiment the task selection assigned to a given function key typically changes with the display format currently being displayed. However, the F9 (and shift-F9) function key always causes user help text to be displayed when it is depressed; and the F10 key always executes a "go back" function (causing the display format next closest to "root" screen 102 in the hierarchial "tree" of display formats to be displayed—or terminating the programming function altogether and returning control to the personal computer DOS operating system in response to a further ny" prompt response from the user if the currently displayed screen is the "root" screen).

In the preferred embodiment, the help text displayed when the F9 or shift-F9 key is depressed reflects the display format currently being displayed, and is obtained from a help file stored on mass storage device 56 in a directory called "HELP". In the preferred embodiment, there is a one-to-one correspondence between different help messages and help files, and only a single help message is stored in each help file. That is, the display format call generated when the F9 (shift-F9) key is depressed depends upon what display format is currently being displayed (and for F9 as opposed to shift-F9, also which input field the cursor is currently within, and references a specific stored help file. In the preferred embodiment, all help files use the common file extension ".HLP", each file contains only help text in ASCII format, and the help file names are descriptive of the function or task the help text corresponds to (e.g., a file "LIGHT.HLP" contains help regarding the selection of an option to backlight the radio display for particular channels, and "MIN_VOL.HLP" contains the text assisting the user in selecting a minimum radio volume level, etc.). Since the help text file names are descriptive and the help text files contain only ASCII text, it is actually possible for the user to customize the help text of his system 50 using a simple ASCII text editor.

When the "root" screen 102 is displayed on display 58, the following assignments are made to the set of formation keys F1–F10 in the preferred embodiment:

F1—Invoke a "set up" task and cause display of an associated "set up" display format 104 to permit the user to establish system "default" parameters and radio options;

F2—Invoke a "Change" task and display an associated "Change" display format 104 permitting the user to revise an already existing personality file 86;

F3—Invoke a "Utility" task and display an associated "Utility" display format 106 permitting the user to select from various utility tasks associated with radio programming;

F4—Invoke a "New" task to allow the user to create a new personality file 86;

F5—Invoke a "Program Radio" task which downloads a personality file 86 into a radio EEPROM 72;

F6—Invoke a "Read" task which uploads the contents of a radio EEPROM 72 to personal computer RAM 82 and/or mass storage device 56;

F7—Inactive;

F8—Inactive;

F9/Shift F9-Display user help text; and

F10-Exit programming functions and return to DOS.

Upon depressing the F2 key, the user is prompted for the name of the personality file 86 he wishes to modify, and then a "Channel Data Screen" 116 is displayed. Similarly, the "Channel Data Screen" 116 is displayed when the F4 key is depressed to create a new personality file 86. From the screen 116A or 116B, the user may invoke additional tasks which permit him to select specific radio operating parameters specified by the current personality file 86. Referring to FIG. 3, system 50 assigns the function key set to the following functions in one exemplary embodiment when the "Change Data" screen 116 is displayed;

F1—Modify screen format 116 in response to user selection between voice guard and T99 format for data transmission;

F2—Inactive;

F3—Display a "pop-up window" screen format 144 permitting the user to enable "GE STAR" radio options;

F4—Display a "pop-up window" display format 146 allowing the user to input or change a textual comment associated with the personality file being created/modified;

F5—Display a "pop-up window" display format 110B allowing the user to download the current personality file 86 into a radio 60;

F6—Display a "pop-up" window display format 150 permitting the user to select T-99 data options;

F7—Display a "Radio Options" pop-up window display format 152 permitting the user to select radio operating parameters (e.g., power output level selection, radio serial no., home channel, etc.);

F8—Display a "pop-up window" display format 154 permitting the user to specify radio scan operations;

F9/Shift F9-Display help text; and

F10-Return to "root" screen format 102.

As will be explained in greater detail shortly, the "pop-up window" display formats are somewhat different from other display formats in that they typically do not occupy the entire screen of display 58 and are overlaid on top of the display format displayed before the pop-up window display was invoked.

Referring again to FIG. 2, the user may select any of various utility tasks from the utility display format 106, including:

F1—Display a display format 118 permitting the user to change the personal computer serial communications port used as port 64;

F2—Display a display format 120 presenting the user with radio maintenance functions;

F3—Display a format 128 permitting the user to select a "directory" on mass storage device 56 from which personality files 86 can be selected;

F4—Inactive;

F5—Display a display format 130 permitting the user to delete a personality file 86;

F6—Display a format 132 presenting the user with the option to print the contents of the current personality file 86 to a printer, a file, or display 58;

F7—Display a format 140 prompting the user to choose a default DOS file extension for designating personality files 86;

F8—Inactive;

F9/Shift F9-Display Help Text; and

F10-Return to display of root screen 102.

The "maintenance" display format 120 (F2) invokes further display formats and associated tasks in the preferred embodiment. The further "maintenance" formats/tasks in the preferred embodiment involve special maintenance and testing functions and are typically used only by service technicians. These special functions actually control the radio 60 to operate in various ways under interactive control by personal computer 52, and are used to test and diagnose problems relating to the internal operation of the radio 60. When the "maintenance" display format 120 is displayed, the user may make the following selections:

F1—Dynamically reconfigure the radio 60 (display format 122);

F2—Calibrate the radio (display format 124);

F3—Track radio frequency operation (display format 126);

F4 through F8—Inactive;

F9/Shift F9-Display help text; and

F10—return to displaying "utility" display format 106.

The reconfigure, calibrate and tracking tasks are conventional and have been in use for quite some time by GE service technicians and customers.

Now that the overall hierarchial tree arrangement of the display formats in the preferred embodiment has been described, each of the various display screens 100-156 will be discussed in greater detail in connection with Tables showing their actual textual contents and more detailed written descriptions of the task selection options they each present to the user.

FUNCTIONAL HIERARCHY

The functional hierarchy of the S-825 control head PC programmer is as follows:

```
L0-A  Current Personality Screen
      L1-A  Setup Window
      L1-B  Change Window
            L2-A  Control Head Personality
                  L3-A  Detail - Frequency Set
                  L3-B  Program
                  L3-C  Option
                  L3-D  Text
                        L4-A  Siren
                        L4-B  CG
                        L4-C  FNC
                        L4-D  Signal
                        L4-E  Radio
                        L4-F  Key
                  L3-E  Frequency Sets
                        L4-F  Frequency Set Detail
                  L3-F  Save Personality
      L1-C  Utility Screen
            L2-B  Port
            L2-C  Maint
            L2-D  Directory
            L2-E  Delete
            L2-F  Print
            L2-G  Extension
      L1-D  New
            L2-A  Control Head Personality
                  L3-A  Detail - Frequency Set
                  L3-B  Program
                  L3-C  Option
                  L3-D  Text
                        L4-A  Siren
                        L4-B  CG
                        L4-C  FNC
                        L4-D  Signal
                        L4-E  Radio
                        L4-F  Key
                  L3-E  Frequency Sets
                        L4-F  Frequency Set Detail
                  L3-F  Save Personality
      L1-E  Program
      L1-F  Read
```

This program is invoked by typing S825CNV at the DOS prompt. Once executed, a brief copyright message will appear and the screen illustrated in the FIG. 37 will appear. This is the current personality screen or the main screen for the radio programmer. The purpose for this screen is to show/highlight the currently defined personalities in the current directory. These personalities are identified by a common extension which is displayed to the right of the screen title (Current Personalities). The current directory defaults to the directory the user was in when the program was run and is identified under the screen title.

The current personality screen will identify up to 63 personalities on a screen. A highlighted cursor (reverse video bar) identifies the selected personality in preparation for a change or program. Movement of the video bar is controlled through the cursor keys. If more than 63 personalities reside in the current directory, they can be accessed by pressing the page down key. The page up and page down keys are only active if more than 63 personalities reside in the directory.

Window Help

Current Personalities

Note: Through out this program and the associated documentation, the term personality is used. Personality is used generically to refer to the information that is stored in the radio that makes a particular radio different from all similar radios. Using this program, that information can be created/deleted/modified and stored on disk for later reference.

This is the main window for the S825 Control Head programmer. At the top of the window is the title "Current Personalities". To the direct right of the title is the default extension. Below the title, the current directory is displayed. Whenever the program is initiated, the currently defined personalities residing in the current directory with the extension selected, will be displayed on the screen. A reverse video bar indicates the default personality for some of the available options. This bar can be positioned by using the cursor keys to move it around.

From this window, your available options are:
F1—Setup. Select this option if you want to:
  Set your personality defaults.
F2—Change. Select this option if you want to:
  Change/edit an existing personality.
F3—Utility. Select this option if you want to:
  Change comm port entry, change directory, delete a personality, print a personality or change extensions.
F4—New. Select this option if you want to:
  Create a new personality.
F5—Progrm. Select this operation if you want to:
  Program a radio with the personality selected.
F6—Read. Select this option if you want to:
  Read the personality out of the radio.

Note to programmer: The field level help should call up the window help.

Selecting F1 (setup) from the current personality window will bring the user into the setup portion of the program. Setup consists of three distinct windows: the deluxe keypad definition (FIG. 38), the basic keypad definition (FIG. 41) and the frequency range window (FIG. 39). The keypad definition windows give the user the ability to define the keypad defaults to use whenever a new personality is created and the frequency range window provides for setting the band split default. Once the user then selects 'Back' from any of the windows, the current state of the windows are saved to disk so that program 'remembers' the settings. The next time the user enters setup, the last state will be the default. (This includes the last keypad definition window used i.e.: Basic or Deluxe.

Upon entry, the cursor will be located in the first input field of the screen. Each of these input fields is a toggle field and represents the appropriate key on the control head. To define the key, the user toggles the field until the correct selection is displayed. Once the selection has been made, the user advances to the next item.

There are 4 display only fields on the window: Pwr, Fnc, Vol, and Chn. These fields are used only to help provide reference to the screen and to give an indication that they cannot be redefined.

Normal cursor progression is left to right, top to bottom. Once the window has been completed, the user can either switch to the frequency range window or pull up the basic window.

Window Help

Deluxe Keypad Definition

This is the deluxe keypad definition setup window. The layout of the screen was selected to represent the physical layout of the keys on the deluxe model of the S825 control head. Using this window, you may select the defaults to be used when creating a new personality. To do this, advance the cursor to the key you wish to define and press the TAB key to toggle/select you desired selection.

From this window, your available options are:
F1—Switch. Select this option if you want to:
Change/select the default frequency range.
F2—Basic. Select this option if you want to:
Define the key pad defaults for the basic unit.

'XXX'

Each of the 'XXX' displayed above is a toggle field that represents a key on the control head. Using the TAB key, the user toggles between the following list of items:
WAI—Wail, YLP—Yelp, RST—Reset, SL1 to SL8, GE*—GEstar,
VG—Voice Guard, PA—Speaker PA, DSB—Disabled, VLU—Volume up
VLD—Volume down, CHU—Channel up, CHD—Channel down, MOD—Mode
HOM—Home, SCN—Scan, SPR—Speaker, SQL—Squelch level,
CG—Channel guard, DEL—Delete, ADD—Add, VRS—Vehicular RPT,
EG*—Emergency GEstar

Prompt

Press TAB to toggle, F9 for help.

Help

Key Definition: This field is used to define the respective key on the control head. Using the TAB key, this field toggles between the available options for this field. They are:
WAI—Wail (Initiate the Wail siren)
YLP—Yelp (Initiate the Yelp siren)
RST—Reset (Disable the key)
SL1 to SL8—Siren/Light combination (Initiate the appropriate combination)
GE*—GEstar (Generate GEstar ID)/T90/T99
VG—Voice Guard (Enter encrypted speech mode)
VRS—Vehicular RPT On/Off
EG*—Emergency GE*
PA—Speaker PA
SPR—External speaker
DSB—Key Disabled
VLU—Volume up
VLD—Volume down
CHU—Channel up
CHD—Channel down
MOD—Mode
HOM—Home
SCN—Scan
ADD—Add
DEL—Delete
SQL—Squelch level
CG—Channel guard

Default

The defaults for each field will be the last state of the fields. The program remembers.
Note: When first invoked, the pattern will default to the standard configuration.

Validity

There are no validity checks for this field.

Storage

Refer to section 11.0 (Prom spec)—Keypad Definition

The window illustrated above is the Basic keypad definition window and is pulled up by selecting the F2 (Keypad) key from the Deluxe window. All data entry for the window operates in a similar fashion to the deluxe.

Upon entry, the cursor will be located in the first input field of the screen. Each of these input fields is a toggle field and represents the appropriate key on the control head. To define the key, the user toggles the field until the correct selection is displayed. Once the selection has been made, the user advances to the next item.

There are 4 display only fields on the window: Pwr, Fnc, Vol, and Chn. These fields are used only to help provide reference to the screen and to give an indication that they cannot be redefined.

Normal cursor progression is left to right, top to bottom. Once the window has been completed, the user can either switch to the frequency range window or pull up the basic window.

Window Help

Basic Keypad Definition

This is the basic keypad definition setup window. The layout of the screen was selected to represent the physical layout of the keys on the basic model of the S825 control head. Using this window, you may select the defaults to be used when creating a new personality. To do this, advance the cursor to the key you wish to define and press the TAB key toggle/select you desired selection.

From this window, your available options are:
F1—Switch. Select this operation if you want to:
Change/select the default frequency range.
F2—Deluxe Select this option if you want to:
Define the key pad defaults for the deluxe unit.

'XXX'

Each of the 'XXX' displayed above is a toggle field that represents a key on the control head. Using the TAB key, the user toggles between the following list of items:
WAI—Wail, YLP—Yelp, RST—Reset, SL1 to SL8, GE*—GEstar,
VG—Voice Guard, PA—Speaker PA, DSB—Disabled, VLU—Volume up
VLD—Volume down, CHU—Channel up, CHD—Channel down, MOD—Mode
HOM—Home, SCN—Scan, SPR—Speaker, SQL—Squelch level,
CG—Channel guard, DEL—Delete, ADD—Add, VRS—Vehicular RPT,
EG*—Emergency GEstar

Prompt

Press TAB to toggle, F9 for help.

Help

Key Definition: This field is used to define the respective key on the control head. Using the TAB key, this field toggles between the available options for this field. They are:
WAI—Wail (Initiate the Wail siren)
YLP—Yelp (Initiate the Yelp siren)

RST—Reset (Disable the key)
SL1 to SL8—Siren/Light combination (Initiate the appropriate combination)
GE*—GEstar (Generate GEstar ID)/T90/T99
VG—Voice Guard (Enter encrypted speech mode)
VRS—Vehicular RPT On/Off
EG*—Emergency GE*
PA—Speaker PA
SPR—External speaker
DSB—Key Disabled
VLU—Volume up
VLD—Volume down
CHU—Channel up
CHD—Channel down
MOD—Mode
HOM—Home
SCN—Scan
ADD—Add
DEL—Delete
SQL—Squelch level
CG—Channel guard Default The defaults for each field will be the last state of the fields. The program remembers.

Note: When first invoked, the pattern will default to the standard configuration.

Validity

There are no validity checks for this field.

Storage

Refer to section 11.0 (Prom spec)—Keypad Definition

FIG. 39 is one of three frequency range windows and is accessed by selecting the F1 (Switch) key from one of the keypad definition windows. This window consists of 14 selectable fields used to indicate the current/desired band split default. A selection is made by moving a highlighted video bar over the selection and leaving the window (either through the back key or F1). The F1 key returns the user to the keypad definition window.

Access to the other frequency range windows is granted by pressing the F3 (Range) key. Once depressed, the next range window will appear in place of the current window. Three windows provide for Rangr, Narrow band delta and Wide band delta. Note: The other windows are displayed on the following pages.

Window help

Frequency Range

FIG. 40 shows the frequency range window. It is used for selecting the band split to default whenever 'New' is selected from the current personality screen. To select a band split, position the reverse video bar over your selection and exit the window by pressing F1 or F10. The selected split will be saved to disk so that the program will remember it the next time it is initiated.

FIG. 42 shows the change personality window and is accessed by selecting the F2 (Change) key from the Current Personality Screen. This window is selected in order to change a personality reading in the current directory.

The reason this window is called is to give the user some flexibility in editing personalities. We do not want to restrict the user by making them cursor to the personality they want to edit. Instead, we bring up an intermediary window and give them the opportunity to change the file name.

Window Help

Change/Edit Personality

This is the change personality window. The purpose of this window is to solicit the name of the personality to change. Once the name is entered press F1 to continue.

From this window your options are:
F1—Select this option if you want to:
  Change the personality selected.
F2—Select this option if you want to:
  Discontinue this procedure.
File to be edited:
This is an alphanumeric field that is used to solicit the file name of the personality to be edited. Under normal operations, the user will not edit this field but to leave the default.

Prompt

None

Help

File to edit: This field is used to enter the name of the personality to be changed/edited. This is an eight character alphanumeric field and will accept any valid DOS file name provided the personality exists in the current directory. Once a name is entered, select F1 to change the personality and F2 to abort the operation.

Default

The default for this field is the name that was highlighted in the current personality screen.

Validity

A valid entry for this field will pass the following tests:
1. Must be an acceptable DOS file name.
2. File must exist in the current directory.
3. File must be a "personality" file.

Storage

There is no storage for this field.

FIG. 43 shows the utility screen and is accessed by selecting the F3 (Utility) key from the current personality screen. The utility screen is used to give the user access to some of the secondary functions of the PC programmer.

This screen operates in a similar manner to the current personality screen. The only difference between the two are the function keys.

Window Help

Utility

This is the utility window. As you can see, every aspect of this window is the same as the current personality screen except for the function keys.

From this window your options are:
F1—Select this option if you want to:
  Change the port to use for programming radios.
F3—Select this option if you want to:
  Change your current directory.
F5—Select this option if you want to:
  Delete/Erase a personality from the disk.
F6—Select this option if you want to:

Printout the personality to the printer, screen or file.

F7—Select this option if you want to:
Change the current extension.

This is the port setup window. The purpose of this window is to give the user the option of selecting the communications port to use for the programming of the control head. Here the user would enter the port for programming and then select the F1 key. Once the F1 key is selected, the setup file is updated to reflect the new selection.

Window Help

Communications Port Selection

This is the comm port window. The purpose of this window is to define/select the communications port you wish to use for radio programming purposes. After entering the correct port:
From this window your options are:
F1—Select this option if you want to:
Save the selection.
F2—Select this option if you want to:
Abort this procedure.

Comm Port

This is a numeric field used to identify the communications port to use for programming the control head.

Note: The validity test is only performed if F1 is selected.

Prompt

Enter the Comm Port ID.

Help

Comm Port ID: The purpose of this field is to identify the communications port to use for programming the control head. There are only two ports available for this purpose: COM1 and COM2. Enter a 1 here to select COM1 and a 2 to select COM2. This field will not accept a comm port ID of a port that does not exist.

Default

First time—1, afterwards the program remembers.

Validity

A valid entry will pass the following tests:
1. Must be either a 1 or a 2.
2. The comm port must exist or it will not be accepted.

Storage

The entry here is stored in the setup file.

FIG. 45 shows the change directory screen and is selected by pressing the F3 (Dir) key from the Utility screen. The purpose of this window is to provide the means by which the user can change directories without having to leave the program.

Once the user enters a path, they have the option of changing directories to the path entered by pressing F1 or aborting the operation by selecting F2 or F10.

Window Help

Change Directory

This is the change directory window. The purpose of this window is to solicit the name of the directory to which the change is to be made.
From this window your options are:
F1—Select this option if you want to:
Proceed with the change.
F2—Select this option if you want to:
Abort this procedure.

Directory

This is a alphanumeric field that is used to specify the new path. Once the user enters the port, they select F1 to perform the actual change. Selecting F2 will have the affect of cancelling the command.

Note: The validity test is only performed if F1 is selected.

Prompt

Enter desired directory.

Help

Change Directory: This field is used to specify the desired or target path for a change directory. This field will accept any valid DOS path identifier restricted only to 32 characters. This field will not accept the name of the path that does not exist.

Default

Current path

Validity

A valid entry for this field must pass the following conditions:
1. Must be a valid DOS path identifier
2. Path must actually exist.

If path does not exist, give message and the user the opportunity to create one.

Storage

None

FIG. 46 shows the delete personality window and is accessed by pressing the F5 (Delete) key from the Utility window. The purpose of this window is to give the user the ability to delete a personality without leaving the program. When this window is opened, the default file name is displayed in the file name field. the user selects F1 to delete or F2 to abort. Once the deletion is made, the current personality screen is updated to reflect the deletion.

Window Help

Delete Personality

This is the delete personality window. The purpose of this window is to solicit the name of the personality to delete from disk.

WARNING: This operation will permanently remove the file.
From this window your options are:
F1—Select this option if you want to:
Proceed with this operation.
F2—Select this option if you want to:
Abort this operation

File Name

This is an alphanumeric field used to indicate the name of the personality to delete. It will accept a file name up to eight characters in length.

Note: The validity test is only performed if F1 is selected.

Prompt

None

Help

Delete Personality: This field is used to identify the personality to delete. Enter the name of the personality to delete and press F1. Once F1 is selected, the personality is permanently deleted from the directory. If you do not wish to delete the personality, select F2.

Default

The highlighted file name.

Validity

A valid field entry will pass the following conditions:
1. The name is a valid DOS file name.
2. The file actually exists.

Storage

There is no storage for this field.

This is the print personality screen and represents a new print screen format for PC programming. The reason for the new format is to provide flexibility in print devices, more reliable error/device checking and a considerably easier user interface.

Upon entry, the cursor is located in the personality field. Once the name is selected, the cursor advances to the output field. This is a toggle field that lets the user toggle his/her print options. Whenever the field toggles, a portion of the window appears and/or disappears to display additional options appropriate only for the selected device. All possible configurations are discussed below.

If the user selects F1 to generate the printout, a final edit check should be performed to ensure that the following conditions are met:
1. If the print device is a printer, the printer is on-line.
2. If the print device is a file, that the file is not overwritten unless directed.

Window Help

Print Personality

This is the print personality window. The purpose of this window is to solicit the information required before performing the print operation. In this window, you should specify the personality to print and where the printout should go.

From this window your options are:
F1—Select this option if you want to:
Continue with this operation.
F2—Select this option if you want to:
Abort this operation.

Personality

This field is used to enter the name of the personality to print. This is an alpha numeric field that will accept up to eight characters.

Prompt

Enter the personality to print.

Help

Personality: This field is used to identify the personality to print. Please enter the personality name.

Default

The highlighted file name.

Validity

A valid field entry will pass the following conditions:
1. The name is a valid DOS file name.
2. The file actually exists.

Storage

There is no storage for this field.

Output To

This is a toggle field that is used to identify the device to receive the printout. There are three available selections: Printer, Screen and File. When printer is selected, the screen above is displayed and the user will have the option of choosing the print device. Once this data is entered, the hard copy printout can be generated. If the user selects Screen, the printout will be generated on the screen and the user can page/cursor through the data. Selecting file from the output to field will cause printout to be generated to a file for printout at a later time.

Prompt

Press TAB to toggle, F9 for help.

Help

Output To: This is a toggle field that is used to identify where the printed output should go. There are three available options: Printer, Screen and File. Using the TAB key, toggle this field until your selection is displayed and press F1 to generate the print. Choose Printer if you want the printed output to go to the printer. Select Screen if you want the output to go to the screen and File if you want the output generated in an ASCII file format.

Default

Printer

Validity

There are no validity checks for this field.

Storage

There is no storage for this field.

FIG. 37 illustrates the print window when the output to field has been toggled to Screen.

FIG. 48 illustrates the layout of the window when file is selected as the output device. Here the user is required to enter a file name for the printed output.

File

This field is used to enter the path/file name to which the output should be generated. Once the user has entered the destination file name and pressed F1, a message will indicate that the printout is being generated and return the user to this screen.

Prompt

Enter destination file name.

Help

Destination: This field is used to enter the destination file name for the printed output. Enter the complete path name and select F1 to generate the file.

Default

Blank/Empty field

Validity

A valid entry will pass the following conditional tests.

1. Name is a valid DOS name.
2. If the file exists, an overwrite prompt will ask for direction.

Storage

There is no storage for this field.

FIG. 49 illustrates the change extension window and is used to select the default extension. The extension selected here is displayed on the current personality screen and becomes the default whenever creating a new personality.

When the window is opened, the cursor will be located in the file name extension field. Here they would enter the new extension and press F1 to save the selection. The disk will be updated to reflect the new extension. The extension will be remembered by the program the next time it is initiated.

Window Help

Change Extension:
The purpose of this window is to solicit the characters for the new extension.
From this window your options are:
F1—Select this option if you want to:
  Continue with this operation.
F2—Select this option if you want to:
  Abort this operation

File Name Extension

This field is used to enter the new file extension to use as the default. This field will accept three alphanumeric characters as valid file extensions.

Prompt

None

Help

Extension: This field is used to enter the default file name extension. This extension will be displayed at the top of the current personality screen and is used as a "selector" in which personalities should be displayed on the screen. Once the extension has been entered, select F1 to perform the change or F2 to abort.

Default

Currently defined extension. First time - 825.

Validity

A valid entry will consist only of alphanumeric characters.

Storage

There is no storage for this field.

FIG. 50 illustrate above is the control head personality screen and is the main screen at the personality level. This screen gives a brief overview of the control head personality by identifying the frequency band split, programmed modes and various mode options. Up to eight modes can be displayed on the screen at a time out of a total of 64 modes. Access to modes 9 and above is gained through the use of the page down key. The user can continue "paging" through modes until mode 64 is reached or they reach the end of the defined modes. In other words, the user cannot page down past the last defined mode. Likewise, access to previous modes is accomplished through the page up key. The only limitation here is that the user cannot page up past mode 1.

The screen above is actually one half of a two part screen. All of the information required to be displayed for each mode would not fit on one screen, therefore the screen was split in two. The F4 key is used to toggle between the two halves of the screen. (Please refer to section 2.4.4 for the second half of the screen.) This screen illustrates the scan section of the modes. When F4 is depressed, the signalling portion of the mode data is displayed and the F4 key label changes to "Scan" to indicate that this screen is again accessed by the F4 key.

In the lower right hand corner of the screen is the Bytes Free field. This is a display field only and give the user an indication of the amount of available spaced left in the personality. As the personality fills, the number displayed here will decrease until the available space left dips below the minimum necessary. Although the control head will support up to 64 modes, it may not be possible for the user to define 64 nodes if the personality "runs out of space". This will be based on the combination of modes and channels.

Logical progression of the cursor is left to right, top to bottom. It is intended that the user enter the mode name, frequency set, signal etc. In the order in which it is displayed. However, the program will not restrict the user to enter the data in that fashion. The user has full control over the screen and a final edit check will be made when the user tries to "leave" the personality. This final edit check will ensure that the following conditions are met:
1. There must be at least one valid mode defined.
2. There are no blank or empty imbedded nodes.
(To be considered valid, a mode must contain a frequency set if GEstar is selected, it must have a valid GEstar ID.)

The user has the ability to insert and remove nodes through the use of the F2 (Insert) and F3(Remove) keys. The operation of these two keys are explained further in this text.

Window Help

Control Head Personality
This is the primary data entry screen when defining a personality. A personality consists of one or more MODES. A mode is a collection of channels in which the radio will operate and a set of options for the mode. These options consist of a signalling scheme, non-priority scan definition and a priority scan definition.

The screen you're in consists of one half of the mode definition. Once the information for this screen has been entered, the additional mode information can be accessed by selecting the F4 key. This key will toggle between the mode scan defaults and the modes signalling defaults.

The steps involved with defining a mode consists of the following:
1. Frequency set definition. You are required to create a frequency set to be used in the personality. This can be done by selecting the 'More' key and then the 'Freq' key.
2. A mode name is then entered in the name field. The name entered here will be displayed on the control head during operation.
3. Once the name has been entered, a frequency set needs to be 'assigned'. You can assign a frequency set to a mode by entering the name of the frequency set in the field to the right of the mode name.
4. The final step to mode creation is to set the various scan and signalling defaults.

To save the currently saved mode to disk, press the F10 key to go back to the currently personality screen. You will be prompted to save the file.
You're other options available from this screen are:
F1—Select this option if you want to:
Get a detail summary of the frequency set.
Move the cursor to the frequency set field you wish to detail.
When this key is pressed, the frequency set definition screen will appear identifying the set data.
F2—Select this option if you want to:
Insert a new mode. This key will cause all modes from the cursor to the end of the personality to shift down one.
F3—Select this option if you want to:
Remove a node.
Use this key to delete a mode by cursoring to the line of the mode you wish to delete and press this key. All modes following will be shifted up one place to fill in the space.
F4—Select this option if you want to:
Reveal the additional mode options.
F5—Select this option if you want to:
Program a control head with the currently displayed personality.
F7—Select this option if you want to:
Define the control head options.
F8—Select this option if you want to:
Create/edit frequency sets and define the personality text.

Mode

Working from left to right, the first field displayed is the mode field. The mode field identifies the numerical order of each mode in the control head. It is a display only field meaning the user cannot cursor to it. The value in the mode field is controlled through the use of the page up/down keys as discussed earlier.

Mode Name

This field is used to mnemonically identify the mode for display in the control head. The mode name field will accept up to 8 characters of ASCII data and will automatically capitalize the letters as they are typed.
Prompt
Enter mode name for display on the control head.
Help
Mode Name: This field is used for entering the mode name for a displayable reference on the control head during radio operation. This field will accept all alphanumeric characters (excluding lower case), spaces and the following special symbols: @[] /.−+<>*'&$%#"!?=;:
Default
Blank/Empty field. Empty names are stored as "MODE XX" where XX is the numerical mode identifier during the write operation.
Validity
This field will accept all alphanumeric characters (excluding lower case), spaces and the following special symbols: @[] /.−+<>*'&$%#"!?=;:
Storage
MASCII—One name per mode.
Note:
1. All characters must be used. (Unused filled with periods)
2. Special conversion routine as per PROM spec.
3. MASCII is an array of names.

Freq Set

The frequency set field is used to associate a predefined frequency set to a mode. When the user enters a frequency set name, a search is made of the personality to fine a "matching frequency set name". If a match is found then a logical association is made between the mode and the frequency set. If the set is not found, then a search is made of the pooled directory for a matching set.

If the user wants to replace the existing frequency set with a new frequency set, they simply replace the name with the name of a new set. If the replaced set is not used with any other mode then it is deleted from the personality.
Prompt
Enter the name of a predefined frequency set.
Help
Frequency Set: This field is used for entering the frequency set definition to be used with this mode. When the name is entered, a search is made through the personality and the frequency set pool for a match. Once a match is made, then an association has been created. To change frequency sets, just change names. This field will only accept valid DOS file names as acceptable entries.
Default
Blank/empty field.
Validity:
1. The name must be able to pass a DOS filename validity test.
2. It must match a predefined frequency set.
Storage
The frequency set name is not stored in the personality. Therefore, the read process must create set names. An example of a created set name is "SET_XX" where XX is the numerical reference of the set within the personality.
1. Channel count stored in modes.
2. Rx/Tx synthesizer data stored in channels

Signal

The signal field is used to identify the type of signalling associated with this mode. Because there are only three possible selections, this field will toggle between the following choices:
Disabl—Indicates signalling disabled
T90T99—Type 90/99 signalling
GEstar—Gestar signalling
Prompt
Press TAB to toggle, F9 for help.
Help
Signal: This field is used to indicate the type of signalling to be used with this mode. Through the use of the TAB key, the value within this field will toggle between the following: "Disabl", "T90T99", and "Gestar". "Disabl" indicates that all signalling should be disabled for this mode. "T90T99" indicates that a T90 or T99 signalling scheme is desired. Leaving "Gestar" in this field will indicate that a GEstar type signalling is desired.
Default
Disabled
Validity
If T90/T99 is selected, then a quick check of the frequency set should be made to ensure that the home channel has a T90 tone. If the home channel does not have a T90 tone, T90/T99 cannot selected.

Storage:
GEstar

P1-Prog

This is a toggle field that is used to indicate the type of priority one scan programming. The choices are:
Fixed—P1 channel is entered, not changeable from control head.
User—P1 channel is entered, changeable from control head.
Selchn—P1 channel is not entered.
Help
Priority 1 Programming: This is a toggle field used to select the type of priority 1 programming for this mode. Using the TAB key, the value in this field will toggle between "Fixed", "User", and "Selchn". "Fixed" indicates that the P1 channel will be entered during programming and cannot be modified through the ADD/DEL keys on the control head. "User" indicates that the P1 channel will be selected through the use of the ADD/DEL keys on the control head. Leaving "Selchn" in this field indicates that the P1 channel will always be the current channel.
Default
User
Validity
There is no validity check on the selection. However, if the user selects Selchn, the P1 field is skipped.
Storage
Scan table

P1

The P1 field is used to identify the priority one channel for a selected mode. It corresponds to a channel within the selected frequency set. Only numeric data is accepted.
Prompt
Enter the desired priority 1 channel.
Help
Priority 1 Channel: This field is used to enter the default/fixed P1 channel. If "Fixed" is selected as the type of P1 programming desired, the value entered here becomes the fixed P1 channel. If "User" is selected, then the channel entered here becomes the default P1 channel.
This field will not accept channels outside of the frequency set and the channel selected must have the Scn flag "On".
Default
Bland/Empty channel
Validity
1. It must be a channel from the selected frequency set.
2. The channel chosen must have Scan enabled.
Storage
Scan

P2-Prog

This is a toggle field that is used to indicate the type of priority two scan programming. The choices are:
Fixed—P2 channel is entered, not changeable from control head.
User—P2 channel is entered, changeable from control head.
Selchn—P2 channel is not entered.
Prompt
Press TAB to toggle, F9 for help.
Help:
Priority 2 Programming: This is a toggle field used to select the type of priority 2 programming for this mode. Using the TAB key, the value in this field will toggle between "Fixed", "User", and "Selchn". "Fixed" indicates that the P2 channel will be entered during programming and cannot be modified through the ADD/DEL keys on the control head. "User" indicates that the P2 channel will be selected through the use of the ADD/DEL keys on the control head. Leaving "Selchn" in this field indicates that the P2 channel will always be the current channel.
Default
User
Validity
There is no validity check on the selection. However, if the user selects Selchn, the P2 field is skipped.
Storage
Scan

P2

The P2 field is used to identify the priority two channel for a selected mode. It corresponds to a channel within the selected frequency set. Only numeric data is accepted.
Prompt
Enter the desired priority 2 channel.
Help
Priority 2 Channel: This field is used to enter the default/fixed P2 channel. If "Fixed" is selected as the type of P2 programming desired, the value entered here becomes the fixed P2 channel. If "User" is selected, then the channel entered here becomes the default P2 channel.
This field will not accept channels outside of the frequency set and the channel selected must have the Scn flag "On".
Default
Blank/Empty field
Validity
1. It must be a channel from the selected frequency set.
2. The channel chosen must have Scan enabled.
Storage
Scan

Non-Pri

Removed in version 1.0

W/CG

This is a toggle field used to indicate whether or not to scan channels with channel guard. There are only two possible selections for this field, Yes/No. Yes indicates that channels with channel guard can be included into the scan list.
Prompt
Press TAB to toggle, F9 for help.
Help
Scan With Channel Guard: This is a toggle field used to indicate whether or not to scan channels with channel guard. Using the TAB key, this field will toggle between "Yes" and "No". Selecting "No" will have the affect of removing channels with channel guard from the scan list.
Default
Yes
Validity
There are not validity checks for this field.
Storage Scan table The detail key is used to provide a detail description of the frequency set selected as shown in FIG. 5. It also provides the means by which the user can modify the frequency set associated with the mode. To access the details of a frequency set, the detail key should be pressed while the cursor is sitting in the freq set field. Once depressed, the screen illustrated above will appear.

The screen displays up to eight channel definitions at a time. Each channel definition includes a channel name, Rx and Tx frequency, Rx and Tx channel guard, Scan flag, CCT, STE Channel guard block and a set of tone signalling frequencies.

Operation of this screen is similar to the control head personality screen. Normal cursor progression is left to right, top to bottom. However, the user is not restricted to entering data in that manner. He/she may cursor freely about the screen, entering data in a fashion comfortable to them. A final screen edit check will perform the consistency checks when the user tries to save the data. The final edit check will ensure that the following conditions are met:

1. There is at least one channel definition in the set.
2. There is no embedded blank/empty channel definition.

(A valid channel definition requires at least an Rx frequency.)

As with the control head personality screen, the user can insert/remove channel definitions through the use of the F2 (Insert) and F3 (Remove) function keys. To insert a channel definition, the user would place the cursor on the line above which the insertion should go. They then press the F2 key. Everything from the current line to the end of the frequency set will be shifted one channel definition down; the current line becoming empty. The user can then proceed to enter the new channel definition.

Removing a channel definition is very similar to the insertion. They would cursor to the line of the channel definition they wish to delete and press the F3 key. The current channel definition would be deleted and all greater channels will be shifted up one definition to fill in the gap.

Channels nine and above can be accessed through the use of the page down key. Each time the page down key is depressed, the next eight channels will be displayed. The user can page down, providing the current page is filled, until channel 32 which is the limit of channels per mode. In a similar manner, the user can page up through the channel using the Page Up key until channel 1 is reached.

Window Help

Frequency Set Definition

This is the frequency set definition screen and is used to create/edit frequency sets. Basically, a frequency set is an association of channels all within the same band split that will be 'assigned' to a mode.

From this window your options are:
F2—Select this option if you want to:
Insert a channel definition.
Position the cursor to the respective line and press this key. The current channel and all following will be shifted down one position.
F3—Select this option if you want to:
Remove a channel definition.
Position the cursor to the line of the channel you wish to delete.
F5—Select this option if you want to:
Store the frequency set to disk.

Chn

This field is a display only field that is used to give the user an indication of which channel is being displayed. The value contained within this field is changeable only through the use of the Page Up and Page Down keys.

Name

The name field is used to enter an mnemonic channel identifier that will be displayed on the control head. The channel name can consist of any combination of alphanumeric characters up to eight characters in length. This is an upper case only field in which the character data typed is always converted to upper case automatically.
Prompt
Enter the displayable name for this channel.
Help
Channel Name: The channel is used to indicate the current channel setting of the control head. It can consist of any combination of alphanumeric characters up to 8 characters in length. Alphabetic characters are automatically converted to upper case upon entry.
Default
Blank field. On the writes, channel names are created for blank name fields.: The created name will look similar to this: CHN..XX where XX is the numeric presentation of the channel.
Validity
The validity check for this field is to ensure that the field only contains acceptable characters as identified in the specification.
Storage
CASCII
1. All characters must be used
2. Special conversion routine.

Tx Freq

This is a numeric field where the user identifies the transmit frequency of the channel. The frequency entered here is copied over to the Rx freq as a default for the VHF and UHF splits. When working with the 800 split, 45 Mhz is added to this value before copying to the Rx side.
Prompt
Enter the transmit frequency for this channel.
Help
Transmit Frequency: The transmit frequency entered here is used to indicate the frequency of which the radio should transmit while tuned to this channel. Frequencies only within the currently defined band split are acceptable as valid frequencies. VHF frequencies must be evenly divisible by either 5 Khz or 6.25 Khz. UHF frequencies must be evenly divisible by 5 Khz. 800 band frequencies must be evenly divisible by 12.5 Khz.
Default
Empty/Blank Field.
Validity
1. Must be within the current band split.
2. If the Cntrl E key is pressed, must be within 10 Mhz outside split.
3. If VHF—Must be evenly divisible by 5 or 6.25.
4. If UHF—Must be evenly divisible by 5.

5. If 800—Must be evenly divisible by 12.5. Must be between 805-824 or 851-870.
Storage
Channels

Rx Freq

This is a numeric field where the user identifies the receive frequency of the channel. This field must be entered in order to have a valid channel definition.
Prompt
Enter the receive frequency for this channel.
Help
Receive Frequency: The receive frequency entered here is used to indicate the frequency of which the radio should receive while tuned to this channel. Frequencies only within the currently defined band split are acceptable as valid frequencies. VHF frequencies must be evenly divisible by either .5 Khz or 6.25 Khz. UHF frequencies must be evenly divisible by 5 Khz. 800 band frequencies must be evenly divisible by 12.5 Khz.
Default
In the VHF and UHF band splits, the default for this field is the value contained in the corresponding Tx frequency. For 800 band split, the default for this field is the corresponding Tx frequency+45 Mhz.
Validity
1. Must be within the current band split.
2. If the Cntrl E key is pressed, must be within 10 Mhz outside split.
3. If VHF—Must be evenly divisible by 5 or 6.25.
4. If UHF—Must be evenly divisible by 5.
5. If 800—Must be evenly divisible by 12.5 Must be between 815-870.
Storage:
Channels

Tx CG

This is a alphanumeric field used to enter the transmit channel guard for this channel. This field accepts digital and tone channel guard codes. Tone channel guards are identified by the placement of a decimal point within the field.
023—Digital Channel Guard
67.0—Tone Channel Guard
When the transmit channel guard is entered, it is automatically copied to the receive channel guard providing it has not yet been defined. This means that once the channel has been defined, the transmit channel guard will not be copied to the receive side regardless of whether or not the field is empty.
There are no known split inversions for channel guards in this control head so none will be performed.
Prompt
Enter the desired tx channel guard mode for this channel.
Help
Transmit Channel Guard: There are two types of channel guard decoding available for this control head: digital and tone. Tone channel guard decoding is identified by the placement of decimal point within the field. For example: 67.0 identifies a tone channel guard of 67 Hz. Valid tone channel guards lay in the range of 67.0 to 210.7 Hz. Digital channel guard decoding is identified by the lack of a decimal point. An example of digital channel guard codes are 023, 047,315 etc. Valid digital channel guard codes can be found in Appendix 1 of the S825 Control Head programming user guild.
Default
There are no defaults for this field.
Validity
The validity check for this field are as follows:
1. If tone channel guard—range is 67.0 to 210.7
2. If digital channel guard—must be included in chngrd.h table.
Storage
TDIV and channel data (always)

Rx CG

This is a alphanumeric field used to enter the receive channel guard for this channel. This field accepts digital and tone channel guard codes. Tone channel guards are identified by the placement of a decimal point within the field. Digital channel guard are identified by the lack of a decimal point. For example:
023—Digital Channel Guard
67.0—Tone Channel Guard
When the transmit channel guard is entered, it is automatically copied to the receive channel guard providing it has not yet been defined. This means that once the channel has been defined, the transmit channel guard will not be copied to the receive side regardless of whether or not the field is empty.
There are no known split inversion for channel guards in this control head so none will be performed.
Prompt
Enter the desired rx channel guard code for this channel.
Help
Receive Channel Guard: There are two types of channel guard decoding available for this control head: digital and tone. Tone channel guard decoding is identified by the placement of decimal point within the field. For example: 67.0 identifies a tone channel guard of 67 Hz. Valid tone channel guards lay in the range of 67.0 to 210.7 Hz. Digital channel guard decoding is identified by the lack of the decimal point. An example of digital channel guard codes are 023, 047, 315 etc. Valid digital guard codes can be found in Appendix 1 of the S825 Control Head programming user guild.
Default
The default for this field is the tx channel guard code—only on the first time the channel is defined.
Validity
The validity check for this field are as follows:
1. If tone channel guard—range is 67.0 to 210.7
2. If digital channel guard—must be included in chngrd.h table.
Storage
If Rx CG decode is enabled:
Digitals always stored in channels and RDIV is set to zero.
Tones always stored in RDIV using * 10 storage and channel Rx cg data is blanked.
Digitals always stored in channels RDIV is set to zero.
Tones always stored in both using PHOENIX III format.

Scn

This is a toggle field that is used to indicate whether or not the channels is to be included into the default/fixed scan list. If Non-priority scan is fixed for this mode, than selecting "Yes" for this field will place the channel in the fixed scan list. Otherwise, the channel is defaulted to inclusion into the scan list. A channel cannot be selected for priority scan without having Scn set to "Yes".

Prompt

Press TAB to toggle, F9 for help.

Help

Scan: This field is used to indicate whether or not this field is to be included into the default/fixed scan list. This field can be changed by toggling the TAB key. A "Yes" value indicates that this channel is included in the default/fixed scan list. Note: In order to define a channel for priority scan, it must be enabled for scan; a "Yes" value.

Defaut

No

Validity

There is no validity check for this field.

Storage

Scan

Cct

This is a toggle field that is used to indicate whether or not the carrier control timer is enabled for this channel. There are two available options: "On" and "Off". Off indicates that there will be no carrier control timer.

Prompt

Press TAB to toggle, F9 for help.

Help

Carrier Control Timer: This field is used to indicated whether or not the carrier control timer should be enabled for this channel. Using the TAB key, the value in this field will toggle between "On" and "Off". Selecting "On" will have the affect of enabling the carrier control time for this channel. The timeout period can be defined in the control head options screen.

Default

On

Validity

There is not validity test for this field.

Storage

If "On" then use the CCT value from the control head options screen for programming the channel data.

Ste

This is a toggle field that is used to indicate whether or not squelch tail elimination is to be enabled for this channel. It toggles between "On" and "Off" with the "On" value indicating that Ste is enabled. Normally, access to this field is denied unless a digital or inverted rx channel guard is entered.

Prompt

Press TAB to toggle, F9 for help.

Help

Squelch Tail Elimination: This field is used to indicate whether or not squelch tail elimination is to be enabled on this channel. By pressing the TAB key, the value within the field will toggle between "On" and "Off". An "On" value indicates that squelch tail elimination has been enabled. STE is set to On for digital channel guard channels.

Default

The default for this channel depends on the Rx channel guard decode. If the Rx CG is a tone channel guard, then this field is defaulted to "On" and the user is given access to this channel. If the Rx CG is digital, this field will default to "On" and the user is denied access to this field. If the Rx CG field is empty, this field defaults to "Off" and the user is denied access.

Validity

There are not validity checks for this field.

Storage

Channel

CGO

This is a toggle field that is used to indicate whether or not the channel guard override function is available for this channel. There are two available options: "Yes"0 and "No". Yes indicates that the operator may override the channel guards for this channel using the channel guards in the channel guard table.

Prompt

Press TAB to toggle, F9 for help.

Help

Channel Guard Division: This is a toggle field that is used to indicate whether or not the operator can override the channel guards for this channel using the channel guards stored in the channel guard table. Using the TAB key, the value in this field toggles between "Yes" and "No". Yes indicates that the operator can override the channel guards on this channel.

Default

On

Validity

There is not validity test for this field.

Storage

DIVCHG

Tone1

This is a numeric field that is used to enter the T90 tone (single tone signalling) or the first tone of the T99 (dual tone signalling).

Prompt

Enter T90/T99 tone. Range 250 Hz to 3000 Hz.

Help

T90/T99 Tone1: This field is used to enter the T90 (single tone signalling) tone or the first tone of the T99 (dual tone signalling). Valid tone values lay in the range of 250 Hz to 3000 Hz.

Default

Blank/Empty field.

Validity

Valid data for this field is an entry between 250 and 3000.

Storage

T90/T99

Tone2

This is a numeric field that is used for entering the second tone for a T99 tone signalling.

Prompt

Enter the second tone of the T99 signalling sequence.

Help

T99 Tone2: This field is used for entering the second tone of the T99 tone signalling sequence. This field will only accept a value of 250 Hz to 3000 Hz.

Default

Blank/empty field. Write a zero to the personality.

Validity

A valid entry is between 250 and 3000. This field will not accept data if the first tone field is empty.

Storage

T90/T99

Insert

The F2 key on the control head personality screen is used for inserting modes within the list. To insert a mode, the user will position the cursor on the line where the new mode should be inserted and press the F2 key. At that time, every mode from the current line and below will be shifted down one slot. The current line will clear allowing the user to enter a new mode definition.

Note: in order to insert, the current mode must contain a valid frequency set.

Remove

The F3 key has been selected as the remove key. The purpose of this key is to remove a mode. To use the remove function, the user would position the cursor on the line/mode they wish to remove and press F3. The current mode will disappear with all following modes shifting up one mode position to fill in the space.

The signal key is used to display the second half of the mode definition screen. The reason the key is labeled "Signal" is because this portion of the screen deals primarily with the mode signalling as is shown in FIG. 52. Once this screen has been selected, the F4 key changes labels to "Scan" to indicate pressing F4 will return the user to the screen they just came from. In other words, the F4 key is used to toggle between the two portions of the mode definition screen. When this key is toggled, the name, frequency set and signal fields do not change. They still contain the previous values. All other function keys on the screen operate the same as with the "Scan" portion of the mode definition.

Note: Whenever the F4 (signal/scan) key is pressed, the cursor may leave its current field and land in the signal field.

Window Help

Control Head Personality

This is the primary data entry screen when defining a personality. A personality consists of one or more MODES. A mode is a collection of channels in which the radio will operate and a set of options for the mode. These options consist of a signalling scheme, non-priority scan definition and a priority scan definition.

The screen you're in consists of one half of the mode definition. Once the information for this screen has been entered, the additional mode information can be accessed by selecting the F4 key. This key will toggle between the mode scan defaults and the modes signalling defaults.

The steps involved with defining a mode consists of the following:

1. Frequency set definition. You are required to create a frequency set to be used in the personality. This can be done by selecting the 'More' key and then the 'Freq' key.

2. A mode name is then entered in the name field. The name entered here will be displayed on the control head during operation.

3. Once the name has been entered, a frequency set needs to be 'assigned'. You can assign a frequency set to a mode by entering the name of the frequency set in the field to the right of the mode name.

4. The final step to mode creation is to set the various scan and signalling defaults.

To save the currently save mode to disk, press the F10 key to go back to the current personality screen. You will be prompted to save the file.

You're other options available from this screen are:

F1—Select this option if you want to:
Get a detail summary of the frequency set.
Move the cursor to the frequency set field your wish to detail.
When this key is pressed, the frequency set definition screen will appear identifying the set data.

F2—Select this option if you want to:
Insert a new mode. This key will cause all modes from the cursor to the end of the personality to shift down one.

F3—Select this option if you want to:
Remove a mode.
Use this key to delete a mode by cursoring to the line of the mode you wish to delete and press this key. All modes following will be shifted up on place to fill in the space.

F4—Select this option if you want to:
Reveal the additional mode options.

F5—Select this option if you want to:
Store the currently displayed personality in the radio.

F7—Select this option if you want to:
Define the control head options.

F8—Select this option if you want to:
Create/edit frequency sets and define the personality text.

Home

This is a numeric field that is used to identify the channel to use as the home channel for this mode. The requirement for this field is that the channel specified here is actually defined in the mode definition and that the channel contains a Rx frequency.

Prompt

Enter the channel to use as the home channel.

Help

Home Channel: This field is used to identify the channel within the frequency set to use as a home channel. The control head will go to the home channel immediately upon depression of the home key. When a channel is entered in this field, a search will be made of the frequency set to ensure that it is a valid channel and has a TX frequency.

Default

Blank/Empty

Validity

It must be a valid channel in the frequency set.

It must have a TX frequency.

Storage

GEstar

Hang

Removed in version 1.0

Initiate

This is a toggle field that is used to indicate how the emergency/id mode operation of the control head is entered. Three selections are possible:

HKSW—(Hookswitch—Emergency/id declared when mike mates with hook)

PTT—(Push to talk—Emergency/id declared when PTT is depressed)

SWITCH—(Switch—Emergency/id declared by switch on control head)

Note: This field does not appear if signalling is disabled for this mode.

Prompt

Press TAB to toggle, F9 for help.

Help

Initiate Emergency/Id: This is a toggle field the is used to indicate the way the emergency/id mode of the radio is entered. By using the TAB key, the value of this field will toggle between "HKSW", "PTT" and "Switch". "HKSW" indicates that initiating emergency/id will occur when the mike mates with the hook. "PTT" indicates initiating emergency/id upon Press-To_Talk. "Switch" initiates emergency/id when the emergency button on the control head is depressed.
Default
Switch
Validity
There is no validity check on this field.
Storage
Gestar

Pttopt

This is a toggle field that is used to indicate the PTT options of the indicate emergency operation. This field toggles between "ALL" and "HKSW". "All" indicates that emergency mode is activated every time the mike is keyed. "HKSW" indicates that emergency operation is activated only when the mike is keyed while it is mated with the mike-hook.

Note: This field does not appear if signalling is disabled for this mode and is only active if the value of the Initiate field is "PTT".
Prompt
Press TAB to toggle, F9 for help.
Help
Push-To-Talk Options: This is a toggle field that is used to indicate the desired mode of initiating emergency operation from the PTT. Using the TAB key, the value in this field will toggle between "All" and "Hksw". Selecting "All" will have the affect of initiating emergency operation every time PTT is keyed. Leaving "Hksw" in this field will indicate that emergency operation is only invoked when the PTT is keyed while the mike is mated with the hook-switch.
Default
Hksw
Validity
There are no validity tests for this field.
Storage
Gestar

Emerg

This is a toggle field that is used to indicate whether or not the user can put the control head in the emergency mode of operation. There are two possible selections for this field: "Yes" and "No". "Yes" indicates that emergency operation is available to the user.

Note: This field does not appear if signalling is disabled for this mode.
Prompt
Press TAB to toggle, F9 for help.
Help
Emergency Operation: This is a toggle field that is used to indicate whether or not the user can put the control head in the emergency mode of operation. There are two possible selections for this field: "Yes" and "No". "Yes" indicates that emergency operation is available to the user.
Default
Yes
Validity
There are no validity checks for this field.
Storage
Gestar

GEstar

This is a numeric field is used for entering the GE star ID.

Note: This field will only appear if GEstar is selected in the Signal field.
Prompt
Enter the GEstar ID. Valid ID(s) range from 1 to 16383.
Help
GEstar ID: This field is used for entering the GEstar ID. The number entered here will be transmitted if "Gestar" was selected in the Signal field. This field will only accept values in the range of 1 to 16383.
Default
Blank/Empty field.
Validity
The validity check for this field is to ensure that the ID entered here falls in the range of 1 to 16383.
Storage
Gestar The program radio window is shown in FIG. 53. The purpose of this window is to confirm that the user does in fact want to perform this operation. The user is prompted to press the F1 key to download the personality to the radio or F2 to abort this operation.

Window Help

Program Radio
From this window your options are:
F1—Select this option if you want to:
 Program the radio
F2—Select this option if you want to:
 Abort this operation.

FIG. 54 shows the control head options window. It is accessed by pressing the F7 (Options) key from the Control Head Personality screen. From this screen, all radio options can be defined.

Operation of this screen is similar in nature to all other windows. Normal cursor movement is from left to right, top to bottom. The only field that appears and disappears is the Keypad Sel. This field appears when the Unit Type field is "Deluxe" and disappears if the Unit Type is "Basic".

Window Help

Control Head Options
This window is used to define some of the operational parameters of the control head.
From this window your options are:
F1—Select this option if you want to:
 Define the siren/light combinations.
F2—Select this option if you want to:
 Define the channel guard table.
F3—Select this option if you want to:
 Define the function key control.
F4—Select this option if you want to:
 Define the emergency signalling parameters.
F5—Select this option if you want to:
 Define some operational characteristic of the radio.
F6—Select this option if you want to:
 Define the keyboard definitions.

Unit Type

This is a toggle field that is used to indicate the control unit type. There are two possible selections for this field: "Deluxe" and "Basic". A Deluxe control head has additional features over the Basic including keypad support.

Prompt

Press TAB to toggle, F9 for help.

Help

Unit Type: This field is used to indicate the type of control head that will be the target for this personality. Using the TAB key, this field will toggle between "Deluxe" and "Basic". The deluxe control head will provide further keypad support.

Default

Whatever is selected from the setup window.

Validity

There are no validity checks for this field.

Storage

General options B

Keypad Sel

This is a toggle field that is used to indicate whether or not the keypad is enabled on the deluxe control head. There are two possible selections: "Ena" and "Dis". "Ena" is selected to enable the keypad.

Note: This field will only appear if the Unit Type is "Deluxe".

Prompt

Press TAB to toggle, F9 for help.

Help

Keypad Select: This is a toggle field used to enable or disable the keypad on the deluxe model of the control head. Disabling the keypad will have the affect of preventing the user from selecting some of the keypad functions. Using the TAB key, this field will toggle between "Ena" (Enabled) and "Dis" (Disabled).

Default

Ena

Validity

There are not validity checks for this field.

Storage

General Options B

Alert Tone

This is a toggle field that is used to indicate whether or not alert tones should be enabled on the control head. There are three possible selections for this field: "None", "Ramp", and "All". "None" is used to indicate alert tones are disabled on the control head. "Ramp" is used to indicate alert tones will be generated whenever the ramp keys are depressed. "All" is selected to indicate alert tones will be generated whenever any of the keys on the control head are depressed.

Prompt

Press TAB to toggle, F9 for help.

Help

This is a toggle field that is used to indicate whether or not the control head should generate an audible feedback on key depression. Using the TAB key, this field will toggle between three possible selections: "None", "Ramp", and "All". "None" is used to indicate alert tones are disabled on the control head. "Ramp" is used to indicate alert tones will be generated whenever the ramp keys are depressed. "All" is selected to indicate alert tones will be generated whenever any of the keys on the control head are depressed.

Default

All

Validity

There are no validity checks for this field.

Storage

General

Off Hook

This is a toggle field that is used to indicate whether or not the control head scans with the mike off hook. There are two possible selections for this field: "Scan" and "NoScn". "Scan" is selected to indicate that the control head should perform the scanning functions with the mike off-hook. "NoScn" will have the affect of disabling scan when the mike is lifted.

Prompt

Press TAB to toggle, F9 for help.

Help

Off Hook Scan: This is a toggle field that is used to indicate whether or not the control head scans with the mike off hook. There are two possible selections for this field: "Scan" and "NoScn". "Scan" is selected to indicate that the control head should perform the scanning functions with the mike off-hook. "NoScn" will have the affect of disabling scan when the mike is lifted.

Default

No Scan

Validity

There are no validity checks for this field.

Storage

General options B

B-Lite Dis

This is a toggle field that is used to indicate whether or not to enable the backlighting of the LCD display. This field toggles between "On" and "Off".

Note: Toggling this field will also have the affect of toggling the B-Lite Sav field On and Off.

Prompt

Press TAB to toggle, F9 for help.

Help

Backlight Display: This is a toggle field that is used to indicate whether or not back-lighting of the LCD display is desired. Using the TAB key, the values in this field will toggle between "On" and "Off". Selecting "Off" will have the affect of disabling the backlight on the control head's LCD display and LED indicators.

Default

On

Validity

There are no validity tests for this field.

Storage

General options A

B-Lite Sav

This is a toggle field that is used to indicate whether or not the control head should have the backlight level when power is removed. There are two possible selections for this field "Yes" and "No".

Note: This field will only appear if the Backlight option is enabled.

Prompt

Press TAB to toggle, F9 for help.

Help

Backlight Save: This is a toggle field that is used to indicate whether or not the control head should remember the state/level of backlighting when power is removed. Selecting "No" here will cause the control head to display the default backlighting level whenever power is removed and reapplied.

Default

Yes

Validity

There are no validity test for this field.
Storage
General options A

Rx CG Dec

This is a toggle field that is used to indicate whether or not the control head should decode the receive channel guard or the radio. The two possible selections are "S825" and "Radio". Selecting S825 will cause the write routine to convert the Rx channel guards into the S825 format and stored them in the RDIV section of the prom. Selecting "Radio" will indicate that the writes should use the Rangr/Delta Rx channel guard calculation and store the values in with the channel data area of the prom.
Prompt
Press TAB to toggle, F9 for help.
Help
Rx Channel Guard Decode: This is a toggle field that is used to indicate whether or not the control head should decode the received channel guards. Using the TAB key, the value in this field will toggle between "S825" and "Radio". Selecting "S825" will have the affect of causing the control head to decode received channel guards.
Default
Radio
Validity
There are no validity test for this field.
Storage
General

Min Volume

This is a toggle field that is used to set the minimum volume level for the control head. The two possible selections are: "Set" and "Off". "Set" is used to indicate that volume cannot be ramped so low that it is off. "Off" on the other hand, will have the affect of allowing the user to ramp the volume to its off position.
Prompt
Press TAB to toggle, F9 for help.
Help
Minimum Volume: This is a toggle field that is used to set the minimum volume level for the control head. The two possible selections are: "Set" and "Off". "Set" is used to indicate that volume cannot be ramped below 1. "Off" on the other hand, will have the affect of allowing the user to ramp the volume to its off position.
Default
Off
Validity
There are no validity tests for this field.
Storage
General options A

DS Timeout

This is a numeric field that is used to set the number of sections before the display(s) times out in one second intervals.
Prompt
Enter the display timeout. Range is 1 to 5 secs.
Help
Display Timeout: This field is used to set the mode/volume display timeout value. This field will only accept values within the range of 1 to 5 seconds. Entering a value here will cause the non default displays to remain active for the time period specified.
Default
3
Validity
To ensure that the value entered is between 1 and 5.
Storage
General Options A

Delete Ky

This is a toggle field that is used to indicate how the control head should handle channel deletions from the scan list. The two possible selections are: "Temp" and "Store". "Temp" is used to instruct the control head that channel deletions from the scan list should only be of a temporary nature. "Store" indicates that the channel deletion is of a permanent nature. On a temporary deletion, the channel is restored when power is recycled or the mode is changed.
Prompt
Press TAB to toggle, F9 for help.
Help
Delete Key: This is a toggle field that is used to indicate how the control head should handle channel deletions from the scan list. The two possible selections are: "Temp" and "Store". "Temp" is used to instruct the control head that channel deletions from the scan list should only be of a temporary nature. "Store" indicates that the channel deletion is of a permanent nature. On a temporary deletion, the channel is restored when power is recycled or the mode is changed.
Default
Store
Validity
There are no validity tests for this field.
Storage
General Options B

Wrap Ramps

This is a toggle field that is used to indicate whether or not the ramp keys on the control head should stop when the end is reached, or wrap around to the beginning. There are two possible selections: "Yes" and "No". "Yes" will cause the control head to wrap around on the ramping function.
Prompt
Press TAB to toggle, F9 for help.
Help
Wrap Ramps: This is a toggle field that instructs the control head to wrap around on the ramping functions. Using the TAB key, the value in this field will toggle between "Yes" and "No". "Yes" will enable the wrap function on the ramp keys.
Default
Yes
Validity
There are no validity test for this field.
Storage
General Options B

DS Test Md

This is a toggle field that is used to indicate whether or not the control head should permit the user to perform a display/keypad test operation. The two possible selections are "Ena" and "Dis". "Ena" will have the affect of allowing the user to perform a test of the LEDs, LCD and keypad.
Prompt
Press TAB to toggle, F9 for help.
Help Display Test Mode: This is a toggle field that is used to indicate whether or not the control head should permit the user to perform a display/keypad test operation. The two possible selections are "Ena" and "Dis". "Ena" will have the affect of allowing the user to perform a test of the LEDs, LCD and keypad.
Default
Dis
Validity
There are no validity tests for this field.
Storage
General Options B

2.4.6.13 Pwr Delay

This is a toggle field that is used to indicate whether or not the user has to hold the power off button for one second in order to remove power from the control head. This purpose for this is to prevent accidental power removal. The two possible selections are: "1 Sec" and "None". "1 Sec" is used to indicate that the user will have to hold the power off key for one second in order to remove from the control head.
Prompt
Press TAB to toggle, F9 for help.
Help
Power Off Delay: This is a toggle field that is used to indicate whether or not the user has to hold the power off button for one second in order to remove power from the control head. This purpose for this is to prevent accidental power removal. The two possible selections are: "1 Sec" and "None". "1 Sec" is used to indicate that the user will have to hold the power off key for one second in order to remove power from the control head.
Default
None
Validity
There are no validity tests for this field.
Storage
General

Scan Hang

This is a toggle field that is used to indicate whether or not a hang time before scan resume applies to this channel. The two options are: "On" and "Off". On indicates that a hang time will be applied before resuming scan after a transmission.
Prompt
Press TAB to toggle, F9 for help.
Help
Hang Time: This is a toggle field that is used to indicate whether or not a hang time should be applied before resuming scan after a transmit. Using the TAB key, the value in this field will toggle between "On" and "Off". Off indicates that scan will resume immediately after release of the PTT.
Default
On
Validity
There are no validity checks for this field.
Storage
Scan

CCT

This is a numeric field that is used to specify the carrier control timer delay. This field will only accept a 1 or 2.
Prompt
Enter in minutes. Range 1 or 2.
Help
CCT: This field is used to indicate the amount of time before the carrier control timer (if activated) drops the transmission. A valid entry will be in the range of 1 to 2.
Default
1
Validity
VHF and UHF will be in the range of 1 and 3
Storage
Channel—(On per channel basis if channel's CCT is On.)

FIG. 55 shows the Siren/Lights windows. It is invoked by selecting the F1 (Siren) key from the control head options screen. The purpose of this window is to give the user the ability to define siren and light combinations associated with the Wail, Yelp and SL keys.

Window Help

Siren/Lights
The purpose of this window for definition of specific siren and light combinations. Once these combinations have been defined, they can then be assigned to the various programmable keys on the control head.

Each row in the window is setup for defining a key. For example: The first row is labeled 'Wail'. This means the everything on that row applies to the 'Wail' definition. In a like manner, the same applies for 'Yelp' and all of the 'S/L'

There are twelve possible entries for a Siren/Light combination. Starting from the left is the 'S' (Siren) column. Here you should enter the Siren number (1-5) you wish generated for the 'Wail' definition.

There are nine light columns that are used to indicate which light(s) are to be activated with this siren. Chose the corresponding light by enabling the field.

The Can (Cancel) field is used to indicate whether or not selection of this siren/light combination will cancel or sum the currently active combination.

The Mom (Momentary) field is used to indicate whether or not this combination is active only while the key is depressed.

Srn

This is a numeric field that is used to identify which siren to use with this key. There are six possible choices for this field. They are:
0. No siren—Light only
1. Wail
2. Yelp
3. Manual
4. Hilo
5. Air Horn To select one of the six choices, the user would enter a number between 0 and 5 corresponding to the siren desired.
Prompt
Enter desired siren. Range 0 to 5.
Help
Siren: This field is used to identify the siren that is to be produced when this key is depressed. The possible choices are: 0—No siren, 1—Wail, 2—Yelp, 3—Manual, 4—Hilo, and 5—Air Horn.
Default
Wail—1
Yelp—2
All others—0

Validity
A valid entry would be within the range of 0 and 5.
Storage
Keypad

Act

Removed in version 1.0

These are toggle fields that are used to indicate which light(s) are to be activated upon activation of this key. There are two possible selections: '*' and ' '. The '*' is selected to indicate that the light is to be enabled upon activation of the key.
Prompt
Press TAB to toggle, F9 for help.
Help
Lights 1-9: This is a toggle field that is used to indicate whether or not this light is to be enabled upon activation of this key. Using the TAB key, this field will toggle between a '*' and a ' '. Selecting the '*' has the affect of activating or enabling this light.
Default
Blank
Validity
There are no validity test for this field.
Storage

Can

This is a toggle field that is used to indicate whether or not this siren/light combination cancels the previously activated siren/light combination. The two possible options are: "Yes" and "No". Yes indicates that this siren light combination when activated will cancel (suppress) the existing combination.
Prompt
Press TAB to toggle, F9 for help.
Help
Cancel: This is a toggle field that is used to indicate whether or not activation of this siren/light combination will cancel (suppress) any currently active combination. Using the TAB key, the value in this field will toggle between a "Yes" and "No". A Yes indicates that this combination will suppress any currently active siren. A No indicates it will sum (include) any active S/L combination.
Default
No
Validity
There are no validity tests for this field.
Storage
Keypad definitions

Mom

This is a toggle field that is used to indicate whether or not activation of this siren/light combination is momentary or not. The two possible selections are: "Yes" and "No". Yes indicates that this S/L is active only while the key is depressed.
Prompt
Press TAB to toggle, F9 for help.
Help
Momentary: This is a toggle field that is used to specify the nature of this siren/light combination. Using the TAB key, the value in this field will toggle between "Yes" and "No". A Yes selection indicates that this combination is only active while the key is depressed and will cancel once the key is released.
Default
No Validity
There are no validity test for this field.
Storage
Keypad definitions The Channel Guard Table window, as illustrated in FIG. 56, is implemented to give the user the ability to define up to 14 channel guard. These channel guards can then override the existing channel guard during operation of the control head. This is effect will give each channel the ability to select a channel guard out of a possible 16.

Normal cursor progression is left to right, top to bottom. When the screen is refreshed, the cursor will be placed in the ID field. Here the user enters a 3 character mnemonic for the channel guard and advances to the next field. Here they enter the Tx channel guard. During the creation of a channel guard table, once the tx channel guard is entered it will automatically be copied over to the rx side.

The Ste field will operate in a manner similar to the channel definition. If the Rx channel guard is a tone channel guard, the Ste will default to 'Y' and the user will not be allowed to change it. If a digital channel guard is entered, the Ste field is defaulted to 'Y' and the user will be permitted to modify the field. If no Rs channel guard is entered, the field will not be accessible.

Window Help

This window is used to define the 14 channel guard for the control head. Once defined, these channel guards can be used to override the existing channel guard for a specific channel.

The screen operates left to right, top to bottom, beginning with division 1. There are three components for each channel guard definition: an ID, a Tx channel guard and an Rx channel guard. The ID is a three character alphanumeric that will be displayed on the control head to reference this channel guard. The Tx and Rx channel guards may be digital or tone channel guards.

Dv

This is a display only field used to indicate which of the fourteen divisions the user is modifying.

ID

This is an alphanumeric field used to enter the 3 character mnemonic for the channel guard. It will accept any alphanumeric character (lower case excluded) and the following special symbols: @[]  /.−+<>*'&$%#"!?=;:

Note: This field will convert to upper case all lower case characters.
Prompt
Enter the name of this channel guard.
Help
ID: This field is used to enter the name of this channel guard. The name entered here is used to reference this channel guard during operation of the control head. This field will accept any alphanumeric character (excluding lower case), spaces and the following special symbols: @[]  /.−+<>*'&$%#"!?=;:
Default
Blank/Empty field
Validity
A valid entry will only contain the characters described above.
Storage
RDIVASCII

CG

This is a alphanumeric field used to enter the transmit channel guard for this channel. This field accepts digital and tone channel guard codes. Tone channel guards are identified by the placement of a decimal point within the field. Digital channel guard are identified by the lack of a decimal point. For example:

023—Digital Channel Guard
67.0—Tone Channel Guard

When the transmit channel guard is entered, it is automatically copied to the receive channel guard providing it has not yet been defined. This means that once the channel has been defined, the transmit channel guard will not be copied to the receive side regardless of whether or not the field is empty.

Prompt
Enter the desired tx channel guard code.
Help
Transmit Channel Guard: There are two types of channel guard encoding available for this control head: digital and tone. Tone channel guard encoding is identified by the placement of decimal point within the field. For example: 67.0 identifies a tone channel guard of 67 Hz. Valid tone channel guards lay in the range of 67.0 to 210.7 Hz. Digital channel guards decoding is identified by the lack of a decimal point. An example of digital channel guard codes are 023, 047, 315 etc. Valid digital channel guard codes can be found in Appendix 1 of the S825 Control Head programming user guild.

Default
There are no defaults for this field.
Validity
A valid check for this field are as follows:
1. If tone channel guard—range is 67.0 to 210.7
2. If digital channel guard—must be included in chngrd.h table.
Storage

Rx CG

This is a alphanumeric field used to enter the receive channel guard for this channel. This field accepts digital and tone channel guard codes. Tone channel guards are identified by the placement of a decimal point within the field. Digital channel guard are identified by the lack of a decimal point. For example:

023—Digital Channel Guard
67.0—Tone Channel Guard

When the transmit channel guard is entered, it is automatically copied to the receive channel guard providing it has not yet been defined. This means that once the channel has been defined, the transmit channel guard will not be copied to the receive side regardless of whether or not the field is empty.

Prompt
Enter the desired rx channel guard code.
Help
Receive Channel Guard: There are two types of channel guard encoding available for this control head: digital and tone. Tone channel guard encoding is identified by the placement of decimal point within the field. For example: 67.0 identifies a tone channel guard of 67 Hz. Valid tone channel guards lay in the range of 67.0 to 210.7 Hz. Digital channel guards decoding is identified by the lack of a decimal point. An example of digital channel guard codes are 023, 047, 315 etc. Valid digital channel guard codes can be found in Appendix 1 of the S825 Control Head programming user guild.

Default
The default for this field is the tx channel guard code.
Validity
A valid check for this field are as follows:
1. If tone channel guard—range is 67.0 to 210.7
2. If digital channel guard—must be included in chngrd.h table.

Ste

This is a toggle field that is used to indicate whether or not squelch tail elimination is to be enabled. It toggles between 'Y' and 'N' with the 'Y' value indicating that Ste is enabled. Normally, access to this field is denied unless a digital or inverted rx channel guard is entered.

Prompt
Press TAB to toggle, F9 for help.
Help
Squelch Tail Elimination: This field is used to indicate whether or not squelch tail elimination is to be enabled on this division. By pressing the TAB key, the value within the field will toggle between 'Y' and 'N'. A 'Y' value indicates that squelch tail elimination has been enabled.

NOTE: Squelch tail elimination must be enabled for digital channel guards.

Default
The default for this field depends on the Rx channel guard decode. If the Rx CG is a tone channel guard, then this field is defaulted to 'Y' and the user is granted access to this field. If the Rx CG is either digital or inverted, this field will default to 'Y' and the user is denied access to this field. If the Rx CG field is empty, this field defaults to 'N' and the user is denied access.

Validity
There are no validity checks for this field.
Storage
RDIV

The FNC Button window (Function key definitions) is accessed by depressing the F3 (FNC) key from the control head options window. The screen shown in FIG. 57 is used to define the primary, secondary and tertiary functions of the function keys.

This window has three input fields. When the window is opened, the cursor is placed in the primary field. Once the user makes a selection, the cursor progresses to the secondary field. Once that selection is made, the cursor then advances to the tertiary field.

There are no final edit checks for this window.

Note: The tertiary field is not to be displayed for version 1.0

Window Help

Function Control Button

This window is used for defining the primary, secondary and tertiary function of the FNC key on the S825 control unit. The primary function of the function keys is activated whenever the function keys are depressed. The secondary function is activated when the function key is depressed in combination with the FNC key and the tertiary functions are activated when the (Key) is pressed. The primary function is the normal state of the keypad. The secondary function is activated when the FNC key is pressed once. The tertiary function is activated when the FNC key is pressed twice in a row.

Primary

This is a toggle field used to indicate the primary function of the function keys. There are four possible choices: "Siren", "DTMF", "Status" and "Disable". "Siren" is selected to indicate that the primary function of the function keys are enable the siren. "DTMF" is used to indicate that the control head is to generate DTMF when the function keys are depressed. By selecting "Status", the control head will generate one of the various status messages and "Disable" will disable the function key.
Default
Siren
Validity
There are no validity checks for this field.
Storage
General options A

Secondary

This is a toggle field used to indicate the primary function of the function keys. There are four possible choices: "Siren", "DTMF", "Status" and "Disable". "Siren" is selected to indicate that the primary function of the function keys are enable the siren. "DTMF" is used to indicate that the control head is to generate DTMF when the function keys are depressed. By selecting "Status", the control head will generate one of the various status messages and "Disable" will disable the function key.
Note: Status is not to be displayed for version 1.0
Prompt
Press TAB to toggle, F9 for help.
Help
Secondary: This is a toggle field used to indicate the secondary function of the function keys. There are four possible choices: "Siren", "DTMF", "Status" and "Disable". "Siren" is selected to indicate that the secondary function of the function keys are enable the siren. "DTMF" is used to indicate that the control head is to generate DTMF when the function keys are depressed. By selecting "Status", the control head will generate one of the various status messages and "Disable" will disable the function key.
Default
DTMF
Validity
There are no validity checks for this field.
Storage
General options A

Tertiary

This is a toggle field used to indicate the primary function of the function keys. There are four possible choices: "Siren", "DTMF", "Status" and "Disable". "Siren" is selected to indicate that the tertiary function of the function keys are enable the siren. "DTMF" is used to indicate that the control head is to generate DTMF when the function keys are depressed. By selecting "Status", the control head will generate one of the various status messages and "Disable" will disable the function key.
Prompt
Press TAB to toggle, F9 for help.
Help
Secondary: This is a toggle field used to indicate the tertiary function of the function keys. There are four possible choices: "Siren", "DTMF", "Status" and "Disable". "Siren" is selected to indicate that the tertiary function of the function keys are enable the siren. "DTMF" is used to indicate that the control head is to generate DTMF when the function keys are depressed. By selecting "Status", the control head will generate one of the various status messages and "Disable" will disable the function key.
Default
Status
Validity
There are no validity checks for this field.
Storage
General Options FIG. 58 illustrates the Emergency signalling window and is accessed by pressing the F4 (Signal) key from the Control head personality screen. The purpose of this screen is to define the variables associated with emergency signalling.

When this window is opened, the cursor will be located in the Emerg Tone 1 field. Because all the fields start in the same column, normal cursor progression will be top to bottom. Because of the nature of this window, no final edit check of the window is needed.

Window Help

Emergency Signalling

The purpose of this window is to define the parameters of the emergency signalling schemes. These parameters consist of the tone lengths and delays for T90 and T99 and the GE star delays.

Emerg Tone 1

This is a numeric entry field that is used to define the T90 emergency tone or the first tone of the emergency T99 tone set. This tone will be generated when the user keys an emergency on the control head in a mode that has T90/T99 selected as the signalling desired.
Prompt
Valid tones range 250–3000 Hz or no tone.
Help
Emergency Tone 1: This field is used to define the T90 emergency tone or the first tone of the emergency T99 signalling. This tone will be generated when an emergency is keyed on a mode that has T90/T99 signalling selected. A valid tone entry is in the range of 250 to 3000 Hz.
Default
Blank/Empty field.
Validity
A valid entry will be in the range of 250 and 3000.
Storage
General options

Length

This is a numeric field used to declare the length of the T90/T99 Emergency Tone
1. The value entered here determines the length of time the control head will generate the above tone.
Prompt
Valid lengths range from X to XXXX.
Help
Emergency Tone 1 Length: This field is used to declare the length of time the control head should generate Emergency Tone 1. Valid tone lengths range from 0 to 3000 Msecs in 20 Msecs increments.
Default
1000
Validity A valid tone length is in the range of 00 to 3000.
Storage
General options

Emerg Tone 2

This is a numeric entry field that is used to define second tone of the emergency T99 tone set. This tone will be generated when the user keys an emergency on the control head in a mode that has T90/T99 selected as the signalling desired.
Prompt
Valid tones range 250–3000 Hz.
Help
Emergency Tone 2: This field is used to define the second tone of the emergency T99 signalling. This tone will be generated when an emergency is keyed on a mode that has T90/T99 signalling selected. A valid tone entry is in the range of 250 to 3000 Hz.
Default
Blank/Empty field.
Validity
A valid entry will be in the range of 250 and 3000 or no tone.
Storage
General options

Length

This is a numeric field used to declare the length of the T90/T99 Emergency Tone 2. The value entered here determines the length of time the control head will generate the above tone.
Prompt
Valid lengths range from 0 to 3000.
Help
Emergency Tone 2 Length: This field is used to declare the length of time the control head should generate Emergency Tone 1. Valid tone lengths range from 0 to 3000 Msecs in 20 Msecs increments.
Default
3000
Validity
A valid tone length is in the range of 0 to 3000.
Storage
General options

Tone Delay

This is a numeric field that is used to indicate the amount of time the control head should delay between generation of the T99 tones.
Prompt
Valid delays range from 0 to 3000 Msecs.
Help
Tone Delay: This is a numeric field that is used to indicate the amount of time the control head should delay between generation of the T99 tones. This field will only accept values in the range of 0 to 3000 Msecs in 20 Msec increments.
Default
1000
Validity
A valid entry will fall between 0 and 3000 in 20 Msec increments.
Storage
General Options

Repeat Count

This is a numeric field used to indicate the number of times the control head is to generate a GEstar ID once the emergency mode of operation has been activated.
Prompt
Valid range is 1 to 255
Help
Repeat Count: This is a numeric field used to indicate the number of times the control head is to generate a GEstar ID once the emergency mode of operation has been activated. Acceptable values are in the range of 1 and 255.
Default
1
Validity
A valid entry is in the range of 1 and 255.
Storage
Gestar

Delay Time

This field is used to indicate the delay between transmissions of the GEstar ID when the emergency mode of operation has been activated.
Prompt
Acceptable values range 1–60.
Help
Delay Time: This field is used to indicate the delay between transmissions of the GEstar ID when the emergency mode of operation has been activated. A valid entry is in the range of 1 to 60 secs in one second increments.
Default
1
Validity
A valid entry will fall in the range of 1 and 60.
Storage
Gestar

Attack Delay

This is a numeric field that is used to specify the transmit attack delay prior to sending the GEstar ID.
Prompt
Acceptable values range from 50 to 1275.
Help
Attack Delay: This is a numeric field that is used to specify the transmit attack delay prior to sending the GEstar ID. Acceptable values are in the range of 50 to 1275.
Default
50
Validity
A valid entry is in the range of 50 and 1275.
Storage
Gestar

Revert to home

This is a toggle field that is used to indicate whether or not GEstar or T90/T99 transmissions occur on the home channel or current channel. The two possible selections are "Yes" and "No". Yes indicates the GEstar and T90/T99 transmissions occur on the home channel.
Prompt
Press TAB to toggle, F9 for help.
Help
Revert to home: This is a toggle field that is used to indicate whether or not the control unit should revert to the home channel when performing a GEstar or T90/T99 transmission. Using the TAB key, the value in this field will toggle between a "Yes" and "No". Selecting a Yes will have the affect of causing the control unit the transmit all GEstar and T90/T99 transmissions on the home channel.
Default
Blank/Empty field.
Validity
A valid entry will be in the range of 250 and 3000.
Storage
General options The radio options screen is entered by pressing the F5 (Radio) key from the Control head options screen shown in FIG. 59. This screen provides for defining some of the options and characteristics of the radio attached to the control head. These options will affect control head/ratio interfacing.

Window Help

Radio Options
The purpose of this window is to define the radio specific options. Basically, these consist of parameters specific to the type of radio connected to the control head.

Radio Download

This is a toggle field that is used to indicate whether or not the radio supports channel downloading. The two possible selections are: "Ena" and "Dis". Selecting "Ena" will indicate that the control head can download channel data to the radio.
Prompt
Press TAB to toggle, F9 for help.
Help
Radio Download: This is a toggle field that is used to indicate whether or not the radio supports channel downloading. The two possible selections are: "Ena" and "Dis". Selecting "Ena" will indicate that the control head can download channel data to the radio.
Default
Ena
Validity
There are no validity tests for this field.
Storage
General

Max Chn/Mode

This is a toggle field that is used to indicate the number of channels/mode that the control head will need to support. The two possible selections are: 16 and 32.
Prompt
Press TAB to toggle, F9 for help.
Help
Max Channels/Mode: This is a toggle field that is used to indicate the number of channels/mode that the control head will need to support. The two possible selections are: 16 and 32. "16" is selected to indicate that the radio attached is either a Rangr or a 16 channel Delta. "32" is selected to indicate a 32 channel Delta.
Default
16
Validity
There are no validity tests for this field
Storage

VRS Beep Interval

This is a numeric field that is used to indicate the number of seconds the control head should delay between VRS beeps. The control head will beep at a periodic rate to audibly inform the user that the VRS is "On". The value entered here determines that rate.
Prompt
Acceptable value 1 to 30.
Help
VRS Beep Interval: This is a numeric field that is used to indicate the number of seconds the control head should delay between VRS beeps. The control head will beep at a periodic rate to audibly inform the user that the VRS is "On". The value entered here determines that rate. Acceptable values range from 1 to 30 Secs.
Default
1
Validity
A valid entry is in the range of 1 and 30.
Storage

VRS Forced Scan

This is a toggle field that is used to indicate whether or not the VRS is forced to scan. There are two possible selections: "Yes" and "No". A "Yes" indicates that the VRS is forced to Scan.
Prompt
Press TAB to toggle, F9 for help.
Help
VRS Forced Scan: This is a toggle field that is used to indicate whether or not the S825 control unit is forced to scan when the VRS is enabled. There are two possible selections: "Yes" and "No". A "Yes" indicates that the S825 control unit will enable channel scan when the VRS is active.
Default
No
Validity
There are no validity test for this field.
Storage

Dual Control

This is a toggle field that is used to indicate whether or not this control head is equipped for dual control. The two possible selections are: "Yes" and "No". A "Yes" selection indicates that the radio system is equipped for dual control.
Prompt
Press TAB to toggle, F9 for help.
Help
Dual Control: This is a toggle field that is used to indicate whether or not this control head is equipped for dual control. The two possible selections are: "Yes" and "No". A "Yes" selection indicates that the radio system is equipped for dual control.
Default
No
Validity
There are no validity tests for this field.
Storage FIG. 60 shows the deluxe keypad definition window and is accessed by selecting the F6 (Key) from the control head options window. The F6 (Key) will bring up either the basic or the deluxe window based upon the unit type field. If the unit type field is "Deluxe" this window will be pulled up. If the unit type field is "Basic" the following screen will appear.

Note: Refer to section 2.1.0 for a discussion of this screen.

FIG. 61 shows the basic keypad definition screen and is accessed by selecting the F6 (Key) from the control head options screen. This window is conditional on the state of the unit type field under the control head options window.

Note: Refer to section 2.1.1 for a discussion of this window.

FIG. 62 illustrates what happens when the F8 'More' key is depressed.

Window Help

Control Head Personality

This is the primary data entry screen when defining a personality. Basically, a personality consists of one or more MODES. A mode is a collection of channels in which the radio will operate and a set of options for the mode. These options consist of a signalling scheme, non-priority scan definition and a priority scan definition.

You're other options available from this screen are:
F2—Select this option if you want to:
 Create/Edit/Delete a frequency set in the pool.
F4—Select this option if you want to:
 Edit the text associated with this personality.

FIG. 63 shows the currently defined frequency set screen and is accessed by pressing the F2 key from the Control Head personality screen. This screen operates in a similar fashion as the current personality screen.

Window Help

Current Defined Frequency Sets

This screen shows the currently defined frequency sets residing in the data base. Immediately below the title is the directory in which the currently defined frequency sets reside. This directory is the same directory from which the program was run.

From this window your available options are:
F2—Select this option if you want to:
 Change/Edit a frequency set.
F4—Select this option if you want to:
 Create a new frequency set.
F5—Select this option if you want to:
 Delete a currently defined frequency set.

FIG. 64 shows the text window and is accessed by pressing the F4 (Text) key from the Control Head Personality screen. The purpose of this window is to let the user define a few lines of text that will be stored with this personality on disk. It also displays the software version number of the control head last programmed with this personality. Also, the last data this personality was downloaded to a radio is captured and saved.

Window Help

Text Window

The purpose of this window is to define/create a few lines of text to be saved with this personality on disk. This text can be any text you desire. Also, you will notice a field for software version and last programmed date. These fields will be filled in once this personality is downloaded into a control head. By referring back to this window, you will have a record of when the control head was programmed and the current software version of the control head.

Software Version

This is a display only field that is used to indicate the version number of the software residing in the control head. This field gets filled in when this personality is written to the control head.

Last Programmed

This is a display only field that identifies the data that this personality was written to the control head. It gets filled in when the personality is written.

Text

There are 8 character fields that are used to enter user defined text to be stored on disk with the personality. This text is not written to the control head, just the file.
Prompt
 These fields are user defined.
Help
 Text Field: This field is used for entering user defined text. This text is saved on disk with the personality for later review. Enter addresses, comments or any other special notes on this personality.
Default
Blank/Empty
Validity
 There are no validity tests with this field.
Storage
None FIG. 65 illustrates the save personality window and is used to enter the name by which this personality is to be saved. Whenever the user tries to exit the personality, this window appears.

Window Help

Save Personality

This is the save personality window and is used to confirm exiting of the control head personality screen. The displayed fields are the source file name, the destination file name. The source file name is the name that this personality was originally stored under. The destination field is for entering the name of the file that this personality should be stored to.

From this window you have the following options available:
F1—Select this option if you want to:
 Have the personality saved and then exit.
F2—Select this option if you want to:
 Exit without saving the personality.
F10—Select this option if you want to:
 Continue editing the personality.

Source

This is a display only field that is used to indicate the file from which this personality was originally opened.

Destination

This is an alphanumeric field that is used to specify the destination file name on the personality just created. Here the user enters a file name.
Prompt
 Enter the destination file name.
Help
 Destination File Name
 This field is used to enter the destination file name for the personality just created. When this personality is saved to disk, it will be saved under the name specified here.

Default
The source personality name. A new personality will default to NEW.[Extension]
Validity
A valid entry will pass the following conditions:
1. That the name is a valid DOS file name.
2. If the name is different than the source and a personality with the same destination name exists, the user must be given the option to overwrite.
Storage
None FIG. 66 shows the program radio window and is accessed by selecting the F5 (Program) key from the current personality screen. This window provides for entering the name of the personality to be used for programming the personality.
Window Help
Program Radio
This window is used to confirm the program radio operations. Selecting F1 will cause the program to download the file identified into the radio.
From this window your available options are:
F1—Select this option if you want to:
Program the radio with the personality specified.
F2—Select this option if you want to
Abort this operation.
Filename
This file is used to enter the name of the personality to be used for the program operation.
Prompt
None
Help
File Name: Enter the file name of the personality to be used for programming the radio. This field will accept 8 characters for a valid file name.
Default
The highlighted name.
Validity
A valid entry will pass the following conditions:
1. The entry is valid DOS file name.
2. The personality actually exists.
Storage FIG. 67 shows the read radio window and is accessed by selecting the F6 (Read) key from the current personality window. The purpose of this window is to confirm the read operation selection.
Window Help
Read Radio
The screen shown in FIG. 68 is used to confirm the read radio operation. Selecting F1 will cause the control head to send its personality up to be stored in the file name specified.
From this window your available options are:
F1—Select this option if you want to:
Read the radio in to the personality specified.
F2—Select this option if you want to:
Abort this operation.
Filename
This file is used to enter the name of the personality to be used for the read operation.
Prompt
None
Help
File Name: This is a character field that is used to enter the name under which the personality is to be stored once read from the control head.
Default
Blank/empty Validity
A valid entry will pass the following conditions:
1. The entry is valid DOS file name.
2. If the personality exists, the user must be given the overwrite option.
Storage
None Several overall design considerations for the user interface provided by the preferred embodiment of the present invention should now be evident.

Firstly, a "top-down" approach is followed as much as possible so that tasks are defined in terms of subtasks, subtasks are defined in terms of sub-subtasks, etc. In this way, every component is broken down as far as possible to simplify each of the tasks actually selected by the user—and also to create additional flexibility by permitting each task to be performed more or less independently. In terms of actually selecting radio programming personality file 86 parameters, the "top-down" approach means that each programming task is defined at its lowest level as an input field—and the user interface provided by the present invention is truly field oriented (e.g., by providing field level help windows, field specific prompts, and the like).

Each input field in the preferred embodiment is preferably specified in terms of the type of data (logical, numeric or characters), number of characters which are to fill the field, the numeric range of the field if the field is numeric, and many other parameters (as will become apparent shortly). Range checking is performed automatically on all fields having limited ranges to prevent system 50 from accepting invalid data. Also, many or most input fields in the preferred embodiment preferably have default values which are used to "fill in" the field when it is first displayed. This permits the user to either accept the default value (e.g., by a single keystroke) or change the field contents by overwriting (editing) the default value to obtain a new desired value.

The preferred embodiment uses several basic types of screen display formats:
full list screen;
full format screen;
dual/split screen;
text screen; and
pop up window.

A full list screen in the preferred embodiment does not support field editing, and is used to list a number of fields from which the user may select one field. Preferably, a reverse video bar is used to highlight the current selection (the cursor and/or tab keys are used to move the video bar to other fields). Only when a function key is depressed does the selection actually take place. In a full list screen, the page up key may be used to page upward through the list. The page down key advances through the list until the bottom of the list is encountered. In the preferred embodiment, the root screen 102 is an example of a full list screen.

In the preferred embodiment, the channel data screen 116 is an example of a full format type screen. Unlike the full list screen, the full format screen provides for editing individual fields displayed within the screen. The information contained within the screen can thus be deleted or changed. In the format screen, the left and right cursor keys are used as editing keys (to move the cursor left and right within a field) rather than as field selection keys. The up and down cursor keys are used to select fields, and the Tab key may be used to select field values (e.g., by toggling logical values). It is preferable for improving readability that a screen title be displayed at the very top of each format screen with a blank line directly beneath it; and that a one-line user prompt message be displayed at the bottom line of the format screen with a blank line directly above it. In addition, the one-line user prompt message displayed at the bottom of each display format actually changes as the cursor is moved from one input field to another—thereby prompting the user with a one line description of the type of information the "current" field contains. Thus, the user only needs to depress the F9 help key if he wants a more detailed explanation of the field contents (in the preferred embodiment, display format-level help text is also available by depressing Shift-F9).

In the preferred embodiment, the number of input fields per screen is generally limited to five to ten in order to reduce clutter and the resulting user confusion and intimidation it can cause. The screen formats are also laid out to provide good balance. Good balance helps prevent user anxiety (by facilitating quick visual scanning), directs the user's attention to important areas of the screen and adds to the overall pleasing appearance of the display.

Split screens provide additional flexibility by displaying two half-screens containing related information. There are at least three possibilities for split screen displays: each half screen is a listing screen (permitting the user to select but not edit the fields in the half screens); each half screen is a format screen (so the user can edit the fields displayed in each); or one half screen is a listing screen which allows the user to select the data to be edited in the other (format) screen.

In this latter (one listing half screen, one format half screen) configuration, the listing screen is preferably the left-most window (half screen), and the right-most window (half screen) is a half format screen. On initial entry into the screen, the cursor is placed in the listing half screen with a list of entries on display. A reverse video bar is placed over the first entry in the list. The format half window is used to break out detailed fields associated with the item highlighted in the left-hand list half screen. As the user cursors through the list, the format half screen instantaneously displays changing information corresponding to the current list selection. Once the user has selected an item from the list he wishes to modify the information corresponding to, he may issue a "switch" command (e.g., by depressing the F1 key) to move the cursor is in the format half screen. Once the cursor is in the format half screen, the user may edit the fields displayed there and save any changes made. Another switch command is used to return to the list half screen. This split screen configuration is especially useful when working with sets of sets.

In the preferred embodiment, the setup display format 104 is an example of a split screen display format. The left-hand half screen of this display format 104 is a listing screen displaying two fields from which the user selects; and the right-hand half screen is another listing screen displaying a set of frequency ranges from which the user selects one field.

Full text display formats are used in the preferred embodiment to display files of formatted text. For example, when the user selects printing a personality field 86 to his display 58 in the preferred embodiment, a full text screen format 138 is displayed showing the entire contents of the personality file. Editing within the text window is not supported in the preferred embodiment and no fields are defined. Page up and down keys can be used to scroll through displayed text.

Pop up windows are used in the preferred embodiment for a variety of purposes, including help text display and data entry. Pop up windows are used when the task they implement is subsidiary (or a subset of) an already displayed screen format. For example, many of the screen formats accessed from full format screens in the preferred embodiment are pop-up windows—since these accessed screen formats effect data/field selection functions that are subsets of the general function implemented by the format screen.

For example, the channel data screen 116 is a full format screen in one preferred embodiment that permits the user to specify radio operating frequency, channel guard frequency, and a variety of channel options associated with each channel (see Table 18). Depressing the F3 key from this channel data screen 116 causes the GE Star options window 144 (see Table 20) to "pop up" in an overlaid fashion over the channel data screen 116 to enable the user to enable or disable the GE Star option and to select other parameters associated with GE Star. When the user is finished programming the GE Star options, he depresses the F10 key to take the "pop up" GE Star window 144 off the screen. Meanwhile, the channel data screen 116 remains displayed "beneath" the GE Star window 144 during the entire time the window is displayed, and continues to be displayed when the window is removed from the display.

Another important use of the pop-up window in the preferred embodiment is for displaying help text. In fact, in the preferred embodiment, a help pop-up window can be overlaid onto an already displayed pop-up window (which in turn is overlaid on top of another screen). However, in order to minimize user confusion in the preferred embodiment, once a pop-up window is displayed no other pop-up windows (other than help windows) can be called.

In the preferred embodiment, error messages are displayed in a small pop-up window centered on the screen (an example of an error message display in the preferred embodiment is found at the end of the detailed discussion above). Once displayed, an error message remains displayed until the user presses a key to signify that the message has been read. Once any key is depressed in the preferred embodiment, the message window disappears.

Now that the hierarchical screen display format arrangement of the preferred embodiment has been discussed in detail, a discussion of exemplary program control steps performed by the preferred embodiment of system 50 to provide such screen displays and to effect radio programming and related tasks will be presented.

In the preferred embodiment, two sets of program control instructions cooperate with one another to provide radio programming functions. The first program control instruction set is stored in radio 60 (e.g., in a ROM not shown) and cooperates with personal computer program control instruction module 84 to provide upload and download of personality files 86 and to also provide the test and diagnostic functions provided by utility function screen formats 122-126. The program control instructions executed by the radio microprocessor 70 are conventional and therefore need not be discussed here. FIGS. 4-15 are schematic flowcharts of the exemplary program control steps embodied in personal computer program control instruction module 84.

Referring to FIG. 4, upon starting system 50 an initialization routine is performed (block 200). FIG. 5 shows the initialization routine 200 in detail. If the user previously specified set up defaults (i.e., at setup screen 104), these user specified file extension, communications ports and other defaults stored in a set up file is not accessed and read (blocks 202, 204). If no setup file exists to be opened, on the other hand, system default values are used (block 206). A routine is then called at block 208 to prepare for displaying the "displaying current personalities" display format 102 by initializing a display format handling routine (as will be explained in greater detail shortly). Control then returns to main routine block 210 (to determine first whether the display format window handling routine was successfully initialized at block 210) and to then effect display of the main "display current personalities" display format 102.

Briefly, in the preferred embodiment the contents of each display format is stored in a data structure containing (or referencing) textual contents, positional information for each input and output field along with field level color and other display parameters, a designation of the help text files associated with each field on a field-by-field basis, and information specifying the active function keys corresponding to the display format. Briefly, to display a display format, system 50 "opens" the display format data structure (similar to the manner in which a file is opened) (block 212), "fills" the display format with variable information that must be specified at run time (e.g., a listing of all personality files 86 with the specified file extension currently residing one mass storage device 56, block 214), and then "shows" the display format by displaying the "filled" display format on display 58 (block 216). System 50 then "gets" additional information to the display 58 and also "gets" user input corresponding to the display format (block 218)—being responsive only to those function keys defined as active for the specific display format being displayed. System 50 processes defined user inputs and takes appropriate actions in response (e.g., by calling for display of another display format, performing a programming task, or both). Upon depressing the F10 ("exit") key in the preferred embodiment, system 50 "closes" the display format (block 220) and returns to the next highest level display format in the FIG. 2 tree structure (or, in case of the main routine shown in FIG. 4, resets the image displayed by display 58, terminates radio programming functions and returns control to the disk operating system at block 224).

System 50 performs error checking functions each time it attempts to "open" a display format data structure and terminates program execution if it cannot for some reason successfully "open" a required display format (e.g., "No" exit of decision block 212).

FIG. 6 is a flowchart of the exemplary program control instructions performed when the "set up" option is selected at FIG. 5 block 218. The FIG. 6 routine "opens" the "set up" display format 104 by opening the "Radio Type" half-screen format (block 226) and then opening the frequency range (bandsplit) half screen format (block 228). An exit occurs if either of these half-screen formats cannot successfully be "opened" (blocks 230, 232). If both formats are successfully opened, they are filled with the corresponding field information (block 232) and displayed on display 58 (block 234). System 50 then "gets" user inputs and takes appropriate action in response (block 236). Upon depression of the F10 key, both display formats are "closed" (block 238) and system 50 returns to displaying display format 102 (block 232).

FIGS. 7-15 show exemplary program control steps performed in the preferred embodiment to respectively display the following: the channel personality display format 104, the Utility display format 106, the change communications port display format 118, the maintenance display format 120, the print display format 134, the print display format 138, the channel data screen 116, the program radio display format 110, and the read personality display format 112. Each of these sequences of steps involves "opening", "filling" and "showing" the appropriate display format; "getting" additional display information and user input; and finally, "closing" the display format.

In the preferred embodiment, each display format is defined by a corresponding window definition data structure 400 a high-level block diagram of which is shown in FIG. 16. Each window definition data structure 400 in the preferred embodiment includes all of the information required to fully define the corresponding window (display format). Thus, in the preferred embodiment, there is a one-to-one correspondence between display formats shown in FIGS. 2-3 and corresponding window definition data structure 400.

In the preferred embodiment, each window definition data structure 400 includes the following portions:
window name 402 (which may or may not be explicitly stored as part of the data structure);
field control blocks (404)1-404(n)—one for each "field" of the display format;
a field pointer array 406;
a function key label array 408;
a function key function call array 410; and
a window control block 412.

In the preferred embodiment, the window control block 412 actually includes references to arrays 406-410 which in turn may reference field control blocks 404 and other data structures (e.g., help text files) and/or executable code (e.g., function calls corresponding to active function keys). Thus, the data structure 400 shown in FIG. 16 comprises logically related elements which need not be contiguously stored in memory or defined as part of a single unified stored data block.

In the preferred embodiment, field control blocks 404(1)-404(n) correspond to individual input and/or output fields defined as part of the associated display format. That is, in the preferred embodiment each input field and each output field in the display format is defined individually by a corresponding field control block 404 (the structure of the field control block will be described in greater detail in connection with FIG. 18). Field pointer array 406 provides an array of pointers to the various field control blocks 404 for a particular display format. Thus, the preferred embodiment field control blocks 404 need not actually be stored as part of window definition data structure 400 but can instead be stored anywhere in memory (and in fact, the same field control blocks 404 can be used to define fields of several display formats if convenient and desirable). The field pointer array 406 provides a "linkage" between a collection of field control blocks 404 and a particular window control block 412.

The function key label array 408 in the preferred embodiment is a text listing of legends to be displayed beneath the function key symbols when the display format is displayed. As described previously, in the preferred embodiment a symbol corresponding to each of the function keys is displayed whether or not the function key is active for a particular display format—with the active function keys having additional descriptive legends also displayed for them. In the preferred embodiment, function key label array 408 provides "NULL" entries for inactive function keys and descriptive legends for active function keys. Similarly, the function key function call array 410 provides a listing of actual program control function calls associated with the active function keys. Typically, the function key function call array 410 includes "NULL" function calls for all inactive function keys and will provide calls to executable function modules corresponding to all active function keys.

Referring now more particularly to FIG. 17, window control block 412 specifies the addresses field pointer array 406, function key label array 408 and function key function call array 410 corresponding to a particular display format (e.g., in entries 432, 428, 430, respectively). Even though arrays 406–410 are shown as being stored together with window control block 412 in FIG. 412, in the preferred embodiment this contiguous storage is not required because the window control block contains pointers (addresses) to the locations in which the arrays 406–410 are stored.

As can be seen from FIG. 17, window control block 412 also includes an additional pointer 434 points to an ASCII help file stored on disk and associated with the window; and another pointer 436 pointing to a window page function defining whether or not window "paging" is permitted for the particular window (i.e., for windows in which the displayed text, fields, or other information is too extensive to be displayed on the display screen all at the same time). In the preferred embodiment, window control block 412 also includes a W_count field 426 specifying the number of fields contained within the window (and thus, the number of corresponding field control block 404 entries within field pointer array 406). Window control block 412 also includes positional fields 418, 420, 422, 424 specifying respectively the beginning row, beginning column, ending row, and ending column on display 58 at which the display format is to be displayed (all display formats in the preferred embodiment are rectangular unless their size and position can be fully specified with these four fields). Finally, window control block 412 in the preferred embodiment includes a pointer 414 to a "Curses" window and a further pointer 416 to a "Curses" window box.

In the preferred embodiment, the conventional software package called "Curses Library" sold by Lattice, Inc. of Glen Ellyn, Ill. 60138 and its associated screen manager library functions are used to define and control various lower level window functions. The preferred embodiment window library routines make function calls to functions stored within the off-the-shelf Lattice Curses Library. The Curses Library contains very low level functions that help to standardize CRT/terminal interaction. The preferred embodiment makes use of this Lattice Curses Library to ensure that the preferred embodiment program control code is transportable to other machines and operating systems (and thus, the Curses Library provides a degree of standardization since it is available for most C based operating systems). Far more detail regarding the Lattice Curses Library is available from a variety of sources and publications including, for example, the manual "Lattice Curses Screen Manager Library Curses Reference Guide Revision 1.0", Lattice, Inc. (1985) (the entire contents of which are incorporated by reference herein).

Briefly, the Lattice Curses Library is a library of C functions used for updating the screen of an IBM personal computer. The Curses Library is capable of keeping and updating any number of full or partial virtual screen images in memory, and also paints the actual screen as needed with any or many of the images. Functions are provided to write text to virtual screens, move the cursor, scroll the screen, overlay screens, outline, insert, delete, clear and highlight. Nearly 100 functions and macros are provided in the library relating to display format, display and manipulation. These functions and macros are used extensively in the preferred embodiment the present invention to perform the low-level display format manipulations required.

Thus, for example, window control block pointer 414 points to a window buffer (data structure) defined in accordance with the Curses Library "initscr" function (which is invoked in the preferred embodiment via a routine called "new window" described in Appendix A). In this way, a "box" may be displayed on display screen 58 via a Curses "refresh" function call referencing pointer 416—and similarly, a window buffer in memory defined under Curses Library routines may be displayed and otherwise manipulated via Curses function calls referencing pointer 414. See Appendix A for additional details relating to how calls to the Curses Library functions are used in the preferred embodiment.

FIG. 18 is a block diagram of exemplary contents of field control block 404 in the preferred embodiment. In the preferred embodiment, each field within a display format is defined individually in terms of its attributes and characteristics. Field control block entries 438–452 define various different attributes/characteristics of the particular field, including whether it is a display only field (entry 442), whether the cursor automatically advances to the next field when the current field is filled (entry 444), whether the field contents toggles between different values (entry 446), whether only uppercase characters can be displayed within the field (entry 448), and the like. Positional entries 454,456 define the row and column locations, respectively, where the field is to be displayed on display screen 58, while entries 458,460 respectively define minimum or maximum numbers of characters that must be used to fill the field. Field attribute entry 468 describes whether the field contents are to be displayed in normal video, bold video or the like.

Following the attribute characteristic definition entries 438–468 appear various pointers which relate to the function of the field defined by field control block 404. Entry 470 defines the actual data in the personality file data structure to be used for filling in an output field or received from an input field. Entry 472 refers to an ASCII text file containing help text to be displayed when the help F-key is depressed while the cursor is in the field. Prompt field 474 contains an ASCII key string prompt line which is displayed (e.g., at the bottom of the display format) whenever the cursor is moved into the field. Field 476 points to characters data (e.g., if a conversion between displayable character data and a different actual data representation is required), while field 478 points to an edit function which is called whenever an input field is filled in (e.g., for range checking and the like).

FIGS. 19–31 are flow charts of the exemplary program control steps performed by processor 52 and display 58 in the preferred embodiment to display the display formats shown in FIGS. 2-3 in accordance with the information stored in window definition data structures 400 shown in FIG. 16. Referring to FIG. 4 (and as explained previously), a display format is displayed in the preferred embodiment by first initializing it (blocks 200,210 shown in FIG. 4); then "opening" the window (block 212), and finally "filling" and "showing" the window (blocks 214,216). User input is received by "getting" from the window (block 218). Finally, a window and its associated data structure are deactivated by "closing" the window (block 220). The manner in which these various steps are performed using the data structures shown in FIGS. 16–18 will now be explained in conjunction with the flow charts of FIGS. 19-31.

Figures 19, 20:
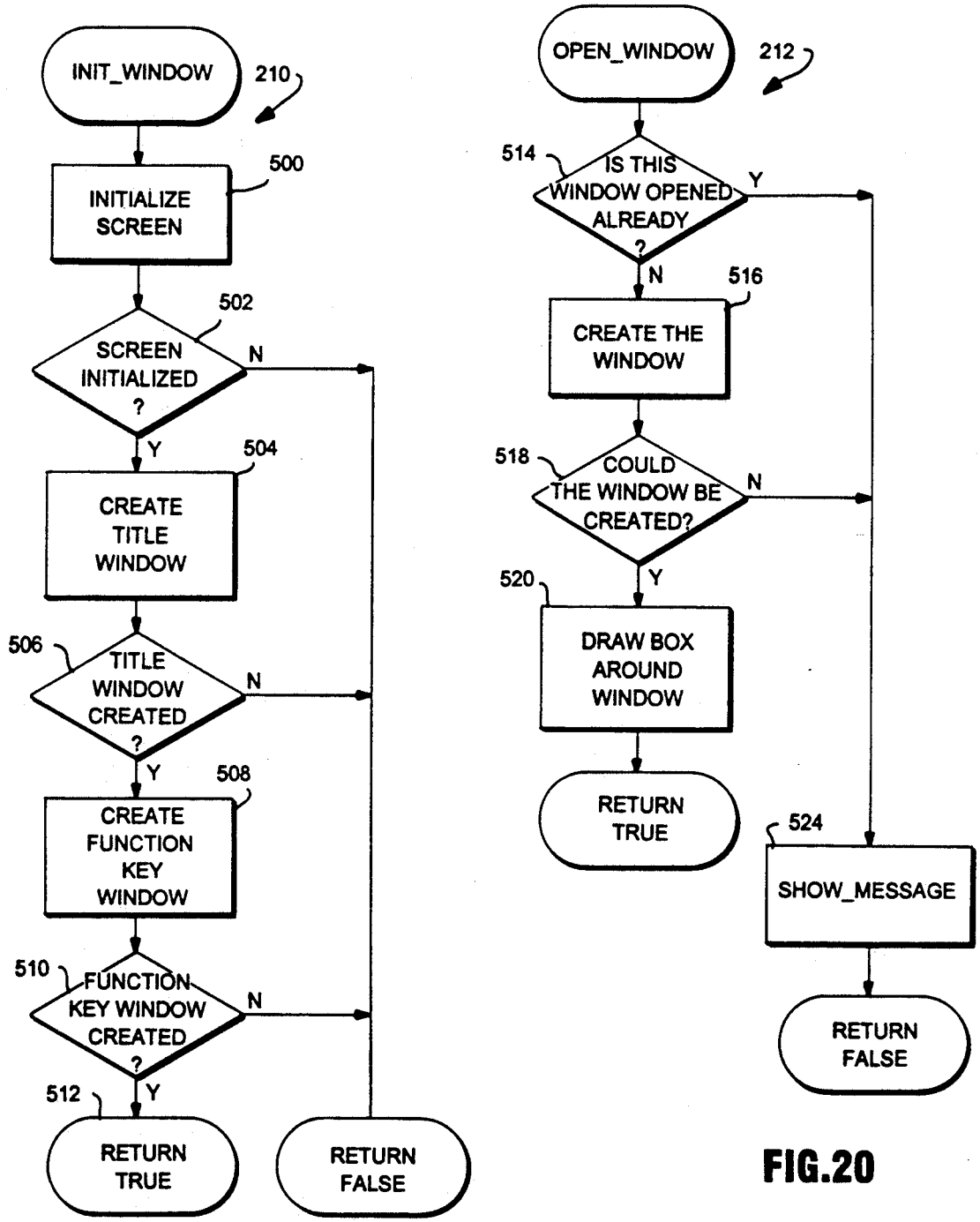
FIGS. 19-31 are flowcharts of exemplary program control steps performed by the preferred embodiment to manipulate the FIG. 16 data structures.

FIG. 19 is a schematic flow diagram of exemplary program control steps performed in the preferred embodiment to initialize the Curses Library runtime module. In the preferred embodiment, the runtime module is initialized by calling a further routine "init screen" (block 500, see Appendix A) which sets aside buffers in personal computer processor random access memory 82 in which to store the various portions of the display format, creates a display format image in memory, initializes various pointers, initializes the attributes of the display 58, etc. System 50 tests whether the screen was properly initialized (decision block 502) by testing a return code provided by the initialization routine. Assuming the screen was properly initialized, a title window is created (e.g., by drawing the outside and inside box delimiters using "draw box" commands, printing appropriate title text, and overwriting the current screen with the new information, block 504) and then a test is performed to determine whether the title window was actually created successfully (decision block 506). If the title window was created properly, then a function key window is created (block 508) and a test is then performed to determine whether the function key window was correctly created (block 510). In the preferred embodiment, decision blocks 502,506,510 are performed by merely testing return codes returned by Curses Library (and/or other) routines which actually perform the blocks 500,504,508. If each of blocks 500,504,508 was correctly performed, then the "INIT window" routine returns a true value (and otherwise returns a false value).

FIG. 20 is a flow chart of exemplary program control steps performed in the preferred embodiment as part of the "open window" routine 212 shown in FIG. 4. The open window routine 212 is called by the FIG. 4 main routine (and also whenever any new window must be displayed as is shown in FIGS. 5–15). It is first determined whether the requested window was already "open" (decision block 514). If the window is not already opened, then the window is created (i.e., appropriate Curses library routines are called to "open" a new EDW window using the window control block 412 a pointer to which is passed to the open window routine 212, decision block 516). An error checking decision block 518 insures that the window was correctly created by the Curses library routines. Once the window is created, then a box is "drawn" around the window in accordance with positional and other information stored in window control block 412 (block 520). In the preferred embodiment, this box is drawn by first referencing window control block 412 to determine whether a thick or a thin box needs to be drawn, and then drawing the box of the appropriate thickness, and finally setting the appropriate attribute. It should be noted that blocks 516,520 do not actually display anything on CRT display 58. Rather, they create images within personal computer processor RAM 82 (i.e., within the memory images created and maintained by the Curses library routines). Specifically, the window create block 516 requests a buffer from the personal computer operating system and allocates this buffer for storage of displaying format image in RAM 82 (referencing field 414 of window control block 412 shown in FIG. 17).

Figure 21:
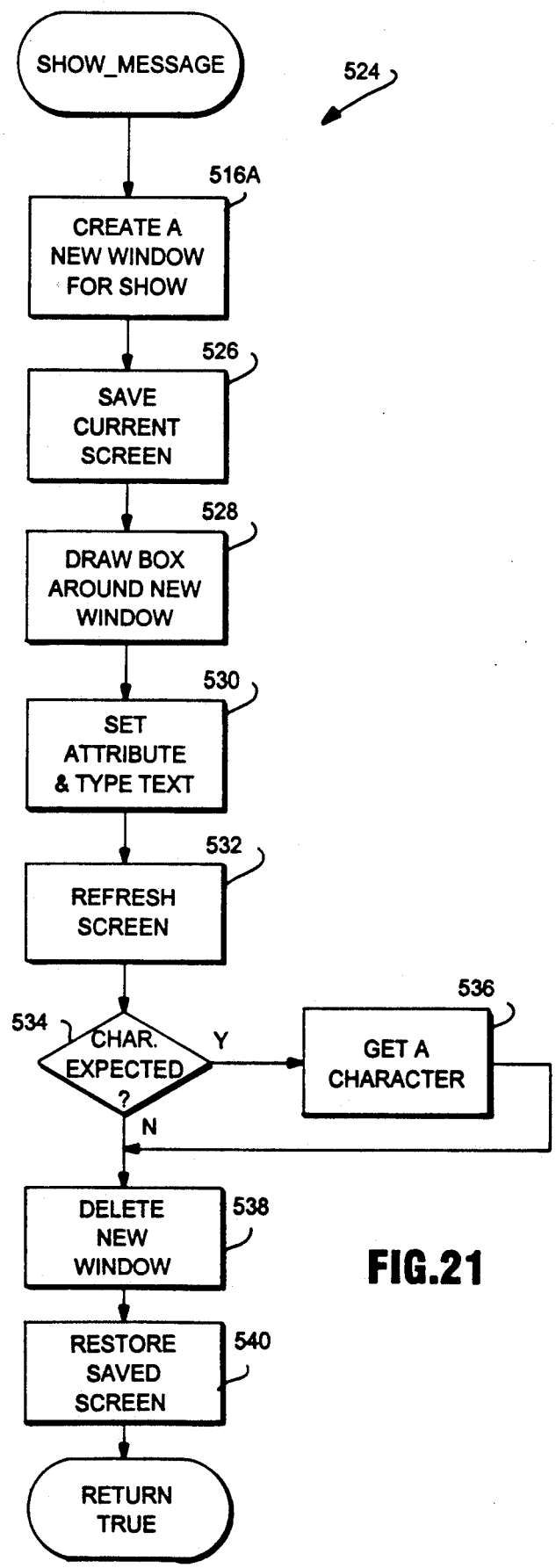

If the open window routine is unsuccessful in creating the window, then an error message is displayed via the "show message" routine 524 a more detailed description of which is shown in FIG. 21. The show message routine 524 displays a message across the middle of the screen in response to parameters specifying text attributes, the text to be displayed, and whether the message is to be displayed until the user presses a key. Show message routine 524 first saves the currently displayed screen so that it can be recalled later for display (block 526). In the preferred embodiment, the save current block 526 is performed by saving the cursor position, style and color in a stack structure of the like and then by actually reading the current screen image from the frame buffer and saving it in a memory buffer within RAM 82. A box is then drawn around the new window (block 528) and the screen attributes for the type text being displayed are set (block 530).

The set attribute and type text block 530 is performed in the preferred embodiment by setting up appropriate attributes for display 58 (e.g., depending upon whether it is monochrome or color display), moving the cursor to the appropriate position on the display for writing the desired help or message text, actually adding the desired text stream to the screen, and then resetting the screen attributes). The save screen may later be restored (block 540) by moving the contents of the saved screen buffer generated by block 526 to the current screen buffer, refreshing the screen to display contents of the screen buffer, and restoring the cursor color and style to the information corresponding to that which was stored by block 526.

After block 530 is performed, the screen is refreshed (block 532) to actually display the new message window, and the preferred embodiment then waits for user input if a character is expected (decision block 534). In response to user input (block 536) the new window is deleted (i.e., erased from the screen and removed from RAM 82, block 538) and the screen that was displayed by display 58 before the new window was displayed is restored to the screen (block 540). If no user input is expected (i.e., if a "no wait" parameter passed to routine 524 is true), then control is immediately returned to calling routine 212 shown in FIG. 20 to remove the show message window just displayed.

Figures 22, 23:
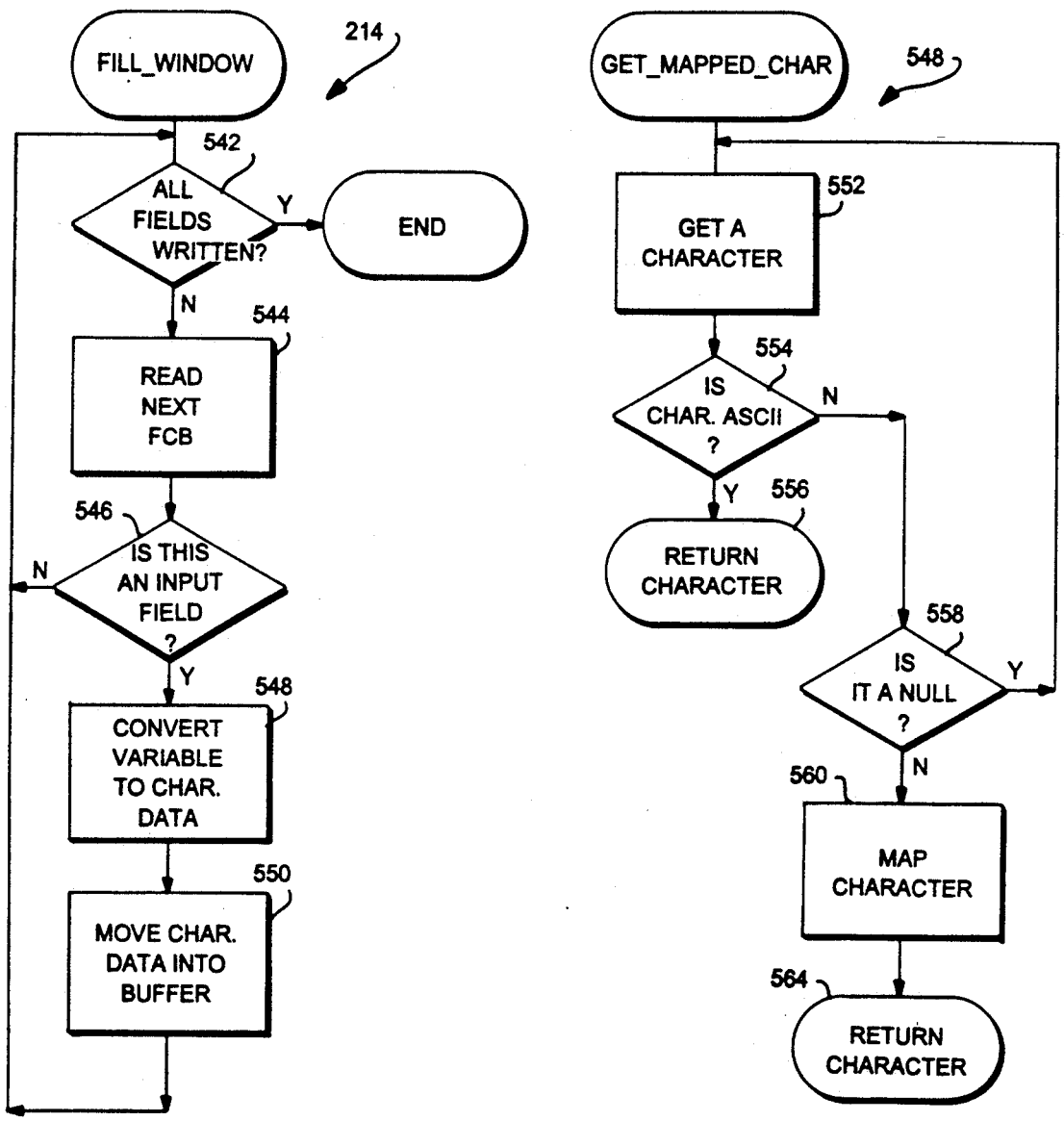

FIG. 22 is a flow chart of exemplary program control steps performed in the preferred embodiment to "fill" a window with a data. In the preferred embodiment the fill window routine 214 does not actually write information onto display 58, but rather fills the newly formed buffer in RAM 82 corresponding to the window being created with the appropriate data for display (i.e., to provide output fields and fully or partially "filled in" input fields). Referring now to FIG. 22, the fill window routine 214 references field control blocks 404 shown in FIG. 16 in sequence in order to write all of the input fields and all of the output fields of the display format into the current buffer stored in RAM 82. Decision block 542 first determines whether all of the fields have been written (e.g., by referencing entry 426 shown in FIG. 17 and comparing that value with the number of times the FIG. 22 loop has been executed). If there are still fields left to be written, fill window routine 214 references the field pointer array 406 of the window definition data structure 400 shown in FIG. 16, indexes down the field pointer array 406 to the next field left to be written, and reads the contents of the associated field control block 404 (block 544). Fill window routine 214 then determines whether the current field is an input field (e.g., by testing the logical value of entry 442 of FIG. 18) (decision block 546). If the field is an input field, then it may be necessary to fill in the field with an appropriate previously entered default value (e.g., to save the user the time and effort required to independently enter the new value). Specifically, if the new field is an input field, it may be necessary to reference data pointed to by FIG. 18 pointer 470, convert that data to character data at block 548 (e.g., by referencing the FIG. 18 field control block "f type" entry 464 to determine whether the field contains numerical or character data, and then performing an appropriate conventional conversion routine to provide displayable characters), and move the resulting character data into the window buffer at an appropriate position corresponding to the field position (as specified by FIG. 18 entries 454-460) (block 550).

Figure 24:
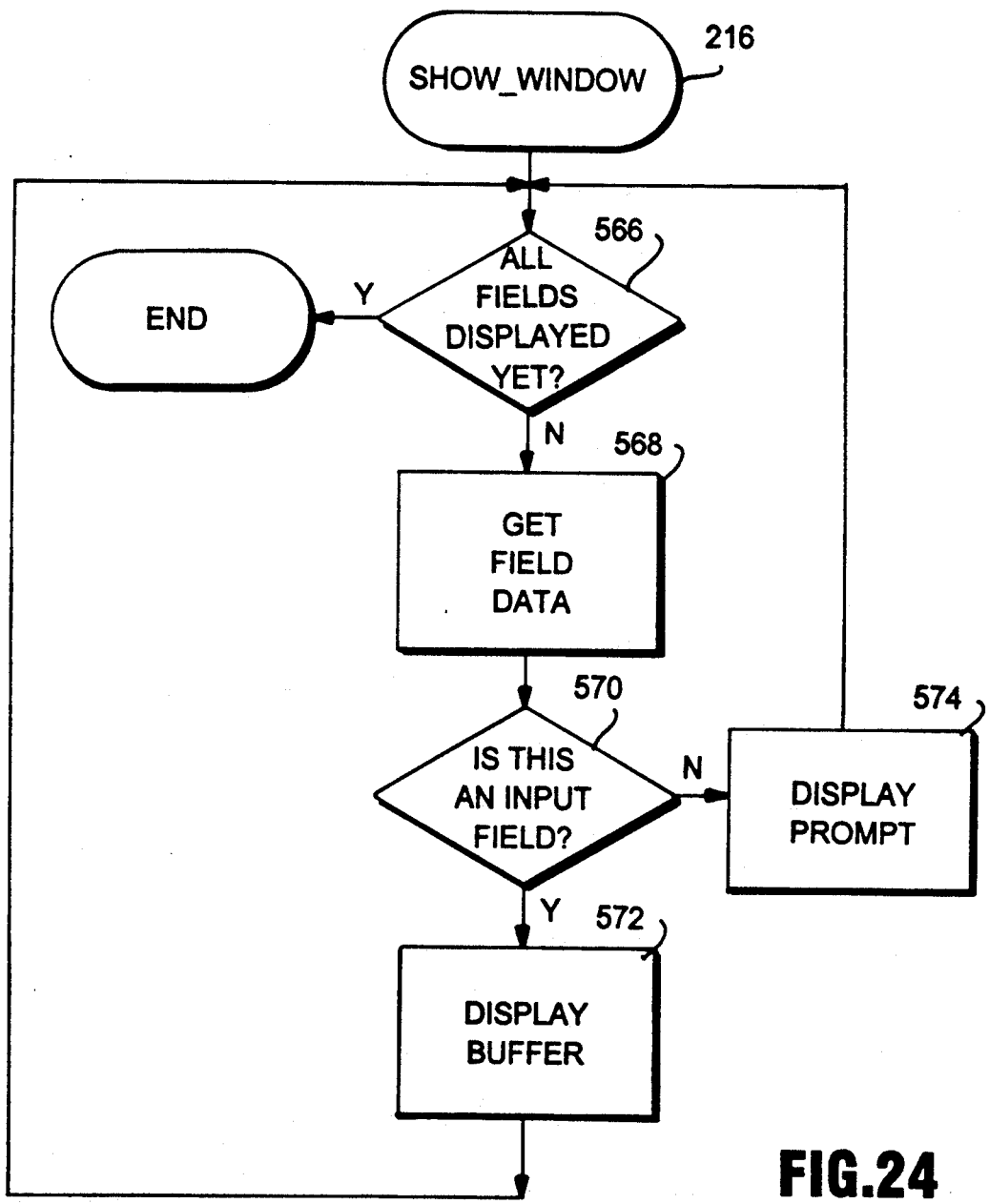

FIG. 24 is a flow chart of exemplary program control steps performed in the preferred embodiment to "show" a window. (See block 216, FIG. 4). In the preferred embodiment, the show window routine 216 displays all of the input and output fields of the window (that is, the "input field impure area information of the EDW window). In the preferred embodiment, the display of the rest of the window, including the box, title area, function key legend, and the like, is handled by the "get window" routine to be described shortly. The show window routine 216 is passed the pointer to window control block 412, displays the input field "impure" area information in the EDW window data structure and otherwise prepares the screen buffer area for a call to the get window routine. When the show routine 216 is executed, it first determines whether all input and output fields are displayed yet (decision block 566). If all input and output fields are not yet displayed, and the field data for the next field is retrieved (block 568) and tested to determine whether the field is an input field (decision block 570). If the field is an input field, then the contents of the text buffer corresponding to the input field (as established by FIG. 12 block 550) is displayed (block 572). If the field is an output field, on the other hand, then the prompt information corresponding to the field is displayed (block 574). The show window routing 216 then terminates (almost always leading to execution of the get window routine shown in FIG. 25).

Figure 25:
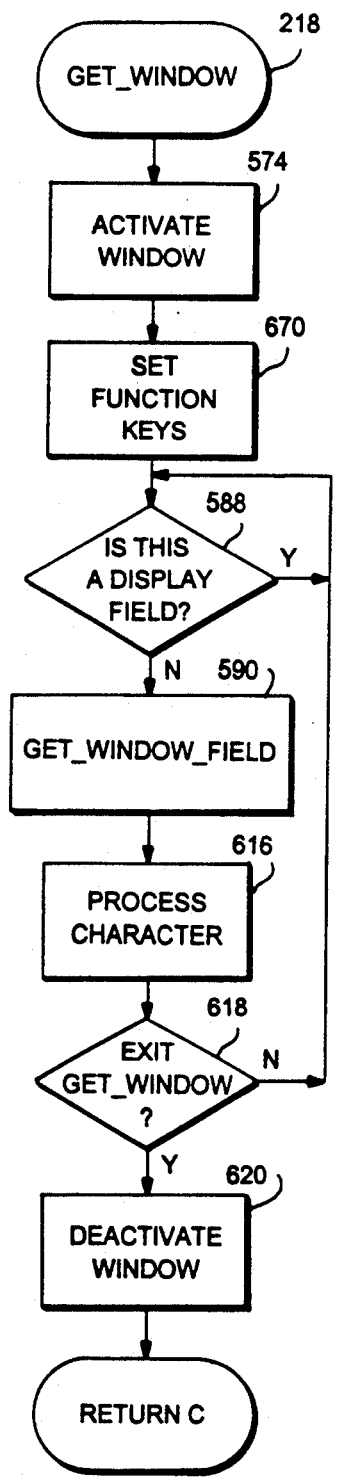

The FIG. 25 "get window" routine 218 is passed pointer to the window control block 412 and an additional value specifying the field of the window in which the cursor is to initially to reside (i.e., to save the user the trouble of manually moving the cursor to an initial field to be filled in). The get window routine 218 causes the remainder of the window to be displayed and also handles user input. Referring to FIG. 25, the get window routine 218 first activates the window (block 574) in order to symbolically deactivate EDW window and activate another by changing the attributes of their borders. In the preferred embodiment, the activate window routine 574 actually changes the old EDW window to single width and the new EDW window to double width, and also changes the function keys assigned to the new EDW window both graphically and functionally.

The activate window routine 574 expects two pointers in the preferred embodiment: "from" and "to". The "from" pointer points to the EDW window that is to be deactivated and the "to" pointer points to the EDW window to be activated. If an EDW window is to be activated without deactivating another EDW window, then a NULL point is passed as the "from" pointer. Conversely, if an EDW window is to be deactivated without activating another, a NULL pointer is passed as the "to" pointer.

Figure 26:
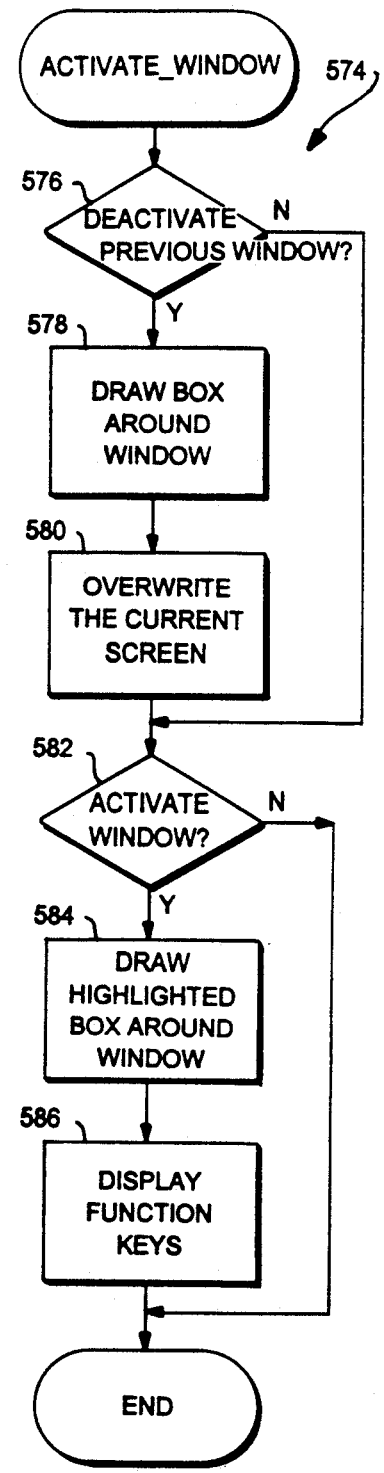

FIG. 26 is a schematic flow chart of activate window routine 574 in the preferred embodiment. Routine 574 first determines whether the previous window is to deactivated (decision block 576)—since in some instances the new window should now supersede the previous window. If the previous window is to be deactivated (decision block 576), then a box is drawn around the new window (block 578) and the current screen is overwritten with the new window information (block 580). As mentioned previously, some screens in the preferred embodiment (e.g., split format display formats) include two windows only one of which is active and the other which is deactivated. Decision block 582 determines whether the new window is to be activated or merely displayed. If the new window is to be activated, then a highlighted box is drawn around the new window (block 584) and a new function key legend display corresponding to the new window is written over the prior function key legends (block 586).

Figure 27:
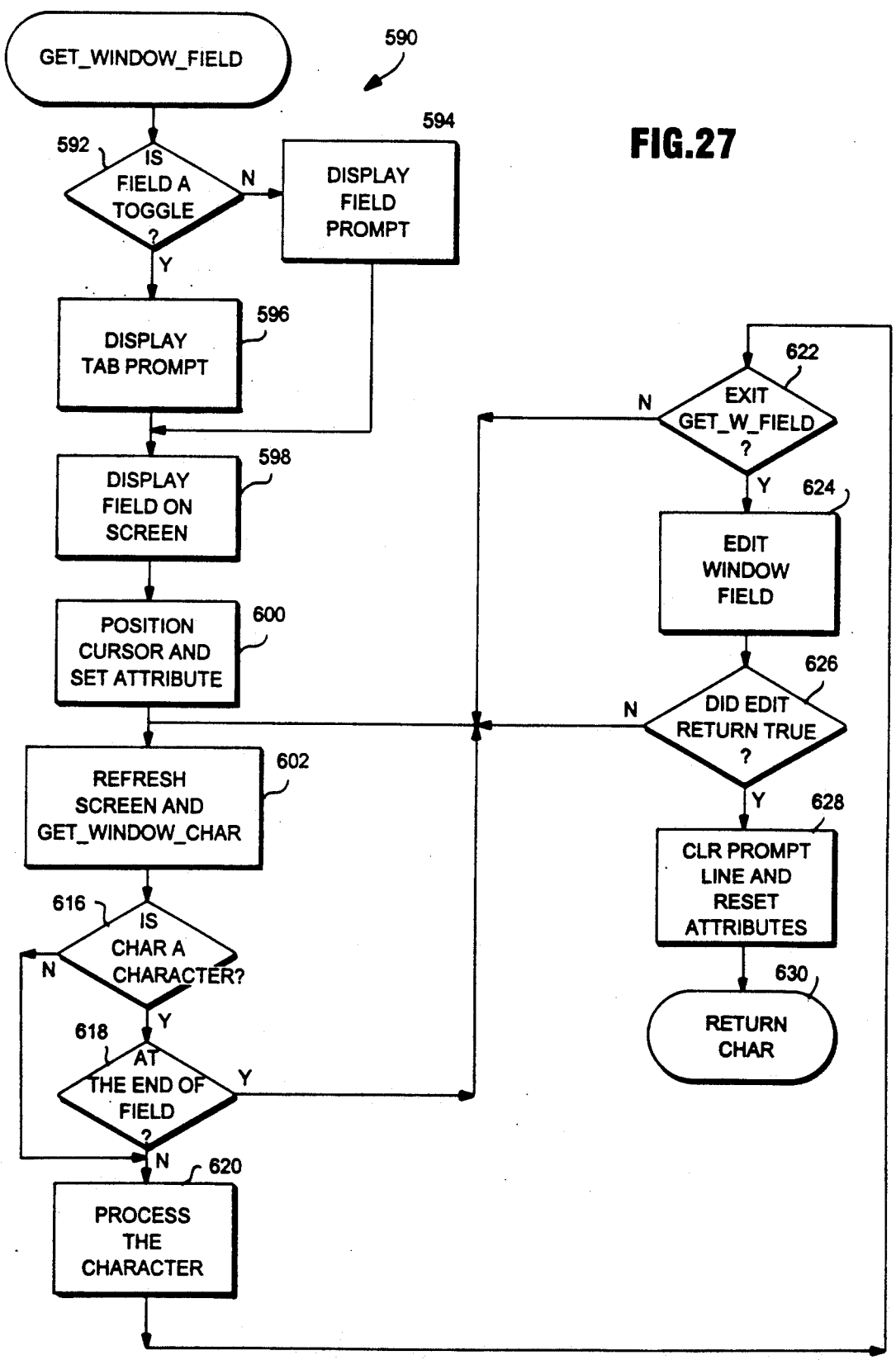

Referring once again to FIG. 25, after the window is activated, decision block 588 determines whether the cursor is within an input field or within an output field. If the cursor is within an input field, then user input is expected and a routine called "get window field" is executed at block 590. A detailed flow chart of this get window field routine is shown in FIG. 27. In the preferred embodiment, it is first determined whether the field is a toggle field (e.g., an input field which contains a logical value or some other small set of possible values) (decision block 592). If the field is not a toggle field, then the field prompt specified by the field control block prompt line pointer 474 (see FIG. 18) is displayed on display 58 (block 594). If the field is a toggle field, on the other hand, the TAB prompt is displayed instead (to notify the user that all he has to do to toggle the field value to another valid value is to depress the TAB key, block 596). The field itself is then displayed on the screen (block 598) and the cursor is positioned and has its attributes set appropriately (block 600).

Figure 28:
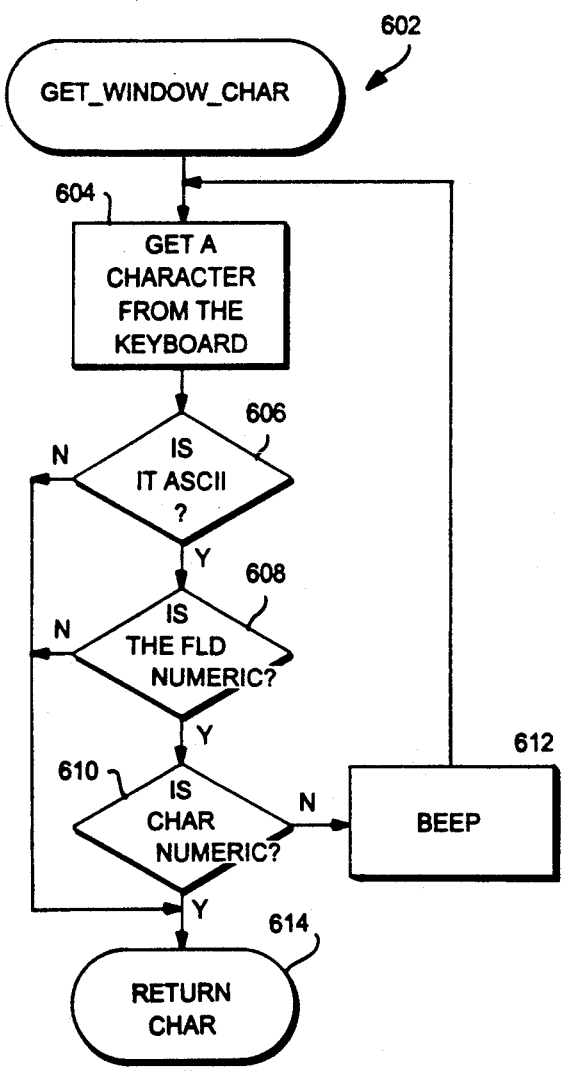

The screen is then refreshed and a routine called "get window character" is performed at block 602. The get window character routine processes user inputs. A detailed flow chart of the get window character routine 602 is shown in FIG. 28. The get window character routine 602 first gets a character from the keyboard (block 604) and then determines whether the character is ASCII (decision block 606). If the received character is ASCII, then routine 602 determines whether the field requires numeric information or alphanumeric information (e.g., by referencing the corresponding field control block 404, decision block 608). If numeric information is required, routine 602 determines whether the character supplied by the user is in fact numeric (decision block 610) and generates a beep or other indication requiring reentry of the character if the character is not numeric (block 612). Otherwise, the character is returned to routine 590 (block 614).

FIG. 23 is a schematic flow chart of exemplary program control steps performed in the preferred embodiment to get a character from the keyboard (i.e., FIG. 28, block 604). Referring now to FIG. 23, the preferred embodiment obtains a character from the keyboard buffer (block 552). This character may be passed to on to FIG. 28 block 606 unchanged, or it may be mapped into other data. In the preferred embodiment, it is possible to dynamically alter the significance of different (e.g., special function) keyboard keys to provide additional flexibility. For example, as has been explained, the preferred embodiment provides various functions to open, display and close display formats. These functions are initiated by providing a function call specifying the name of the function (as is well known to those skilled in this art). However, it is generally desirable to be able to dynamically alter the significance of different keyboard keys so that depressing different keys at different times can cause the same function call to be initiated. In the preferred embodiment, the FIG. 23 routine "filters" all user inputted keystrokes and maps certain keystrokes into function calls—with the specific function calls the keystrokes are mapped into being dependent upon a mapping table which can be specified on a window or field level basis (as will now be explained).

The user inputted character is first tested to determine whether it is an ASCII character (i.e., whether it falls within the range of valid ASCII characters which need not be mapped out but may instead be displayed or otherwise processed directly) (decision block 554). If the retrieved character is a valid ASCII character, it is simply returned (block 556). If, on the other hand, decision block 554 determines that the retrieved character is not a valid ASCII character, it may be mapped into a function call by blocks 558-562. The character is then tested to determine whether it is a null character (decision block 558). If the character is a NULL character (i.e., a character having no correspondence in the current mapping table), then the next character is retrieved (block 560) and steps 552-554 are performed for this next character. If the character is not a NULL character, then the character is mapped (block 560) (e.g., by using a prestored memory lookup table which simply converts input characters to function calls). In the preferred embodiment, a default table lookup called "screen map" is used, for example, to map the INS key into a function call "toggle insert"; the "DEL" key into a function call "delete in place"; etc. The preferred embodiment permits different mapping tables to be used at different times (e.g., based on a pointer stored in field control block 404 or the like). The mapped function call is then returned at block 564.

Referring once again to FIG. 27, if the returned character is in fact a character (decision block 616) then it is determined whether there are any character spaces left within the field to be filled in (decision block 618). If no character spaces remain, then blocks 602-618 are performed once again to get another character. Otherwise, the character is processed at block 620 (e.g., by placing it into a buffer, performing an appropriate function call in response to it, or the like). It is then determined whether routine 590 should be exited (decision block 622). An exit at blocks 622 may occur when the entire field has been filled in. Before exiting the routine 590, however, the preferred embodiment performs a validity check in the preferred embodiment with the user-inputted field value at block 624 by calling an "edit" routine if the field is to be edited (as specified by entry 450 of the field control block 404) (see FIG. 18).

If the window field is to be edited, then the field control block entry 478 is used to point to an edit function used for editing this specific field. This field edit function in the preferred embodiment may perform range checking operations to ensure that the field has been filled in with the value of an appropriate range (e.g., if frequency information is required, the edit function may ensure that only frequency information that is within a valid FCC frequency allocation range and which falls on appropriate channel spacings has been filled in). If the edit block 624 does not return the true value (indicating an invalid value has been filled in, decision block 626), then blocks 602-626 are performed again (thereby requiring the user to reenter the field information). Otherwise, the prompt line is cleared and the attributes are reset and a return to "get window" routine 218 occurs at blocks 628-630.

Referring once again to FIG. 25, upon returning to the get window routine 218, the character return block 590 is processed in an appropriate manner depending upon the particular window being displayed and a particular character returned. For example, if the user depresses the "go back" function key, the get window routine 218 is exited (block 618) and the current window is deactivated (block 620). Similarly, some windows having only one input field (e.g., a window prompting the user for a Y, N) may be exited upon the user response to a single field. Otherwise, blocks 588-618 are performed again for any other fields within the window to allow the user to fill in those input fields.

Figure 29:
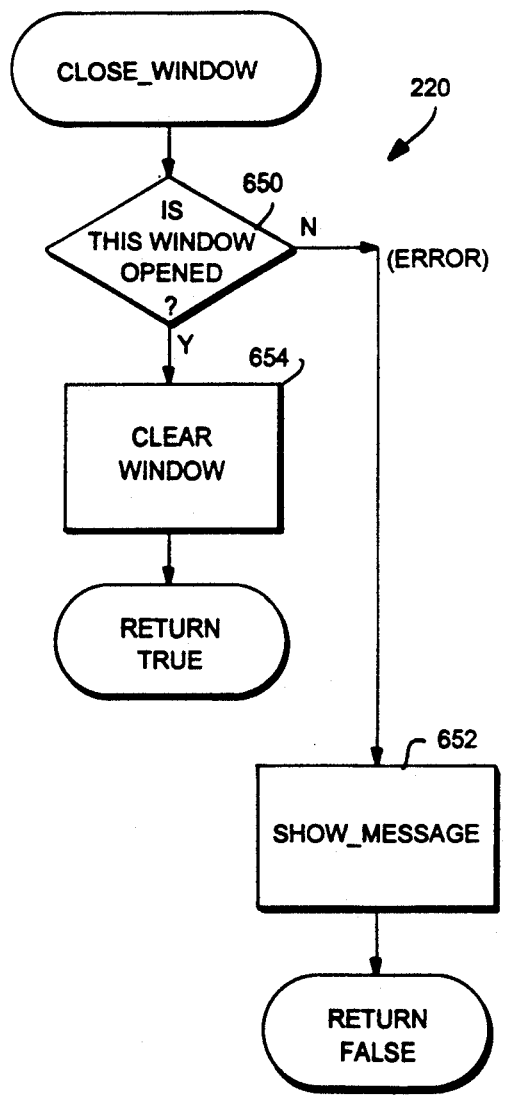

FIG. 29 is a flow chart of exemplary program control steps performed in the preferred embodiment as part of the "closed" window routine 220. The "close window" routine 220 in the preferred embodiment simply closes an EDW window, and returns a true value if it is successful and a false value if it is unsuccessful. If the window to be closed is not even open (as tested for by decision block 650), then an error message is displayed (block 652). Otherwise, the open window is cleared at block 654. To "clear" a window, each one of the individual fields of the window is cleared individually in the preferred embodiment and then the remainder of the window is cleared from the screen.

Figure 30:
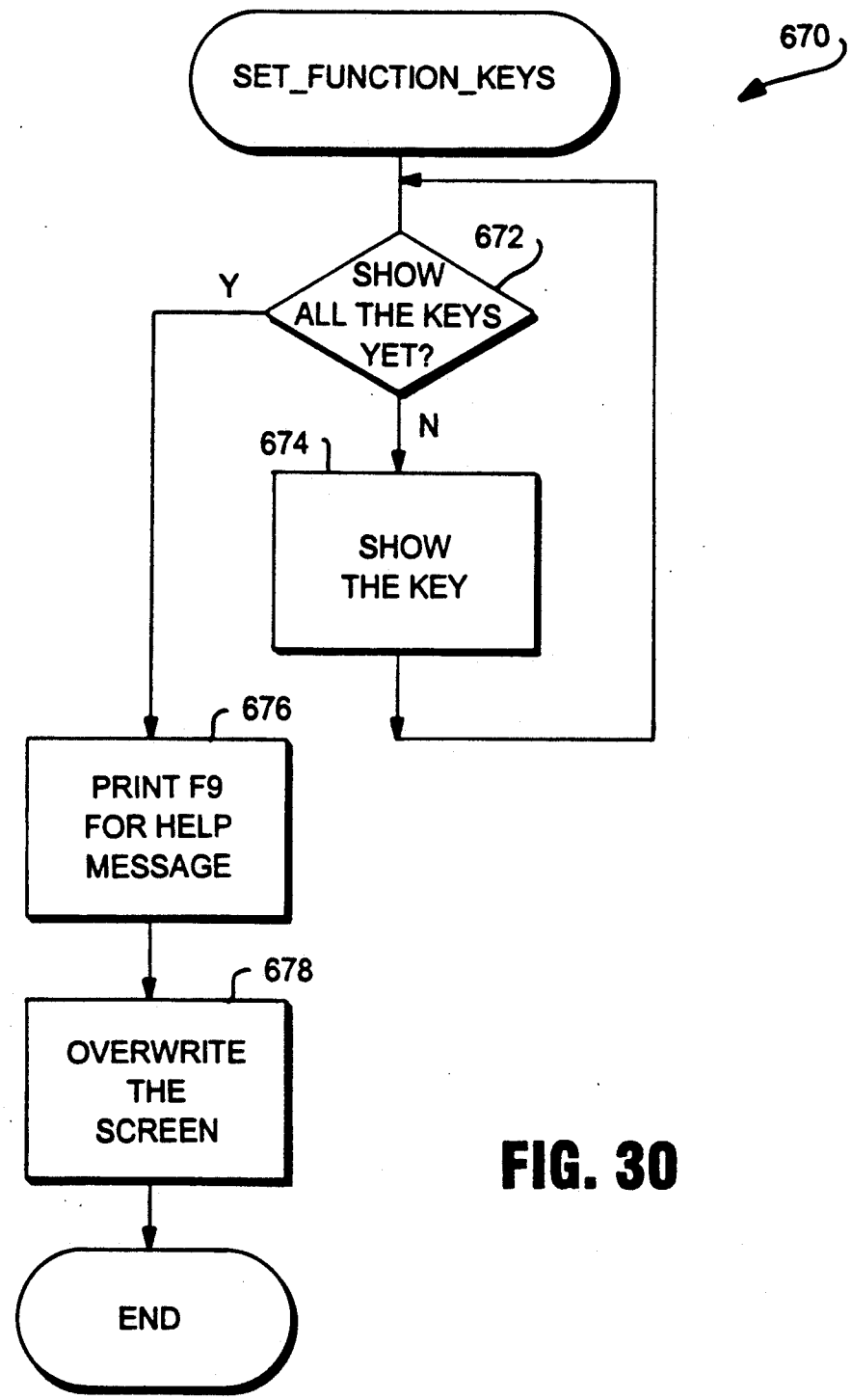

FIG. 30 is a schematic flow chart of exemplary program control steps performed in the preferred embodiment to set and display currently active function keys associated with a particular window. This "set function keys" routine 670 is typically performed as part of the "get window" routine 218 shown in FIG. 25. Decision block first determines whether the legends for all of the function keys have yet been displayed (decision block 672), and if not, proceeds to display a descriptive legend (obtained by referencing the function key label array of the window pointed to by the window control block 412) beneath a legend for each function key. NULL entries in the function key label array 408 indicate that no legend is to be displayed below the indication of that particular function key. At block 676, a descriptive help message indicating that function key F9 is available for field-level help (and Shift-F9 is available for window-level help) as displayed at the bottom of the screen is overwritten to include all new function key labels (block 678).

Figure 31:
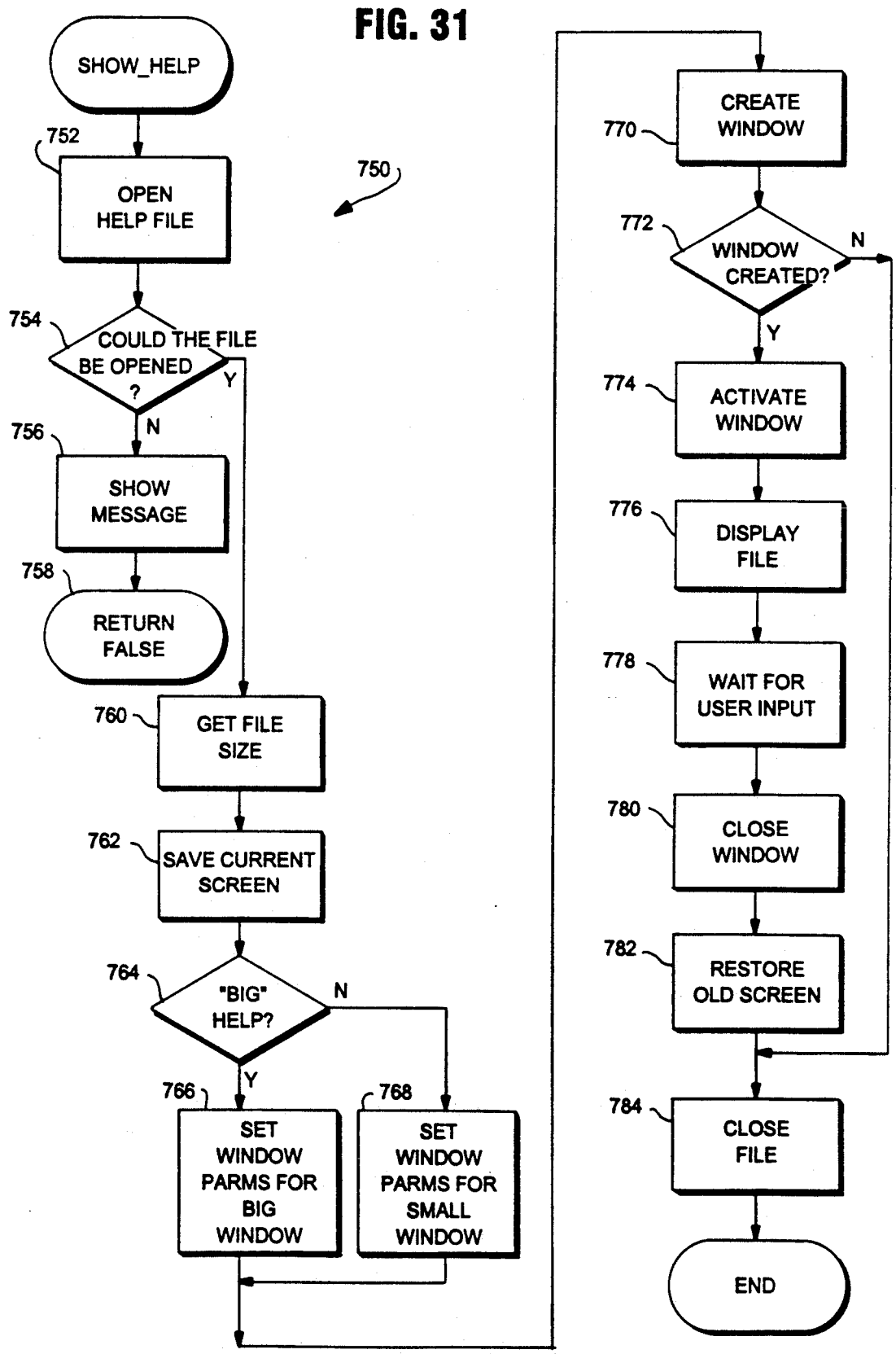

FIG. 31 is a flow chart of exemplary program control steps performed in the preferred embodiment as part of a "show help" routine 750 whenever the user depresses the F9 help key. Upon depressing the help key, a help file is opened (block 752) as a buffer in RAM 82 for storing the help text to be displayed. If this buffer cannot be opened (decision block 754), an error message is displayed whereupon (block 756) and a routine return (block 758). Otherwise, the size of the help text to be displayed is retrieved (block 760)—typically by referencing the window control block 412, window help file pointer 434 to determine which help file is to be used and then determining the size of the help file. Next, the current screen is saved (block 762) so that the after the help text is displayed the user can return immediately where he left off. Decision block 764 then test whether the user has requested a "big" (i.e., window-level) help rather than a field-level help. In the preferred embodiment; a large help window is displayed for window-level help (regardless of the amount of text contained within the window-level help) and a smaller window is displayed for field-level help to enable the user to instantly distinguish between window-level help and field-level help. Thus, if a window-level help has been requested, the parameters are set for a big window (block 766), whereas small window parameters are set for field-level help (block 768). The window is next created (block 770) and its successful creation is tested for by decision block 772. A created window is activated (block 774) and the appropriate help file text is displayed within the created window (block 776).

In the preferred embodiment, the user must depress a kay in order to make the help window cease being displayed (and in this way the user can view the help text as long as he wishes). The user input is waited for at block 778, and once the user does depress a key, the help window is closed (block 780), the old screen is restored (block 782) and the help file buffer is closed (block 784).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

APPENDIX A
CURSES LIBRARY LABELS activate_window                     A-1

* Summary

```
include <window.h> int activate_window (from, to)

wcb_def *from;          Pointer to the old window
wcb_def *to;            Pointer to the new window
```

* Description

The activate_window routine symbolically deactivates one EDW window and activates another by changing the attributes of their borders.
    It changes the old EDW window to single width and the new EDW window to double width.
    It also changes the function keys assigned to the new EDW window, both graphically and functionally.

* Return Value

NONE

* Note

The activate_window routine expects two pointers: from and to.
    The from pointer points to the EDW window that is to be deactivated and the to pointer points to the EDW window to be activated.
    If an EDW window is to be activated without deactivating another EDW window, then pass a null pointer ( null_data_ptr ) as the from pointer.
    Conversely, if an EDW window is to be deactivated without activating another, pass a null pointer as the to pointer.
    ( See Example. )

activate_window

* Example

```
include <window.h>
#include "demo.h"     /* H file created by GNW for a window
                         called 'demo'   */
MAIN ()
    {
    if ( init_window () )
        if ( open_window ( &demo ) )
            {
            activate_window ( null_data_ptr, &demo );
            show_window     ( &demo );
            wrefresh        ( demo.w_ptr );
            get_mapped_char ();
            activate_window ( &demo, null_data_ptr );
            wrefresh        ( demo.w_ptr );
            get_mapped_char ();
            close_window    ( &demo );
            }
    }
``` clear_screen

* Summary include <window.h> int clear_screen (wp, number, character)

WINDOW *wp;              Pointer to TCURSES window
    int number;              Determines number of characters to
                             delete
    char character;          Characters to replace deleted
                             characters

* Description

The clear_screen routine will clear all or a portion of the TCURSES
    window.
    If number == CLR_SCREEN then the entire window will be cleared,
    all attributes reset, and the cursor homed.
    Otherwise, the indicated number of characters will be changed to
    the character passed.

* Return Value

NONE

* Example

```
include <window.h>

MAIN ()
    {
    init_screen   ();
    clear_screen ( curscr, CLR_SCREEN, ' ' );
    }
``` clear_window

* Summary include <window.h> int clear_window (wcb)

wcb_def *wcb;                    Pointer to the window control block

* Description

The clear_window routine clears the input field information
   from the screen.

* Return Value

NONE.

* Example

```
include <window.h>
#include "demo.h"      /* H file created by GNW for a window
                             called 'demo'   */
MAIN ()
    {
    if ( init_window () );
        if ( open_window ( &demo ) );
            {
            show_window  ( &demo );
            get_window   ( &demo, 0 );
            clear_window ( &demo );
            get_window   ( &demo, 0 );
            close_window ( &demo );
            }
    }
``` close_window

* Summary include <window.h> int close_window (wcb)

wcb_def *wcb;                    Pointer to the window control block

* Description

The close_window routine closes an opened EDW window.

* Return Value

This routine will return a TRUE ( 1 ) if successful
   or a FALSE ( 0 ) if it fails.

* Example

```
include <window.h>
#include "demo.h"      /* H file created by GNW for a window
                             called 'demo'   */
MAIN ()
    {
    if ( init_window () )
        if ( open_window ( &demo ) )
            {
            fill_window  ( &demo );
            show_window  ( &demo );
            get_window   ( &demo, 0 );
            close_window ( &demo );
            }
    }
``` draw_bottom

* Summary include <window.h> int draw_bottom (wp, row, lcol, rcol, thick)

| | |
  |---|---|
  | WINDOW *wp; | Pointer to TCURSES window |
  | int row; | The bottom row of the box |
  | int lcol; | The leftmost column number |
  | int rcol; | The rightmost column number |
  | int thick; | Indicates drawing of a thick border when == YES ( 1 ). Otherwise, it draws a single width border. |

* Description

The draw_bottom routine draws the bottom of a box on the screen.
  ( See draw_box )

* Return Value

NONE

* Note

All of the locations designated in the parameters are relative
  to the current window, not the screen.

* Example

```
  #include <window.h>

MAIN ()
       {
       WINDOW *wp;

init_screen ();
       if (( wp = new_window (NULL, 8, 18, 20, 60)) != null_data_ptr)
               {
               draw_bottom ( wp, 10, 0, 40, YES );
               draw_top    ( wp,  0, 0, 40, YES );
               draw_v_line ( wp,  1, 10, 0, 40, YES );
               wrefresh    ( wp );
               getch       ();
               delwin      ( wp );
               }
       }
  ```

* Graphic Examples draw_box

* Summary include <window.h> int draw_box (wp, mode, flag, t_row, b_row, l_col, r_col)

| | |
  |---|---|
  | WINDOW *wp; | Pointer to TCURSES window |
  | int mode; | Attribute of the box |
  | int flag; | Indicates drawing of a thick border when == YES ( 1 ). Otherwise, it draws a single width border. |
  | int t_row; | The top row of the box |
  | int b_row; | The bottom row of the box |
  | int l_col; | The leftmost column of the box |
  | int r_col; | The rightmost column of the box |

* Description

The draw_box routine draws a box in the specified TCURSES window.

* Return Value

NONE

* Note

All of the locations designated in the parameters are relative to the current window, not the screen.

* Example

```
  #include <window.h>

MAIN ()
      {
      WINDOW *wp;

init_screen ();
      if (( wp = new_window (NULL, 8, 18, 20, 60)) != null_data_ptr)
              {
              draw_box ( wp, NORMAL, YES, 0, 10, 0, 40 );
              wrefresh ( wp );
              getch    ();
              delwin   ( wp );
              }
      }
  ```

* Graphic Examples

 

draw_line

* Summary include <window.h> int draw_line (wp, mode, flag, ichar, lchar, rchar, xchar, row,
                 lcol, rcol, xcol)

| | |
  |---|---|
  | WINDOW *wp; | Pointer to TCURSES window |
  | int mode; | The attribute of the line |
  | int flag; | Not used |
  | int ichar; | The character of which the line is made |
  | int lchar; | The character on the left side |
  | int rchar; | The character on the right side |
  | int xchar; | The intersection character |
  | int row; | The row number of the bottom of the box |
  | int lcol; | The leftmost column number |
  | int rcol; | The rightmost column number |
  | int xcol[]; | The intersection column numbers |

* Description

The draw_line routine will draw an horizontal line in the TCURSES
  window at the specified location with one or more crossing characters.

* Return Value

NONE

* Note

All of the locations designated in the parameters are relative
  to the current window, not the screen.

* Example

```
  #include <window.h> int arr[1] = (20);

MAIN ()                /* Draws a four sectioned window */
  {
      WINDOW *wp;
      int j;

init_screen ();
      if (( wp = new_window (NULL, 8, 18, 20, 60)) != null_data_ptr)
          {
          draw_line ( wp, FG_YELLOW|BOLD, TRUE, '\304', '\332',
                          '\277', '\302', 0, 0, 39, arr );

for ( j = 1; j < 5; j++ )
              draw_line ( wp, FG_YELLOW|BOLD, TRUE, ' ',
                              '\263', '\263', '\263', j, 0,
                              39, arr );

draw_line ( wp, FG_YELLOW|BOLD, TRUE, '\304', '\303',
                          '\264', '\305', 5, 0, 39, arr );

for ( j = 6; j < 10; j++ )
              draw_line ( wp, FG_YELLOW|BOLD, TRUE, ' ',
                              '\263', '\263', '\263', j, 0,
                              39, arr );

draw_line ( wp, FG_YELLOW|BOLD, TRUE, '\304', '\300',
                          '\331', '\301', 10, 0, 39, arr );

wrefresh  ( wp );
          getch     ();
          delwin    ( wp );
          }
  }
  ``` draw_line

* Graphic Examples

```
/********$*************$************\     (--+---+---+-----+-----)
``` draw_top

* Summary include <window.h> int draw_top (wp, row, lcol, rcol, thick)

| | |
  |---|---|
  | WINDOW *wp; | Pointer to TCURSES window |
  | int row; | The top row of the box |
  | int lcol; | The leftmost column number |
  | int rcol; | The rightmost column number |
  | int thick; | Indicates drawing of a thick border when == YES ( 1 ). Otherwise, it draws a single width border. |

* Description

The draw_top routine draws the top of a box on the screen.
  ( See draw_box )

* Return Value

NONE

* Note

All of the locations designated in the parameters are relative
  to the current window, not the screen.

* Example include <window.h>

```
  MAIN ()
      {
      WINDOW *wp;

init_screen ();
      if (( wp = new_window (NULL, 8, 18, 20, 60)) != null_data_ptr)
              {
              draw_bottom ( wp, 10,  0, 40, YES );
              draw_top    ( wp,  0,  0, 40, YES );
              draw_v_line ( wp,  1, 10,  0, 40, YES );
              wrefresh    ( wp );
              getch       ();
              delwin      ( wp );
              }
      }
  ```

* Graphic Examples draw_v_line

* Summary include <window.h> int draw_v_line (wp, trow, brow, lcol, rcol, thick)

| | |
  |---|---|
  | WINDOW *wp; | Pointer to TCURSES window |
  | int trow; | The row number of the top of the lines |
  | int brow; | The row number of the bottom of the lines |
  | int lcol; | The column number of the left line |
  | int rcol; | The column number of the right line |
  | int thick; | The thickness of the box (single or double) |

* Description

The draw_v_line routine draws both verticle lines of a box.
  ( See draw_box )

* Return Value

NONE

* Note

All of the locations designated in the parameters are relative
  to the current window, not the screen.

* Example include <window.h>

MAIN ()
  {
      WINDOW *wp;

init_screen ();
      if (( wp = new_window (NULL, 8, 18, 20, 60)) != null_data_ptr)
          {
          draw_bottom ( wp, 10,  0, 40, YES );
          draw_top    ( wp,  0,  0, 40, YES );
          draw_v_line ( wp,  1, 10,  0, 40, YES );
          wrefresh    ( wp );
          getch       ();
          delwin      ( wp );
          }
  }

* Graphic Examples

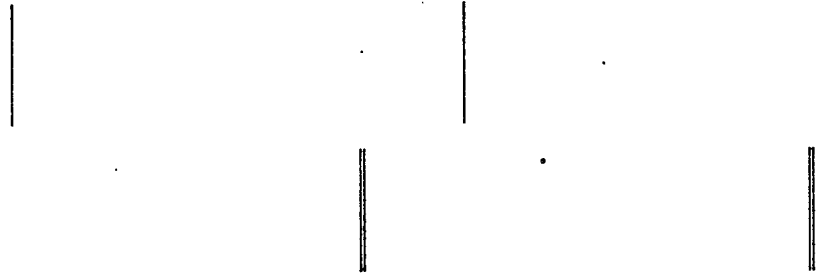

fill_window

* Summary include <window.h> int fill_window (wcb)

wcb_def *wcb;                    Pointer to the window control block

* Description

The fill_window routine moves the information from the fields data
  area to the fields buffer area.

* Return Value

NONE

* Note

The fill_window routine prepares the fields buffer area for a call
  to show_window.

* Example

```
include <window.h>
#include "demo.h"    /* H file created by GNW for a window
                        called 'demo'   */
MAIN ()
    {
    if ( init_window () )
        if ( open_window ( &demo ) )
            {
            fill_window  ( &demo );
            show_window  ( &demo );
            get_window   ( &demo, 0 );
            close_window ( &demo );
            }
    }
``` get_mapped_char

* Summary include <window.h> int get_mapped_char (wp)

WINDOW *wp;                      Pointer to TCURSES window

* Description

The get_mapped_char routine gets a character from the TCURSES window
  passed in by wp.  Then, it translates the character and returns
  a mapped character.

* Return Value

A mapped character translated from the character taken from the
  window.
  Refer to window.h and screen.h for a definition of mapped characters.

* Example

```
include <window.h>
MAIN ()
    {
    char c;
``` get_mapped_char

```c
    if ( init_window () )
        if ( open_window ( &demo ) )
            {
            show_window              ( &demo );
            c = get_mapped_char ( demo.w_ptr );
            close_window             ( &demo );

switch ( c )
                {
                case ( CARRIAGE_RETURN );
                    ()
                case ( F1 );
                    ()
                }
            }
    } char    screen_map[NUM_OF_SPCL_CHARS] =
        { DELETE_FIELD,            /* DLE          */
          0,                       /* SUB          */
          0,                       /* ETX          */
          ISAVE,                   /* HT           */
          MOVE_LEFT,               /* MLFT         */
          MOVE_WORD_LEFT,          /* WLFT         */
          MOVE_RIGHT,              /* MRGT         */
          MOVE_WORD_RIGHT,         /* WRGT         */
          MOVE_UP,                 /* MUPP         */
          CARRIAGE_RETURN,         /* RET          */
          MOVE_DOWN,               /* MDWN         */
          0,                       /*              */
          TOGGLE_INSERT,           /* INS          */
          DELETE_BACK,             /* RUB          */
          DELETE_IN_PLACE,         /* DEL          */
          0,                       /*              */
          DELETE_FIELD,            /* CAN          */
          GO_HOME,                 /* HME          */
          GO_END,                  /* END          */
          0,                       /* EOL          */
          PAGE_UP,                 /* PUP          */
          PAGE_DOWN,               /* PDN          */
          0,                       /* BIG          */
          0,                       /* GMN          */
          0,                       /* BTB          */
          0,                       /* PRT          */
          0,                       /* CPRT         */
          0,                       /*              */
          0,                       /* ESC          */
          0,                       /*              */
          F1,F2,F3,F4,F5,
          F6,F7,F8,IHELP,IEXIT,
          0,0,0,0,0,0,0,0,IBHELP,0, /* f11-f20     */
          0,0,0,0,0,0,0,0,0,0       /* f21-f30     */
          };

/*      THESE ARE THE DEFAULT MAPPED CHARACTERS                       */
``` get_window

* Summary include <window.h> int get_window (wcb, x)

wcb_def *wcb;                    Pointer to the window control block
  int      x;                      The initial cursor field

* Description

The get_window routine gets the EDW window input field information from the screen.
  The integer ( x ) denotes the number of the field with which to start the get.

* Return Value

Returns the direction that the cursor is to move to the next field.

* Note

The window must have an input field or an error will result.

* Example

```
  #include <window.h>
  #include "demo.h"      /* H file created by GNW for a window
                             called 'demo'   */
  MAIN ()
      {
      if (init_window ())
          if ( open_window ( &demo ))
              {
              fill_window  ( &demo );
              show_window  ( &demo );
              get_window   ( &demo, 0 );
              close_window ( &demo );
              }
      }
  ``` init_screen

* Summary include <window.h> int init_screen ()

* Description

The init_screen routine will initialize the screen.
  It should be the first screen call made.

* Return Value

A TRUE ( 1 ) indicates success; a FALSE ( 0 ) indicates failure.

* Example

```
  #include <window.h>
  MAIN ()
      {
      init_screen ();
      }
  ``` init_window

* Summary include <window.h> int init_window ()

* Description

The init_window routine initializes the EDW window run time routines.

* Return Value

This routine will return a TRUE ( 1 ) if successful or a
  FALSE ( 0 ) if it fails.

* Note

This routine calls init_screen, effectively replacing it when using
  the windowing tools.

* Example

```
  #include <window.h>
  #include "demo.h"     /* H file created by GNW for a window
                           called 'demo'   */
  MAIN ()
      {
      if ( init_window () )
          if ( open_window ( &demo ) )
              {
              show_window  ( &demo );
              get_window   ( &demo, 0 );
              close_window ( &demo );
              }
      }
  ``` new_window

* Summary include <window.h> int *new_window (wp, trow, brow, lcol, rcol)

| | |
  |---|---|
  | WINDOW *wp; | Pointer to TCURSES window |
  | int trow; | The row number of the top of the window |
  | int brow; | The row number of the bottom of the window |
  | int lcol; | The leftmost column number of the window |
  | int rcol; | The rightmost column number of the window |

* Description

The new_window routine creates a TCURSES window and returns a pointer
  to the TCURSES window data structure created by new_window.

* Return Value

If successful, a pointer to the new window created.

Otherwise, a NULL pointer.

* Example

```
    #include <window.h>
    #include "demo.h"      /* H file created by GNW for a window
                              called 'demo'   */
    MAIN ()
        {
        WINDOW *wp;

init_screen ();
        if (( wp = new_window (NULL, 8, 18, 20, 60)) != null_data_ptr)
            {
            set_attribute ( wp, NORMAL );
            wprintw        ( wp, "hello" );
            wrefresh       ( wp );
            getch          ();
            delwin         ( wp );
            }
        }
``` open_window

* Summary include <window.h> int open_window (new)

wcb_def *new;                    Pointer to new window to be opened

* Description

The open_window routine opens a new EDW window using the descriptors pointed to by new.

* Return Value

This routine will return a TRUE ( 1 ) if successful or a FALSE ( 0 ) if it fails.

* Example

```
    #include <window.h>
    #include "demo.h"      /* H file created by GNW for a window
                              called 'demo'   */
    MAIN ()
        {
        if ( init_window () )
            if ( open_window ( &demo ) )
                {
                fill_window  ( &demo );
                show_window  ( &demo );
                get_window   ( &demo, 0 );
                close_window ( &demo );
                }
        }
``` put_title

* Summary include <window.h> int put_title (wp, name, title, sub, level)

```
  WINDOW *wp;            Pointer to TCURSES window
  char *name;            Pointer to name
                         ( centered on line 2 )
  char *title;           Pointer to title
                         ( begining on the second column
                           of line 0 )
  char *sub;             Pointer to sub
                         ( begining on the fifth column
                           of line 2 )
  char *level;           Pointer to level
                         ( right justified to the 75th
                           column of line 2 )
  ```

* Description

The put_title routine places a title in the window pointed to by wp.

* Return Value

NONE

* Example

```
  #include <window.h>

MAIN ()
       {
       if ( init_window () )
           {
           set_attribute ( w_tscr, FG_YELLOW|BOLD );
           put_title      ( w_tscr, "NAME", "Title", "Sub", "Level" );

/* w_tscr is the name of the window opened         */
               /* during init_window                              */ wrefresh       ( w_tscr );
           getch          ();
           delwin         ( w_tscr );
           }
       }
  ```

* Graphic Example

The inner box is a representation of the inverse character box actually displayed by put_title.

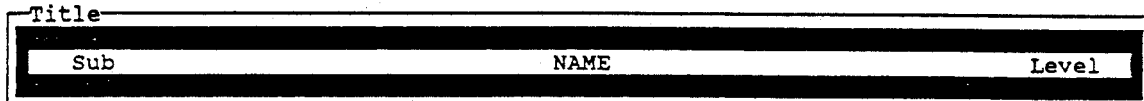

reset_screen

* Summary include <window.h> int reset_screen ()

* Description

The reset_screen routine clears the screen and resets the terminal to edit mode.

* Return Value

NONE

* Example

```
include <window.h>
#include "demo.h"      /* H file created by GNW for a window
                          called 'demo'    */
MAIN ()
    {
    if ( init_window () )
        {
        if ( open_window ( &demo ) )
            {
            fill_window  ( &demo );
            show_window  ( &demo );
            get_window   ( &demo, 0 );
            close_window ( &demo );
            }
            reset_screen ();
            }
    }
``` set_attribute

* Summary include <window.h> int set_attribute (wp, mode)

WINDOW *wp;                    Pointer to TCURSES window
  int mode;                      Attribute of the screen

* Description

The set_attribute routine sets the attributes of a TCURSES window. This routine may also be used to insure the appearance of inverse characters on a monochrome monitor.

* Return Value

NONE

* Example

```
include <window.h>
MAIN ()
    {
    init_screen ();
    set_attribute ( curscr, NORMAL );
    }
``` show_message

* Summary include <window.h> int show_message (mode, text, no_wait)

| | |
  |---|---|
  | int mode; | Attribute of the text |
  | char *text; | Pointer to text |
  | int no_wait; | Indicates automatic removal of message |

* Description

The show_message routine shows a message accross the middle of the screen.
  If no_wait == FALSE, the message is displayed until the user presses a key. At that time, the screen is restored and program execution is returned to the calling procedure.
  If no_wait == TRUE, the message is displayed and program execution is immediately returned to the caller. Restoration of the screen is left to the caller.

* Return Value

NONE

* Example

```
include <window.h>

MAIN ()
    {
    WINDOW *wp;

init_screen ();
    if (( wp = new_window (NULL, 8, 18, 20, 60)) != null_data_ptr)
        {
        set_attribute ( wp, NORMAL );
        show_message  ( FG_YELLOW|BOLD, " In Example Program " ,
                        FALSE );
        wrefresh      ( wp );
        getch         ();
        delwin        ( wp );
        }
    }
``` show_window

* Summary include <window.h> int show_window (wcb)

wcb_def *wcb;            Pointer to the window control block

* Description

The show_window routine displays the input field impure area information in the EDW window.

* Return Value

NONE

* Note

The show_window routine prepares the screen buffer area for a call to get_window.

* Example

```
include <window.h>
#include "demo.h"    /* H file created by GNW for a window
                        called 'demo'   */
MAIN ()
     {
     if (init_window ())
         if ( open_window ( &demo ))
         {
             fill_window    ( &demo );
             show_window    ( &demo );
             get_window     ( &demo, 0 );
             close_window   ( &demo );
         }
     }
```

APPENDIX B  -  USER MANUAL

TABLE OF CONTENTS

INTRODUCTION

CHAPTER 1 — BEFORE YOU BEGIN
    ABOUT THIS MANUAL
    IMPORTANT TERMS
    HOW TO USE WORK SHEETS
    HOW SCREENS WORK
    USING THE KEYBOARD
        Function Key
        Character Keys
        Editing Keys
        Movement Keys
        Special Usage Keys
    S825 CONTROL UNIT PC PROGRAMMING FLOW CHART CHAPTER 2 — INSTALLATION
    UNPACKING
    PC PROGRAMMING SOFTWARE REQUIREMENTS
    DISKETTE HANDLING
    MAKING BACKUPS
    SYSTEM HOOK-UP
    LOADING THE SOFTWARE
        Software Installation
        Program Entry
            Hard Disk
            Dual Floppy

CHAPTER 3 — GETTING STARTED — A TUTORIAL

CHAPTER 4 — RUNNING THE PROGRAM
    INITIALIZATION
    SETTING UP THE PROGRAM
        System Keypad Definition CREATE/CHANGE A PERSONALITY
    <u>Insert/Remove a Mode</u>
    <u>Options</u>
        <u>Sirens</u>
        <u>Channel Guard</u>
        <u>Fnc</u>
        <u>Emergency Signalling</u>
        <u>Radio</u>
        <u>Key</u>
SAVING A PERSONALITY
PROGRAMMING THE PERSONALITY INTO THE CONTROL UNIT
READING THE PERSONALITY OF THE RADIO

CHAPTER 5 — USING THE UTILITIES
    UTILITY WINDOW
    PRINT PERSONALITY
        <u>Print to Screen Option</u>
        <u>Print to Printer Option</u>
        <u>Print to File Option</u>
    DELETE PERSONALITY
    CHANGE DIRECTORIES
    CHANGE EXTENSIONS
    CHANGING THE COMMUNICATIONS PORT

CHAPTER 6 — WHEN PROBLEMS ARISE

APPENDICES
| | |
|---|---|
| A | TERMS |
| B | FUNCTION KEYS |
| C | ACCEPTABLE VALUES |
| D | PRIMARY & EQUIVALENT DIGITAL CODES |
| E | CHANNEL GUARD TONE FREQUENCIES |
| F | WORK SHEETS |

INTRODUCTION

The General Electric Mobile Communications Business welcomes you to the world of mobile communications. We believe there is no equal to GE products and have made a commitment to our customers to ensure that product satisfaction and reliable service is our number one priority.

Built in the USA, the GE S825 Control Unit is a rugged control unit that has been designed to give you greater flexibility and ease of use. From the oversized, color-coded, uniquely shaped buttons to the user programmable features of the siren/lights and auxiliary buttons this control unit has an unparalleled level of flexibility and friendliness.

This manual is organized to support you in programming the S825 Control Unit and will discuss:

o the steps necessary to install the program, o the procedures to actually program the personality, o answers to some of your questions.

Whether you are a technician experienced in programming other GE control units or a first time user, this manual has been written to give you a clear and concise understanding of the S825 Control Unit.

CHAPTER 1 – BEFORE YOU BEGIN

ABOUT THIS MANUAL

Specifically, this manual is designed to present you with all the necessary information required to connect the S325 Control Unit to the computer and run the programming software.

Chapter 1 – provides you with some basic information you will need to know prior to running the software. It explains how to use the work sheets, keyboard layout, commonly used terms and screen/window functionality.

Chapter 2 – contains a list of the contents of this package and instructions for installing the S825 Control Unit.

Chapter 3 – is a short tutorial that will lead you through the basic operation of the program. If you are not familiar with programming procedures it is recommended that you take the time to complete the tutorial.

Chapter 4 – will instruct you in the creation of a control unit personality. The purpose of each screen/window is discussed in detail and what is required so that your control unit will operate the way you want it to.

Chapter 5 – gives you file management information such as changing directories, changing file extensions, and deleting files.

Chapter 6 – is devoted to problem solving. It identifies the error messages that you will encounter and provides solutions and alternatives.

Appendices – The Appendices follow Chapter 6 and contain the following reference materials:

A. Terms – Definitions of frequently used words.

B. Function Keys – A listing of what function keys you will run across and a definition of what function they will perform.

C. Acceptable Values – The range of values the PC Programmer will accept for a specific field.

D. Primary & Equivalent Digital Codes – A table indicating usable Digital Channel Guard codes.

E. Channel Guard Tone Frequencies – A table indicating standard EIA Channel Guard tone frequencies.

F. Work sheets – Prepared forms to assist you in organizing your thoughts prior to entering the data in the program.

Screen diagrams are used throughout this manual to help clarify section discussions. Each item being discussed is denoted by a number for easy identification.

Please pay particular attention to NOTES as they contain pertinent information that you should be aware of.

IMPORTANT TERMS

Default Value – The S825 Control Unit software provides predetermined (default) values in a majority of the data entry fields within the program. Exceptions to this rule are fields requiring variable names, dates, and serial numbers. The default values assume that the control unit will be used without optional features. Before changing these default values, we recommend that you be familiar with the operational implications of adding a particular feature or option to the control unit being programmed.

Error Messages – Each time data is entered in the program a validity check is made to ensure that reasonable values were entered. In the event that the data does not fall within the acceptable range of values, an error message will be displayed in the center of the screen indicating non-acceptance.

Field – Refers to the area of the screen/window which allows data entry. This area is readily identifiable by reverse video when moving the cursor across the screen.

Help – Throughout the Control Unit PC Programmer Software, Help denotes or refers to on-line assistance. This can be accessed by pressing the F9 Help key from any field.

Personality – Used generically to refer to information that is stored in the control unit that makes one control unit perform differently from all other control units. That information can be created, deleted or modified and stored on a disk for later reference.

Prompt Line – Assistance text located on the last line of the window. This line provides directions for entering data and changes when moving from field to field.

HOW TO USE WORK SHEETS

Work sheets can be found in Appendix F. They are pre-printed forms to assist you in organizing personality information prior to going to the computer. You are encouraged to make copies of these work sheets and fill them in before programming begins. Doing so can prevent costly and time consuming mistakes and can be used for future reference. Empty blocks in the work sheets are provided for you to fill in the desired values. Blocks with information already typed in represent toggle fields in the program where the appropriate response should be circled.

Frequency Sets Work Sheet Definition – Work Sheet A in the Work Sheet Folder. This work sheet will assist you in defining the frequency sets for the data base, allowing you to define 13 channels worth of information. Space has been provided for writing in the channel name, frequency information and Channel Guard information.

Mode Work Sheet – Work Sheet B in the Work Sheet Folder. This work sheet is used to assist you in defining mode data. Space has been provided for defining up to four modes.

Control Unit Options Work Sheet – Work Sheet C in the Work Sheet Folder. This work sheet presents the options available for the control unit.

Radio Options Work Sheet – also on Work Sheet C in the Work Sheet Folder. This work sheet presents all of the available options for the associated radio.

Siren/Light Combinations Work Sheet - Work Sheet D in the Work Sheet Folder. The siren/light work sheet will assist you in defining the wail, yelp, and siren/light combinations. Room has been provided to select the siren to use and indicate which combination of lights you desire for the function.

Channel Guard Table Work Sheet - Work Sheet E in the Work Sheet Folder. The Channel Guard work sheet is used in defining the Channel Guard override selection table for the control unit. Space has been provided to enter a three character ID and transmit and receive Channel Guards for each of the 14 entries.

HOW SCREENS WORK

Each screen is divided into three areas: (1) screen title, (2) screen windows, and (3) active function keys. The title tells you where you are in the program hierarchy. Screen windows provide for input of data to the screen. Active function keys provide access to commands (or actions) available within that screen. The function key commands are labeled along the bottom of the screen. Only the function keys with labels are enabled in a given screen or window.

A window is a section of a screen that displays previously stored information, enables programming alternatives, or accepts data currently being entered. There may be more than one window within a particular screen. Each window is outlined within the screen presentation.

There are two types of windows: active and passive. The active window is available for data entry or revision and can be identified by its highlighted borders. The passive window is displayed but is unavailable for program execution. In the case that windows have overlapping borders, the active window is presented in the foreground.

Like the screen, windows are divided into three distinct sections. They are: (1) window title, (2) work area, and (3) prompt line. The window title describes the function currently being performed. The work area is the space provided for your input to the window. The prompt line is printed information in the lower portion of the window defining in further detail the action to be taken in the work area.

This program uses a series of presentation screens to guide you easily through the programming of a control unit. There are four major categories of data entry screens:

- Current Personalities Screen
- Control Unit Personality Screen
- Currently Defined Frequency Sets Screen
- Frequency Set Definitions Screen

Current Personalities Screen - The Current Personalities Screen lists the file names of all stored control unit personalities presently maintained in this special directory. From this screen you can create a new personality (file) or make changes to existing personalities. You then have the option of initiating one of the actions indicated by the function keys at the bottom of the screen.

Control Unit Personality Screen - Data defining the control unit personality is entered into the Control Unit Screen which can be accessed from the Current Personalities Screen by pressing function keys F2 Change or F4 New. Within this screen you can define the operational characteristics of the control unit. This includes channel data, signalling schemes, and control features. There is also a window for storing text you may want to record.

Currently Defined Frequency Sets Screen - This screen shows the currently defined frequency sets residing in the data base. Immediately below the title is the directory in which the currently defined frequency sets reside. This directory is referred to as the Pool directory. From this screen you can create, edit or delete a frequency set.

Frequency Set Definition Screen - This screen is used to create/edit frequency sets. A frequency set is a collection of channels all within the same band split that will be assigned to a mode.

USING THE KEYBOARD

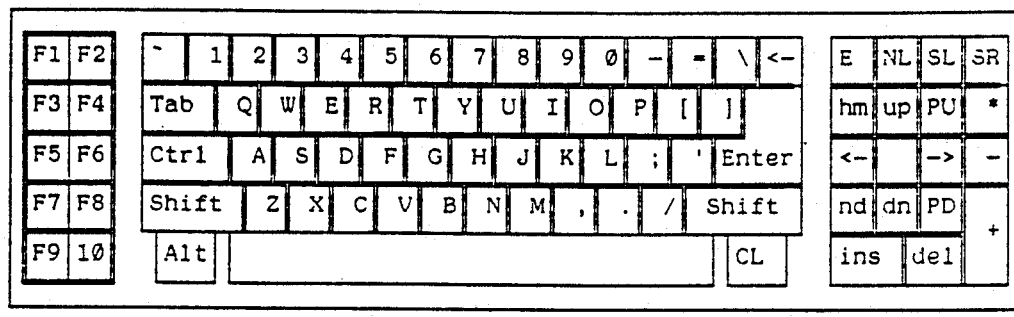

FIGURE 1 - KEYBOARD

It is important that you be familiar with the keyboard of your computer system. Each keyboard is different in relation to the placement of some of the keys. In the PC Programming Software package there are categories of operational keys:

- o  Function
- o  Character
- o  Editing
- o  Movement
- o  Special Usage

The following sections give an overview of which keys are included in these categories and their functions. However, in some screens, such as the Current Personalities Screen, only the use of cursor keys is allowed because selection operation is all that is needed.

Function Keys

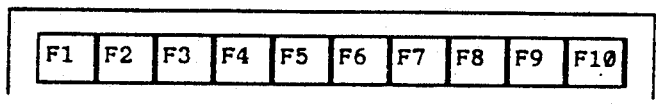   OR:

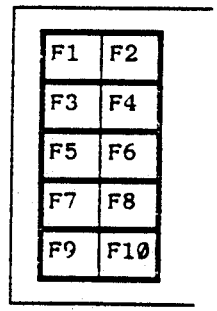

The purpose of a particular function key is dependent upon the screen or window that is currently highlighted at any given point in the program. In other words, a function key may be labeled differently from one screen or window to the next. Be sure that you fully understand the purpose for any function key prior to pressing it.

The command or action associated with a particular function key is labeled on the lower portion of your screen. There are two types of function keys: Inactive and Active.

Inactive function keys have no operational capabilities during execution of a given screen and are not labeled on the screen.

Active function keys, on the other hand, are labeled. By pressing a specific function, the software executes the action delegated to that particular key.

The function keys are alphanumerically labeled F1 - F10. These keys will perform specific functions, depending upon which screen/window they appear in. The following Function Key Table represents their functionality in the SS25 PC Programming Software.

FUNCTION KEY TABLE

|   | F1 | F2 | F3 | F4 | F5 | F6 | F7 | F8 | F9 | F10 |
|---|----|----|----|----|----|----|----|----|----|-----|
| A | Setup | Change | Utilty | New | Progrm | Read | | | Help | Exit |
| B | Switch | Freq | Keypad | Range | | | | | Help | Back |
| C | | Change | | New | Delete | | | | Help | Back |
| D | | Insert | Remove | | Store | | | | Help | Back |
| E | Yes | No | | | | | | | Help | Back |
| F | Detail | Insert | Remove | Signal | Progrm | | Option | More | Help | Back |
| G | Detail | Insert | Remove | Scan | Progrm | | Option | More | Help | Back |
| H | Port | | Dir | | Delete | Print | Ext | | Help | Back |
| I | Siren | CG | Fnc | Signal | Radio | Key | | | Help | Back |
| J | | Freq | | Text | | | | More | Help | Ba |
| K | | | | | | | | | Help | Back |

A — Current Personalities Screen
B — Setup Windows
C — Currently Defined Frequency Sets Screen
D — Frequency Set Definitions Screen
E — Change/Edit File Window
    Comm Port Setup Window
    Delete File Window
    Change Extension Window
    Read Radio into File Window
    Save File Window
    Change Directory Window
    Print Personality Window
    Program Radio Window
F — Control Unit Personality "Scan" — New Window
G — Control Unit Personality "Signal" — New Window
H — Utility Window
I — Control Unit Options Window
J — Control Unit Personality — More Window
K — Siren/Lights Window
    Function Button Window
    Radio Options Window
    Scan Keypad Definition Window
    Channel Guard Window
    Emergency Signalling Window
    System Keypad Definition Window

Character Keys

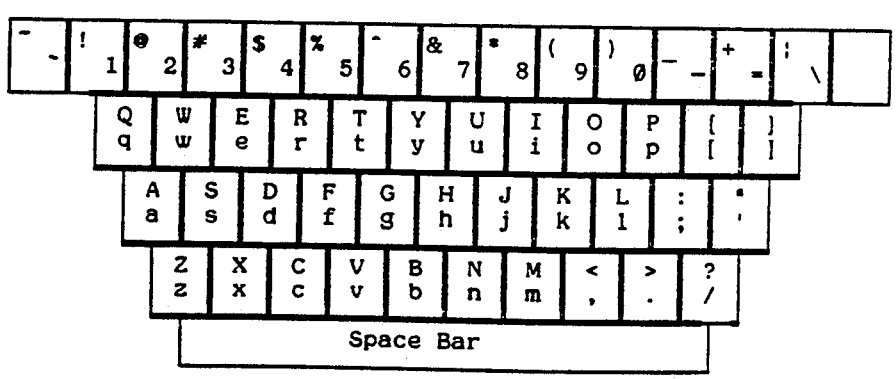

Character keys are used to enter data into a field. When pressed, the software inserts that character in the field position designated by the cursor and then advances to the next available character position. Character keys for the purposes of this PC Programming Software package are:

o  Alphabetic: (a - z) and (A - Z)
o  Numeric: (0 - 9)
o  Special Characters  ~`'",.?!;:@#$%^&*!-+=<>(][}()\/
o  Space Bar Editing Keys

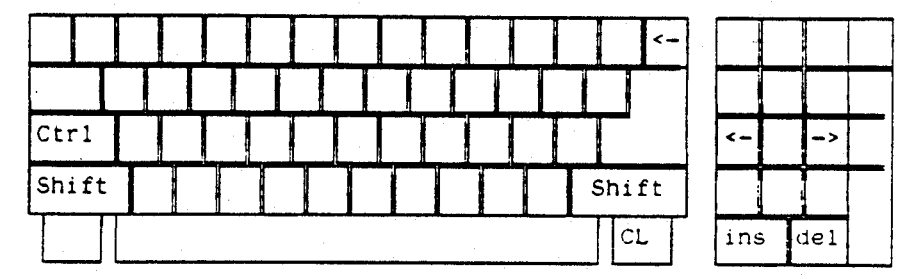

Editing keys manipulate the data within a field. These keys are:

Left and Right Arrows: Each time one of these arrows is pressed it moves the cursor one character to the left or right until the left or right most position is reached.

Backspace: As the cursor moves to the left the character immediately to the left of the cursor is deleted.

Insert: This key toggles the insert operation on and off. The insert operation enables you to insert a character or a string of characters without overwriting any previously entered information.

Delete: This key enables you to delete a character or a string of characters.

Shift/Caps Lock: Enabled, the Shift and Caps Lock key writes all alphabetic characters in capitalized letters.

Control/Left Arrow: When both keys are simultaneously pressed, the cursor is moved to the left most character in the field.

Control/Right Arrow: When both keys are simultaneously pressed, the cursor is moved to the right most character in the field.

Control Backspace: By simultaneously pressing both keys all characters to the left of the cursor are deleted and then all characters opposing the deletion are moved right or left to fill the space.

Movement Keys

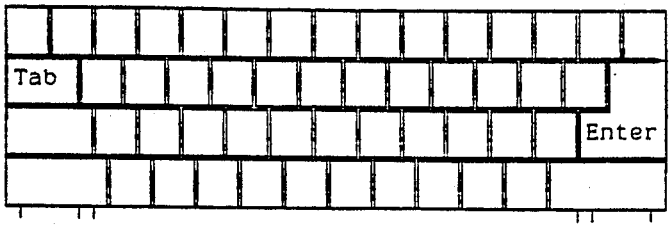 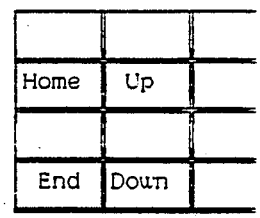

These keys enable the movement or cursor positioning on the screen. They are also used to indicate an end of input in the current field.

__Enter__: The data entered into the present field is accepted and the cursor is advanced to the next field.

__Up Arrow__: The data entered into the present field is accepted and the cursor is returned to the previous field.

__Down Arrow__: The data entered into the present field is accepted and the cursor is advanced to the next field.

__Home__: Moves the cursor to the first!field in the window.

__End__: Moves the cursor to the final field in the window.

__Tab__: Toggles a predetermined field between selections such as a Yes or No response. May also move the cursor into the next field.

Special Usage Keys

Two keys are represented in this category:

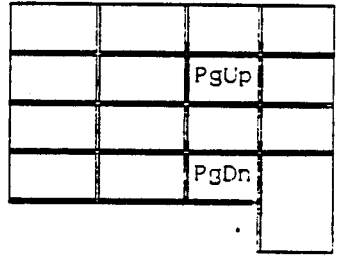

Page Up (Pg Up): Used to return to the previous page in the Control Unit Personality Screen and the Frequency Set Definitions Screen. The screen will advance one page at a time until the beginning page is presented. Also used in a similar manner in the Help Window.

Page Down (Pg Dn): Used to advance to the following page in the Control Unit Personality Screen and the Frequency Set Definitions Screen. The screen will retreat one page at a time until the last page is reached. Also used in a similar manner in the Help Window.

S825 CONTROL UNIT PC PROGRAMMING FLOW CHART

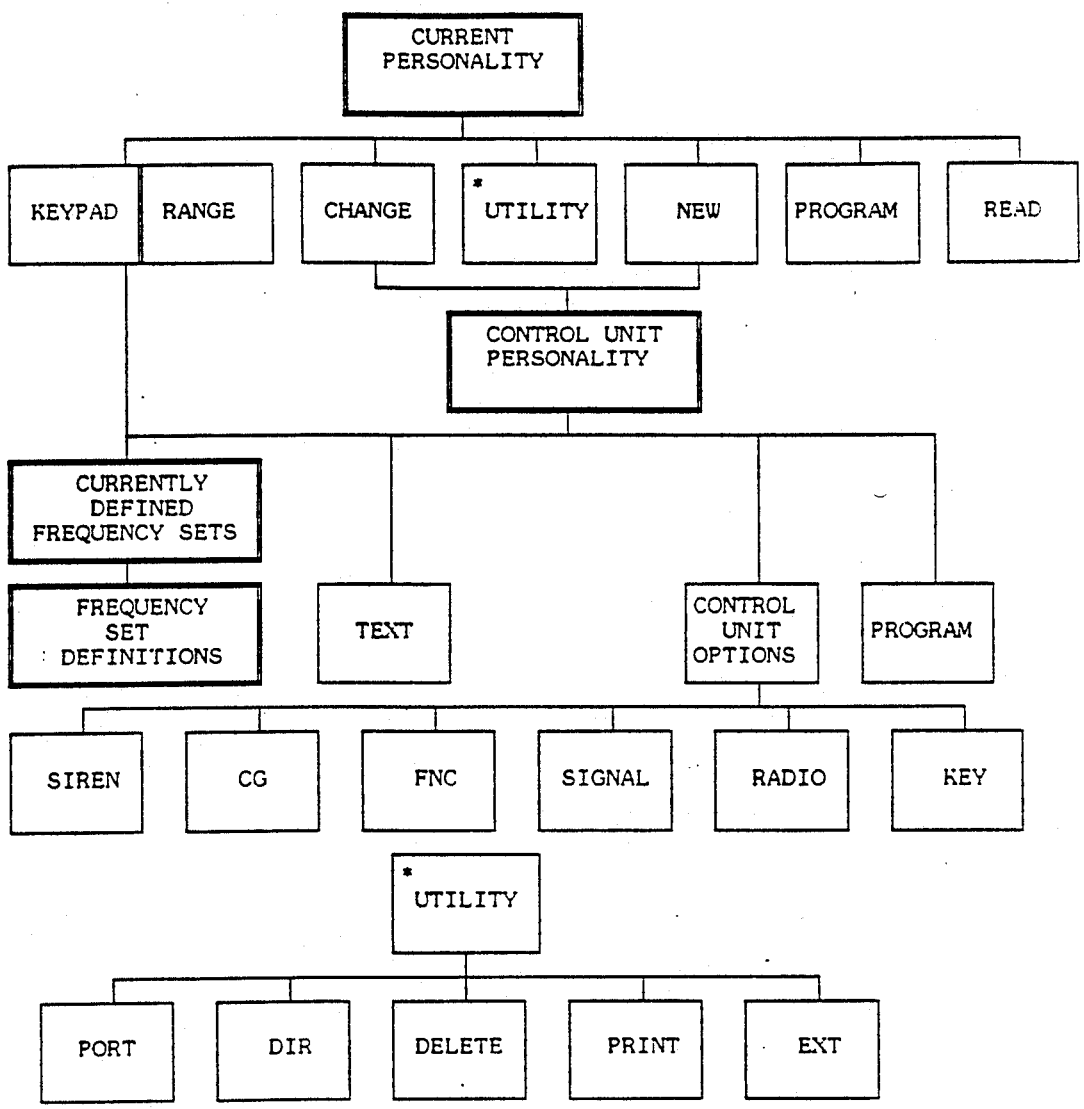

CHAPTER 2 - INSTALLATION 2.0  UNPACKING

Upon unpacking this package you should be sure you have received the following:

- Control Unit Programming Software (TQ-3337), to include: Two double-sided, double-density 5-1/4 inch diskettes. (One labeled "Program Disk # 1" and the other labeled "Program Disk # 2".)
  Or, a single 3-1/2 inch diskette.

- S825 Control Unit Programming Cable (TQ-3338).

PC PROGRAMMING SOFTWARE REQUIREMENTS

The following hardware and software is required to program the S825 Control Unit:

A. IBM PC/XT/AT or any true compatible with MS-DOS version 3.0 or later, and having the following minimum configuration:

1. Two Disk Drives, either dual flexible (floppy) or a single floppy with fixed (hard) disk drive system.

2. 640K Internal RAM.

3. Serial Port.

4. Parallel Port (recommended) for connection of a printer.

B. Serial Programming Interface Module (TQ-3313) and RS-232 Cable (part # 19B235027P1).

C. Control Unit Programming Cable (TQ-3338).

D. S825 Control Unit Programming Software (TQ-3337).

E. Printer (optional, but recommended).

DISKETTE HANDLING

While working with your diskettes you may want to consider the following handling procedures:

- Always store your diskettes in their envelope.

- Insert diskettes into the drive carefully.

- Use only felt tipped pens to write on diskette labels.

- Store your diskettes at a comfortable room temperature.

- Refrain from touching the recording surface.

- Do not bend the diskettes.

- Do not allow any form of liquid to come in contact with the diskette surface.

- Keep diskettes away from magnetic force fields as found in electronic equipment.

If you follow these simple guidelines you will receive long service from your diskettes.

MAKING BACKUPS

The PC Programming Software is provided to you on two double sided double density 5-1/4 inch diskettes. One is labeled "Program Disk # 1" and the other is labeled "Program Disk # 2". These diskettes are very sensitive and fragile and, therefore, should be handled with care and stored in a secure area.

We recommend that, upon receipt of your diskettes, you copy the original PC Programming Software diskettes to other diskettes or a fixed disk and store the originals in a safe place. This ensures the availability of an accurate program should a copy fail during program applications. The copy you have made for your daily programming tasks will be referred to in this manual as the "working copy".

NOTE: It is important to use the Diskcopy command when making backups and not the Copy or Xcopy command. Each diskette contains a volume label that is required for the installation process. Copy and Xcopy do not copy volume labels so please refrain from using these commands.

SYSTEM HOOK-UP

Connect all peripheral equipment to your computer prior to configuring the PC Programming Software items. Remember to refer to the operating manuals of each device for correct installation procedures.

If your system is already established, check to see that you have all the equipment necessary to execute the program. Isolate all cables connecting computer to devices to prevent tangling, interference and damage.

Step One:

Refer to Figure 2 - Programming System Hook-Up, and then look at your computer to locate a serial port. This port will usually be located at the rear of the computer. However, since this is dependent upon the design of your computer refer to the computer operator's manual for directions.

The IBM PC/XT/AT systems support up to two serial ports. There are two physical standards for the serial port configurations of personal computers. The most common is the 25 pin RS-232 output that has a DB-25 male connector at the computer. The other standard is a DB-9 male connector at the computer (used on the IBM-AT and many portable lap-top computers). The PC Interface Module, like most data communications equipment, uses a standard RS-232, DB-25, female connector. If your computer uses a DB-9 connector, you will need to purchase a DB-9/DB-25 interface cable from your local computer dealer.

Please note at this point that the S825 Control Unit PC Programming Software only communicates with the control unit and its interface on the serial port designated as COM1 or COM2. Your computer references will assist you in determining which serial port has been so designated. Once located, examine the keyed plug on the RS-232 cable for the correct keyed end and insert it carefully into the appropriate serial port on the computer.

FIGURE 2 - PROGRAMMING SYSTEM HOOK-UP

The other end of the RS-232 cable should now be connected into the computer receptacle on the PC Interface Module. Check carefully to ensure that plugs are fully seated in the receptacle and, if retaining screws are included, that they are carefully tightened to firmly hold the plug in place. Should the plug not seat correctly to its receptacle, remove the plug and examine the pins to determine if the proper plug was inserted and to determine if pins are aligned and undamaged. Damaged pins and broken connections will cause the PC Programming Software to fail.

Step Two:

Position your S825 Control Unit on your work area in a convenient place. In order to program the unit, you must connect the control unit to a DC power supply. Ensure that power is applied to the control unit prior to attempting programming.

Connect the PC Programming Cable (TQ-3338) as depicted in Figure 2. The Programming Cable is inserted into the receptacle on the back of the control unit. Again you should ensure that the plug is fully seated in its receptacle. The cover must be removed before connecting the cable.

LOADING THE SOFTWARE

The PC software can be installed on a fixed drive or run from floppy diskettes in a dual floppy drive configuration.

Software Installation

This section is for hard drive users only. If dual floppies are being used, skip this section and go on to "Program Entry".

5-1/4 Inch Diskettes:

When using 5-1/4 inch diskettes, the software installation is initiated by inserting Program Disk # 1 in floppy drive A: and typing the following:

INSTALL <enter>

The screen in Figure 3 - Software Installation Screen, will appear.

---

GE Mobile Communications

| S825 INSTALLATION PROCEDURE |
|---|

RADIO PROGRAMMING SOFTWARE
INSTALLATION PROCEDURE

This procedure will install your Radio Programming Software onto the drive which you specify. The procedure will prompt you when you need to insert a different diskette.

TARGET DRIVE:  X

| F1 Install | F2 | F3 | F4 | F5 | F6 | F7 | F8 | F9 Help | Exit |
|---|---|---|---|---|---|---|---|---|---|

FIGURE 3 - SOFTWARE INSTALLATION SCREEN

Enter the target drive and press F1. This will cause the program to copy the files from the distribution diskettes to your hard drive. The program will prompt you to remove Program Disk # 1 and insert Program Disk # 2 during the install routine.

3-1/2 Inch Diskette:

When using the 3-1/2 inch diskette the software installation is initiated by inserting the Program Disk in drive A: and typing the following:

INSTALL <enter>

When the screen in Figure 3 appears, enter the target drive and press F1. This will cause the program to copy the files from the distribution diskette to your hard drive.

2.5.2 Program Entry

To help you manage your PC programming software, General Electric has created a directory structure, or filing system, for your programs. This filing system is created whenever any PC programming software is installed on your hard disk and also applies to floppy disk users.

When the S825 PC programming software is installed, a directory structure consisting of five subdirectories is created. This structure is represented graphically as follows:

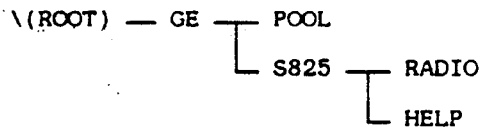

The first directory created is the GE directory; the main directory under which all GE PC programming software will be stored. This directory will contain a batch file that is used to invoke the S825 software. From the GE directory, two subdirectories are created; Pool and S825. The Pool directory is used to store frequency sets that are created during program operation while the S825 subdirectory contains all of the executable programs.

The PC programming software is distributed with a number of help files that reside in the Help directory and are used by the program whenever the F9 Help key is pressed. These files are only required to support the on-line help facility and may be removed if on-line help is no longer required. The final directory created is the radio directory. The purpose of this directory is to hold the personalities created during program operation.

Directories can be used very effectively in organizing your programming personalities. It is highly recommended that you familiarize yourself with directories. Refer to your DOS Users Manual for more information.

Hard Disk:

Once you have completed the installation procedure, the following steps may be taken to access the S825 Control Unit PC Programming Sofware:

Type: C: <enter>   this step will ensure that the current drive is C:

Type: cd\GE <enter>   this step will ensure that the current path is the root directory Type: S825 <enter>

The S825 PC Programming Software is now loaded into memory and an introductory screen appears identifying the program.

Dual Floppy:

Insert the DOS disk in drive A: and "boot" or turn on the system. Place Program Disk # 1 in Drive A: and a formatted disk in Drive B: and Type: A:   to ensure that the current drive is A:

Type: cd\GE <enter>   to ensure the current path is the root
                      directory Type: S825 <enter>    to bring you into the introductory
                      screen (Current Personalities Screen).

When the Current Personalities Screen appears, replace
Program Disk # 1 in drive A: with Program Disk # 2.

NOTE:   The formatted disk in Drive B: will become your data
        disk on which you will store the personality
        information and data for your control unit.

CHAPTER 3 — GETTING STARTED

The following brief tutorial is designed to give you an understanding
of how the program operates and to also give you some hands on
experience before you begin actual programming. We encourage you to
explore the program and view all screens and windows during this
tutorial. If you need on-line assistance at any point in this
program, press F9 Help and a help message for the field you are in
will appear.

Before you start the tutorial refer to your hardware setup and ensure
that the control unit is set up according to the installation
procedures in Chapter 2. Once installation has been completed follow
the Program Entry steps (for Hard Disk, or Dual Floppy). After you
have typed in S825 and pressed enter, the Current Personalities screen
will appear and you are now ready to begin this tutorial.

From the Current Personalities Screen, press F1 Setup.

From the Setup Window, press F2 Freq.

This will take you into the Currently Defined Frequency Sets
Window. Before you can create a personality you will need to
create frequency sets. A frequency set is nothing more than a
collection of channels. The PC Programmer Software allows you to
define these sets and save them on disk. They make personality
creation very simple because all you do is specify which
frequency set to use for the mode. In the window are two sample
frequency sets named SAMPLE1 and SAMPLE2.

Using the right arrow key move cursor over to SAMPLE2 and
   press F2 Change. A Change/Edit File Window will appear,
   select F1 Yes.

This tells the PC Programmer Software to pull up the SAMPLE2
frequency set and allows you to edit it. You will see that two
channels have been named and defined in this frequency set.

Using the down arrow key move cursor down until the cursor is
   on Channel 3. Type 37/50 and press <enter>.

That number becomes the alphanumeric display name of the channel
on the control unit.

Press <enter> to move into the Tx Freq field. Type 37.5 and
   again press <enter>.

You will notice that the Tx Freq number also appears in the Rx
Freq field.

Now that you have added your third channel, you want to save it
back to disk.

To do so, press F10 Back. The Save File Window will appear.
Press F1 Exit with Save. You will get a file overwrite
prompt. Press Y to continue.

We are now going to create a personality using the frequency set
you just defined.

Press F10 Back (from the Currently Defined Frequency Sets
Window) and then press F10 Back again (from the Setup
Window). You will now be in the Current Personalities
Screen. Select F4 New and the Control Unit Personality
Screen will appear.

The first step in defining a a personality is to define the
mode. A mode consists of an alphanumeric display name and a
frequency set.

Type in MODE 1 as the display name and press <enter>. The
cursor will move to the frequency set field. To specify the
frequency set that you want to use for this mode, type
SAMPLE2 and press <enter>.

The program will pull the frequency set SAMPLE2 into this mode.
You can view this frequency set from the Detail Window.

Using your left cursor key move cursor over to the frequency
set field and press F1 Detail.

The Detail Window will display the channels for that set.

Press F10 Back.

You have just created a personality!

Press F10 Back and the Save Personality Window will appear.
Press Ctrl-Backspace simultaneously to clear out the file
name field. Type PERS1.

Your newly created personality has now been named and is ready to
be saved to disk.

Press F1 Exit with Save.

The new personality name will appear in the Current Personalities
Screen.

The next step is to program the personality into the control
unit. NOTE: Do not attempt the next sequence without ensuring
that the Serial Programming Interface Module is properly
connected. Failure to attach the Serial Programming Interface
Module prior to a program or read operation may result in system
lock-up. Should this occur, refer to Chapter 6 of this manual.

Select F5 Progrm and the Program Radio Window will appear.
Select F1 Yes, which will cause the Radio Type Window to
appear. Press F1 Yes from this window.

A message will appear on the screen indicating that the
personality is being downloaded into the control unit. The
program operation is finished when the program window disappears
from the screen.

Select F6 Read and type PERS2. Press F1 Yes.

The program will then handshake with the control unit and read
the personality out of the control unit into the file PERS2.
When the operation is finished the windows will disappear and the
Current Personalities Screen will reappear showing newly created
personalities PERS1 and PERS2.

You have now completed the tutorial. You can delete the
personalities if you like or keep them in your program for future
reference.

To delete a personality move cursor to the personality you
   want deleted. Select F3 Utility, press F5 Delete, and press
   F1 Yes.

The selected personality will be deleted from the disk and will
no longer appear in the Current Personalities Screen.

CHAPTER 4 - RUNNING THE PROGRAM

INITIALIZATION

Depending on its manufacturer, your personal computer will
have certain unique operating characteristics which makes it
different from other computers of similar capability. For
example, file names and file extensions must conform to the
requirements of your disk operating system. We, therefore,
recommend that you become fully conversant with your
computer's disk operating system and its operating manual
prior to beginning this program.

When you turn on your personal computer, it begins an
initialization routine which every system must go through to
prepare for operation. During the initialization of your
system, the MS-DOS program is loaded into memory. Remember
that MS-DOS is the interpreter between your keyboard actions
and the capabilities of the PC Programming Software.

Once the PC is initialized and you have received the DOS
prompt, you should type:

cd/GE <enter>

S825 <enter>

After a brief introductory screen the Current Personalities
Screen will appear.

```
┌─GE Mobile Communications─────────────────────────────────────────────────┐
│ ┌─Directory──────────────────────────────────────────────────────────┐   │
│ │   (1)          S-825 Control Unit Programming             L0-A     │   │
│ └────────────────────────────────────────────────────────────────────┘   │
├──────────────────────────────────────────────────────────────────────────┤
│               (2)   Current Personalities - 825   (3)                    │
│               (4)   C:\GE\S825\RADIO   (5)                               │
│ (7)                                                                      │
│ MAYOR      JUDGE      COUNCIL    PUBLIC     FIRE_CHF    POLICE   COMM_OFF│
│ WATER      SEWER                                                         │
│
│                              (6)
│
│
│ (8)
│ Use the cursor keys to select personality.
│                              (9)
│ ┌────┐┌──────┐┌──────┐┌────┐┌──────┐┌────┐┌────┐┌────┐┌────┐┌────┐
│ │ F1 ││  F2  ││  F3  ││ F4 ││  F5  ││ F6 ││ F7 ││ F8 ││ F9 ││F10 │
│ │Setup││Change││Utility││New ││Progrm││Read││    ││    ││Help││Back│
│ └────┘└──────┘└──────┘└────┘└──────┘└────┘└────┘└────┘└────┘└────┘
```

FIGURE 4 - CURRENT PERSONALITIES SCREEN

| | | |
|---|---|---|
| (1) | Function | - indicates current function |
| (2) | Screen Title | - identifies screen |
| (3) | Default Extension | - designated extension |
| (4) | Current Drive | - designated drive |
| (5) | Current Directory | - designated directory name |
| (6) | Personality Fields | - personalities in current directory |
| (7) | Highlighted Personality | - indicates cursor location |
| (8) | Prompt Line | - current field instruction line |
| (9) | Function Keys | - entry to specific program area |

The Current Personalities screen, shown in Figure 4, is the main screen for the S825 Control Unit PC Programmer Software. From this screen you will be able to create personalities, program personalities into the control unit, and read personalities out of the control unit. To access a personality, move the cursor (a reverse video bar) across the screen using the arrowed cursor keys. There is room available for up to 63 personalities on the screen. Once the screen is full additional personalities can be accessed by using the Pg Dn and Pg Up cursor keys.

NOTES: 1) Throughout this document the term personality is used. Personality is used generically to refer to the information stored in one control unit causing it to operate differently from another control unit.

2) Whenever the program is initiated, the extension will default to the extension used when the program was last run. Only personalities with the extension identified are listed in this screen.

From the Current Personalities Screen, your options are:

F1 - Setup. Select this option if you want to:
Select the default keypad type and frequency range.

F2 - Change. Select this option if you want to:
Change/edit an existing personality.

F3 - Utilty. Select this option if you want to:
Print a personality, delete a personality, change the directory, change the extension, or change the communication port entry.

F4 - New. Select this option if you want to:
Create a new personality.

F5 - Progrm. Select this option if you want to:
Program a unit with the personality selected.

F6 - Read. Select this option if you want to:
Read the personality out of the unit.

F9 - Help. Select this option if you want to:
Receive further information pertaining to a field area.

F10- Exit. Select this option if you want to:
Terminate the program and return to the control of DOS.

SETTING UP THE PROGRAM

To set up the program you will first need to select the F1 Setup key while in the Current Personalities Screen.

The setup portion of this program consists of three distinct windows:

- The System Keypad Definition Window
- The Scan Keypad Definition Window
- The Frequency Ranges Window The two Keypad Definition Windows give the user the ability to define the keypad defaults used whenever a new personality is created.

The Frequency Ranges Window provides for setting the band split default for a particular personality.

System Keypad Definition

```
┌─GE Mobile Communications──────────────────────────────────────────────┐
│┌─────────────────────────────────────────────────────────────────────┐│
││ Setup         S-825 Control Unit Programming              L1-A      ││
││ └(1)─                                                               ││
│└─────────────────────────────────────────────────────────────────────┘│
│┌──────────────────────────────────────┬──────────────────────────────┐│
││ (2)    System Keypad Definition      │    Frequency  Ranges         ││
││                                      │           RANGR              ││
││                        (3)           │                              ││
││ (4) Pwr             XXX XXX XXX      │   LB    29 -  42    35 -  50 ││
││                                      │   HB   136 - 153   150 - 174 ││
││ (5) Fnc             XXX XXX XXX      │                              ││
││                                      │   UHF  403 - 423   410 - 430 ││
││    XXX XXX XXX XXX XXX XXX XXX XXX   │        420 - 440   440 - 460 ││
││            (6) (7)                   │        450 - 470   470 - 488 ││
││            Vol Chn XXX               │        482 - 500   494 - 512 ││
││                                      │                              ││
││    XXX XXX XXX XXX XXX XXX XXX XXX   │   800  806 - 870             ││
││ (8)                                  │                              ││
││  Press TAB to toggle, F9 for help    │                              ││
│└──────────────────────────────────────┴──────────────────────────────┘│
                                  (9)
┌──────┬──────┬──────┬──────┬────┬────┬────┬────┬──────┬──────┐
│  F1  │  F2  │  F3  │  F4  │ F5 │ F6 │ F7 │ F8 │  F9  │ F10  │
│Switch│ Freq │Keypad│Range │    │    │    │    │ Help │ Back │
└──────┴──────┴──────┴──────┴────┴────┴────┴────┴──────┴──────┘
```

FIGURE 5 - SYSTEM KEYPAD DEFINITION WINDOW (1) Function          - indicates current functions
(2) Window Title      - identifies window
(3) First Input Field - toggle or type desired data
(4) Power Field       - keypad reference, "display only"
(5) Function Field    - keypad reference, "display only"
(6) Volume Field      - keypad reference, "display only"
(7) Channel Field     - keypad reference, "display only"
(8) Prompt Line       - current field instruction line
(9) Function Keys     - entry to specific program area The System Keypad Definition Window, shown in Figure 5, allows you to select the defaults to be used when creating a new personality. This window can be accessed by selecting F1 Setup from the Current Personalities Screen or selecting F3 Keypad from the Scan Keypad Definition Window. The layout of this screen is selected to represent the physical layout of the keys on the System model of the S825 Control Unit. Upon entry in this window, the cursor will be located in the first input field of the window. This input field is a toggle field and represents the same key as on the control unit keypad. To define the key, toggle the field (using the Tab key) until the correct selection is displayed or if you know the selection you want you can type it in. Movement between fields in this window is limited to the Enter key, and up and down arrow keys. Inside each field the left and right cursor keys are active as are the alphanumeric keyboard keys to allow you to type in the field definition if preferred.

There are four "Display Only" fields in the System Keypad Definition Window. They are Pwr, Fnc, Vol, and Chn. These fields are for keypad reference and cannot be accessed.

The toggle fields and functionality represented in the System Keypad Definition Window are:

```
WAI  - Wail (initiates the wail siren)
YLP  - Yelp (initiates the yelp siren)
RST  - Reset (will disable all siren/lights)
S/L1 to S/L8 - Siren/Light Combinations (initiates the
       programmed combination of sirens and lights)
GE*  - GE-STAR (generates the GE-STAR ID T90/T99)
VG   - Voice Guard (enters an encrypted speech mode)
VRS  - Vehicular RPT On/Off
EG*  - Emergency GE-STAR
PA   - Speaker Public Address
DSB  - Key Disabled (prevents operation of key)
VLU  - Volume Up
VLD  - Volume Down
CHU  - Channel Up
CHD  - Channel Down
MOD  - Mode Select
HOM  - Home (takes you to the home channel)
SCN  - Scan (on/off)
ADD  - Add (adds channels to scan list)
DEL  - Delete (deletes channels from scan list)
SQL  - Squelch Level (sets the level of squelch)
CG   - Channel Guard Select
SPR  - External Speaker On/Off
```

After all selections have been made you can now either go to the Frequency Range Window or pull up the Scan Keypad Definition Window.

From the System Keypad Definition Window, your function key options are:

F1 - Switch. Select this option if you want to:
    Change/select the default frequency range.

F2 - Freq. Select this option if you want to:
    Create/delete or modify a frequency set.

F3 - Keypad. Select this option if you want to:
    Define the keypad defaults for the Scan unit.

F4 - Range. Select this option if you want to:
    Toggle the Frequency Ranges Window between RANGR, DELTA-S and DELTA-SX.

F9 - Help. Select this option if you want to:
    Receive further information pertaining to a field area.

F10- Back. Select this option if you want to:
    Return to the Current Personalities Screen.

Scan Keypad Definition

GE Mobile Communications

Setup (1)      S-825 Control Unit Programming      L1-A

```
(2)      Scan Keypad Definition          |        Frequency Range
                                          |           DELTA-S
                      (3)                 |
(4) Pwr              XXX       XXX        |   LB  -  29.7 - 36
                                          |           36  - 42
(5) Fnc              XXX                  |           42  - 50
                                          |   HB  -  136  -153
         XXX XXX     XXX       XXX        |          150.8-174
         (6) (7)                          |   UHF -  403  -423
         Vol Chn                          |          450  -470
                                          |          470  -494
  XXX XXX XXX XXX    XXX       XXX        |          494  -512

(8)
  Press TAB to toggle, F9 for help
```

(9)

| F1 Switch | F2 Freq | F3 Keypad | F4 Range | F5 | F6 | F7 | F8 | F9 Help | F10 Back |

FIGURE 6 - SCAN KEYPAD DEFINITION WINDOW (1) Function        - indicates current function
(2) Window Title    - identifies window
(3) First Input Field - toggle or type desired data
(4) Power Field     - keypad reference, "display only"
(5) Function Field  - keypad reference, "display only"
(6) Volume Field    - keypad reference, "display only"
(7) Channel Field   - keypad reference, "display only"
(8) Prompt Line     - current field instruction line
(9) Function Keys   - entry to specific program area The Scan Keypad Definition Window, shown in Figure 6, allows you to select the defaults to be used when creating a new personality. This window can be accessed by selecting F1 Setup from the Current Personalities Screen or selecting F3 Keypad from the System Keypad Definition Window. The layout of this screen is selected to represent the physical layout of the keys on the Scan model of the S825 Control Unit. Upon entry in this window, the cursor will be located in the first input field of the window. This input field is a toggle field and represents the same key as on the control unit keypad. To define the key, toggle the field (using the Tab key) until the correct selection is displayed or if you know the selection you want you can type it in. Movement between fields in this window is limited to the Enter key and up and down arrow keys. Inside each field the left and right cursor keys are active as are the alphanumeric keyboard keys to allow you to type in the field definition if preferred.

There are four "Display Only" fields in the Scan Keypad Definition Window. They are Pwr, Fnc, Vol, and Chn. These fields are for keypad reference and cannot be accessed.

The toggle fields and functionality represented in the Scan Keypad Definition Window are:

```
WAI - Wail (initiates the wail siren)
YLP - Yelp (initiates the yelp siren)
RST - Reset (will disable all siren/lights)
S/L1 to S/L8 - Siren/Light Combinations (initiates the
       programmed combination of sirens and lights)
GE* - GE-STAR (generates the GE-STAR ID T90/T99)
VG  - Voice Guard (enters an encrypted speech mode)
VRS - Vehicular RPT On/Off
EG* - Emergency GE-STAR
PA  - Speaker Public Address
DSB - Key Disabled (prevents operation of key)
VLU - Volume Up
```

```
VLD  -  Volume Down
CHU  -  Channel Up
CHD  -  Channel Down
MOD  -  Mode Select
HOM  -  Home (takes you to the home channel)
SCN  -  Scan (on/off)
ADD  -  Add (adds channels to scan list)
DEL  -  Delete (deletes channels from scan list)
SQL  -  Squelch Level (sets the level of squelch)
CG   -  Channel Guard Select
SPR  -  External Speaker On/Off
```

After all selections have been made you can now either go to the Frequency Ranges Window or pull up the System Keypad Definition Window.

From the Scan Keypad Definition Window, your function key options are:

F1 – Switch. Select this option if you want to:
   Change/select the default frequency range.

F2 – Freq. Select this option if you want to:
   Create/delete or modify a frequency set.

F3 – Keypad. Select this option if you want to:
   Define the keypad defaults for the System unit.

F4 – Range. Select this option if you want to:
   Toggle the Frequency Ranges Window between RANGR, DELTA-S and DELTA-SX.

F9 – Help. Select this option if you want to:
   Receive further information pertaining to a field area.

F10– Back. Select this option if you want to:
   Return to the Current Personalities Screen.

Frequency Ranges Windows

There are three Frequency Ranges Windows which provide for

- RANGR,

- DELTA-S, and

- DELTA-SX.

These windows are used to select the current/desired band split default. Selection is made by moving a highlighted video bar over the selection and leaving the window either through the F1 Switch key or the F10 Back key.

Frequency Ranges – RANGR

```
┌─GE Mobile Communications──────────────────────────────────────────────┐
│ ┌─────────────────────────────────────────────────────────────┐      │
│ │ Setup        S-825 Control Unit Programming         L1-A    │      │
│ └─(1)─────────────────────────────────────────────────────────┘      │
└───────────────────────────────────────────────────────────────────────┘
```

```
┌─────────────────────────────┬──────────────────────────────────────┐
│   System Keypad Definition  │         Frequency Ranges             │
│                             │         (2)   RANGR                  │
│                             │                    (3)               │
│  Pwr            XXX XXX XXX │  (4) LB     29 – 42    35 – 50       │
│                             │  (5) HB    136 – 153  150 – 174      │
│  Fnc            XXX XXX XXX │                                      │
│                             │  (6) UHF   403 – 423  410 – 430      │
│  XXX XXX XXX XXX XXX XXX XXX XXX │         420 – 440  440 – 460    │
│         Vol Chn XXX         │            450 – 470  470 – 488      │
│                             │            482 – 500  494 – 512      │
│  XXX XXX XXX XXX XXX XXX XXX XXX │                                │
│                             │  (7) 800   806 – 870                 │
│                             │  (8)                                 │
│                             │  Select the frequency band spli      │
└─────────────────────────────┴──────────────────────────────────────┘
                                (9)
```

```
┌────┬────┬──────┬─────┐┌────┬────┬────┬────┬──────┬──────┐
│ F1 │ F2 │ F3   │ F4  ││ F5 │ F6 │ F7 │ F8 │ F9   │ F10  │
│Swtch│Freq│Keypad│Range││    │    │    │    │ Help │ Back │
└────┴────┴──────┴─────┘└────┴────┴────┴────┴──────┴──────┘
```

FIGURE 7 – FREQUENCY RANGES "RANGR" WINDOW (1) Function            – indicates current function
(2) Window Title        – identifies window
(3) Frequency Fields    – select frequency band split
(4) LB Frequency Range  – indicates low band splits
(5) HB Frequency Range  – indicates high band splits
(6) UHF Frequency Range – indicates UHF band splits
(7) 800 Frequency Range – indicates 800 band splits
(8) Prompt Line         – current field instruction line
(9) Function Keys       – entry to specific program area The Frequency Ranges "RANGR" Window, shown in Figure 7, is used for selecting the current/desired band split default. Selecting a band split default does two things to the program. First, it tells the program which band split to use when creating new frequency sets. Secondly, it tells the program which band split is going to be used when creating a new personality. This information is critical for control units with download capability to the radio.

By pressing the F1 Switch key from one of the Keypad Definition Windows you can access this window. Upon entry, the cursor will be located on the last chosen field of the 14 selectable fields. The arrowed cursor keys, home and end cursor keys, Enter key, and Tab key are the only active movement keys in this window. To select a band split, position the cursor (reverse video bar) over your selection and exit the window by pressing the F1 Switch or F10 Back keys. The selected split will be saved to disk so that the program will remember it the next time the personality is called up.

From the Frequency Ranges "RANGR" Window, your function key options are:

F1 – Switch. Select this option if you want to:
    Select the Keypad Definition Window.

F2 – Freq. Select this option if you want to:
    Create/delete or modify a frequency set.

F3 - Keypad. Select this option if you want to:
Toggle the Keypad Definition Window between System and Scan.

F4 - Range. Select this option if you want to:
Toggle the Frequency Ranges Window between RANGR, DELTA-S and DELTA-SX.

F9 - Help. Select this option if you want to:
Receive further information pertaining to a field area.

F10- Back. Select this option if you want to:
Return to the Current Personalities Screen.

Frequency Ranges - DELTA-S

```
GE Mobile Communications
┌──────────────────────────────────────────────────────────────────┐
│ Setup          S-825 Control Unit Programming            L1-A    │
│ (1)                                                              │
└──────────────────────────────────────────────────────────────────┘

Scan Keypad Definition              Frequency Ranges
                                      (2)    DELTA-S
                                                (3)
   Pwr              XXX    XXX      (4)   LB  - 29.7 - 36
                                                 36  - 42
   Fnc              XXX                            42  - 50
                                    (5)   HB  - 136  -153
         XXX XXX    XXX    XXX                  150.8-174
                                    (6)   UHF - 403  -423
         Vol Chn                                450  -470
                                                470  -494
   XXX XXX XXX XXX  XXX    XXX                  494  -512

(7)
                                    Select the frequency band spli (8)
┌────┬────┬──────┬─────┬────┬────┬────┬────┬──────┬──────┐
│ F1 │ F2 │ F3   │ F4  │ F5 │ F6 │ F7 │ F8 │ F9   │ F10  │
│Swi-│Freq│Keypad│Range│    │    │    │    │Help  │Back  │
│tch │    │      │     │    │    │    │    │      │      │
└────┴────┴──────┴─────┴────┴────┴────┴────┴──────┴──────┘
```

FIGURE 8 - FREQUENCY RANGES "DELTA-S" WINDOW (1) Function           — indicates current function
(2) Window Title       — identifies window
(3) Frequency Fields   — select frequency band split
(4) LB Frequency Range — indicates low band splits
(5) HB Frequency Range — indicates high band splits
(6) UHF Frequency Range — indicates UHF band splits
(7) Prompt Line        — current field instruction line
(8) Function Keys      — entry to specific program area The Frequency Ranges "DELTA-S" Window, shown in Figure 8, is used for selecting the band split default whenever "New" is selected from the Current Personalities Screen.

By pressing the F1 Switch key from one of the Keypad Definition Windows you can access this window or one of the Frequency Ranges Windows. To get to the DELTA-S Window, toggle the F4 Range key. Upon entry in this window, the cursor will be located on the last chosen field of the nine selectable fields. The arrowed cursor keys, home and end cursor keys, Enter key and Tab key are the only active movement keys in this window. To select a current/desired band split, position the cursor (reverse video bar) over the appropriate field and exit the window by pressing F1 Switch or F10 Back. The selected split will be saved to disk so that the program will remember it the next time the personality is called up.

From the Frequency Ranges "DELTA-S" Window, your function key options are:

F1 - Switch. Select this option if you want to:
   Select the Keypad Definition Window.

F2 - Freq. Select this option if you want to:
   Create/delete or modify a frequency set.

F3 - Keypad. Select this option if you want to:
   Toggle the Keypad Definition Window between System and Scan.

F4 - Range. Select this option if you want to:
   Toggle the Frequency Ranges Window between RANGE, DELTA-S and DELTA-SX.

F9 - Help. Select this option if you want to:
   Receive further information pertaining to a field area.

F10- Back. Select this option if you want to:
   Return to the Current Personalities Screen.

Frequency Ranges – DELTA-SX

```
┌─GE Mobile Communications──────────────────────────────────────────────┐
│ ┌─────────┬─────────────────────────────────────────────────┬───────┐ │
│ │ Setup   │         S-825 Control Unit Programming          │ L1-A  │ │
│ │  (1)    │                                                 │       │ │
│ └─────────┴─────────────────────────────────────────────────┴───────┘ │
└───────────────────────────────────────────────────────────────────────┘

┌──────────────────────────────────┬──────────────────────────────────┐
│      Scan Keypad Definition      │         Frequency Ranges         │
│                                  │         (2)  DELTA-SX            │
│                                  │              (3)                 │
│   Pwr              XXX    XXX    │   (4)   HB  -  136 - 153         │
│                                  │                150 - 174         │
│   Fnc              XXX           │                                  │
│                                  │   (5)   UHF -  403 - 423         │
│         XXX XXX    XXX    XXX    │                410 - 430         │
│                                  │                420 - 440         │
│         Vol Chn                  │                440 - 460         │
│                                  │                450 - 470         │
│   XXX XXX XXX XXX   XXX   XXX    │                                  │
│                                  │   (6)                            │
│                                  │   Select the frequency band spli │
└──────────────────────────────────┴──────────────────────────────────┘
                              (7)
┌────┬────┬──────┬─────┬────┬────┬────┬────┬──────┬──────┐
│ F1 │ F2 │  F3  │ F4  │ F5 │ F6 │ F7 │ F8 │  F9  │ F10  │
│Swit│Freq│Keypad│Range│    │    │    │    │ Help │ Back │
│ch  │    │      │     │    │    │    │    │      │      │
└────┴────┴──────┴─────┴────┴────┴────┴────┴──────┴──────┘
```

FIGURE 9 – FREQUENCY RANGES "DELTA-SX" WINDOW (1) Function           – indicates current function
(2) Window Title       – identifies window
(3) Frequency Fields   – select frequency band split
(4) HB Frequency Range – indicates high band splits
(5) UHF Frequency Range – indicates UHF band splits
(6) Prompt Line        – current field instruction line
(7) Function Keys      – entry to specific program area The Frequency Ranges "DELTA-SX" Window, shown in Figure 9, is used for selecting the band split default whenever "New" is selected from the Current Personalities Screen.

By pressing the F1 Switch key from one of the Keypad Definition Windows you can access this window or one of the Frequency Ranges Windows. To get to the DELTA-SX Window, toggle the F4 Range key. Upon entry in this window, the cursor will be located on the last chosen field of the seven selectable fields. The arrowed cursor keys, home and end cursor keys, Enter key, and Tab key are the only active movement keys in this window. To select a current/desired band split, position the cursor (reverse video bar) over the appropriate field and exit the window by pressing F1 Switch or F10 Back. The selected split will be saved to disk so that the program will remember it the next time the personality is called up.

From the Frequency Ranges "DELTA-SX" Window, your function key options are:

F1 — Switch. Select this option if you want to:
Select the Keypad Definition Window.

F2 — Freq. Select this option if you want to:
Create/delete or modify a frequency set.

F3 — Keypad. Select this option if you want to:
Toggle the Keypad Definition Window between System and Scan.

F4 — Range. Select this option if you want to:
Toggle the Frequency Ranges Window between RANGR, DELTA-S and DELTA-SX.

F9 — Help. Select this option if you want to:
Receive further information pertaining to a field area.

F10— Back. Select this option if you want to:
Return to the Current Personalities Screen.

Frequency Sets

GE Mobile Communications

| Directory (1) | S-825 Control Unit Programming | L1-B |

(2) Currently Defined Frequency Sets
(3) C:\GE\POOL (4)

(5)
29_30    410440    806860    810

(6)

(7)
Use the cursor keys to select personality.

(8)

| F1 | F2 Change | F3 | F4 New | F5 Delete | F6 | F7 | F8 | F9 Help | F10 Back |

FIGURE 10 - CURRENTLY DEFINED FREQUENCY SETS SCREEN (1) Function             - indicates current function
(2) Screen Title         - identifies screen
(3) Current Drive        - designated drive
(4) Current Directory    - designated directory
(5) Highlighted Personality - indicates cursor location
(6) Personality Fields   - personalities in current directory
(7) Prompt Line          - current field instruction line
(8) Function Keys        - entry to specific program area The Currently Defined Frequency Sets Screen, shown in Figure 10, shows the currently defined frequency sets residing in the data base. This screen can be accessed by selecting F1 Setup from the Current Personalities Screen and then F2 Freq from the Keypad Definition Window. From this screen you will be able to create, modify, and delete frequency sets. To access a frequency set, move the cursor (reverse video bar) across the screen using the arrowed cursor keys. There is room available for up to 63 frequency sets on the screen. Once the screen is full additional frequency sets can be accessed by using the Pg Dn and Pg Up cursor keys.

NOTE: Throughout this document the term frequency sets is used to refer to a collection of channel definitions that can be stored to disk for later recall.

From the Currently Defined Frequency Sets Screen, your function key options are:

F2 - Change. Select this option if you want to:
    Change/Edit a frequency set.

F4 - New. Select this option if you want to:
    Create a new frequency set.

F5 - Delete. Select this option if you want to:
    Delete a currently defined frequency set.

F9 - Help. Select this option if you want to:
    Receive further information pertaining to a field area.

F10- Back. Select this option if you want to:
    Return to the Keypad Definition Window.

NOTE: The Currently Defined Frequency Sets Screen can also be accessed from the Control Unit Personality Screen. Starting at the Current Personalities Screen select F4 New and the Control Unit Personality Screen will appear. Select F8 More and the function keys change to show other functions available. Select F2 Freq and the Currently Defined Frequency Sets Screen will be brought up.

Create/Change a Frequency Set

In order to create/change a frequency set you will need to go to the Frequency Set Definitions Screen. From the Currently Defined Frequency Sets Screen select F4 New to create a new frequency set or select F2 Change to edit a frequency set. When the F2 Change key is pressed a "pop-up" window, shown in Figure 11, will prompt you for the file name to be changed before you enter the Frequency Set Definitions Screen.

GE Mobile Communications

| Edit | S-825 Control Unit Programming | L1-B |
|---|---|---|
| (1) | | |

```
              Currently Defined Frequency Sets
                        C:\GE\POOL

29_30        410440       806860       810

┌─────────────────────────────────────────┐
                    │   (3)  Change/edit file                 │
                    │                                         │
                    │   File to be edited:   XXXXXXXX  (4)    │
            (2)     │                                         │
                    │   Are you sure:  Yes - Press F1  (5)    │
                    │                  No  - Press F2         │
                    │                                         │
                    └─────────────────────────────────────────┘

Use the cursor keys to select personality.
```

(6)

| F1 | F2 Change | F3 | F4 New | F5 Delete | F6 | F7 | F8 | F9 Help | F10 Back |

FIGURE 11 - CHANGE/EDIT FILE WINDOW (1) Function           — indicates current function
(2) "Pop-Up" window    — change/edit file window
(3) Window Title       — identifies window
(4) Change/Edit Field  — frequency set to be edited
(5) Continue Prompt    — continue or abort option
(6) Function Keys      — used to access specific areas From the Change/Edit File Window, your options are:

F1 - Yes. Select this option if you want to:
    Change the personality selected.

F2 - No. Select this option if you wan to:
    Discontinue with this procedure.

F9 - Help. Select this option if you want to:
    Receive further information pertaining to a field area.

F10- Back. Select this option if you want to:
    Return to the Currently Defined Frequency Sets Screen.

GE Mobile Communications

| New | S-825 Control Unit Programming | L1-B |
|---|---|---|
| (1) | | |

```
                       (2)  Frequency Set Definitions
                           (3)  136  - 153 Mhz                       (14) (15)
 (4)   (5)       (6)       (7)      (8)    (9)  (10)(11)(12)(13)    T90/T99
 Chn   Name      Tx Freq   Rx Freq  Tx CG  Rx CG Ste CCT Scn CGO   Tone1 Tone2
  1    XXXXXXXX  XXXXXXXX  XXXXXXXX XXXXX  XXXXX XXX XXX XXX XXX   XXXXX XXXXX
  2
  3
  4
  5
  6
  7
  8

(16)
Enter the displayable name for this channel.
```

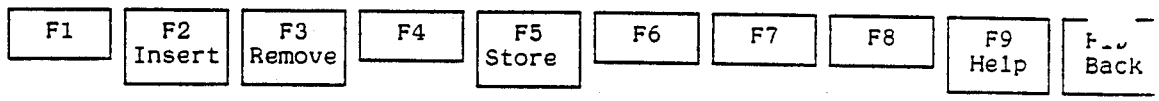

(17)

FIGURE 12 - FREQUENCY SET DEFINITIONS SCREEN

```
(1)  Function        -  indicates current function
(2)  Window Title    -  identifies screen
(3)  Band Split      -  designated freq set band split
(4)  Channel         -  positional channel indicator
(5)  Name            -  alphanumeric display name
(6)  Tx Frequency    -  transmit frequency
(7)  Rx Frequency    -  receive frequency
(8)  TX CG           -  transmit Channel Guard
(9)  RX CG           -  receive Channel Guard
(10) Ste             -  squelch tail elimination enable
(11) CCT             -  carrier control timer enable
(12) Scn             -  fixed list scan enable
(13) CGO             -  Channel Guard override
(14) Tone 1          -  T90/T99 single tone indicator
(15) Tone 2          -  T99 dual tone indicator
(16) Prompt Line     -  current field instruction line
(17) Function Keys   -  entry to specific program area
```

Figure 12:
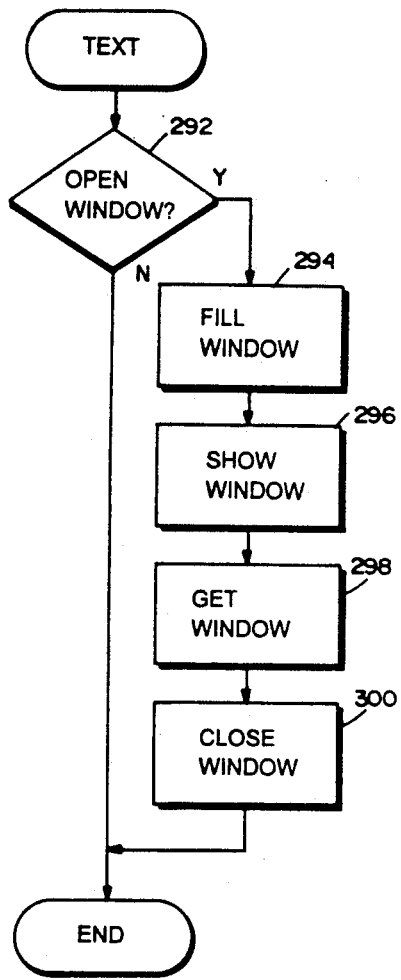

The Frequency Set Definitions Screen, shown in Figure 12, allows you to create/edit frequency sets. The frequency set is basically an association of channels all within the same band split that will be assigned to a mode.

Once in the screen, you can move between fields by using the arrowed cursor keys, home and end cursor keys, and enter key. Within the field you can use the arrowed cursor keys, space bar, delete, and alphanumeric keyboard keys (unless the field is toggle only). The tab key is used as a field-to-field key unless in a toggle field and then it will only toggle that particular field. The prompt line at the bottom of the window will help you to know which fields require typed input or the use of the toggle key.

The screen will display up to eight channel definitions (lines of data) at a time. Each channel definition consists of the channel number, channel identifier (name) to be displayed on the control unit, various frequency settings and designated tones. Additional channel definitions can be accessed by the pg dn and pg up cursor keys. These keys are only active if there are more than eight channel definitions. Please note that there are only 32 channel definitions allowed per mode.

You can easily insert or remove channel definitions using the F2 Insert and F3 Remove keys. To insert a channel definition place your cursor on the line above where you want the new channel definition to appear and press F2 Insert. An empty channel definition line will appear shifting all the following lines to the next higher channel number. To delete a channel definition line place your cursor anywhere on the channel definition you want deleted and press F3 Remove. The line you are on will disappear and the line that was just below it will now occupy the space of the deleted line. Thus, all lines below the deleted line will become one channel number less than before.

Before inserting data in the program it is recommended that you first fill out the available work sheet in Appendix F of this manual.

```
                    Frequency Set Definitions
                      (3)  136  - 153 Mhz
 (4)   (5)                                                          T90/T99
 Chn   Name    Tx Freq    Rx Freq  Tx CG  Rx CG Ste CCT Scn CGO  Tone1   Tone2
  1   XXXXXXXX XXXXXXXX  XXXXXXXX  XXXXX  XXXXX XXX XXX XXX XXX  XXXX    XXXX
  2
  3
```

---

Band Split     (3)    The Frequency Set Band Split is selected in one
                      of the Frequency Ranges Windows. These windows
                      are discussed further in the Frequency Ranges
                      Window section.

This field is "display only" and is not
                      accessible from this window.

---

Channel        (4)    The Channel field is used as a positional
                      indicator in the Frequency Set Definitions
                      Screen. The channel number indicates which
                      channel is being defined on the line.

No access to the channel field is necessary.
                      This is a "display only" field.

There are eight channel definitions listed on a
                      screen with a maximum of 32 for each mode.

Name           (5)    The Name field is used to enter a channel
                      alphanumeric identifier that will be displayed
                      on the control unit when the control unit is
                      operating on that channel.

To name a channel definition type in the name
                      you want. You can use up to eight characters
                      in any alphanumeric combination to specify a
                      name. This field is an upper case field,
                      therefore all characters will be converted to
                      upper case even if entered in lower case.

---

```
                    Frequency Set Definitions
                       136  - 153 Mhz
         (6)        (7)                                             T90/T99
 Chn Name    Tx Freq    Rx Freq  Tx CG  Rx CG Ste CCT Scn CGO  Tone1   Tone2
  1  XXXXXXXX XXXXXXXX  XXXXXXXX XXXXX  XXXXX XXX XXX XXX XXX  XXXX    XXXX
  2
  3
```

---

Tx Freq        (6)    The Transmit Frequency field is a numeric
                      field used to identify the channel transmit
                      frequency. The value entered here is used to
                      indicate the frequency the radio should
                      transmit at while tuned to this channel. When
                      defining a new channel, the Tx frequency will
                      be copied over to the Rx frequency as a
                      default for the VHF and UHF splits. When
                      working with frequencies in the 806 - 824 Mhz
                      range, 45 Mhz is added to the value before
                      copying it to the Rx frequency side.

Input the frequency that the radio should
                      transmit at while tuned to this channel. Only
                      frequencies within the currently defined band
                      split are acceptable as valid.
                      - VHF frequencies must be evenly divisible by either 5 or 6.25 Khz.
- UHF frequencies must be evenly divisible by 5 Khz.
- 800 band frequencies must be evenly divisible by 12.5 Khz (must be between 805-824 or 851-870).

| | | | |
|---|---|---|---|
| Rx Freq | (7). | | The Receive Frequency field is a numeric field that is used to identify the frequency the control unit will receive at while tuned to this channel. |
| | | | The Tx frequency field should be copied over to this field and will be used as a default for VHF and UHF splits. When working with frequencies in the 806 - 824 Mhz range, 45 Mhz is added to the value before entering it in the Rx frequency field. |

```
                        Frequency Set Definitions
                             136   - 153  Mhz
                        (7)        (8)                             T90/T99
Chn  Name     Tx Freq   Rx Freq  Tx CG Rx CG Ste CCT Scn CGO  Tone1  Tone2
 1   XXXXXXX  XXXXXXX   XXXXXXX  XXXX  XXXX  XXX XXX XXX XXX  XXXXX  XXXXX
 2
 3                                                     -
```

| | | | |
|---|---|---|---|
| Rx Freq cont'd | (7) | | - VHF frequencies must be evenly divisible by either 5 or 6.25 Khz.<br>- UHF frequencies must be evenly divisible by 5 Khz.<br>- 800 band frequencies must be evenly divisible by 12.5 Khz (must be between 851-870).<br><br>All channel definitions must have an Rx frequency to be considered valid. |
| Tx CG | (8) | | The Transmit Channel Guard field is a numeric field used to enter the transmit Channel Guard for this channel. This field accepts digital and tone Channel Guard codes. When the transmit Channel Guard is entered, it is automatically copied to the receive Channel Guard.<br><br>Enter the desired transmit Channel Guard code for this channel using either tone or Digital Channel Guard codes.<br><br>- Tone Channel Guards are identified by the placement of a decimal point within the field. For example: 67.0 identifies a tone Channel Guard of 67 Hz. Valid tone Channel Guards are in the range of 67.0 to 210.7 Hz.<br>- Digital Channel Guards do not have a decimal point within the field. For example: 023, 047, 315, etc. |

```
                    Frequency Set Definitions
                         136  - 153  Mhz
                                 (9)  (10)                      T90/T99
Chn  Name     Tx Freq   Rx Freq  Tx CG Rx CG Ste CCT Scn CGO   Tone1    Tone2
 1   XXXXXXX  XXXXXXX   XXXXXXX  XXXXX XXXXX XXX XXX XXX XXX   XXXXX    XXXXX
 2
 3
```

| Rx CG | (9) | The Receive Channel Guard field is used to enter the receive Channel Guard for this channel. This field accepts digital and tone Channel Guard codes. When the transmit Channel Guard is entered, it is automatically copied to the receive Channel Guard. |
|---|---|---|
| | | Enter the desired receive Channel Guard code for this channel using either tone or Digital Channel Guard codes.<br>- Tone Channel Guards are identified by the placement of a decimal point within the field. For example: 67.0 identifies a tone Channel Guard of 67 Hz. Valid tone Channel Guards are in the range of 67.0 to 210.7 Hz.<br>- Digital Channel Guards do not have a decimal point within the field. For example: 023, 047, 315, etc. |
| | | When reading the personality back an equiva`ent tone or code may appear in place of the actual number issued. |
| Ste | (10) | The Squelch Tail Elimination field is used to indicate whether or not squelch tail elimination is to be enabled for this channel. |
| | | Access to this field is normally denied unless a digital or tone Rx Channel Guard is entered.<br>- If the receive Channel Guard field is a tone Channel Guard this field will be defaulted to "on" and you are given access. Using the toggle switch you can enter "on" or "off". |

```
                    Frequency Set Definitions
                         136  - 153  Mhz
                                  (10)(11)(12)                  T90/T99
Chn  Name     Tx Freq   Rx Freq  Tx CG Rx CG Ste CCT Scn CGO   Tone1    Tone2
 1   XXXXXXX  XXXXXXX   XXXXXXX  XXXXX XXXXX XXX XXX XXX XXX   XXXXX    XXXXX
 2
 3
```

| Ste cont'd | (10) | - If the receive Channel Guard is digital this field will also default to "on" but access to the field is denied.<br>- If the receive Channel Guard field is empty then the field defaults to "off" and access is again denied. |
|---|---|---|
| CCT | (11) | The Carrier Control Timer field is used to indicate whether or not the carrier control timer should be enabled for this channel. |
| | | Use the Tab key as a toggle switch to select "On" or "Off". Selecting "On" will have the effect of enabling the carrier control timer |

| | | |
|---|---|---|
| | | for this channel. The timeout period can be defined in the Control Unit Options Window. "Off" indicates there will be no carrier control time. |
| Scn | (12) | The Scan field is used to determine whether or not the channel will be included in the fixed scan list.<br><br>Selection of this field is through toggling the Tab key between "Yes" and "No" values. A "Yes" value indicates the channel will be included in the fixed scan list. In order to define a channel for priority scan a "Yes" value must be selected. |

```
                    Frequency Set Definition
                         136  - 153 Mhz                      (14) (15)
                                                 (13)        T90/T99
 Chn  Name    Tx Freq   Rx Freq  Tx CG Rx CG Ste CCT Scn CGO Tone1 Tone2
  1   XXXXXXX XXXXXXX   XXXXXXX  XXXXX XXXXX XXX XXX XXX XXX XXXXX XXXXX
  2
  3
```

| | | |
|---|---|---|
| CGO | (13) | The Channel Guard Override field indicates whether or not the Channel Guard override function is available. This is a toggle field with two available options: "Yes" and "No".<br><br>Using the Tab key as a toggle switch, select between "Yes" and "No" values. Selection of "Yes" allows you to override the Channel Guards for this channel using the Channel Guard buttons.<br><br>This option requires enabling radio download. |
| Tone 1 | (14) | The Tone 1 field is a numeric field that is used to enter the T90 tone or single tone signalling and the first tone of the T99 or dual tone signalling.<br><br>Select the T90/T99 tone by entering values in the range of 250 Hz to 3000 Hz.<br><br>Only integers are acceptable. |
| Tone 2 | (15) | The Tone 2 field is a numeric field that is used to enter the second tone for T99 tone signalling. There must be data in the Tone 1 field for value acceptance in this field.<br><br>Select the second T99 tone value. Only values between 250 Hz and 3000 Hz will be accepted in this field.<br><br>Only integers are acceptable. |

From the Frequency Set Definitions Screen, your options are:

F2 - Insert.  Select this option if you want to:
Insert a new line for a channel definition.

F3 - Remove.  Select this option if you want to:
Delete a channel definition line.

F5 - Store.  Select this option if you want to:
Save the channel definitions defined.

F9 - Help.  Select this option if you want to:
Receive further information pertaining to a field area.

F10- Back.  Select this option if you want to:
Return to the Currently Defined Frequency Sets Screen.

Delete a Frequency Set

In order to delete a frequency set you will need to go to the Currently Defined Frequency Sets Screen and select F5 Delete to delete an existing frequency set. When the F5 Delete key is pressed a "pop-up" window, shown in Figure 13, will prompt you for the file name to be deleted. (The file name will default to the last highlighted frequency set.)

```
┌─GE Mobile Communications────────────────────────────────────────┐
│ Directory        S-825 Control Unit Programming          L1-B   │
│  (1)                                                            │
├─────────────────────────────────────────────────────────────────┤
│              Currently Defined Frequency Sets                   │
│                      C:\GE\POOL                                 │
│  29_30      4104┌───────────────────────────────────┐           │
│                 │       (3) Delete File             │           │
│                 │                                   │           │
│                 │   Delete the file:  XXXXXXX (4)   │           │
│             (2) │                                   │           │
│                 │   Are you sure:  Yes - Press F1   │  (5)      │
│                 │                  No  - Press F2   │           │
│                 └───────────────────────────────────┘           │
│                                                                 │
│  Use the cursor keys to select personality.                     │
└─────────────────────────────────────────────────────────────────┘
                                (6)
 ┌─────┐ ┌─────┐ ┌────┐ ┌────┐ ┌────┐ ┌────┐ ┌────┐ ┌────┐ ┌─────┐ ┌─────┐
 │ F1  │ │ F2  │ │ F3 │ │ F4 │ │ F5 │ │ F6 │ │ F7 │ │ F8 │ │ F9  │ │ F10 │
 │ Yes │ │ No  │ │    │ │    │ │    │ │    │ │    │ │    │ │Help │ │Back │
 └─────┘ └─────┘ └────┘ └────┘ └────┘ └────┘ └────┘ └────┘ └─────┘ └─────┘
```

Figure 13:
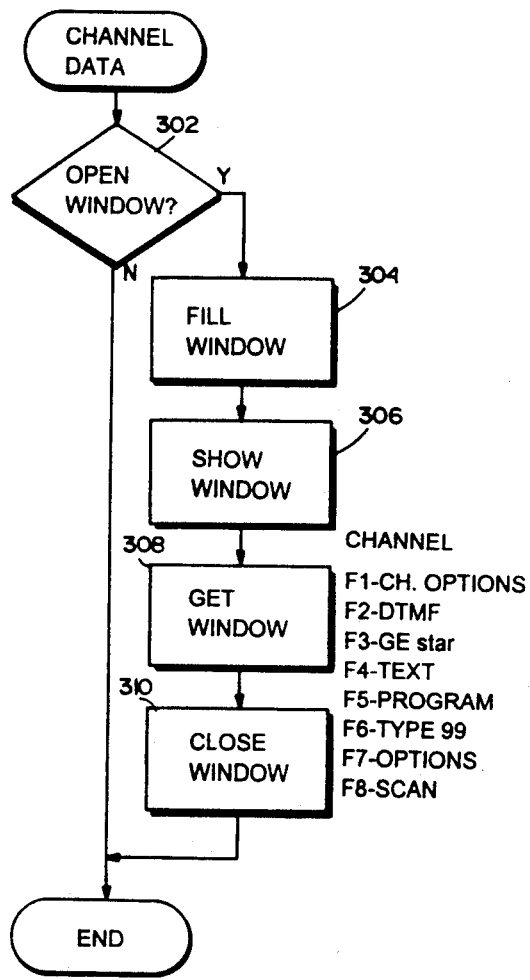

FIGURE 13 - DELETE FILE WINDOW (1) Function              - indicates current function
(2) "Pop-Up" window       - delete file window
(3) Window Title          - identifies window
(4) Delete Field          - frequency set to be deleted
(5) Continue Prompt       - continue or abort option
(6) Function Keys         - used to access specific areas From the Delete File Window, your options are:

F1 — Yes. Select this option if you want to:
   Delete the frequency set selected.

F2 — No. Select this option if you want to:
   Discontinue with this procedure.

F9 — Help. Select this option if you want to:
   Receive further information pertaining to a field area.

F10— Back. Select this option if you want to:
   Return to the Currently Defined Frequency Sets Screen.

CREATE/CHANGE A PERSONALITY

In order to create/change a personality you will need to access the Control Unit Personality Screen. This screen can be accessed by selecting F4 New or F2 Change from the Current Personalities Screen.

When changing a personality there will be a "pop-up" window, shown in Figure 14, that will prompt you for the file name to be changed before you enter the Control Unit Personality Screen.

```
┌─GE Mobile Communications─────────────────────────────────────────────
│ ┌─────────────────────────────────────────────────────────────────┐
│ │ Change Radio       S-825 Control Unit Programming        L1-B   │
│ │ (1)                                                             │
│ └─────────────────────────────────────────────────────────────────┘

Current Personalities - 825
                    C:\GE\S825\RADIO

MAYOR      JUDGE      COUNCIL    PUBLIC      FIRE_CHF    POLICE    COMM_OFF
   WATER      SEWER
                        ┌─────────────────────────────────────┐
                        │   (3) Change/edit file              │
              (2)       │                                     │
                        │   File to be edited: XXXXXXX  (4)   │
                        │                                     │
                        │   Are you sure:  Yes — Press F1 (5) │
                        │                  No  — Press F2     │
                        └─────────────────────────────────────┘

Use the cursor keys to select personality.
                                 (6)
   ┌────┐ ┌────┐ ┌────┐ ┌────┐ ┌────┐ ┌────┐ ┌────┐ ┌────┐ ┌────┐ ┌────┐
   │ F1 │ │ F2 │ │ F3 │ │ F4 │ │ F5 │ │ F6 │ │ F7 │ │ F8 │ │ F9 │ │ F10│
   │Yes │ │No  │ │    │ │    │ │    │ │    │ │    │ │    │ │Help│ │Back│
   └────┘ └────┘ └────┘ └────┘ └────┘ └────┘ └────┘ └────┘ └────┘ └────┘
```

FIGURE 14 — CHANGE/EDIT FILE WINDOW (1) Function            — indicates current function
(2) "Pop-Up" Window     — change/edit file window
(3) Window Title        — identifies window
(4) Change/Edit Field   — personality to be edited
(5) Continue Prompt     — continue or abort option
(6) Function Keys       — entry to specific program area From the Change/Edit File Window, your options are:

F1 - Yes. Select this option if you want to:
   Change the personality selected.

F2 - No. Select this option if you want to:
   Discontinue with this procedure.

F9 - Help. Select this option if you want to:
   Receive further information pertaining to a field area.

F10- Back. Select this option if you want to:
   Return to the Current Personalities Screen.

```
 GE Mobile Communications
  ┌─────────────────────────────────────────────────────────────────────────┐
  │ New           S-825 Control Unit Programming               L1-B         │
  │ (1)                                                                     │
  └─────────────────────────────────────────────────────────────────────────┘

(2)  Control Unit Personality
                        (3)  VHF    136 - 160
   (4)   (5)       (6)        (7)      (8)      (9)   (10)      (11)  (12)
   Mode  Name      Freq Set   Signal   P1-Prog  P1    P2-Prog   P2    W/CG
   1     XXXXXXXX  XXXXXXXX   XXXXX    XXXXX    XX    XXXXX     XX    XXX
   2
   3
   4
   5
   6
   7
   8

(13)                                                            (14)
  Enter mode name for display on the control unit.     Bytes Free: XXXX

(15)
 ┌─────┐ ┌──────┐ ┌──────┐ ┌─────┐ ┌─────┐ ┌────┐ ┌──────┐ ┌─────┐ ┌─────┐ ┌─────┐
 │ F1  │ │ F2   │ │ F3   │ │ F4  │ │ F5  │ │ F6 │ │ F7   │ │ F8  │ │ F9  │ │ F10 │
 │Detail│ │Insert│ │Remove│ │Scan │ │Progrm│ │   │ │Option│ │More │ │Help │ │Back │
 └─────┘ └──────┘ └──────┘ └─────┘ └─────┘ └────┘ └──────┘ └─────┘ └─────┘ └─────┘
```

FIGURE 15 - CONTROL UNIT PERSONALITY "SCAN" SCREEN (1)   Function        - indicates current function
(2)   Screen Title    - identifies screen
(3)   Band Split      - designated freq set band split
(4)   Mode Number     - positional mode indicator
(5)   Name            - alphanumeric display name
(6)   Freq Set        - frequency set for mode
(7)   Signal          - select signal modes
(8)   P1-Prog         - priority 1 programming field
(9)   P1              - identifies priority 1 channel
(10)  P2-Prog         - priority 2 programming field
(11)  P2              - identifies priority 2 channel
(12)  W/CG            - scan with Channel Guard field
(13)  Prompt Line     - current field instruction line
(14)  Bytes Free      - identifies remaining bytes available
(15)  Function Keys   - entry to specific program area GE Mobile Communications

| New (1) | S-825 Control Unit Programming | L1-B |

```
                    (2)  Control Unit Personality
                       (3) VHF  136 - 160
 (4)    (5)       (6)        (7)     (16)   (17)      (18)     (19)    (20)
Mode   Name      Freq Set   Signal   Home   Initiate  Pttopt   Emerg   GEstar
 1     XXXXXXX   XXXXXXX    XXXXX    XX     XXXXX     XXXX     XXX     XXXX
 2
 3
 4
 5
 6
 7
 8

(13)                                                                  (14)
Enter mode name for display on the control unit.         Bytes Free: XXXX
```

(15)

| F1 Detail | F2 Insert | F3 Remove | F4 Scan | F5 Progrm | F6 | F7 Option | F8 More | F9 Help | F10 Back |

FIGURE 16 – CONTROL UNIT PERSONALITY "SIGNAL" SCREEN

| (1)  | Function       | – indicates current function         |
| (2)  | Screen Title   | – identifies screen                  |
| (3)  | Band Split     | – designated freq set band split     |
| (4)  | Mode Number    | – positional mode indicator          |
| (5)  | Name           | – alphanumeric display name          |
| (6)  | Freq Set       | – frequency set for mode             |
| (7)  | Signal         | – select signal mode                 |
| (8) – (12) | Scan Sets | – scan options from figure 15     |
| (13) | Prompt Line    | – current field instruction line     |
| (14) | Bytes Free     | – identifies remaining bytes available |
| (15) | Function Keys  | – entry to specific program area     |
| (16) | Home           | – identifies home channel for mode   |
| (17) | Initiate       | – indicates emergency/id operation   |
| (18) | Pttopt         | – push-to-talk options field         |
| (19) | Emerg          | – emergency operation enable         |
| (20) | GEstar         | – GE-STAR identification field       |

The Control Unit Personality Screen is the main screen at the personality level. It gives a brief overview of the control unit personality by identifying the frequency band split, programmed modes and various mode options. The Control Unit Personality Screen has been divided into two sections. The first section is displayed upon access to the screen and controls the personality "scan" listings. The second part, accessed by using the F4 key as a toggle switch, controls the "signalling" information. The Mode Name and Frequency Set for each mode is always displayed regardless of which Control Unit Personality Screen area you are in. (Reference Figures 15 and 16.)

Once in a window, you can move between fields by using the arrowed cursor keys, home and end cursor keys, and Enter key. Within the field you can use the arrowed cursor keys, space bar, delete, and alphanumeric keyboard keys (unless the field is toggle only). The Tab key is used as a field-tofield key unless in a toggle field and then it will only toggle that particular field. The prompt line at the bottom of the window will help you to know which fields require typed input or the use of the toggle key. And as mentioned earlier, the F4 function key serves as the toggle key between the scan and signalling windows.

Up to eight modes can be displayed on the screen at one time out of a maximum of 96. If there are nine or more modes the pg dn and pg up keys become active allowing you to access other modes.

NOTE: When creating a new personality it is important to remember that no personality name is actually given to the newly created personality until all information has been entered into the Control Unit Personality Screen and you try to exit the screen.

```
                            Control Unit Personality
                 (3)        VHF   136 - 160
 (4)  (5)        (6)
 Mode Name       Freq Set   Signal    P1-Prog    P1    P2-Prog    P2    W/CG
  1   XXXXXXXX   XXXXXXXX   XXXXX     XXXXXX     XX    XXXXXX     XX    XXX
  2
  3
```

| | | |
|---|---|---|
| Band Split | (3) | The Band Split field is listed in the top center of the Control Unit Personality Screen. |
| | | Access to this field is denied as it is a "display only" field. The band split values should be entered in the Frequency Ranges Window before inputting data in this screen. |
| Mode | (4) | The Mode field is the first field displayed. This field identifies the numerical order of each mode in the control unit. |
| | | Access to this field is denied as it is a "display only" field. |
| Mode Name | (5) | The Mode Name field is used to identify what name you want to display on the control unit during operation. |
| | | Enter an alphanumeric name you wish to use to identify the mode – up to eight characters. Each character will be displayed in upper case. |
| Freq Set | (6) | The Frequency Set field is used to associate a predefined frequency set to a mode. |
| | | Enter a predefined frequency set in this field. The information for the frequency set field has already been defined in the Frequency Set Definitions Screen. |

|  |  |  | Control Unit Personality |  |  |  |  |  |
|---|---|---|---|---|---|---|---|---|
|  |  |  | VHF | 136 - 160 |  |  |  |  |
|  |  | (6) | (7) | (8) |  |  |  |  |
| Mode | Name | Freq Set | Signal | P1-Prog | P1 | P2-Prog | P2 | W/CG |
| 1 | XXXXXXX | XXXXXXX | XXXXX | XXXXX | XX | XXXXX | XX | XX |
| 2 |  |  |  |  |  |  |  |  |
| 3 |  |  |  |  |  |  |  |  |

| | | |
|---|---|---|
| Freq Set cont'd | (6) | When you enter a frequency set name, a search will be made of the personality to find a "matching frequency set name". If found, a logical association is made between the mode and the frequency set. If the set is not found, then a search will be made of the pooled directory. You cannot enter a non-defined frequency set. If you want to replace the existing frequency set with a new frequency set, simply replace the name with the name of a new set. If the replaced set is not used with any other mode then it will be deleted from the personality. Once the information is loaded, the F1 Detail key can be used to tailor the data for a particular user. |
| Signal | (7) | The Signal field is used to define the type of signalling associated with this mode.<br><br>Using the Tab key, toggle to the value you wish to use. There are three possible values:<br>- The value "Disable" will disable signalling.<br>- The value "T90/T99" indicates that a T90 or T99 signalling scheme is requested.<br>- The value "GE-STAR" indicates GE-STAR signalling is desired. |
| P1-Prog | (8) | The Priority 1 Programming field is used to select the type of P1 programming for this mode.<br><br>With the Tab key, toggle to the desired indicator. There are three choices: |

|  |  |  | Control Unit Personality |  |  |  |  |  |
|---|---|---|---|---|---|---|---|---|
|  |  |  | VHF | 136 - 160 |  |  |  |  |
|  |  |  |  | (8) | (9) | (10) |  |  |
| Mode | Name | Freq Set | Signal | P1-Prog | P1 | P2-Prog | P2 | W/CG |
| 1 | XXXXXXX | XXXXXXX | XXXXX | XXXXX | XX | XXXXX | XX | XX |
| 2 |  |  |  |  |  |  |  |  |
| 3 |  |  |  |  |  |  |  |  |

| | | |
|---|---|---|
| P1 cont'd | (8) | - "Fixed" indicates that the P1 channel will be entered during programming and cannot be modified through the Add/Del keys on the control unit.<br>- "User" indicates that the P1 channel will be selected through the use of the Add/Del keys on the control unit.<br>- "Selchn" indicates that the P1 channel will always be the currently selected channel. |

| | | |
|---|---|---|
| P1 | (9) | The Priority One field is used to identify the priority one channel for a selected mode when fixed P1 programming is selected. It corresponds to a channel within the selected frequency set.<br><br>Enter the desired priority one channel. Only numeric data is accepted. This field will not accept a channel outside of the frequency set and the channel you do select must have the Scn flag on. |
| P2-Prog | (10) | The Priority Two Programming field is used to select the type of priority two programming for this mode.<br><br>Using the Tab key, toggle to the desired indicator. There are three types of priority two programming.<br>- "Fixed" indicates that the P2 channel will be entered during programming and cannot be modified through the Add/Del keys on the control unit. |

```
                     Control Unit Personality
                         VHF    136 - 160
                                             (10)      (11)   (12)
Mode  Name      Freq Set    Signal    P1-Prog   P1   P2-Prog    P2    W/CG
  1   XXXXXXX   XXXXXXX     XXXXX     XXXXX     XX   XXXXX      XX    XXX
  2
  3
```

| | | |
|---|---|---|
| P2-Prog cont'd | (10) | - "User" indicates that the P2 channel will be selected through the use of the Add/Del keys on the control unit.<br>- "Selchn" indicates that the P2 channel will always be the currently selected channel. |
| P2 | (11) | The Priority Two field is used to identify the priority two channel for a selected mode when Fixed P2 programming is selected. It corresponds to a channel within the selected frequency set.<br><br>Enter the desired priority two channel. Only numeric data is accepted. This field will not accept a channel outside of the frequency set and the channel you do select must have the Scn flag on. |
| W/CG | (12) | The Scan with Channel Guard field is used to indicate whether or not the control unit decodes Channel Guard on the priority scan channels.<br><br>Using the Tab key, toggle to the preferred indicator. "Yes" indicates that the control unit will decode Channel Guard on the priority scan channels. "No" indicates that the control unit will not decode Channel Guard on the priority scan channels.<br><br>Non-priorty channels are always decoded with Channel Guard. |

The second half of the Control Unit Personality Screen is brought up by depressing the F4 Signal key. The signal portion of the screen deals primarily with the mode signalling. Once this screen has been selected the F4 key changes its label to "Scan" to indicate pressing F4 will return you to the scan portion of the Control Unit Personality Screen.

```
                        Control Unit Personality
                          VHF    136 - 160
                                 (16)   (17)
Mode Name     Freq Set   Signal  Home   Initiate  Pttopt  Emerg  GEstar
  1  XXXXXXX  XXXXXXX    XXXXX   XX     XXXXX     XXX     XXX    XXX
  2
  3
```

| | | |
|---|---|---|
| Home | (16) | The Home field is used to identify the channel to use as the home channel for this mode. The control unit will go to the home channel immediately upon depression of the home key. |
| | | Enter the numeric channel to use as the home channel. The channel must be defined in the channel definition and contain an Rx frequency. |
| | | When a channel is entered in this field, a search will be made of the frequency set to ensure that it is a valid channel. |
| Initiate | (17) | The Initiate field is used to indicate how the emergency/ID mode operation of the control unit is entered. |
| | | Using the Tab key, toggle to the desired selection. There are three choices:<br>- HKSW (Hookswitch) - emergency/ID declared when the mic is taken off hook.<br>- PTT (Push to talk) - emergency/ID declared when PTT is depressed.<br>- Switch - emergency/ID declared by switch on control unit. |
| | | This field does not appear if signalling is disabled for this mode. |

```
                        Control Unit Personality
                          VHF    136 - 160
                                                  (18)    (19)   (20)
Mode Name     Freq Set   Signal  Home   Initiate  Pttopt  Emerg  GEstar
  1  XXXXXXX  XXXXXXX    XXXXX   XX     XXXXX     XXX     XXX    XXX
  2
  3
```

| | | |
|---|---|---|
| Pttopt | (18) | The Push-to-Talk Options field is used to indicate the desired mode of initiating emergency/ID operation from the PTT. |
| | | Using the Tab key, toggle to the desired value. "ALL" has the affect of initiating emergency/ID operation every time PTT is keyed. "HKSW" indicates that emergency/ID operation is activated only once when the mic is removed from the hookswitch. |
| | | This field will not appear if signalling is disabled for this mode and is only active if the value of the initiate field is PTT. |

| | | |
|---|---|---|
| Emerg | (19) | The Emergency Operation field is used to indicate if the control unit will generate an emergency ID or GE-STAR ID while in this mode.

Using the Tab key, toggle to the desired selection. "Yes" indicates the emergency operation is available.

This field does not appear if signalling is disabled for this mode. |
| GEstar | (20) | The GE-STAR ID field is used for entering the GE-STAR ID.

Enter the valid GE-STAR ID. Range is from 1 to 16383.

This field will only appear if GE-STAR is selected in the signal field. |

From the Control Unit Personality Screen, your options are:

F1 – Detail.  Select this option if you want to:
  Get a detailed summary of the frequency set.

F2 – Insert.  Select this option if you want to:
  Insert a new mode.

F3 – Remove.  Select this option if you want to:
  Remove a mode.

F4 – Signal or Scan.  Select this option if you want to:
  Reveal the additional mode options.

F5 – Program.  Select this option if you want to:
  Program a control unit with the currently displayed personality.

F7 – Option.  Select this option if you want to:
  Define the control unit options.

F8 – More.  Select this option if you want to:
  Create/edit frequency sets and define personality text.

F9 – Help.  Select this option if you want to:
  Receive further information pertaining to a field area.

F10– Back.  Select this option if you want to:
  Exit this window.  When pressing F10 Back a "pop-up" window will appear prompting you for more information before you can exit.

Insert/Remove a Mode

A mode is a collection of channels in which the control unit/radio will operate and a set of options for the mode.

You can easily insert or remove modes using the F2 Insert and F3 Remove keys.

To insert a mode, place your cursor on the line where you want the new mode to appear and press F2 Insert.  An empty mode line will appear shifting all the following lines to the next higher channel number.

To delete a mode place your cursor anywhere on the mode you want deleted and press F3 Remove.  The line you are on will disappear and the line just below it will now occupy the space of the deleted line. Thus, all lines below the deleted line will become one mode number less than before.

Options

The Control Unit Options Window, shown in Figure 17, is used to define some of the operational parameters of the control unit and can be accessed by pressing F7 Option from the Control Unit Personality Screen. All control unit options can be defined from this window.

```
┌GE Mobile Communications─────────────────────────────────────────────┐
│ ┌────────────────────────────────────────────────────────────────┐  │
│ │ Edit:            S-825 Control Unit Programming         L1-2   │  │
│ └─(1)────────────────────────────────────────────────────────────┘  │
├─────────────────────────────────────────────────────────────────────┤
│                    (2)  Control Unit Options                        │
│                                                                     │
│ (3)  Unit Type:  XXXXXX   (4)  Keypad Sel: XXX   (5)  Alert Tone: XXX│
│                                                                     │
│ (6)  Off Hook:   XXXXXX   (7)  B-Lite Dis: XXX   (8)  B-Lite Sav: XXX│
│                                                                     │
│ (9)  Rx CG Dec:  XXXXX   (10)  Min Volume: XXX  (11)  DS Timeout: X │
│                                                                     │
│ (12) Delete Ky:  XXXXX   (13)  Wrap Ramps: XXX  (14)  DS Test Md: XXX│
│                                                                     │
│ (15) Scan Hang:  XXXXX   (16)        CCT:  X    (17)  Horn Ring: XXX│
│                                                                     │
│ (18)                                                                │
│   Press TAB to toggle, F9 for help.                                 │
└─────────────────────────────────────────────────────────────────────┘
                                  (19)
┌─────┐┌─────┐┌─────┐┌──────┐┌─────┐┌─────┐ ┌─────┐ ┌─────┐┌─────┐ ┌────┐
│ F1  ││ F2  ││ F3  ││ F4   ││ F5  ││ F6  │ │ F7  │ │ F8  ││ F9  │ │back│
│Siren││ CG  ││ Fnc ││Signal││Radio││ Key │ │     │ │     ││Help │ │    │
└─────┘└─────┘└─────┘└──────┘└─────┘└─────┘ └─────┘ └─────┘└─────┘ └────┘
```

FIGURE 17 - CONTROL UNIT OPTIONS WINDOW

| | | |
|---|---|---|
| (1)  | Function              | - indicates current function |
| (2)  | Window Title          | - identifies window |
| (3)  | Unit Type             | - indicates type of control unit |
| (4)  | Keypad Select         | - enables keypad entry of modes |
| (5)  | Alert Tone            | - indicates alert tone enabled |
| (6)  | Off Hook              | - enables scanning with mic off-hook |
| (7)  | Backlight Display     | - allows LCD backlighting turned off |
| (8)  | Backlight Save        | - saves backlight level with power off |
| (9)  | Rx Channel Guard Decode | - receive Channel Guard decode option |
| (10) | Minimum Volume        | - sets minimum volume level |
| (11) | Display Timeout       | - determines seconds display stays on |
| (12) | Delete Key            | - allows channel deletions from scan |
| (13) | Wrap Ramps            | - determines ramp wrap around |
| (14) | Display Test Mode     | - indicates display test enabled |
| (15) | Hang Time             | - enables two second scan hang time |
| (16) | Carrier Control Timer | - time before transmission drops |
| (17) | Horn Ring             | - indicates horn control polarity |
| (18) | Prompt Line           | - current field instruction line |
| (19) | Function Keys         | - entry to specific program area |

| Control Unit Options |
|---|
| (3) Unit Type: XXXXXX    (4) Keypad Sel: XXX    (5) Alert Tone: XXX |

| | | |
|---|---|---|
| Unit Type | (3) | The Unit Type field is used to indicate the type of control unit, System or Scan, that will be the target for this personality.<br><br>Using the Tab key, toggle to the keypad type you have. "System" for the System model control unit and "Scan" for the Scan model.<br><br>If the wrong keypad designation is defined, programming of the control unit will be incorrect and cause the keypad to malfunction. |
| Keypad Sel | (4) | The Keypad Select field is used to enable or disable the keypad on the System model of the control unit for direct mode entry.<br><br>If your control unit is the "System" model, use the tab key to toggle to the desired setting. "Ena" will enable the keypad for direct mode entry. "Dis" will disable direct mode entry.<br><br>When "Scan" is selected in the "Unit Type" field the "Keypad Select" field disappears. |
| Alert Tone | (5) | The Alert Tone field is used to indicate whether or not alert tones should be enabled on the control unit.<br><br>Using the Tab key to toggle, select one of the three possible selections for this field:<br>- None - disables alert tones on all keys of the control unit keypad,<br>- Ramp - enables alert tones only when ramp keys are depressed, and<br>- All - enables alert tones for all keys. |

| Control Unit Options |
|---|
| (6) Off Hook: XXXXXX    (7) B-Lite Dis: XXX    (8) B-Lite Sav: XXX |

| | | |
|---|---|---|
| Off Hook | (6) | The Off-Hook Scan field is used to indicate whether or not the control unit will scan with the mic off-hook.<br><br>Using the Tab key to toggle, select "Scan" if you want the control unit to perform scanning functions when the mic is off-hook or "NoScn" to disable scan when the mic is lifted. |
| B-Lite Dis | (7) | The Backlight Disable field is used to prevent the user from turning off backlighting on the control unit.<br><br>Using the Tab key, toggle to an "Off" or "On" value. Select "Off" to indicate that the user should be allowed to turn backlighting off. Selecting "On" will have the effect of preventing the user from turning the backlighting off. |

| | | |
|---|---|---|
| B-Lite Sav | (8) | The Backlight Save field is used to indicate if the control unit will save the backlight level when power is removed. |
| | | Using the Tab key, toggle to a "Yes" or "No" value. Provided the backlight level has been enabled: selecting "Yes" will turn on the backlight at the same level it was on when the control unit was previously used. Selecting "No" will cause the backlight to come on at a defaulted level determined during control unit manufacture. |

| Control Unit Options | | | | | |
|---|---|---|---|---|---|
| (9) Rx CG Dec: XXXXX | | (10) Min Volume: XXX | | (11) DS Timeout: X | |
| (12) Delete Ky: XXXXX | | Wrap Ramps: XXX | | DS Test Md: XXX | |

| | | |
|---|---|---|
| Rx CG Dec | (9) | The Receive Channel Guard Decode field is used to indicate whether or not the control unit should decode the received Channel Guards. |
| | | Use the Tab key to toggle to "S825" causing the control unit to perform Channel Guard decoding or "Radio" causing the radio to perform Channel Guard decoding (tone Channel Guard only). |
| Min Volume | (10) | The Minimum Volume field is used to prevent the user from disabling audio on the control unit. |
| | | Using the Tab key as a toggle switch, select "Set" indicating the volume cannot be ramped so low that audio is off, or "Off" allowing the user to ramp volume to its off position. |
| DS Timeout | (11) | The Display Timeout field is used to set the number of seconds before the display(s) times out in one second intervals. |
| | | In this field, enter the display timeout you prefer. The range is 1 to 5 seconds. |
| Delete Key | (12) | The Delete Key field is used to indicate how the control unit should handle channel deletions from the fixed scan list. |
| | | Use the Tab key to toggle to the appropriate value. "Store" indicates that the control unit channel deletions from the fixed scan list are not allowed. "Temp" indicates the control unit channel deletions will be temporary. The channel is restored when power is recycled or the mode is changed. |

```
                        Control Unit Options

Delete Ky:  XXXXX     (13) Wrap Ramps:  XXX      (14) DS Test Md:  XXX
(15) Scan Hang: XXXXX                CCT:  X                Horn Ring:  XXX
```

| | | |
|---|---|---|
| Wrap Ramps (13) | The Wrap Ramps field is used to indicate whether or not the ramp keys on the control unit should stop when the end is reached, or wrap around to the beginning. | |
| | Using the Tab key to toggle, you can select "Yes" to cause the control unit to wrap around on the ramping function or "No" to disable the wrap function on the ramp keys. | |
| DS Test Mode (14) | The Display Test Mode field is used to indicate if the control unit will permit you to perform a display/keypad test from the front panel. | |
| | Use the Tab key to toggle. Selection of "Ena" allows you to perform a test of the LEDs, LCD and keypad on the control unit. Selection of "Dis" prevents the display/keypad test. | |
| Scan Hang (15) | The Hang Time field is used to indicate if a hang time before scan resumes should be applied to this channel. | |
| | Using the Tab key as a toggle switch, select an "On" or "Off" value. "On" indicates that a hang time will be applied before resuming scan after receiving a transmission. "Off" indicates that scan will resume immediately. | |

```
                        Control Unit Options

Scan Hang:  XXXXX     (16)     CCT:  X       (17) Horn Ring:  XXX
```

| | | |
|---|---|---|
| CCT (16) | The Carrier Control Timer field is used to indicate the amount of time before the carrier control timer will drop the transmission. | |
| | This is a numeric field indicating minutes. You can select either 1 (default value) or 2. | |
| | If the carrier control timer is not activated for all channels this field will have no effect on the control unit. However, if one or more channels have CCT enabled in the Frequency Sets Definitions screen then the value entered here becomes the carrier control timer value for those channels. | |
| Horn Ring (17) | The Horn Ring field is used to provide the horn control polarity to the control unit. | |
| | Using the Tab key as to toggle switch, select "POS" to indicate that the horn control voltage is positive. Or select "NEG" to indicate horn control voltage is negative. | |

From the Control Head Options Window, your options are:

F1   Siren. Select this option if you want to:
     Define the siren/light combinations.

F2   CG. Select this option if you want to:
     Define the Channel Guard table.

F3   Fnc. Select this option if you want to:
     Define the function key control.

F4   Signal. Select this option if you want to:
     Define the emergency signalling parameters.

F5   Radio. Select this option if you want to:
     Define some operational characteristic of the radio.

F6   Key. Select this option if you want to:
     Define the keypad definitions.

F9 – Help. Select this option if you want to:
     Receive further information pertaining to a field area.

F10– Back. Select this option if you want to:
     Return to the Control Unit Personality Screen.

Sirens

The Siren/Lights Window, shown in Figure 18, is accessed by pressing the F1 Siren key from the Control Unit Options Window and is used to define specific siren/light combinations for the S825 Control Unit.

```
┌─GE Mobile Communications──────────────────────────────────────────────┐
│ ┌──────┬─────────────────────────────────────────────────────┬──────┐ │
│ │ Edit │         S-825 Control Unit Programming              │ L1-5 │ │
│ │ (1)  │                                                     │      │ │
│ └──────┴─────────────────────────────────────────────────────┴──────┘ │
│                                                                       │
│                         (3) Siren/Lights                              │
│                  (4)  (5)      (6)           (7)  (8)                 │
│          (2)     Funct Srn  1 2 3 4 5 6 7 8 9 Can Mom                 │
│    Unit Type: X  Wail  X    X X X X X X X X   XXX XXX    one: XXX     │
│                  Yelp                                                 │
│    Off Hook:  X  S/L 1                                   Sav: XXX     │
│                  S/L 2                                                │
│    RX CG Dec: X  S/L 3                                   out: X       │
│                  S/L 4                                                │
│    Delete Ky: X  S/L 5                                   Md:  XXX     │
│                  S/L 6                                                │
│    Scan Hang: X  S/L 7                                   ing: XXX     │
│                  S/L 8                                                │
│                 (9)                                                   │
│    Press TAB to  Enter desired siren.  Range 0 to 5                   │
│                                                                       │
│                                  (10)                                 │
│  ┌──┐ ┌──┐ ┌──┐ ┌──┐ ┌──┐ ┌──┐ ┌──┐ ┌──┐ ┌────┐ ┌────┐                │
│  │F1│ │F2│ │F3│ │F4│ │F5│ │F6│ │F7│ │F8│ │ F9 │ │F10 │                │
│  └──┘ └──┘ └──┘ └──┘ └──┘ └──┘ └──┘ └──┘ │Help│ │Back│                │
│                                          └────┘ └────┘                │
└───────────────────────────────────────────────────────────────────────┘
```

FIGURE 18 – SIREN/LIGHTS WINDOW (1)  Function         – indicates current function
(2)  "Pop-Up" Window  – change/edit file window
(3)  Window Title     – identifies window
(4)  Definition       – defines row
(5)  Siren            – siren key field
(6)  Lights           – lights selection field
(7)  Cancel           – stops previous siren/light activity
(8)  Momentary        – momentary siren/light activity
(9)  Prompt Line      – current field instruction line
(10) Function Keys    – entry to specific program area

```
          Siren/Lights
(4)    (5)      (6)
Funct. Srn   1 2 3 4 5 6 7 8 9
Wail    X    X X X X X X X X X
Yelp
S/L 1
S/L 2
S/L 3
S/L 4
S/L 5
S/L 6
S/L 7
S/L 8
```

Funct      (4):

The Function field is used as a positional indicator to identify which function is being defined on the line.

This is a "display only" field and is inaccessible.

The Siren/Light Window is used to define only the siren/light combinations for Wail, Yelp, and S/L 1 through S/L 8.

---

Srn         (5)    The Siren field is used to identify which siren to use with this key.

Enter a number between 0 and 5 corresponding to the siren desired.
- 0, no siren - light only
- 1, wail (oscillating)
- 2, yelp
- 3, manual (peak and hold wail)
- 4, hilo
- 5, air horn If no entry is made in this field the default value will be 1 for the Wail field, 2 for the Yelp field, and 0 for the S/L1-S/L8 fields.

---

1 - 9       (6)    The 1-9 Light field is used to indicate which light(s) are to be enabled.

Using the Tab key as a toggle switch, toggle between a blank space ( ) or a star (*). When you want lights to be activated toggle to the star (*); leave a blank space ( ) where you prefer the light(s) to be off.

Using the star as the only visible symbol in this field makes it readily apparent which lights you have activated.

---

Can         (7):

The Cancel field is used to indicate that the siren/light combination cancels a previously activated siren/light combination.

```
    Siren/Lights
                      (7) (8)
 1 2 3 4 5 6 7 8 9   Can Mom
 X X X X X X X X X   xxx xxx
```

Using the Tab key as a toggle switch, select "Yes" to indicate that you want the previous siren/light combination(s) suppressed, or select "No" to include the active siren/light combination(s).

For Example:  Selection of "yes" is made in the Cancel column for Wail and S/L 1, and a selection of "no" is made in the Cancel column for Yelp.

```
       Siren/Lights
 Funct  Srn  1 2 3 4 5 6 7 8 9  Can
 Wail    1   * *   *             Yes
 Yelp    2           *.          No
 S/L 1   0             *         Yes
```

Pressing the Wail key will cause the wail siren/light combination to be initiated. By then pressing the Yelp key (where Cancel is "no"), the Yelp and, Wail and Yelp siren light combinations are then activated simultaneously. Should the S/L 1 key (where Cancel is "yes") then be pressed, the Wail and Yelp siren light combinations will go off and only the S/L 1 siren light combination will be operational.

Mom (8) The Momentary field is used to indicate whether or not activation of this siren/light combination is momentary or not.

Using the Tab key as a toggle switch, select "Yes" to indicate that this combination will only be active while the key is depressed and will cancel once the key is released. Or, select "No" to indicate that once the key is pressed the siren/light combination will remain active until cancelled.

Your function key options from the Siren/Lights Window are:

F9 - Help. Select this option if you want to:
   Receive further information pertaining to a field area.

F10- Back. Select this option if you want to:
   Return to the Control Unit Options Window.

Channel Guard

The Channel Guard Window, shown in Figure 19, is accessed by pressing the F2 CG key from the Control Unit Options Window and is implemented to give you the ability to define up to fourteen Channel Guards.

```
┌─GE Mobile Communications───────────────────────────────────────────
│ ┌──────────────────────────────────────────────────────────────┐
│ │ Edit           S-825 Control Unit Programming          L1-B  │
│ └─(1)──────────────────────────────────────────────────────────┘
```

|   | (3) Channel Guard Table |   |
|---|---|---|
| (2) | (8) (8) | |
|  | (6)  (7)   S       (6)  (7)   S | |
| Unit Type: | (4) (5)  Tx   Rx   T  (4) (5)  Tx   Rx   T | e: XXX |
|  | CG  ID   CG   CG   E  CG  ID   CG   CG   E | |
| Off Hook: | 1  XXX XXXXX XXXXX X   2  XXX XXXXX XXXXX X | v: XXX |
|  | 3                      4 | |
| Rx CG Dec: | 5                      6 | t: X |
|  | 7                      8 | |
| Delete Ky: | 9                     10 | d: XXX |
|  | 11                    12 | |
| Scan Hang: | 13                    14 | g: XXX |
|  | (9) | |
| Press TAB t | Enter the name of this Channel Guard. | |

(10)

| F1 | F2 | F3 | F4 | F5 | F6 | F7 | F8 | F9 Help | F10 Back |

FIGURE 19 - CHANNEL GUARD TABLE WINDOW (1)  Function                  - indicates current function
(2)  "Pop-Up" Window            - Channel Guard table window
(3)  Window Title               - identifies window
(4)  Channel Guard              - Channel Guard being modified
(5)  Identification             - identifies name of Channel Guard
(6)  Transmit Channel Guard     - Channel Guard transmit field
(7)  Receive Channel Guard      - Channel Guard receive field
(8)  Squelch Tail, Elimination  - activates squelch tail elimination
(9)  Prompt Line                - current field instruction line
(10) Function Keys              - entry to specific program area

```
            Channel Guard Table
              (6)          S           (6)          S
     (4) (5)  Tx    Rx     T  (4) (5)  Tx    Rx     T
     CG  ID   CG    CG     E  CG  ID   CG    CG     E
     1   XXX  XXXXX XXXXX  X  2   XXX  XXXXX XXXXX  X
     3                        4
```

| CG | (4) | The Channel Guard field is used to indicate which of the fourteen Channel Guards you are modifying.<br><br>This is a "display only" field and is inaccessible. |
|---|---|---|
| ID | (5) | The Identification field is used to name the Channel Guard.<br><br>Enter three alphanumeric characters.<br><br>This field will convert any lower case characters to upper case and will not allow @[ ]\/.-+<>*'&$%#"!?=;:. |
| Tx CG | (6) | The Transmit Channel Guard field is used to enter the transmit Channel Guard for this entry.<br><br>Enter the desired transmit Channel Guard code using either tone or Digital Channel Guard codes.<br><br>— Tone Channel Guards are identified by the placement of a decimal point within the field. For example: 67.0 identifies a tone Channel Guard of 67 Hz. Valid tone Channel Guards are in the range of 67.0 to 210.7 Hz.<br>— Digital Channel Guards do not have a decimal point within the field. For example: 023, 047, 315, etc. |

```
            Channel Guard Table
                   (8)                       (8)
              (7)   S                  (7)    S
         Tx   Rx    T             Tx   Rx     T
     CG  ID   CG    CG     E  CG  ID   CG     CG    E
     1   XXX  XXXXX XXXXX  X  2   XXX  XXXXX  XXXXX X
     3                        4
```

| Rx CG | (7) | The Receive Channel Guard field is used to enter the receive Channel Guard for this entry.<br><br>Enter the desired receive Channel Guard code using either tone or Digital Channel Guard codes.<br><br>— Tone Channel Guards are identified by the placement of a decimal point within the field. For example: 67.0 identifies a tone Channel Guard of 67 Hz. Valid tone Channel Guards are in the range of 67.0 to 210.7 Hz.<br>— Digital Channel Guards do not have a decimal point within the field. For example: 023, 047, 315, etc. |
|---|---|---|

Ste (8) The Squelch Tail Elimination field is used to indicate whether or not squelch tail elimination is to be enabled for this channel.

Access to this field is normally denied unless a Digital or tone receive Channel Guard is entered.

- If the receive Channel Guard field is a tone Channel Guard this field will be defaulted to "On" and you are given access. Using the toggle switch you can enter "On" or "Off".
- If the receive Channel Guard is digital this field will also default to "On" but access to the field is denied.
- If the receive Channel Guard field is empty then the field defaults to "Off" and access is again denied.

Your function key options from the Channel Guard Table Window are:

F9 - Help. Select this option if you want to:
   Receive further information pertaining to a field area.

F10- Back. Select this option if you want to:
   Return to the Contron Unit Options Window.

Fnc

The Function Control Button Window, shown in Figure 20, is accessed by pressing the F3 Fnc key from the Control Unit Options Window and is used to define the primary and secondary functions of the function keys.

```
┌─GE Mobile Communications─────────────────────────────────────────────────┐
│ ┌Edit──────────────S-825 Control Unit Programming──────────────L1-B─┐   │
│ └─(1)─────────────────────────────────────────────────────────────────┘   │
│                                                                          │
│ ┌─────────────────┬──────────────────────────────────┬────────────────┐ │
│ │             (2) │  (3)  FNC Button                 │                │ │
│ │ Unit Type:  XXX │  (4)    Primary:   XXXXXXXX      │ Tone:    XXX   │ │
│ │ Off Hook:   XXX │  (5)    Secondary: XXXXXXXX      │ e Sav:   XXX   │ │
│ │ Rx CG Dec:  XXX │                                  │ meout:   X     │ │
│ │ Delete Ky:  XXX │                                  │ st Md:   XXX   │ │
│ │ Scan Hang:  XXX │                                  │ Ring:    XXX   │ │
│ │                 │ (6)                              │                │ │
│ │ Press TAB to tog│  Press TAB to toggle, F9 for help.│               │ │
│ └─────────────────┴──────────────────────────────────┴────────────────┘ │
│                                (7)                                       │
│  ┌──┐ ┌──┐ ┌──┐ ┌──┐ ┌──┐ ┌──┐ ┌──┐ ┌──┐ ┌────┐ ┌────┐                   │
│  │F1│ │F2│ │F3│ │F4│ │F5│ │F6│ │F7│ │F8│ │ F9 │ │F10 │                   │
│  └──┘ └──┘ └──┘ └──┘ └──┘ └──┘ └──┘ └──┘ │Help│ │Back│                   │
│                                          └────┘ └────┘                   │
└──────────────────────────────────────────────────────────────────────────┘
```

FIGURE 20 - FUNCTION CONTROL BUTTON WINDOW (1) Function         - indicates current function
(2) "Pop-Up" Window  - function key definitions window
(3) Window Title     - identifies window
(4) Primary          - function keys primary functions
(5) Secondary        - function keys secondary functions
(6) Prompt Line      - current field instruction line
(7) Function Keys    - entry to specific program area

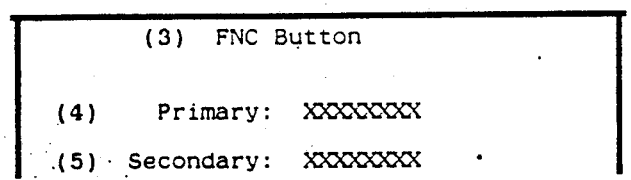

| | | |
|---|---|---|
| Primary | (4) | The Primary field is used to indicate the primary function of the function keys.<br><br>Use the Tab key to toggle and indicate one of the three function key functions you desire.<br><br>Your choices in the Primary field are:<br>- "Siren" - indicates the primary function of the function keys are enabled with siren.<br>- "DTMF" - indicates the control unit will generate DTMF when the function keys are depressed.<br>- "Disable" - disables the level of the FNC key. (If the secondary function is disabled, the FNC key is also disabled except for changing backlight.) |
| Secondary | (5) | The Secondary field is used to indicate the secondary function of the function keys.<br><br>Using the Tab key as a toggle switch, indicate which of the three possible function key functions you desire.<br><br>Your choices in the Secondary field are:<br>"Siren" - which indicates the secondary function of the function keys are enabled with the siren.<br>"DTMF" - is used to indicate the control unit will generate DTMF when the function keys are depressed.<br>"Disable" - will disable the level of the FNC key. |

Your function key options from the Function Control Button Window are:

F9 - Help. Select this option if you want to:
    Receive further information pertaining to a field area.

F10- Back. Select this option if you want to:
    Return to the Control Head Options Window.

Emergency Signalling

The Emergency Signalling Window, shown in Figure 21, is accessed by pressing the F4 Signal key from the Control Unit Options Window and is used to define the variables associated with emergency signalling.

```
 GE Mobile Communications
┌─────────────────────────────────────────────────────────────────────┐
│  Edit              S-825 Control Unit Programming          L1-B    │
│  (1)                                                                │
└─────────────────────────────────────────────────────────────────────┘

┌──(3) Emergency Signalling─────────────┐
        (2)   │    Revert to Home:   XXX        (4)   │
  Unit Type: XXX│(5)T90/T99                           │ Tone:   XXX
              │     Emerg tone 1:  XXXXX Hz     (6)   │
   Off Hook: XXX│          Length:  XXXXX Msecs  (7)  │ e Sav:  XXX
              │     Emerg tone 2:  XXXXX Hz     (8)   │
  Rx CG Dec: XXX│          Length:  XXXXX Msecs  (9)  │ meout:  X
              │       Tone Delay:  XXX   Secs   (10)  │
  Delete Ky: XXX│(11)GE Star                          │ st Md:  XXX
              │     Repeat Count:  XXX          (12)  │
  Scan Hang: XXX│      Delay Time:  XX    Secs   (13) │
              │     Attack Delay:  XXXXX Msecs  (14)  │
              │(15)                                   │
 Press TAB to tog│ Press TAB to toggle, F9 for help.   │
              └──────────────────────────────────────┘
                               (16)
  ┌──┐ ┌──┐ ┌──┐ ┌──┐ ┌──┐ ┌──┐ ┌──┐ ┌──┐ ┌────┐ ┌────┐
  │F1│ │F2│ │F3│ │F4│ │F5│ │F6│ │F7│ │F8│ │ F9 │ │F10 │
  │  │ │  │ │  │ │  │ │  │ │  │ │  │ │  │ │Help│ │Back│
  └──┘ └──┘ └──┘ └──┘ └──┘ └──┘ └──┘ └──┘ └────┘ └────┘
```

FIGURE 21 - EMERGENCY SIGNALLING WINDOW (1)   Function              -   indicates current function
  (2)   "Pop-Up" Window       -   change/edit file window
  (3)   Window Title          -   identifies window
  (4)   Revert to Home        -   enables transmission on home channel
  (5)   T90/T99               -   designates T90/T99 fields follow
  (6)   Emergency Tone 1      -   defines T90/T99 1st emergency tone
  (7)   Length                -   indicates length of emergency tone 1
  (8)   Emergency Tone 2      -   defines T99 second emergency tone
  (9)   Length                -   indicates length of emergency tone 2
  (10)  Tone Delay            -   time delay between T99 tones
  (11)  GE Star               -   designates GE-STAR fields follow
  (12)  Repeat Count          -   activates GE* ID in emergency mode
  (13)  Delay Time            -   Emergency GE* ID transmit delay time
  (14)  Attack Delay          -   specifies transmit attack delay
  (15)  Prompt Line           -   current field instruction line
  (16)  Function Keys         -   entry to specific program area

```
        ┌─────────────────────────────────────┐
        │     Emergency Signalling            │
        │                                     │
        │   Revert to Home:  XXX       (4)    │
        │ T90/T99                             │
        │     Emerg tone 1:  XXXXX Hz  (6)    │
        │          Length:  XXXXX Msecs (7)   │
        │     Emerg tone 2:  XXXXX Hz         │
        │          Length:  XXXXX Msecs       │
        └─────────────────────────────────────┘
```

Revert Home  (4)   The Revert to Home field is used to indicate
                   whether or not GE-STAR or T90/T99
                   transmissions occur on the home channel or on
                   the selected channel.

Using the Tab key as a toggle switch, select
                   "Yes" to indicate the GE-STAR and T90/T99
                   transmissions will occur on the home channel,
                   or "No" to indicate the GE-STAR and T90/T99
                   transmissions will occur on the selected
                   channel.

| | | |
|---|---|---|
| Emerg tone 1 (6) | | The Emergency Tone 1 field is used to define the T90 emergency tone or the first tone of the emergency T99 tone set. This tone will be generated when the user keys an emergency on the control unit in a mode that has T90/T99 selected as the signalling desired.<br><br>Enter a valid tone in the range of 250 to 3000 Hz. |
| Length | (7) | The Length field is used to declare the length of the T90/T99 Emergency Tone 1. The value entered here determines the length of time the control unit will generate the above tone.<br><br>Enter a valid tone length in the range of 0 to 3000 Msecs in 20 Msecs increments. |

```
   Emergency Signalling

T90/T99
     Emerg tone 2:   XXXXX Hz      (8)
         Length:     XXXXX Msecs   (9)
      Tone Delay:    XXX   Secs    (10)
GE Star
     Repeat Count:   XXX           (12)
```

| | | |
|---|---|---|
| Emerg tone 2 (8) | | The Emergency Tone 2 field is used to define the second tone of the emergency T99 tone set. This tone will be generated when the user keys an emergency on the control unit in a mode that has T90/T99 selected as the signalling desired.<br><br>Enter a valid tone in the range of 250 to 3000 Hz. |
| Length | (9) | The Length field is used to declare the length of the T90/T99 Emergency Tone 2. The value entered here determines the length of time the control unit will generate the above tone.<br><br>Enter a valid tone length in the range of 0 to 3000 Msecs in 20 Msecs increments. |
| Tone Delay | (10) | The Tone Delay field is used to indicate the amount of time the control unit should delay between generation of the T99 tones.<br><br>Enter a value in the range of 0 to 3000 Msecs in 20 Msec increments. |
| Repeat Count (12) | | The Repeat Count field is used to indicate the number of times the control unit is to generate a GE-STAR ID once the emergency mode of operation has been activated.<br><br>Enter a value in the range of 1 and 255. |

```
          Emergency Signalling
  GE Star
      Repeat Count:  XXX
        Delay Time:  XX    Secs  (13)
      Attack Delay:  XXXXX Msecs (14)

Press TAB to toggle, F9 for help.
```

Delay Time    (13)    The Delay Time field is used to indicate the
                      delay between transmissions of the emergency
                      GE-STAR ID when the emergency mode of
                      operation has been activated.

Enter a valid value in the range of 1 to 60
                      secs in one second increments.

Attack Delay  (14)    The Attack Delay field is used to specify the
                      transmit attack delay prior to sending the
                      GE-STAR ID.

Enter a value in the range of 50 and
                      5000 Msecs.

Your function key options from the Emergency Signalling
Window are:

F9 - Help.  Select this option if you want to:
     Receive further information pertaining to a field area.

F10- Back.  Select this option if you want to:
     Return to the Control Unit Options Window.

Radio

The Radio Options Window, shown in Figure 22, is accessed by
pressing the F5 Radio key from the Control Unit Options
Window and is used to define some of the options and
characteristics of the radio attached to the control unit.
These options will affect control unit/radio interfacing.

```
GE Mobile Communications
 ┌─────────────────────────────────────────────────────────────┐
 │ Edit          S-825 Control Unit Programming        L1-B    │
 │ (1)                                                         │

(3)  Radio Options
            (2)

Unit Type:  XXX        Radio Download:   XXX   (4)    Tone:    XXX
   Off Hook:  XXX        Ign A+ Required:  XXX   (5)    e Sav:   XXX
  Rx CG Dec:  XXX        VRS Beep Interval: XX   (6)    meout:   X
  Delete Ky:  XXX        VRS Forced Scan:  XXX   (7)    st Md:   XXX
  Scan Hang:  XXX        Dual Control:     XXX   (8)    Ring:    XXX (9)
  Press TAB to tog     Press TAB to toggle, F9 for help.
```

(10)

FIGURE 22 - RADIO OPTIONS WINDOW

| | | |
|---|---|---|
| (1) | Function | - indicates current function |
| (2) | "Pop-Up" Window | - change/edit file window |
| (3) | Window Title | - identifies window |
| (4) | Radio Download | - channel downloading support field |
| (5) | Ign A+ Required | - prevents Tx when ignition is off |
| (6) | VRS Beep Interval | - seconds delay between VRS beeps |
| (7) | VRS Forced Scan | - indicates if VRS is forced to scan |
| (8) | Dual Control | - indicates if dual control equipped |
| (9) | Prompt Line | - current field instruction line |
| (10) | Function Keys | - entry to specific program area |

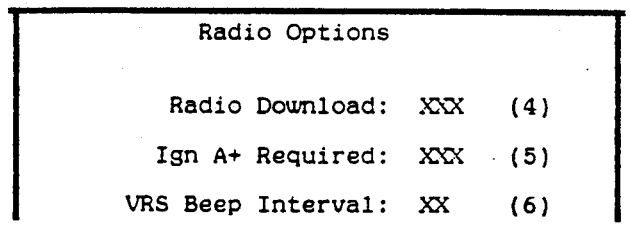

| | | |
|---|---|---|
| Radio Download | (4) | The Radio Download field is used to indicate whether or not the control unit should download data to the radio. |
| | | Using the Tab key as a toggle switch, select "Ena" to enable the control unit to download data to the radio or "Dis" to disable the control unit from downloading data to the radio. |
| Ign A+ Required | (5) | The Ignition A+ Required field is used to prevent transmission when the automobile ignition is off. |
| | | Using the Tab key as a toggle switch, select "Yes" to indicate that the control unit is to prevent all transmissions while the automobile ignition is off. Select "No" to indicate that transmission can occur at any time power is applied to the control unit. |
| VRS Beep Interval | (6) | The VRS Beep Interval field is used to indicate the number of seconds the control unit should delay between VRS beeps. The control unit will beep at a periodic rate to audibly inform you that the VRS is on. |
| | | Enter a value between 1 and 15 seconds. |

```
            ┌─────────────────────────────────────────┐
            │            Radio Options                │
            │                                         │
            │     VRS Forced Scan:   XXX    (7)       │
            │                                         │
            │     Dual Control:      XXX    (8)       │
            │                                         │
            └─────────────────────────────────────────┘
```

| | |
|---|---|
| VRS Forced Scan (7) | The VRS Forced Scan field is used to indicate whether or not the S825 control unit is forced to scan when the VRS is enabled. |
| | Using the Tab key as a toggle switch, select "Yes" if you want the S825 control unit to disable channel scan when the VRS is active. |
| Dual Control (8) | The Dual Control field is used to indicate whether or not this control unit is equipped for dual control. |
| | Using the Tab key as a toggle switch, select "Yes" if the radio system is equipped for dual control. |

Your function key options from the Radio Options Window are:

F9 — Help. Select this option if you want to:
   Receive further information pertaining to a field area.

F10— Back. Select this option if you want to:
   Return to the Control Unit Options Window.

Key

```
┌─GE Mobile Communications──────────────────────────────────────────────
│ ┌────────────────────────────────────────────────────────────────┐
│ │ Edit           S-825 Control Unit Programming           L1-B   │
│ └─(1)────────────────────────────────────────────────────────────┘

┌──────────────────────────────────────────┐
              │ (3)   System Keypad Definition           │
        (2)   │                    (4)                   │
  Unit Type: XXX│(5)Pwr            XXX XXX XXX           │  Tone:   XXX
              │                                          │
   Off Hook: XXX│(6)Fnc            XXX XXX XXX           │  e Sav:  XXX
              │                                          │
  Rx CG Dec: XXX│   XXX XXX XXX XXX XXX XXX XXX XXX      │ meout:   X
              │        (7) (8)                           │
  Delete Ky: XXX│       Vol Chn XXX                      │ st Md:   XXX
              │                                          │
  Scan Hang: XXX│   XXX XXX XXX XXX XXX XXX XXX XXX      │ Ring:    XXX
              │(9)                                       │
 Press TAB to tog│  Press TAB to toggle, F9 for help     │
              └──────────────────────────────────────────┘
                              (10)
 ┌────┐ ┌────┐ ┌────┐ ┌────┐ ┌────┐ ┌────┐ ┌────┐ ┌────┐ ┌────┐ ┌────┐
 │ F1 │ │ F2 │ │ F3 │ │ F4 │ │ F5 │ │ F6 │ │ F7 │ │ F8 │ │ F9 │ │ F10│
 │    │ │    │ │    │ │    │ │    │ │    │ │    │ │    │ │Help│ │Back│
 └────┘ └────┘ └────┘ └────┘ └────┘ └────┘ └────┘ └────┘ └────┘ └────┘
```

FIGURE 23 - SYSTEM KEYPAD DEFINITION WINDOW

- (1) Function — indicates current function
- (2) "Pop-Up" Window — system keypad definition window
- (3) Window Title — identifies window
- (4) Input Fields — toggle or type desired data
- (5) Power Field — keypad reference, "display only"
- (6) Function Field — keypad reference, "display only"
- (7) Volume Field — keypad reference, "display only"
- (8) Channel Field — keypad reference, "display only"
- (9) Prompt Line — current field instruction line
- (10) Function Keys — entry to specific program area The System Keypad Definition Window, shown in Figure 23, allows you to select the defaults to be used when creating a personality. The layout of this screen is selected to represent the physical layout of the keys on the System model of the S825 series Control Unit. Upon entry in this window, the cursor will be located in the first input field of the window. This input field is a toggle field and represents the same key as on the control unit keypad. To define the key, toggle the field (using the Tab key) until the correct selection is displayed or if you know the selection you want you can type it in. Movement between fields in this window is limited to the Enter key, and up and down arrows. Inside each field the left and right cursor keys are active as are the alphanumeric keyboard keys to allow you to type in the field definition if preferred.

There are four "Display Only" fields in the System Keypad Definition Window. They are; Pwr, Fnc, Vol, and Chn. These fields are for keypad reference and cannot be accessed.

The toggle fields and functionality represented in the System Keypad Definition Window are:

- WAI — Wail (initiates the wail siren)
- YLP — Yelp (initiates the yelp siren)
- RST — Reset (will disable all siren/lights)
- S/L1 to S/L8 — Siren/Light Combinations (initiates the programmed combination of sirens and lights)
- GE* — GE-STAR (generates the GE-STAR ID T90/T99)
- VG — Voice Guard (enters an encrypted speech mode)
- VRS — Vehicular RPT On/Off
- EG* — Emergency GE-STAR
- PA — Speaker Public Address
- DSB — Key Disabled (prevents operation of key)
- VLU — Volume Up
- VLD — Volume Down
- CHU — Channel Up
- CHD — Channel Down
- MOD — Mode Select
- HOM — Home (takes you to the home channel)
- SCN — Scan (on/off)
- ADD — Add (adds channels to scan list)
- DEL — Delete (deletes channels from scan list)
- SQL — Squelch Level (sets the level of squelch)
- CG — Channel Guard Select
- SPR — External Speaker On/Off

```
GE Mobile Communications
┌─────────────────────────────────────────────────────────────────┐
│  Edit              S-825 Control Unit Programming         L1-B  │
│  (1)                                                            │
└─────────────────────────────────────────────────────────────────┘
```

```
┌──────────────────┬──────────────────────────────────────┬──────────────┐
│                  │  (3)   Scan Keypad Definition        │              │
│        (2)       │                    (4)               │              │
│  Unit Type:  XXX │  (5) Pwr            XXX      XXX     │ Tone:   XXX  │
│                  │                                      │              │
│  Off Hook:   XXX │  (6) Fnc            XXX              │ e Sav:  XXX  │
│                  │                                      │              │
│  Rx CG Dec:  XXX │        XXX XXX      XXX      XXX     │ meout:  X    │
│                  │        (7) (8)                       │              │
│  Delete Ky:  XXX │        Vol Chn                       │ st Md:  XXX  │
│                  │                                      │              │
│  Scan Hang:  XXX │    XXX XXX XXX XXX  XXX      XXX     │ Ring:   XXX  │
│                  │                                      │              │
│                  │  (9)                                 │              │
│                  │    Press TAB to toggle, F9 for help  │              │
└──────────────────┴──────────────────────────────────────┴──────────────┘
                                  (10)
  ┌────┐ ┌────┐ ┌────┐ ┌────┐ ┌────┐ ┌────┐ ┌────┐ ┌────┐ ┌────┐ ┌────┐
  │ F1 │ │ F2 │ │ F3 │ │ F4 │ │ F5 │ │ F6 │ │ F7 │ │ F8 │ │ F9 │ │    │
  │    │ │    │ │    │ │    │ │    │ │    │ │    │ │    │ │Help│ │    │
  └────┘ └────┘ └────┘ └────┘ └────┘ └────┘ └────┘ └────┘ └────┘ └────┘
```

FIGURE 24 — SCAN KEYPAD DEFINITION WINDOW (1)  Function          — indicates current function
(2)  "Pop-Up" Window   — scan keypad definition window
(3)  Window Title      — identifies window
(4)  Input Fields      — toggle or type desired data
(5)  Power Field       — keypad reference, "display only"
(6)  Function Field    — keypad reference, "display only"
(7)  Volume Field      — keypad reference, "display only"
(8)  Channel Field     — keypad reference, "display only"
(9)  Prompt Line       — current field instruction line
(10) Function Keys     — entry to specific program area The Scan Keypad Definition Window, shown in Figure 24, allows
you to select the defaults to be used when creating a
personality. The layout of this screen is selected to
represent the physical layout of the keys on the Scan model
of the S825 series Control Unit. Upon entry in this window,
the cursor will be located in the first input field of the
window. This input field is a toggle field and represents
the same key as on the control unit keypad. To define the
key, toggle the field (using the Tab key) until the correct
selection is displayed or if you know the selection you want
you can type it in. Movement between fields in this window
is limited to the Enter key and up and down arrows. Inside
each field the left and right cursor keys are active as are
the alphanumeric keyboard keys to allow you to type in the
field definition if preferred.

There are four "display only" fields in the Scan Keypad
Definition Window. They are; Pwr, Fnc, Vol, and Chn. These
fields are for keypad reference and cannot be accessed.

The toggle fields and functionality represented in the Scan
Keypad Definition Window are:

WAI —  Wail (initiates the wail siren)
    YLP —  Yelp (initiates the yelp siren)
    RST —  Reset (will disable all siren/lights)
    S/L1 to S/L8 — Siren/Light Combinations (initiates the
           programmed combination of sirens and lights)

```
GE*  -  GE-STAR (generates the GE-STAR ID T90/T99)
VG   -  Voice Guard (enters an encrypted speech mode)
VRS  -  Vehicular RPT On/Off
EG*  -  Emergency GE-STAR
PA   -  Speaker Public Address
DSB  -  Key Disabled (prevents operation of key)
VLU  -  Volume Up
VLD  -  Volume Down
CHU  -  Channel Up
CHD  -  Channel Down
MOD  -  Mode Select
HOM  -  Home (takes you to the home channel)
SCN  -  Scan (on/off)
ADD  -  Add (adds channels to scan list)
DEL  -  Delete (deletes channels from scan list)
SQL  -  Squelch Level (sets the level of squelch)
CG   -  Channel Guard Select
SPR  -  External Speaker On/Off
```

Your function key options for the System and Scan Keypad Definition Windows are:

F9 – Help. Select this option if you want to:
   Receive further information pertaining to a field area.

F10– Back. Select this option if you want to:
   Return to the Control Unit Options Window.

SAVING A PERSONALITY

To save a personality to disk, press the F10 Back key from the Control Unit Personality Screen. You will be prompted to save the file as shown in Figure 25.

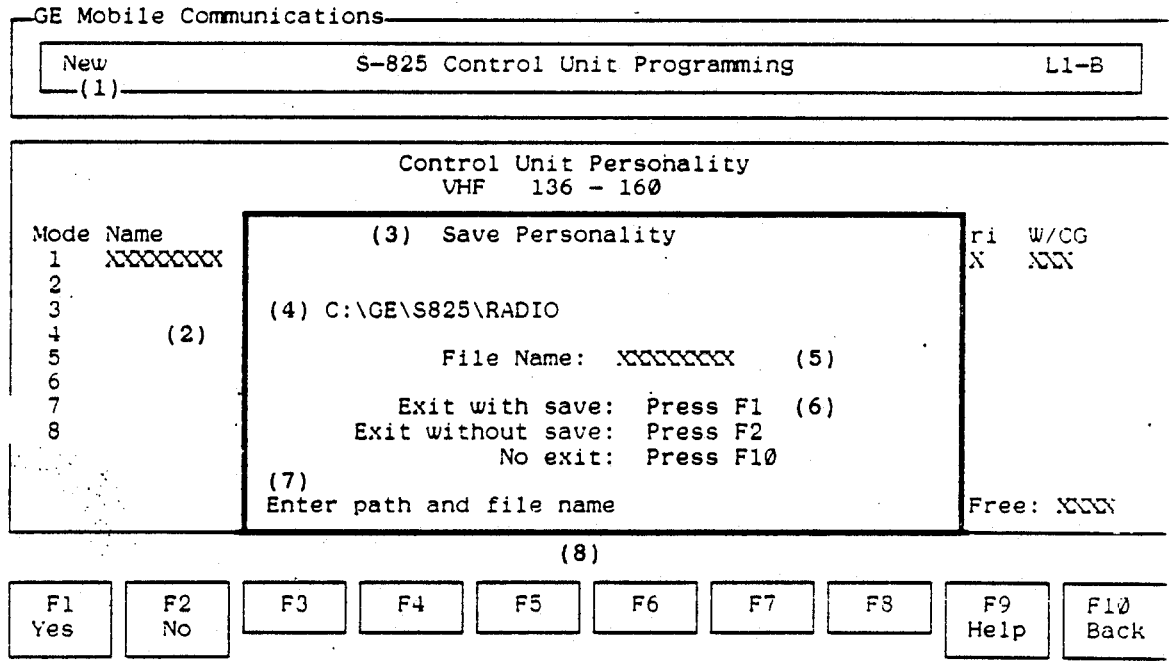

FIGURE 25 – SAVE FILE WINDOW

```
(1)  Function          -  indicates current function
(2)  "Pop-Up" Window   -  change/edit file window
(3)  Window Title      -  identifies window
(4)  Path Field        -  path source field
(5)  File Name         -  destination file name field
(6)  Continue Prompt   -  save or no save option
(7)  Prompt Line       -  current field instruction line
(8)  Function Keys     -  entry to specific program area
```

This window will ask where you want the previously entered personality to be saved. The path field allows you to change or select a destination directory where the current personality will be stored. It defaults to the current drive and directory. To modify the path, press the up arrow key from the file name field. The file name field indicates the name under which the personality will be stored.

By pressing the F1 Exit with save key, the personality will be saved to the specified location. By pressing F2 Exit without save, the personality will not be saved and you will be returned to the Current Personalities Screen. Pressing F10 No exit will take you into the Control Unit Personality Screen again.

From the Save File Window, your options are:

F1 – Yes. Select this option if you want to:
    Save data to disk and exit to the Current Personalities Screen.

F2 – No. Select this option if you want to:
    Exit to the Current Personalities Screen without saving data.

F9 – Help. Select this option if you want to:
    Receive further information pertaining to a field area.

F10– Back. Select this option if you want to:
    Return to the Control Unit Personality Screen.

PROGRAMMING THE PERSONALITY INTO THE CONTROL UNIT

To program the personality into the control unit press the F5 Progrm key while in the Current Personalities Screen. A "pop-up" window will appear, as shown in Figure 26.

FIGURE 26 – PROGRAM RADIO WINDOW (1) Function — indicates current function
(2) "Pop-Up" Window — program radio window
(3) Window Title — identifies window
(4) Filename Field — personality name to program
(5) Continue Prompt — continue or abort option
(6) Prompt Line — current field instruction line
(7) Function Keys — entry to specific program area The Program Radio Window provides for entering the name of the personality to be used for programming the personality.

Enter the name of the personality you want to use for the program operation.

From the Program Radio Window your available options are:

F1 - Select this option if you want to:
    Program the radio with the personality specified.

F2 - Select this option if you want to:
    Abort this operation.

F9 - Help. Select this option if you want to:
    Receive further information pertaining to a field area.

F10- Back. Select this option if you want to:
    Return to the Current Personalities Screen.

READING THE PERSONALITY OF THE RADIO

To confirm the read operation selection, press F6 Read while in the Current Personalities Screen. A "pop-up" window will appear, as shown in Figure 27.

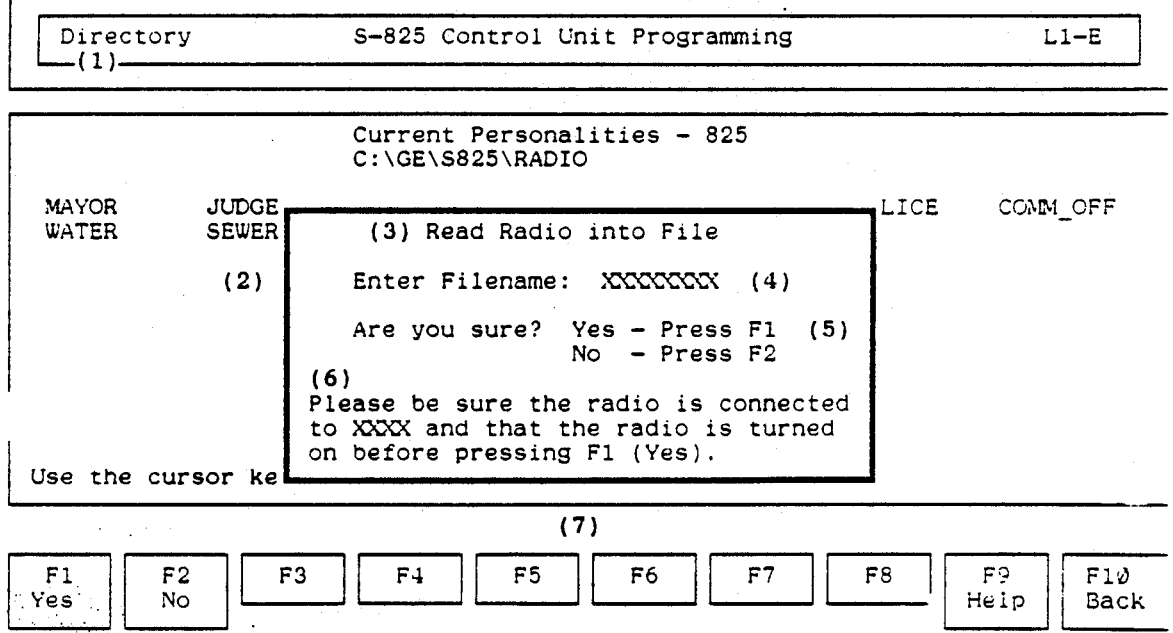

FIGURE 27 - READ RADIO INTO FILE WINDOW (1) Function          - indicates current function
(2) "Pop-Up" Window   - read radio into file window
(3) Window Title      - identifies window
(4) Filename Field    - personality name to read
(5) Continue Prompt   - continue or abort option
(6) Prompt Line       - current field instruction line
(7) Function Keys     - entry to specific program area The Read Radio into File Window is used to confirm the read operation selection.

Enter the name of the personality you want to use for the read operation.

From this window your available options are:

F1 - Select this option if you want to:
   Read the control unit into the personality specified.

F2 - Select this option if you want to:
   Abort this operation.

F9 - Help. Select this option if you want to:
   Receive further information pertaining to a field area.

F10- Back. Select this option if you want to:
   Return to the Current Personalities Screen.

CHAPTER 5 - USING THE UTILITIES

UTILITY WINDOW

```
┌─GE Mobile Communications─────────────────────────────────────────
│  ┌─────────────────────────────────────────────────────────────┐
│  │ Directory        S-825 Control Unit Programming       L0-A  │
│  └─(1)──────────────────────────────────────────────────────────┘

┌──────────────────────────────────────────────────────────────┐
   │              (2)  Current Personalities - 825   (3)          │
   │              (4)  C:\GE\S825\RADIO  (5)                      │
   │ (7)                                                          │
   │ MAYOR     JUDGE      COUNCIL    PUBLIC    FIRE_CHF   POLICE    COMM_OFF
   │ WATER     SEWER                                              │
   │                                                              │
   │                              (6)                             │
   │                                                              │
   └──────────────────────────────────────────────────────────────┘

(8)
   Use the cursor keys to select personality.
                                 (9)
   ┌─────┐ ┌───┐ ┌───┐ ┌───┐ ┌──────┐ ┌─────┐ ┌───┐ ┌───┐ ┌─────┐ ┌─────┐
   │ F1  │ │F2 │ │F3 │ │F4 │ │  F5  │ │ F6  │ │F7 │ │F8 │ │ F9  │ │ F10 │
   │Port │ │   │ │Dir│ │   │ │Delete│ │Print│ │Ext│ │   │ │Help │ │Back │
   └─────┘ └───┘ └───┘ └───┘ └──────┘ └─────┘ └───┘ └───┘ └─────┘ └─────┘
```

FIGURE 28 - UTILITY WINDOW (1)  Function              - indicates current function
(2)  Screen Title          - identifies screen
(3)  Default Extension     - designated extension
(4)  Current Drive         - designated drive
(5)  Current Directory     - designated directory name
(6)  Personality Fields    - personalities in current directory
(7)  Highlighted Personality - indicates cursor location
(8)  Prompt Line           - current field instruction line
(9)  Function Keys         - entry to specific program area The Utility Window allows access to infrequently used functions which have little relationship to the actual programming of a control unit. When the F3 Utility key is pressed from the Current Personalities Screen, the personality listing screen changes to the function "Utility" Window with new function keys listed as shown in Figure 28.

From the Utility Window, your options are:

F1 — Port. Select this option if you want to:
Change the port to use for programming the control unit.

F3 — Dir. Select this option if you want to:
Change your current directory.

F5 — Delete. Select this option if you want to:
Erase a personality from the disk.

F6 — Print. Select this option if you want to:
Print out the personality to the printer, screen, or file.

F7 — Ext. Select this option if you want to:
Change the current extension.

F9 — Help. Select this option if you want to:
Receive further information pertaining to a field area.

F10— Back. Select this option if you want to:
Return to the Current Personalities Screen.

PRINT PERSONALITY

Pressing the F6 Print key while in the Utility Window causes a "pop-up" window to be displayed and enables the F1 Yes, F2 No, F9 Help and F10 Back function keys.

Print to Screen Option

```
┌─GE Mobile Communications──────────────────────────────────────────────┐
│ ┌Print──────────────────────────────────────────────────────────┐ L2-F│
│ │ (1)       S-825 Control Unit Programming                      │     │
│ └───────────────────────────────────────────────────────────────┘     │
│                                                                       │
│                    (3)  Print Personality                             │
│                                                                       │
│                  Personality:  XXXXXXXX   (4)                         │
│  MAYOR    JUDG   Output To:    Screen     (5)       OLICE    COMM_OFF │
│  WATER    SEWE                                                        │
│                                                                       │
│           (2)                                                         │
│                                                                       │
│                                                                       │
│                                                                       │
│                  (6)                                                  │
│                    Are you sure?  Yes — Press F1                      │
│                                   No  — Press F2                      │
│                  (7)                                                  │
│  Use the cursor k Press TAB to toggle, F9 for help                    │
└───────────────────────────────────────────────────────────────────────┘
                              (8)
 ┌────┐ ┌────┐ ┌────┐ ┌────┐ ┌────┐ ┌────┐ ┌────┐ ┌────┐ ┌────┐ ┌────┐
 │ F1 │ │ F2 │ │ F3 │ │ F4 │ │ F5 │ │ F6 │ │ F7 │ │ F8 │ │ F9 │ │ F10│
 │Yes │ │ No │ │    │ │    │ │    │ │    │ │    │ │    │ │Help│ │Back│
 └────┘ └────┘ └────┘ └────┘ └────┘ └────┘ └────┘ └────┘ └────┘ └────┘
```

FIGURE 29 - PRINT PERSONALITY "SCREEN" WINDOW

| | | |
|---|---|---|
| (1) | Function | - indicates current function |
| (2) | "Pop-Up" Window | - print personality window |
| (3) | Window Title | - identifies window |
| (4) | Personality Field | - personality to print |
| (5) | Output To Field | - personality will print to screen |
| (6) | Print Que | - que to print option |
| (7) | Prompt Line | - current field instruction line |
| (8) | Function Keys | - entry to specific program area |

The Print Personality "Screen" Window, shown in Figure 29, is brought up by toggling the "Output To" field from any of the Print Personality Windows. Once you have typed in the personality you want to print, press the F1 Yes key to generate the printout and the personality data will appear on the screen allowing you to page through it.

The active function keys for this window are:

F1 - Yes. Select this option if you want to:
    Print to the screen.

F2 - No. Select this option if you want to:
    Cancel the print que and return to the window.

F9 - Help. Select this option if you want to:
    Receive further information pertaining to a field area.

F10- Back. Select this option if you want to:
    Return to the Utility Window.

Print to Printer Option

```
-GE Mobile Communications────────────────────────────────
 ┌──────────────────────────────────────────────────────┐
 │ Print        S-825 Control Unit Programming    L2-F  │
 │ (1)                                                  │
 └──────────────────────────────────────────────────────┘

(3) Print   Personality
              (2)
                     Personality:  XXXXXXX   (4)
 MAYOR      JUDG     Output To:    Printer   (5)         OLICE    COMM_OFF
 WATER      SEWE Printer No:  1   (6)
                             1 - LPT1    3 - COM1
                             2 - LPT2    4 - COM2
                     (7)
                         Are you sure?  Yes - Press F1
                                        No  - Press F2
                     (8)
 Use the cursor k    Press TAB to toggle, F9 for help (9)
 ┌────┬────┬────┬────┬────┬────┬────┬────┬────┬────┐
 │ F1 │ F2 │ F3 │ F4 │ F5 │ F6 │ F7 │ F8 │ F9 │ F10│
 │Yes │ No │    │    │    │    │    │    │Help│Back│
 └────┴────┴────┴────┴────┴────┴────┴────┴────┴────┘
```

FIGURE 30 - PRINT PERSONALITY "PRINTER" WINDOW (1) Function            - indicates current function
(2) "Pop-Up" Window     - print personality window
(3) Window Title        - identifies window
(4) Personality Field   - personality to print
(5) Output To Field     - personality will print to printer
(6) Printer Number Field - identify printer selection
(7) Print Que           - que to print option
(8) Prompt Line         - current field instruction line
(9) Function Keys       - entry to specific program area The Print Personality "Printer" Window, shown in Figure 30, is brought up by toggling the "Output To" field from any of the Print Personality Windows. Once you have typed in the personality you want to print, press the F1 Yes key to generate a hard copy printout.

The active function keys for this window are:

F1 - Yes. Select this option if you want to:
   Print to the printer.

F2 - No. Select this option if you want to:
   Cancel the print que and return to the window.

F9 - Help. Select this option if you want to:
   Receive further information pertaining to a field area.

F10- Back. Select this option if you want to:
   Return to the Utility Window.

NOTE: If you select F1, the PC Programming Software will perform a final edit check notifying you if your printer is not on-line. If the printer is on-line the information will then print.

Print to File Option

```
┌─GE Mobile Communications──────────────────────────────────────────────┐
│  ┌─────────────────────────────────────────────────────────┐          │
│  │ Print         S-825 Control Unit Programming      L2-F  │          │
│  │─(1)──────────────────────────────────────────────────── │          │
│  └─────────────────────────────────────────────────────────┘          │
│                                                                        │
│                    (3) Print   Personality                             │
│           (2)                                                          │
│                   Personality:  XXXXXXX    (4)                         │
│   MAYOR    JUDG    Output To:   File       (5)                  OLICE    COMM_OFF
│   WATER    SEWE   (6)                                                  │
│                   XXXXXXXXXXXXXXXXXXXXXXXXXXXXXXXXX                    │
│                                                                        │
│                                                                        │
│                                                                        │
│                    Are you sure?  Yes - Press F1  (7)                  │
│                                   No  - Press F2                       │
│                   (8)                                                  │
│   Use the cursor k  Press TAB to toggle, F9 for help                   │
└────────────────────────────────(9)─────────────────────────────────────┘

┌─────┬─────┬─────┬─────┬─────┬─────┬─────┬─────┬─────┬─────┐
│ F1  │ F2  │ F3  │ F4  │ F5  │ F6  │ F7  │ F8  │ F9  │ F10 │
│ Yes │ No  │     │     │     │     │     │     │ Help│ Back│
└─────┴─────┴─────┴─────┴─────┴─────┴─────┴─────┴─────┴─────┘
```

FIGURE 31 - PRINT PERSONALITY "FILE" WINDOW

| | | |
|---|---|---|
| (1) | Function | - indicates current function |
| (2) | "Pop-Up" Window | - print personality window |
| (3) | Window Title | - identifies window |
| (4) | Personality Field | - personality to print |
| (5) | Output To Field | - personality will print to file |
| (6) | Path/File Name | - path/file name to print to |
| (7) | Print Que | - que to print option |
| (8) | Prompt Line | - current field instruction line |
| (9) | Function Keys | - entry to specific program area |

The Print Personality File Window, shown in Figure 31, is brought up by toggling the "Output To" field from any of the Print Personality Windows. Once the personality you want to use has been selected, type in the path/file name the printed output should go to. You can use up to 35 characters in this field. Pressing the F1 Yes key will cause the printout to be generated to the specified file for printout at a later time.

The active function keys for this window are:

F1 - Yes.  Select this option if you want to:
     Print to the file.

F2 - No.  Select this option if you want to:
     Cancel the print que and return to the window.

F9 - Help.  Select this option if you want to:
     Receive further information pertaining to a field area.

F10- Back.  Select this option if you want to:
     Return to the Utility Window.

NOTE:  When F1 is selected, the PC Programming Software will perform a final edit check to see that you are not overwriting a file with information already stored or it. If you are, a warning will appear to let you know. If no file is being overwritten, a message will indicate that the printout is being generated and return you to the Print Personality Window.

DELETE PERSONALITY

```
┌─GE Mobile Communications──────────────────────────────────────────────────
│ ┌──────────────────────────────────────────────────────────────────────┐
│ │ Delete            S-825 Control Unit Programming              L1-F   │
│ └(1)───────────────────────────────────────────────────────────────────┘
│
│                     Current Personalities - 825
│                     C:\GE\S825\RADIO
│
│   MAYOR        JUDGE       COUNCIL    PUBLIC     FIRE_CHF    POLICE    COMM_OFF
│   WATER        SEWER       ┌────────────────────────────┐
│                            │ (3)  Delete Personality    │
│                 (2)        │                            │
│                            │ Delete the file  XXXXXXX  (4) │
│                            │ (5)                        │
│                            │ Are you sure:  Yes - Press F1 │
│                            │                No  - Press F2 │
│                            └────────────────────────────┘
│
│                                  (6)
│   ┌────┐ ┌────┐ ┌────┐ ┌────┐ ┌────┐ ┌────┐ ┌────┐ ┌────┐ ┌────┐ ┌────┐
│   │ F1 │ │ F2 │ │ F3 │ │ F4 │ │ F5 │ │ F6 │ │ F7 │ │ F8 │ │ F9 │ │ F10│
│   │Yes │ │ No │ │    │ │    │ │    │ │    │ │    │ │    │ │Help│ │Back│
│   └────┘ └────┘ └────┘ └────┘ └────┘ └────┘ └────┘ └────┘ └────┘ └────┘
```

FIGURE 32 - DELETE PERSONALITY WINDOW

| | | |
|---|---|---|
| (1) | Function | - indicates current function |
| (2) | "Pop-Up" Window | - delete personality window |
| (3) | Window Title | - identifies window |
| (4) | Personality Field | - personality to be deleted |
| (5) | Continue Prompt | - continue or abort option |
| (6) | Function Keys | - entry to specific program area |

Personality files can be deleted without leaving the Utility Window. It is important to note, however, that deleting a personality will remove it permanently from the directory. To access the Delete Personality Window, shown in Figure 32, press F5 Delete.

The active function keys for this window are:

F1 - Yes. Select this option if you want to:
   Continue with this change.

F2 - No. Select this option if you want to:
   Cancel this procedure.

F9 - Help. Select this option if you want to:
   Receive further information pertaining to a field area.

F10- Back. Select this option if you want to:
   Return to the Utility Window.

NOTE:   If F1 is selected the personality named will be PERMANENTLY deleted. If you do not wish to delete the personality, select F2.

CHANGE DIRECTORIES

```
┌─GE Mobile Communications──────────────────────────────────────────┐
│ ┌──────────────────────────────────────────────────────────────┐  │
│ │ Change Dir         S-825 Control Unit Programming      L1-E  │  │
│ └─(1)───────────────────────────────────────────────────────────┘ │
├───────────────────────────────────────────────────────────────────┤
│                  Current Personalities - 825                      │
│                  C:\GE\S825\RADIO                                 │
│   MAYOR     JUDGE┌──────────────────────────────────┐ICE  COMM_OFF│
│   WATER     SEWER│    (3) Change Directory          │             │
│             (2)  │ (4)                              │             │
│                  │ XXXXXXXXXXXXXXXXXXXXXXXXXXXXXXX  │             │
│                  │                                  │             │
│                  │  Are you sure?  Yes - Press F1 (5)│            │
│                  │                 No  - Press F2   │             │
│                  │ (6)                              │             │
│                  │   Enter desired directory        │             │
│                  └──────────────────────────────────┘             │
│ Use the cursor keys to select personality.                        │
├───────────────────────────────────────────────────────────────────┤
│                               (7)                                 │
│  ┌───┐ ┌───┐ ┌───┐ ┌───┐ ┌───┐ ┌───┐ ┌───┐ ┌───┐ ┌────┐ ┌────┐    │
│  │F1 │ │F2 │ │F3 │ │F4 │ │F5 │ │F6 │ │F7 │ │F8 │ │F9  │ │F10 │    │
│  │Yes│ │No │ │   │ │   │ │   │ │   │ │   │ │   │ │Help│ │Back│    │
│  └───┘ └───┘ └───┘ └───┘ └───┘ └───┘ └───┘ └───┘ └────┘ └────┘    │
└───────────────────────────────────────────────────────────────────┘
```

FIGURE 33 - CHANGE DIRECTORY WINDOW (1) Function                  - indicates current function
(2) "Pop-Up" Window           - change directory window
(3) Window Title              - identifies window
(4) Path Field                - identify path to be changed
(5) Continue Prompt           - continue or abort option
(6) Prompt Line               - current field instruction line
(7) Function Keys             - entry to specific program area The Change Directory Window, shown in Figure 33, lets you change directories without leaving the program. This window can be accessed by pressing the F3 Dir key. Once this window is opened, enter a valid path name for the directory you plan to change in the directory field. You can use up to 32 characters.

The active function keys for this window are:

F1 - Yes. Select this option if you want to:
    Continue with this change.

F2 - No. Select this option if you want to:
    Cancel this procedure.

F9 - Help. Select this option if you want to:
    Receive further information pertaining to a field area.

F10- Back. Select this option if you want to:
    Return to the Utility Window.

NOTE:   Pressing F1 Yes will return you to the Utility Window
        under the specified directory.

CHANGE EXTENSIONS

```
┌─GE Mobile Communications──────────────────────────────────────────────┐
│  ┌─────────────────────────────────────────────────────────────────┐  │
│  │ Extension          S-825 Control Unit Programming        L1-H  │  │
│  │ ─(1)─                                                           │  │
│  └─────────────────────────────────────────────────────────────────┘  │
│                                                                       │
│  ┌─────────────────────────────────────────────────────────────────┐  │
│  │                  Current Personalities - 825                    │  │
│  │                  C:\GE\S825\RADIO                               │  │
│  │                                                                 │  │
│  │ MAYOR      JUDGE      COUNCIL    PUBLIC    FIRE_CHF   POLICE    COMM_OFF │
│  │ WATER      SEWER                                                │  │
│  │            ┌──────────────────────────────────┐                 │  │
│  │    (2)     │ (3) Change Extension         (4) │                 │  │
│  │            │ Enter file name extension - 825  │                 │  │
│  │            │ Are you sure:  Yes - Press F1 (5)│                 │  │
│  │            │                No  - Press F2    │                 │  │
│  │            └──────────────────────────────────┘                 │  │
│  └─────────────────────────────────────────────────────────────────┘  │
│                                  (6)                                  │
│ ┌────┬────┬────┬────┬────┬────┬────┬────┬─────┬─────┐                │
│ │ F1 │ F2 │ F3 │ F4 │ F5 │ F6 │ F7 │ F8 │ F9  │ F10 │                │
│ │Yes │No  │    │    │    │    │    │    │Help │Back │                │
│ └────┴────┴────┴────┴────┴────┴────┴────┴─────┴─────┘                │
```

FIGURE 34 - CHANGE EXTENSION WINDOW (1) Function            - indicates current function
(2) "Pop-Up" Window     - change directory window
(3) Window Title        - identifies window
(4) Extension Field     - identify extension
(5) Continue Prompt     - continue or abort option
(6) Function Keys       - entry to specific program area The Change Extension Window, shown in Figure 34, allows you to select the default extension displayed at the top of the Current Personalities Screen. This extension is used as a selector in which personalities are displayed on the screen. To change an extension select the F7 Ext key from the Utility Window. Once this window is opened enter the desired extension in the "Enter File Name Extension" field. This field will accept three alphanumeric characters.

The active function keys for this window are:

F1 - Yes. Select this option if you want to:
    Continue with this change.

F2 - No. Select this option if you want to:
    Cancel this procedure.

F9 - Help. Select this option if you want to:
    Receive further information pertaining to a field area.

F10- Back. Select this option if you want to:
    Return to the Utility Window.

NOTE:  Even though this control unit extension is S825 the extension shown in the default on the Current Personalities Screen is 825 because only three characters are allowed. Anytime you change the extension, that extension will then become the default and will be used whenever files are saved unless another extension is explicitly specified.

CHANGING THE COMMUNICATIONS PORT

```
┌─GE Mobile Communications─────────────────────────────────────────────┐
│ Port          S-825 Control Unit Programming              L1-D       │
│ ─(1)─                                                                │
├──────────────────────────────────────────────────────────────────────┤
│              Current Personalities - 825                             │
│              C:\GE\S825\RADIO                                        │
│                                                                      │
│   MAYOR    JUDGE┌──────────────────────────────────┐ICE    COMM_OFF  │
│   WATER    SEWER│ (3)  Communications Port Setup   │                 │
│            (2)  │                                  │                 │
│                 │         Comm Port X  (4)         │                 │
│                 │                                  │                 │
│                 │   Are you sure?  Yes - Press F1  (5)               │
│                 │                  No  - Press F2  │                 │
│                 │                                  │                 │
│                 │   (6)                            │                 │
│                 │   Enter the Comm Port ID         │                 │
│                 └──────────────────────────────────┘                 │
│                                                                      │
│   Use the cursor keys to select personality.                         │
├──────────────────────────────────────────────────────────────────────┤
│                               (7)                                    │
│  ┌───┐ ┌───┐ ┌───┐ ┌───┐ ┌───┐ ┌───┐ ┌───┐ ┌───┐ ┌────┐ ┌────┐        │
│  │F1 │ │F2 │ │F3 │ │F4 │ │F5 │ │F6 │ │F7 │ │F8 │ │F9  │ │F10 │        │
│  │Yes│ │No │ │   │ │   │ │   │ │   │ │   │ │   │ │Help│ │Back│        │
│  └───┘ └───┘ └───┘ └───┘ └───┘ └───┘ └───┘ └───┘ └────┘ └────┘        │
└──────────────────────────────────────────────────────────────────────┘
```

FIGURE 35 - COMMUNICATIONS PORT SETUP WINDOW (1) Function          - indicates current function
(2) "Pop-Up" Window   - setup window
(3) Window Title      - identifies window
(4) Comm Port Field   - communications port indicator
(5) Continue Prompt   - continue or abort option
(6) Prompt Line       - current field instruction line
(7) Function Keys     - entry to specific program area The Communications Port Setup Window, shown in Figure 35, allows you to select the communications port you want to use in programming the control unit. To define the communications port you want to use, press the F1 Port key while in the Utility Window. At the "Comm Port" field select the port you wish to use. There are only two ports available for this purpose: COM1 and COM2. To select COM1 enter a 1 or to select COM2 enter a 2.

The active function keys for this window are:

F1 - Yes. Select this option if you want to:
    Continue with this change.

F2 - No. Select this option if you want to:
    Cancel this procedure.

F9 - Help. Select this option if you want to:
    Receive further information pertaining to a field area.

F10- Back. Select this option if you want to:
    Return to the Utility Window.

NOTE:  Once the F1 key is selected, the setup file is updated to reflect the new selection and that selection will become the default until a new selection is made.

CHAPTER 6 - WHEN PROBLEMS ARISE

This chapter is devoted exclusively to explaining the error messages you might encounter and how to rectify the situation while programming the control unit. However, should your program lock up and no error message appear, it is best to reboot the system by pressing Ctrl-Alt-Del simultaneously. What you have previously programmed will probably be lost so don't do this unless the keyboard keys no longer function.

Problem:  "Cannot write personality, size too large."

The S825 contains a variable length personality that is dependent upon the number of modes, channels and options. It is possible to create a personality that is too large to store in the control unit.

Solution: You will need to remove either modes, channels or options from the personality before attempting another write. Edit the personality keeping close track of the bytes free indicator at the bottom. As long as this indicator is greater than 0, the personality can be stored in the control unit.

Problem: "Cannot execute read – disk full."

This message is an indication that your disk is running out of storage space. You cannot execute the read unless you have enough disk space in which to store a personality.

Solution: You will need to create disk space on your disk or get a new data disk. Refer to your DOS User's Guide for help in deleting files.

Problem: "Cannot page down."

This is an indication that you can no longer page down through your display data on the window either because you have reached the physical end of your data or the window is not complete.

Solution: If you are at the end of your data, (i.e., the last channel definition is displayed or the last mode) you can do nothing more than page up. Otherwise check to ensure that your current window is completely filled in.

Problem: "Cannot page up."

This is an indication that you are at the very beginning of your window display data.

Solution: Discontinue paging up.

Problem: "Cannot save file – disk full."

This message is an indication that your disk is running out of storage space. You will not be able to save the personality unless you have enough disk space in which to store a personality.

Solution: You will need to create disk space on your disk or get a new data disk. Refer to your DOS User's Guide for help in deleting files.

Problem: "Could not delete file."

An attempt was made to delete either a personality or a frequency set that could not be deleted because the file doesn't exist, the drive is write protected, or there is a problem with the diskette.

Solution: Ensure that the personality or frequency set you are trying to delete actually exists. Next check to ensure that the diskette is not write protected.

Problem: "Could not open temporary file."

At various times, the PC Programmer creates temporary files for storage. This message is an indication that the program could not read one of the temporary files it created.

Solution: Please contact GE Mobile Communications if you receive this message.

Problem: "Directory does not exist."

This is an indication that the directory you tried to change to does not exist.

Solution: Only specify a valid path/directory when attempting to change directories.

Problem: "DS Timeout must be in the range 1 to 5."

Appears when a value greater than 5 or less than 1 is entered in the DS Timeout field.

Solution: Enter a number between 1 and 5.

Problem: "File does not exist."

An attempt was made to change/delete or print a personality or frequency set that does not exist.

Solution: Correct the file name entry before further attempts are made.

Problem: "File is not correct type."

An attempt was made to change either a personality or frequency set and the file selected was not of the correct type.

Solution: Remove or do not use the questionable file.

Problem: "File name invalid, do not specify extension."

An attempt was made to specify a file extension from the change/edit or delete window.

Solution: These windows do not require the addition of a file extension when the file name is specified. Remove the file extension before further attempts are made.

Problem: "File name may not contain an extension."

An attempt was made to specify a file extension from the ... window.

Solution: These windows do not require the addition of a file extension when the file name is specified. Remove the file extension before further attempts are made.

Problem: "File not found."

An attempt was made to change/delete or print a personality or frequency set that does not exist.

Solution: Correct the file name entry before further attempts are made.

Problem: "Frequency out of range."

An attempt was made to enter a frequency that does not fall within the band split selected.

Solution: Ensure that the frequency specified falls within the band split indicated at the top of the window.

Problem: "Frequency sets must have at least one channel."

An attempt was made to leave the Frequency Set Detail Window or save a frequency set definition without any channels defined.

Solution: The program will not allow you to continue without adding a channel. Ensure that at least 1 valid channel definition is in the frequency set before continuing.

Problem: "Incorrect file size/type."

An attempt was made to change either a personality or frequency set and the file selected was not of the correct type.

Solution: Remove or do not use the questionable file.

Problem: "Invalid scan keypad option."

An attempt was made to specify a keypad option that does not exist.

Solution: Use the Tab key to toggle this field until your desired option is displayed.

Problem: "Invalid (P1/P2) channel in mode _, must have scan on."

An attempt was made to specify a channel that does not have Scn enabled for either a P1 or P2 channel.

Solution: In order to specify a channel as a P1 or P2 channel, it must have its Scn flag set to "On". To do so, cursor over to the frequency set field and detail. Go to the desired channel and ensure that Scn is set to "On".

Problem: "Invalid (P1/P2/HOME) channel in mode _, channel not in set."

An attempt was made to specify a channel that is not currently defined in the frequency set as either a priority scan channel or a home channel.

Solution: Specify a channel that is currently defined in the frequency set.

Problem: "Invalid beep interval, valid range is 1 - 15 secs."

An attempt was made to specify a beep interval that is outside of its prescribed range.

Solution: Enter a number between 1 and 15.

Problem: "Invalid Channel Guard entered."

An attempt was made to enter an invalid Digital Channel Guard or a tone Channel Guard that is outside of the acceptable range.

Solution: Enter a tone channel within the range of 67.0 to 210.7 or refer to Appendix D for a valid Digital Channel Guard.

Problem: "Invalid channel spacing."

An attempt was made to enter a frequency that has an incorrect channel spacing for this particular split.

Solution: If the band split you are working in falls within the VHF range, enter a frequency that is evenly divisible by 5 or 6.25. If you are working within the UHF frequencies, enter a frequency that is evenly divisible by 6.25. For channels in the 800 Mhz range, the correct channel spacing is 12.5.

Problem: "Invalid character entered in field."

An attempt was made to enter an invalid character in either of the T90/T99 tone fields.

Solution: Enter only numeric data without any special characters or decimal points.

Problem: "Invalid system keypad option."

An attempt was made to specify a keypad option that does not exist.

Solution: Use the Tab key to toggle this field until your desired option is displayed.

Problem: "Invalid extension specified."

An attempt was made to specify an extension (from the Change Extension Window) that does not meet the conditions for a valid extension.

Solution: Ensure that the extension specified consists of only alphanumeric characters.

Problem: "Invalid frequency set."

An attempt was made to specify a frequency set that does not exist in the Pool directory.

Solution: Use the F2 Freq key to ensure that the frequency set specified actually exists in the Currently Defined Frequency Sets Window.

Problem: "Invalid GE-STAR ID, valid range is 1 - 16383."

An attempt was made to specify a GE-STAR ID that falls outside of the acceptable range of IDs.

Solution: Enter an ID that falls within the range of 1 and 16383.

Problem: "Invalid Home channel in mode _, must have a Tx frequency."

An attempt was made to specify a home channel that does not have a transmit frequency specified. All home channels must have a transmit frequency.

Solution: Enter a channel that has both a Tx and Rx frequency specified.

Problem: "Invalid port entered."

An attempt was made to specify a communications port other than COM1 or COM2. The PC Programmer Software only supports COM1 or COM2.

Solution: Use either COM1 or COM2 for programming.

Problem: "Invalid tone, valid range is 250 - 3000."

An attempt was made to enter a T90/T99 tone that falls outside the range of acceptable values.

Solution: Enter a tone frequency between 250 and 3000 Hz.

Problem: "Invalid, must be in 100 Msecs increments."

An attempt was made to enter an attack delay that did not fall in a 100 Msec interval.

Solution: Enter a value that is evenly divisible by 100. For example: 100, 200, 300, ... 1100, 1200, etc.

Problem: "Invalid, must be in 20 Msecs increments."

An attempt was made to specify a tone length or tone delay that was not specified in a 20 Msec interval.

Solution: Enter a value evenly divisible by 20. For example: 20, 40, 60, ... 120, 140, etc.

Problem: "Invalid, valid range is 0 - 3000 Msecs."

An attempt was made to enter a tone length or tone delay length that falls outside the range of acceptable values.

Solution: Specify a value that falls between 1 and 3000.

Problem: "Invalid, valid range is 1 - 255."

An attempt was made to specify a repeat count that falls outside the range of acceptable values.

Solution: Specify a repeat count that falls within 1 and 255.

Problem: "Invalid, valid range is 1 - 60."

An attempt was made to specify a delay time that falls outside the range of acceptable values.

Solution: Specify a delay time that falls within 1 and 60.

Problem: "Invalid, valid range is 50 - 5000 Msecs."

An attempt was made to specify an attack delay that falls outside of the acceptable range of values.

Solution: Enter an attack delay that falls between 50 and 5000 Msecs.

Problem: "Invalid, valid tone range 250 - 3000 Hz."

An attempt was made to enter a T90/T99 tone that falls outside the range of acceptable values.

Solution: Enter a tone frequency between 250 and 3000 Hz.

Problem: "Maximum number of channels exceeded."

An attempt was made to include a frequency set that would cause the personality to exceed the channel capacity.

Solution: You will not be allowed to include another frequency set that will cause the personality to exceed its limits. If you must include the set you are attempting to add you must remove other frequency sets to create room for the new set. Use the F3 Remove key to remove modes and/or channels.

Problem: "Mode # _ is invalid, it must contain a frequency set."

An attempt was made to either save the personality or program it into a control unit with a mode that does not contain a frequency set.

Solution: Either remove the mode in question or ensure that it has a frequency set assigned.

Problem: "Mode # _ is invalid, it must contain a valid GEstar ID."

An attempt was made to either save the personality or program it into a control unit with a mode that does not contain a valid GE-STAR ID.

Solution: Either remove the mode in question, disable the signal field, or ensure that the mode has a valid GE-STAR ID.

Problem: "Must be on a frequency set field."

The F1 Detail key was pressed while the cursor was on a field other than the frequency set field. The detail key will only work when the cursor is on the frequency set you wish to detail.

Solution: Move the cursor to the frequency set field before attempting to perform the detail operation.

Problem: "Must enter a frequency set name."

An attempt was made to change/delete or save a frequency set when no set name was specified.

Solution: Enter the correct frequency set name.

Problem: "Must enter at least 2 characters."

An attempt was made to specify a keypad definition that consisted of only one character.

Solution: All keypad definitions consist of either two or three characters. Either specify a correct keypad definition or use the Tab key to toggle this field to the correct selection.

Problem: "Problem with Print."

An attempt was made to print a personality and the main program could not initiate the print task. There are three common reasons for the print spawn to fail. There is not enough memory available, the print executable is not in the right directory for the spawn, or you are using a version of DOS earlier than version 3.0 or higher.

Solution: First, check to ensure that you are running the right version of DOS. Exit the program and at the DOS prompt, type VER <enter>. Typing this command will cause the DOS version to appear on the window. If this number is 1.XX or 2.XX you will need to upgrade to DOS 3.0 or higher. Next, check to ensure that S8PRINT.EXE file resides in the same directory as the S825.EXE file. If the S8PRINT.EXE file is not there, copy it from the distribution diskettes. However, if the print is there then you must be running out of memory. If you have any memory resident programs installed then remove them before continuing.

Problem: "Problem with Read."

An attempt was made to read the control unit and the main program could not spawn the read task. There are three common reasons for the read spawn to fail. There is not enough memory available, the read executable is not in the right directory for the spawn, or you are using a version of DOS earlier than version 3.0 or higher.

Solution: First, check to ensure that you are running the right version of DOS. Exit the program and at the DOS prompt, type VER <enter>. Typing this command will cause the DOS version to appear on the window. If this number is 1.XX or 2.XX you will need to upgrade to DOS 3.0 or higher. Next, check to ensure that S8READ.EXE file resides in the same directory as the S825.EXE file. If the S8READ.EXE file is not there, copy it from the distribution diskettes. However, if the read is there then you must be running out of memory. If you have any memory resident programs installed then remove them before continuing.

Problem: "Problem with Write"

An attempt was made to write a personality and the main program could not spawn the write task. There are three common reasons for the write spawn to fail. First, there is not enough memory available, the write executable is not in the right directory for the spawn or you are using a version of DOS earlier than version 3.0 or higher.

Solution: First, check to ensure that you're running the right version of DOS. Exit the program and at the DOS prompt, type VER <enter>. Typing this command will cause the DOS version to appear on the window. If this number is 1.XX or 2.XX you will need to upgrade to DOS 3.0 or higher. Next, check to ensure that S8WRITE.EXE file resides in the same directory as the S825.EXE file. If the S8WRITE.EXE file is not there, copy it from the distribution diskettes. However, if the write is there then you must be running out of memory. If you have any memory resident programs installed then remove them before continuing.

Problem: "Read failed. Check connection."

This message will appear whenever handshaking with the control unit fails. There are several reasons for the program being unable to handshake with the control unit: power is not applied to the control unit, cabling is not properly seated or connected, incorrect communications port has been specified, or the control unit is turned off or malfunctioning.

Solution: The first step is to try and isolate the cause of the problem. Is the control unit malfunctioning? Replace the control unit with a known good control unit and attempt a read. If the message reappears, then the problem is not with the control unit. Is your cabling connected and seated correctly? Refer to the hardware configuration in Chapter 2 for help in making this determination. Lastly, do you have the right port specified? Go into the Utility Window and change the port setup. If the problem still appears you should check your asynchronous card for functionality.

Problem: "Siren range is 0 to 5."

An attempt was made to specify a siren that falls outside the range of acceptable values.

Solution: Enter a value between 0 and 5.

Problem: "This field will only accept a 1 or 2."

An attempt was made to specify a carrier control timer that was outside the range of acceptable values for the carrier control timer.

Solution: Enter either a 1 or a 2.

Problem: "Tone 2 is not valid without a tone 1."

An attempt was made to specify a Type 99 tone 2 in the channel window without a Type 99 tone 1 defined. The program will not accept a tone 2 without tone 1 being defined first.

Solution: Enter a tone 1 prior to attempting to add a tone 2.

Problem: "Valid personalities must have at least one mode."

An attempt was made to save the personality or program the personality into the control unit without a mode defined. The program will not save a personality without at least one valid mode nor will it allow it to be programmed into the control unit.

Solution: You will need to define a mode before making further attempts.

Problem: "Warning, S825 cannot decode digital codes."

The S825 Control Unit cannot decode Digital Channel Guards. If Rx CG Dec is set to S825 in the Control Unit Options Screen, the CG table should not contain Digital Channel Guard codes. If the CG table does contain Digital Channel Guard codes and the Rx CG Dec is set to S825, this warning will appear when attempting to leave the CG Table Window.

Solution: If the S825 is going to perform the receive Channel Guard decoding then all digital codes must be removed from the CG Table Window.

TERMS

Cursor Keys - Those keys on the right hand side of the keyboard marked with arrows (Up Arrow, Right Arrow, Down Arrow and Left Arrow keys). They are used to control the direction of the cursor.

Default Value - The S825 Control Unit PC Programmer Software provides predetermined (default) values in a majority of the data entry fields within the program. Exceptions to this rule are fields requiring variable names, dates, and serial numbers. The default values assume that the control unit will be used without optional features. Before changing these default values, we recommend that you be familiar with the operational implications of adding a particular feature or option to the control unit being programmed.

Error Messages - Each time data is entered in the program a validity check is made to ensure that reasonable values were entered. In the event that the data does not fall within the acceptable range of values an error message will be displayed in the center of the screen indicating non acceptance.

Field - Refers to the area of the screen/window which allows data entry. This area is readily identifiable by reverse video when moving the cursor across the screen.

Frequency Set - Is used throughout this document to refer to a collection of channels that can be saved to disks. These channels must fall within a particular band split.

Function Keys - Function keys are the keys, often found on the left-hand portion of your PC's keyboard, which begin with the prefix F. The function keys are used in the PC Programmer Software to execute a particular command.

Help - Throughout the Control Unit PC Programmer Software, Help denotes or refers to on-line assistance. This can be accessed by pressing the F9 Help Key from any field.

Mode - A set of channels unique to a specific location or activity.

PC Programmer Software - This term is used to identify the programming software for the S825 Control Unit.

Personality - Used generically to refer to information that is stored in the control unit that makes one control unit perform differently from all other control units. That information can be created, deleted or modified and stored on a disk for later reference.

Prompt Line - Assistance text located on the last line of the window. This line provides directions for entering data and changes when moving from field to field.

Ramp - Refers to rapid channel or volume advancement while depressing key and holding.

Screen - Refers to a major or parent data entry process and is used to show position within the program. Each screen is divided into three distinct areas: (1) screen title, (2) screen windows, and (3) active function keys. The title tells you where you are in the program hierarchy. The screen windows are provided for input of data to the screen. The active function keys provide access to the commands (or actions) available within that screen. The function key commands are labeled along the bottom of the screen. Only the function keys with labels are enabled in a given screen or window.

Window - A window is a section of a screen that displays previously stored information, enables programming alternatives, or accepts data currently being entered. There may be more than one window within a particular screen. Each window is outlined within the screen presentation.

There are two types of windows: active and passive. The active window is available for data entry or revision and can be identified by its highlighted borders. The passive window is displayed but is unavailable for program execution. In the case that windows have overlapping borders, the active window is presented in the foreground.

Like the screen, windows are divided into three distinct sections. They are: (1) window title, (2) work area, and (3) prompt line. The window title describes the function currently being performed. The work area is the space provided for your input to the window. The prompt line is printed information in the lower portion of the window defining in further detail the action to be taken in the work area.

FUNCTION KEYS

F1

<u>Set up</u> - Setup (F1) Function Key - Allows the user to select personality defaults by defining System and Scan keypad definitions and entering frequency ranges.

Switch – Switch (F1) Function Key – From the Setup Window, this key is used to activate the Frequency Ranges Window from the Keypad Definition Window, or the Keypad Definition Window from the Frequency Ranges Window.

Execute – Yes (F1) Function Key – The selected operation will be executed. At numerous times during programming of the control unit, the program may ask you if you wish to complete an operation. When you press the function key labeled Yes, the selected operation will be completed.

Communications Port Setup – Port (F1) Function Key – From the Utility Window, this key allows you to select which port on your personal computer will be used for communications with the control unit.

Detail – Detail (F1) Function Key – From the Control Unit Personality Screen this key provides access to the "details" of the frequency set in the current mode.

Siren – Siren (F1) Function Key – Used to access the Siren/Light Definition Window from the Control Unit Options Window.

F2

Change – Change (F2) Function Key – From the Current Personality Screen this function key allows you to change an existing personality. This key, along with the F4 New key, provides access to the Control Unit Personality Screen. From the Currently Defined Frequency Sets Screen this key allows you to change a currently defined frequency set.

Cancel – No (F2) Function Key – Pressing this function key terminates the selected operation. At numerous times during the operation of the PC Programmer Software, the program will ask you if you wish to complete an operation. When you press the function key labeled No, the selected operation will *not* be executed.

Insert – Insert (F2) Function Key – Used in the Control Unit Personality Screen to insert a mode. Used in the Frequency Set Definitions Screen to insert a channel definition.

Channel Guard – CG (F2) Function Key – Used to access the Channel Guard table from the Control Unit Options Window.

Frequency Sets – Freq (F2) Function Key – Used to bring up the Currently Defined Frequency Sets Screen from the Keypad Definition Window or the Frequency Ranges Window.

F3

Keypad – Keypad (F3) Function Key – Used to toggle the Keypad Definition Window between the System and Scan Keypad definitions.

Utilities – Utilty (F3) Function Key – This key provides access to the Utility Window from the Current Personalities Screen. The Utility Window allows you to print a personality, change file extensions, select a communications port setup or change file directories without exiting the program.

Change Directory – Dir (F3) Function Key – This command is enabled within the Utility Window and allows you to change directories without having to exit the PC program.

Remove – Remove (F3) Function Key – Used in the Control Unit Personality Screen to remove a mode definition. Also used in the Frequency Set Definitions Screen to remove a channel definition.

Function – Fnc (F3) Function Key – Provides access to the FNC Button Window from the Control Unit Options Window. Lets you define the functionality of the function key.

F4

New - New (F4) Function Key - This function key, accessed from the Current Personalities Screen, allows you to create a new radio personality. This key, along with the F2 Change key, provides access to the Control Unit Personality Screen.

Range - Range (F4) Function Key - From the Setup window, this key is used to toggle the Frequency Ranges Window between RANGR, DELTA-S and DELTA-SX.

Signal - Signal (F4) Function Key - From the Control Unit Options Window this key is used to access the Emergency Signalling Window. From the Control Unit Personality Screen, this key toggles to the signal options.

Scan - Scan (F4) Function Key - Used to toggle the Control Unit Personality Screen to the scan options.

Text Select - Text (F4) Function Key - This key enables use of the "Text" window within the Control Unit Personality Screen. This window will automatically provide the software revision number and software revision date of the S825 Control Unit last programmed. This window also accepts additional information (in text format) which you may wish to include about a particular radio personality.

F5

Program - Progrm (F5) Function Key - This key is enabled in both the Current Personalities Screen and the Control Unit Personality Screen. In the Current Personalities Screen, this function writes a personality stored in memory to the radio. In the Control Unit Personality Screen, this key writes the latest changes made in the selected personality to the radio.

Delete - Delete (F5) Function Key - Used to delete a personality or frequency set.

Store - Store (F5) Function Key - Used to store the frequency set being edited to disk.

Radio - Radio (F5) Function Key - Used to pull up the Radio Options window.

F6

Read Select - Read (F6) Function Key - From the Current Personalities Screen, this key provides the capability to read a specific radio personality into a file.

Print - Print (F6) Function Key - This function allows you to obtain a hard (paper) copy of the personality data stored in memory. This key is enabled in the Utility Window, and also provides the capability to print personality data to a file or to the window.

Key - Key (F6) Function Key - Used to pull up the keypad definition from the Control Unit Options Window.

F7

Extension Select - Ext (F7) Function Key - From the Utility Window, this key allows you to specify which files are to be displayed in the Current Personalities Screen. This function also permits the definition of a new three letter default extension.

Option Select - Option (F7) Function Key - This key provides the capability to create or modify radio options within the Control Unit Personality Screen.

F8

<u>More</u> - More (F8) Function Key - Used to toggle the function keys within the Control Unit Personality Screen.

F9

<u>Help</u> - Help (F9) Function Key - Select F9 whenever you have questions about the execution of an operation. F9 will always provide assistance from any screen or window.

Field Level Help messages are provided from any screen or any window by simply pressing the F9 Help key and provides additional information on the field in question.

Window Level Help messages are provided by pressing the Shift F9 Help key and describe the purpose of the data presented in the window.

F10

<u>Back</u> - Back (F10) Function Key - This key is pressed whenever you wish to return to a previous window, thus making it active again for further revisions or data entry. In some cases, it will return control of the program to the Current Personalities Screen.

<u>Exit</u> - Exit (F10) Function Key - When selected from the Current Personalities Screen, the program is terminated and you are returned to the control of your disk operating system (DOS).

Acceptable Values - Control Unit Personality Screen Scan

| Field Name | Default Value | Acceptable Values |
|---|---|---|
| Mode | Blank | 3 Alphanumeric Characters |
| Freq Set | Blank | Any Defined Frequency Set Name |
| Signal | Disabl | Disabl, T90T99 or GEstar |
| P1-Prog | User | User, Selchn or Fixed |
| P1 | Blank | Any channel in set with Scn = Yes |
| P2-Prog | User | User, Selchn or Fixed |
| P2 | Blank | Any channel in set with Scn = Yes |
| W/CG | Yes | Yes or No |

Acceptable Values – Control Unit Personality Screen Signal

| Field Name | Default Value | Acceptable Values |
|---|---|---|
| Mode | Blank | 8 Alphanumeric Characters |
| Freq Set | Blank | Any Defined Frequency Set Name |
| Signal | Disabl | Disabl, T90T99 or GEstar |
| Home | Blank | Any channel in set |
| Initiate | Switch | Switch, Hksw or Ptt |
| Pttopt | All | All or Hksw |
| Emerg | Yes | Yes or No |
| GEstar | Blank | 1 to 16383 |

Acceptable Values – Frequency Set Definition

| Field Name | Default Value | Acceptable Values |
|---|---|---|
| Name | Blank | 8 Alphanumeric Characters |
| Tx Freq | Blank | VHF – In Band with 5Khz/6.25Khz Sep<br>UHF – In Band with 6.25 Khz Sep<br>800 – In Band with 12.5 Khz Sep |
| Rx Freq | VHF/UHF – Tx Freq<br>806 – 824 Tx + 45<br>851 – 870 Tx | VHF – In Band with 5Khz/6.25Khz Sep<br>UHF – In Band with 6.25 Khz Sep<br>800 – In Band with 12.5 Khz Sep |
| Tx CG | Blank | Tone – 67.0 to 210.7<br>Digital – See Appendix D |
| Rx CG | Tx CG | Tone – 67.0 to 210.7<br>Digital – See Appendix D |
| Ste | Value of Rx CG<br>Digital – On<br>Tone – Off | On or Off |
| CCT | On | On or Off |
| Scn | No | Yes or No |
| CGO | Yes | Yes or No |
| Tone1 and Tone2 | Blank | 250 Hz to 3000 Hz (No tenths) |

Acceptable Values – Control Unit Options

| Field Name | Default Value | Acceptable Values |
|---|---|---|
| Unit Type | To selected keypad definition screen from setup | System or Scan |
| Keypad Sel | Ena | Ena or Dis |
| Alert Tone | All | All, None or Ramp |
| Off Hook | NoScn | Scan or NoScn |
| B-Lite Dis | On | On or Off |
| B-Lite Sav | No | Yes or No |
| Rx CG Dec | Radio | Radio or S825 |
| Min Volume | Off | Set or Off |
| DS Timeout | 3 | 1 to 5 |

Acceptable Values – Control Unit Options

| Field Name | Default Value | Acceptable Values |
|---|---|---|
| Delete Key | Store | Store or Temp |
| Wrap Ramps | Yes | Yes or No |
| DS Test Md | Dis | Ena or Dis |
| Scan Hang | On | On or Off |
| CCT | 1 | 1 or 2 |
| Horn Ring | Pos | Pos or Neg |

Acceptable Values – Siren Lights

| Field Name | Default Value | Acceptable Values |
|---|---|---|
| Srn | Function Dependent | 1 to 5 |
| Lights (1 – 8) | Function Dependent | Enable (*) or Disable ( ) |
| Can | Yes | Yes or No |
| Mon | No | Yes or No |

Acceptable Values – CG

| Field Name | Default Value | Acceptable Values |
|---|---|---|
| ID | Blank | 3 Alphanumeric Characters |
| Tx CG | Blank | Tone – 67.0 to 210.7<br>Digital – See Appendix D |
| Rx CG | Tx CG | Tone – 67.0 to 210.7<br>Digital – See Appendix D |
| Ste | Value of Rx CG<br>Digital – On<br>Tone – Off | On or Off |

Acceptable Values – FNC

| Field Name | Default Value | Acceptable Values |
|---|---|---|
| Primary | Siren | Siren, DTMF or Disable |
| Secondary | DTMF | Siren, DTMF or Disable |

Acceptable Values – Emergency Signalling

| Field Name | Default Value | Acceptable Values |
|---|---|---|
| Revert to Home | No | Yes or No |
| Emerg Tone 1 | Blank | 250 Hz to 3000 Hz |
| Length | 1000 Msec | 0 to 3000 Msec - 20 Msec Intervals |
| Emerg Tone 2 | Blank | 250 Hz to 3000 Hz |
| Length | 3000 Msec | 0 to 3000 Msec - 20 Msec Intervals |
| Tone Delay | 1000 Msec | 0 to 3000 Msec - 20 Msec Intervals |
| Repeat Count | 1 | 1 to 255 |
| Delay Time | 1 Sec | 1 Sec to 60 Sec |
| Attack Delay | 50 Msec | 50 to 5000 Msec - 100 Msec Interval |

Acceptable Values – Radio Options

| Field Name | Default Value | Acceptable Values |
|---|---|---|
| Radio Download | Ena | Ena or Dis |
| Max Chn/Mode | 16 | 16 or 32 |
| VRS Beep Interval | 1 Sec | 1 to 15 Sec |
| VRS Forced Scan | No | Yes or No |
| Dual Control | No | Yes or No |

Acceptable Values – Keypad Definitions

| Field Name | Default Value | Acceptable Values |
|---|---|---|
| System | Key Dependent | WAI YLP RST SL1-SL8 GE* VG VRS EG* PA DSB VLU VLD CHU CHD MOD HOM SCN ADD DEL SQL CG SPR |
| Scan | Key Dependent | WAI YLP RST SL1-SL8 GE* VG VRS EG* PA DSB VLU VLD CHU CHD MOD HCM SCN ADD DEL SQL CG SPR |

APPENDIX D

PRIMARY & EQUIVALENT DIGITAL CODES

| PRIMARY CODE | EQUIVALENT CODE | PRIMARY CODE | EQUIVALENT CODE | PRIMARY CODE | EQUIVALENT CODE |
|---|---|---|---|---|---|
| 023 | 340,766 | 205 | 135,610 | 464 | 237,642,772 |
| 025 |  | 223 | 350,475,750 | 465 | 056,656 |
| 026 | 566 | 226 | 104,557 | 466 | 144,666 |
| 031 | 374,643 | 243 | 267,342 | 503 | 157,312 |
| 032 |  | 244 | 176,417 | 506 | 224,313,574 |
| 043 | 355 | 245 | 370,554 | 516 | 067,720 |
| 047 | 375,707 | 251 | 236,704,742 | 532 | 161,345 |
| 051 | 520,771 | 261 | 227,567 | 546 | 317,614,751 |
| 054 | 405,675 | 263 | 213,136 | 565 | 307,362 |
| 065 | 301 | 265 | 171,426 | 606 | 153,630 |
| 071 | 603,717,746 | 271 | 427,510,762 | 612 | 254,314,706 |
| 072 | 470,701 | 306 | 147,303,761 | 624 | 075,501 |
| 073 | 640 | 311 | 330,456,561 | 627 | 037,560 |
| 074 | 360,721 | 315 | 321,673 | 631 | 231,504,636,745 |
| 114 | 327,615 | 331 | 372,507 | 632 | 123,657 |
| 115 | 534,674 | 343 | 324,570 | 654 | 163,460,607 |
| 116 | 060,737 | 346 | 616,635,724 | 662 | 363,436,443,444 |
| 125 | 172 | 351 | 353,435 | 664 | 344,471,715 |
| 131 | 572,702 | 364 | 130,641 | 703 | 150,256 |
| 132 | 605,634,714 | 365 | 107 | 712 | 136,502 |
| 134 | 273 | 371 | 217,453,530 | 723 | 235,611,671 |
| 143 | 333 | 411 | 117,756 | 731 | 447,473,474,744 |
| 152 | 366,415 | 412 | 127,411,711 |  |  |
| 155 | 233,660 | 413 | 133,620 | 732 | 164,207 |
| 156 | 517,741 | 423 | 234,563,621,713 | 734 | 066 |
| 162 | 416,553 | 431 | 262,316,730 | 743 | 312,515,663 |
| 165 | 354 | 432 | 276,326 | 754 | 076,203 |
| 172 | 057 | 445 | 222,457,575 |  |  |
| 174 | 142,270 |  |  |  |  |

APPENDIX E

CHANNEL GUARD TONE FREQUENCIES

| STANDARD TONE FREQUENCIES (Hz) | | | | |
|---|---|---|---|---|
| 67.0 | 88.5 | 107.2 | 131.8 | 167.9 |
| 71.9 | 91.5 | 110.9 | 136.5 | 173.8 |
| 74.4 | 94.8 | 114.8 | 141.3 | 179.9 |
| 77.0 | 97.4 | 118.8 | 146.2 | 186.2 |
| 79.7 | 100.0 | 123.0 | 151.4 | 192.8 |
| 82.5 | 103.5 | 127.3 | 156.7 | 203.5 |
| 85.4 | | | 162.2 | 210.7 |

APPENDIX F
WORKSHEET FOLDER
Worksheet A — Frequency Set Definition

Set Name: _____

| Ch | Name | TX Freq | Rx Freq | Tx CG | Rx CG | Ste | CCT | Scn | CGO | Tone1 | Tone2 |
|---|---|---|---|---|---|---|---|---|---|---|---|
| | | | | | | On/Off | On/Off | Yes/No | Yes/No | | |
| | | | | | | On/Off | On/Off | Yes/No | Yes/No | | |
| | | | | | | On/Off | On/Off | Yes/No | Yes/No | | |
| | | | | | | On/Off | On/Off | Yes/No | Yes/No | | |
| | | | | | | On/Off | On/Off | Yes/No | Yes/No | | |
| | | | | | | On/Off | On/Off | Yes/No | Yes/No | | |
| | | | | | | On/Off | On/Off | Yes/No | Yes/No | | |
| | | | | | | On/Off | On/Off | Yes/No | Yes/No | | |
| | | | | | | On/Off | On/Off | Yes/No | Yes/No | | |
| | | | | | | On/Off | On/Off | Yes/No | Yes/No | | |
| | | | | | | On/Off | On/Off | Yes/No | Yes/No | | |
| | | | | | | On/Off | On/Off | Yes/No | Yes/No | | |
| | | | | | | On/Off | On/Off | Yes/No | Yes/No | | |

Worksheet B
Control Unit Personality — Mode Definitions

Mode: _____   Name: _____   Freq Set: _____

| Signal | P1-Prog | P1 | P2-Prog | P2 | W/CG | Home | Initiate | Pttopt | Emerg | GEstar |
|--------|---------|----|---------|----|------|------|----------|--------|-------|--------|
| Disable T90/T99 GE-STAR | User Fixed Selchn | | User Fixed Selchn | | Yes No | | Switch Hksw PTT | All Hksw | Yes No | |

Mode: _____   Name: _____   Freq Set: _____

| Signal | P1-Prog | P1 | P2-Prog | P2 | W/CG | Home | Initiate | Pttopt | Emerg | GEstar |
|--------|---------|----|---------|----|------|------|----------|--------|-------|--------|
| Disable T90/T99 GE-STAR | User Fixed Selchn | | User Fixed Selchn | | Yes No | | Switch Hksw PTT | All Hksw | Yes No | |

Mode: _____   Name: _____   Freq Set: _____

| Signal | P1-Prog | P1 | P2-Prog | P2 | W/CG | Home | Initiate | Pttopt | Emerg | GEstar |
|--------|---------|----|---------|----|------|------|----------|--------|-------|--------|
| Disable T90/T99 GE-STAR | User Fixed Selchn | | User Fixed Selchn | | Yes No | | Switch Hksw PTT | All Hksw | Yes No | |

Mode: _____   Name: _____   Freq Set: _____

| Signal | P1-Prog | P1 | P2-Prog | P2 | W/CG | Home | Initiate | Pttopt | Emerg | GEstar |
|--------|---------|----|---------|----|------|------|----------|--------|-------|--------|
| Disable T90/T99 GE-STAR | User Fixed Selchn | | User Fixed Selchn | | Yes No | | Switch Hksw PTT | All Hksw | Yes No | |

Worksheet C
Control Unit Options

| Serial Number: | | | Date: | | |
|---|---|---|---|---|---|
| Unit Type | Keypad Sel | Alert Tone | Off Hook | B-Lite Dis | B-Lite Sav |
| System<br>Scan | Ena<br>Dis | None<br>Ramp<br>All | Scan<br>NoScn | On<br>Off | Yes<br>No |
| Rx CG Dec | Min Volume | DS Timeout | Delete Key | Wrap Ramps | DS Test Md: |
| Radio<br>S825 | Set<br>Off | | Store<br>Temp | Yes<br>No | Ena<br>Dis |
| Scan Hang | CCT | Horn Ring | | | |
| On<br>Off | 1<br>2 | Pos<br>Neg | | | |

Radio Options

| Radio Options | | | | | |
|---|---|---|---|---|---|
| Download | Ign A+ Req'd | VRS Beep In | VRS Scan | Dual Cntrl | |
| Ena<br>Dis | Yes<br>No | | Yes<br>No | Yes<br>No | |

Worksheet D
Siren/Light Combinations

| Function | Siren | Lights | | | | | | | | | Options | |
| --- | --- | --- | --- | --- | --- | --- | --- | --- | --- | --- | --- | --- |
| | | 1 | 2 | 3 | 4 | 5 | 6 | 7 | 8 | 9 | Can | Mom |
| Wail | | | | | | | | | | | Yes No | Yes No |
| Yelp | | | | | | | | | | | Yes No | Yes No |
| S/L 1 | | | | | | | | | | | Yes No | Yes No |
| S/L 2 | | | | | | | | | | | Yes No | Yes No |
| S/L 3 | | | | | | | | | | | Yes No | Yes No |
| S/L 4 | | | | | | | | | | | Yes No | Yes No |
| S/L 5 | | | | | | | | | | | Yes No | Yes No |
| S/L 6 | | | | | | | | | | | Yes No | Yes No |
| S/L 7 | | | | | | | | | | | Yes No | Yes No |
| S/L 8 | | | | | | | | | | | Yes No | Yes No |

Worksheet E
Channel Guard Table

| CHANNEL GUARD TABLE | | | | | | | | | |
|---|---|---|---|---|---|---|---|---|---|
| Num | Id | Tx CG | Rx CG | STE | Num | Id | Tx CG | Rx CG | STE |
| 1 | | | | On<br>Off | 2 | | | | On<br>Off |
| 3 | | | | On<br>Off | 4 | | | | On<br>Off |
| 5 | | | | On<br>Off | 6 | | | | On<br>Off |
| 7 | | | | On<br>Off | 8 | | | | ..f |
| 9 | | | | On<br>Off | 10 | | | | On<br>Off |
| 11 | | | | On<br>Off | 12 | | | | On<br>Off |
| 13 | | | | On<br>Off | 14 | | | | On<br>Off |

What is claimed is:

1. A digital radio transceiver programming apparatus of the type for loading personality defining information into an internal non-volatile memory of a digital radio transceiver, said apparatus comprising:
connector means for operatively connecting to said digital radio transceiver non-volatile memory;
user operable input means for inputting user selections, said input means including a set of user depressible keys;
processor means connected to said connector means and to said input means for generating digital signals specifying operating parameters of said digital radio transceiver in response to inputted user selections and for loading said digital signals into said digital radio transceiver non-volatile memory via said connector means, said processor means including means for dynamically assigning some of said user depressible keys to active status and associating said active status keys to user selectable functions, and for dynamically assigning others of said user depressible keys to inactive status;
storage means connected to said processor means for storing further digital signals representing plural display formats, said plural display formats being organized in a hierarchical tree structure; and
display means connected to said processor means for selectively displaying said display formats in response to inputted user selections, said display means also including means for selectively displaying one of said display formats superimposed on another display format.

2. Apparatus as in claim 1 wherein said processing means includes means for displaying a designation of the type of said digital radio transceiver in a title section of said display formats.

3. Apparatus as in claim 1 wherein said processing means includes means for dynamically assigning some but not all of said set of keys consistently for different displayed display formats.

4. Apparatus as in claim 3 wherein:
said storing means includes means for storing user help information associated with each of said display formats;
said key assigning means assigns a common function key for all of said display formats to select display of said user help information; and
said processing means includes means for controlling said display means to display the user help information associated with the display format being displayed in response to depression of said common function key.

5. Apparatus as in claim 1 wherein:
said key assigning means assigns a certain common key for all of said display formats in said set to select display of the previous display format in said hierarchical tree structure.

6. Apparatus as in claim 5 wherein said processing means includes means for controlling said display means to display said previous display format in response to depression of said certain key.

7. Apparatus as in claim 1 wherein said processing means includes means for controlling said display means to display a previous display format in response to depression of a certain key.

8. Apparatus as in claim 1 wherein said display means displays each of said legends beneath a symbol indicating the key associated with said each legend.

9. Apparatus as in claim 1 wherein:
said input means comprises a keyboard including an enter key and a set of function keys;
said assigning means includes means for assigning a first of said function keys to select a next display format in said hierarchical tree structure and for assigning a second of said function keys to select a previous display format in said hierarchical tree structure; and
said processing means includes means for controlling said display means to display said next display format in response to depression of said first function key, for controlling said display means to display said previous display format in response to depression of said second function key, and for controlling said display means to continue to display for currently displayed display format in response to depression of said enter key.

10. Apparatus as in claim 1 wherein said display formats each include a work area portion comprising at least one display only field displayed in normal video and at least one input field displayed in reverse video.

11. A digital radio transceiver programming apparatus of the type for loading personality defining information into an internal non-volatile memory of a digital radio transceiver, said apparatus comprising:
connector means for operatively connecting to said digital radio transceiver non-volatile memory;
user operable input means for inputting user selections, said input means including a set of user depressible keys;
processor means connected to said connector means and to said input means for generating digital signals specifying operating parameters of said digital radio transceiver in response to inputted user selections and for loading said digital signals into said digital radio transceiver non-volatile memory via said connector means, said processor means including means for dynamically assigning some of said user depressible keys to active status and associating said active status keys to user selectable functions, and for dynamically assigning others of said user depressible keys to inactive status said processor means including means for selectively displaying a window superimposed on at least one of said display formats, said window including an upper title portion, a center work area portion comprising at least one field, and a lower prompt line portion;
storage means connected to said processor means for storing further digital signals representing plural display formats, said plural display formats being organized in a hierarchical tree structure; and
display means connected to said processor means for selectively displaying said display formats in response to inputted user selections.

12. A digital radio transceiver programming apparatus of the type for loading personality defining information into an internal non-volatile memory of a digital radio transceiver, said apparatus comprising:
connector means for operatively connecting to said digital radio transceiver non-volatile memory;
user operable input means for inputting user selections, said input means including a set of user depressible keys;
processor means connected to said connector means and to said input means for generating digital signals specifying operating parameters of said digital radio transceiver in response to inputted user selections and for loading said digital signals into said digital radio transceiver non-volatile memory via said connector means;
storage means connected to said processor for storing further digital signals representing plural display formats organized in a hierarchical tree structure and for storing plural individual discrete help text files associated with and corresponding to said plural display formats; and
display means connected to said processor means for selectively displaying said display formats in response to inputted user selections,
said processing means including means for reading a help text corresponding to a display format displayed by said display means and controlling said display means to display the contents of said read help text file in a pop-up window overlaid said displayed display format in response to an inputted user selection via said input means.

13. Apparatus as in claim 12 wherein:
at least one of said display formats comprises plural input fields;
said storage means includes help subdirectory means for storing plural separate and discrete ASCII text help file corresponding to each of said plural input fields;
said display means includes means for displaying a cursor symbol;
said input means includes cursor control means manipulable by said user for moving said cursor symbol so as to superimpose said symbol over any of said input fields; and
said processor means includes means for selecting one of said plural help files in response to displayed cursor position and for controlling said display means to superimpose display the contents of said selected help file over display of said at least one display format.

14. A system as in claim 12 wherein each of said display formats displayed by said display means includes:
(a) a title section disposed in an upper portion of said display format,
(b) a work section disposed in a center portion of said display format, and
(c) plural function key symbols displayed in a lower portion of said display format.

15. A digital radio transceiver programming apparatus of the type for loading personality defining information into an internal non-volatile memory of a digital radio transceiver, said apparatus comprising:
connector means for operatively connecting to said digital radio transceiver non-volatile memory;
user operable input means for inputting user selections, said input means including a set of user depressible keys;
processor means connected to said connector means and to said input means for generating digital signals specifying operating parameters of said digital radio transceiver in response to inputted user selections and for loading said digital signals into said digital radio transceiver non-volatile memory via said connector means;
storage means connected to said processor for storing further digital signals representing plural display formats organized in a hierarchical tree structure, at least one of said display formats comprising plural input fields; and display means connected to said processor means for selectively displaying said display formats in response to inputted user selections, said processing means including means responsive to said input means for superimposing said cursor symbol over a user selected one of said input fields, and means for generating a prompt line responsive to the displayed position of said cursor and for controlling said display to display said generated prompt line at a lower portion within said work section.

16. An apparatus as in claim 15 wherein each of said display formats displayed by said display means includes:
   (a) a title section disposed in an upper portion of said display format,
   (b) a work section disposed in a center portion of said display format, said work section including said input fields, and
   (c) plural function key symbols displayed in a lower portion of said display format, said display means for also displaying a cursor symbol.

17. A digital radio transceiver programming apparatus of the type for loading personality defining information into a non-volatile memory associated a digital radio transceiver, said apparatus comprising:

means for operatively connecting to said digital radio transceiver non-volatile memory;
   user operable input means for inputting user selections;
   processor means connected to said connector means and to said input means for generating digital signals specifying operating parameters of said digital radio transceiver in response to inputted user selections and for loading said digital signals into said digital radio transceiver non-volatile memory via said connector means;
   storage means connected to said processor for storing further digital signals representing plural display formats organized in a hierarchical tree structure, at least one of said display formats comprises plural input fields; and
   display means connected to said processor means for selectively displaying said display formats in response to inputted user selections, each of said display formats displayed by said display means includes:
   (a) a title section disposed in an upper portion of said display format,
   (b) a work section disposed in a center portion of said display format, said work section including said input fields, and
   (c) said processing means including means responsive to said input means for selecting one of said input fields and for permitting said user to select a contents of said input fields via said input means, said processing means further including means for checking said selected contents for errors, means for generating an error message if said error checking means said selected contents contains errors, and means for controlling said display means to display a pop-up window and superimposed over the display of one of said screen formats, said pop-up window containing said generated error message.

18. Apparatus as in claim 17 wherein:
   said storage means includes means for storing plural personality files each having a unique name corresponding thereto;
   a first of said stored display formats comprises a current personality display format; and
   said processing means includes means for controlling said display means to display said current personality format including a listing of said stored plural personality file names, means for permitting said user to select one of said listed stored plural personality files from said list in response to user manipulation of said input means, and means for highlighting the listing of said selected file name in response to said user selection.

19. An apparatus as in claim 17 wherein each of said display formats displayed by said display means includes:
   (a) a title section disposed in an upper portion of said display format,
   (b) a work section disposed in a center portion of said display format, said work section including said input fields, and
   (c) said plural function key symbols displayed in a lower portion of said display format;
   said processing means including means responsive to said input means for selecting one of said input fields and for permitting said user to select a contents of said input fields via said input means, said processing means further including means for checking said selected contents for errors, means for generating an error message if said error checking means said selected contents contains errors, and means for controlling said display means to display a pop up window and superimposed over the display of one of said screen formats, said pop-up window containing said generated error message.

20. A method of loading personality defining information into a non-volatile memory also coated with a digital radio transceiver, said method comprising:
   operatively connecting to said digital radio transceiver non-volatile memory;
   inputting user selections including depressing a set of user depressible keys;
   generating digital signals specifying operating parameters of said digital radio transceiver in response to inputted user selections;
   loading said generated digital signals into said digital radio transceiver non-volatile memory;
   dynamically assigning some of said user depressible keys to active status and associating said active status keys to user selectable functions;
   dynamically assigning others of said user depressible keys to inactive status;
   storing further digital signals representing plural display formats organized in a hierarchical tree structure; and
   selectively displaying one of said display formats in response to inputted user selections including the following steps:
   (a) generating a title section and displaying said title section in an upper portion of an electronic display;
   (b) generating a tree level indicator indicating the position of said display format in said hierarchical tree structure and displaying said tree level indicator as part of said title section, and (c) displaying plural function key symbols representing said set of function keys in a lower portion of said display, including displaying each of said plural function key symbols which represents an active status function key with a legend indicating said associated user selectable function and displaying each of said plural function key symbols representing an inactive status function key with no function indicating legend.

21. A method as in claim 20 wherein said displaying step includes the following steps:

(a) generating a title section and displaying said title section in an upper portion of an electronic display, (b) generating a tree level indicator indicating the position of said display format in said hierarchical tree structure and displaying said tree level indicator as part of said title section, and (c) displaying plural key symbols representing said set of keys in a lower portion of said display, including displaying each of said plural key symbols which represents an active status function key with a legend indicating said associated user selectable function and displaying each of said plural key symbols representing an inactive status key with no function indicating legend.

22. A digital radio transceiver programming apparatus of the type for loading personality defining information into the internal non-volatile memory of a digital radio transceiver, said apparatus comprising:

connector means for operatively connecting to said digital radio transceiver non-volatile memory;

user operable input means for inputting user selections, said input means including a set of user depressible keys;

processor means connected to said connector means and to said input means for generating digital signals specifying operating parameters of said digital radio transceiver in response to inputted user selections and for loading said digital signals into said digital radio transceiver non-volatile memory via said connector means, said processor means including means for dynamically assigning some of said user depressible keys to active status and associating said active status keys to user selectable functions, and for dynamically assigning others of said user depressible keys to inactive status;

storage means connected to said processor means for storing further digital signals representing plural display formats, said plural display formats being organized in a hierarchical tree structure; and display means connected to said processor means for selectively displaying said display formats in response to inputted user selections; each of said display formats displayed by said display means includes:

(a) a title section disposed in an upper portion of said display format, said title section identifying a function currently being performed by said processor means, said title section including a tree level indicator indicating the position of said display format in said hierarchical tree structure, (b) a work section disposed in a center portion of said display format, and (c) plural function key symbols displayed in a lower portion of said display format, said symbols representing said set of keys, each of said plural key symbols which represents an active status key being displayed with a legend indicating said associated user selectable function, each of said plural key symbols representing an inactive status key being displayed with no function indicating legend.

23. A digital radio transceiver programming apparatus of the type for loading personality defining information into the internal non-volatile memory of a digital radio transceiver, said apparatus comprising:

connector means for operatively connecting to said digital radio transceiver non-volatile memory;

user operable input means for inputting user selections, said input means including a set of user depressible keys;

processor means connected to said connector means and to said input means for generating digital signals specifying operating parameters of said digital radio transceiver in response to inputted user selections and for loading said digital signals into said digital radio transceiver non-volatile memory via said connector means, said processor means including means for dynamically assigning some of said user depressible keys to active status and associating said active status keys to user selectable functions, and for dynamically assigning others of said user depressible keys to inactive status;

storage means connected to said processor means for storing further digital signals representing plural display formats, said plural display formats being organized in a hierarchical tree structure, and display means connected to said processor means for selectively displaying said display formats in response to inputted user selections;

wherein each of said display formats displayed by said display means includes:

(a) a title section identifying a function currently being performed by said processor means, said title section including a tree level indicator indicating the position of said display format in said hierarchical tree structure, (b) a work section, and (c) plural function key symbols representing said set of keys, each of said plural key symbols which represents an active status key being displayed with a legend indicating said associated user selectable function.

* * * * *